United States Patent
Verdejo Amengual

(10) Patent No.: US 12,539,075 B2
(45) Date of Patent: Feb. 3, 2026

(54) METHOD AND SYSTEM FOR EVALUATION AND MONITORING OF MUSCLE HEMODYNAMIC PERFORMANCE DURING A CYCLICAL LOCOMOTOR ACTIVITY

(71) Applicant: Martí Verdejo Amengual, Islas Baleares (ES)

(72) Inventor: Martí Verdejo Amengual, Islas Baleares (ES)

( * ) Notice: Subject to any disclaimer, the term of this patent is extended or adjusted under 35 U.S.C. 154(b) by 447 days.

(21) Appl. No.: 18/016,199

(22) PCT Filed: Jul. 16, 2021

(86) PCT No.: PCT/ES2021/070530
§ 371 (c)(1),
(2) Date: Jan. 13, 2023

(87) PCT Pub. No.: WO2022/013479
PCT Pub. Date: Jan. 20, 2022

(65) Prior Publication Data
US 2023/0371887 A1    Nov. 23, 2023

(30) Foreign Application Priority Data
Jul. 17, 2020    (ES) .................... 202030749

(51) Int. Cl.
*A61B 5/00* (2006.01)
*A61B 5/0205* (2006.01)
(Continued)

(52) U.S. Cl.
CPC .......... *A61B 5/4519* (2013.01); *A61B 5/0075* (2013.01); *A61B 5/0205* (2013.01);
(Continued)

(58) Field of Classification Search
CPC ... A61B 5/4519; A61B 5/0075; A61B 5/0205; A61B 5/1107; A61B 5/1118;
(Continued)

(56) References Cited

U.S. PATENT DOCUMENTS

2010/0071696 A1* 3/2010 Jafari ................... A61B 5/087
128/204.23
2015/0265194 A1 9/2015 Pollonini et al.
(Continued)

FOREIGN PATENT DOCUMENTS

WO    20160191594 A1    12/2016
WO    20190035027 A1    2/2019

OTHER PUBLICATIONS

M. Verdejo Amengual, "Convergencia de Moxy y Portable V02", blog, 2018, <https://web.archive.org/web/20200217102310/http://my.moxymonitor.com/blog/convergence-of-moxy-and-portable-vo2-0> <retrieved on Jul. 24, 2023>.
(Continued)

*Primary Examiner* — Catherine M Voorhees
(74) *Attorney, Agent, or Firm* — Hayes Soloway PC

(57) ABSTRACT

Monitoring and evaluation method of muscle hemodynamic performance during a cyclical locomotor activity that includes the stages of provide one or more NIRS sensors, place the sensors on muscle tissues, provide a heart rate monitor and a locomotor intensity meter, obtain data relative to $SmO_2\%$, ThB, of each of the muscle tissues, heart rate (bpm) and locomotor intensity data, calculate the values of $SmO_2\%$, $O_2HHb$ and HHb, $\Phi O_2HHb$ and $\Phi HHb$, ThB and $\Phi ThB$, calculate the general trend line, calculate and obtain the physiological thresholds of each muscle tissue and the general thresholds, evaluate and/or compare the evolution and trend between two or more of the muscle tissues to determine the performance of the physiological sub-factors that make up the performance of muscle oxidative capacity (Continued)

and/or the delivery capacity of oxygen-charged and oxygen-discharged blood.

17 Claims, 16 Drawing Sheets

(51) Int. Cl.
*A61B 5/11* (2006.01)
*A61B 5/1455* (2006.01)
*G16H 40/67* (2018.01)
*A61B 5/024* (2006.01)

(52) U.S. Cl.
CPC ............ *A61B 5/1107* (2013.01); *A61B 5/1118* (2013.01); *A61B 5/14551* (2013.01); *A61B 5/7225* (2013.01); *G16H 40/67* (2018.01); *A61B 5/02416* (2013.01); *A61B 5/6823* (2013.01); *A61B 2562/04* (2013.01)

(58) Field of Classification Search
CPC .............. A61B 5/14551; A61B 5/7225; A61B 5/02416; A61B 5/6823; A61B 5/222; G16H 40/67
See application file for complete search history.

(56) References Cited

U.S. PATENT DOCUMENTS

| | | |
|---|---|---|
| 2016/0346891 A1 | 12/2016 | Kirby et al. |
| 2017/0303788 A1 | 10/2017 | Xavier Da Silveira et al. |
| 2018/0161658 A1* | 6/2018 | Felker ................. A63B 71/0622 |
| 2020/0194106 A1* | 6/2020 | Olson .................. A61B 5/7282 |
| 2021/0169417 A1* | 6/2021 | Burton ................. A61B 5/4857 |
| 2021/0366606 A1* | 11/2021 | Shahadi ................. G01S 13/89 |
| 2022/0378377 A1* | 12/2022 | Au .......................... G16H 40/63 |
| 2023/0142728 A1* | 5/2023 | Otsuki ................... A61B 5/725 600/509 |
| 2023/0218221 A1* | 7/2023 | Kwalwasser ........ A61B 5/7275 600/301 |

OTHER PUBLICATIONS

Stephan Van Der Zwaard, "Oxygenation Threshold Derived from Near-Infrared Spectroscopy: Reliability and Its Relationship with the First Ventilatory Threshold", Article, 2016, 1-16, PLOS ONE.

* cited by examiner

SMO2 tHb

METHOD AND SYSTEM FOR EVALUATION AND MONITORING OF MUSCLE HEMODYNAMIC PERFORMANCE DURING A CYCLICAL LOCOMOTOR ACTIVITY

CROSS-REFERENCE TO RELATED APPLICATIONS AND PRIORITY

This patent application claims priority from PCT Application No. PCT/ES2021/070530 filed Jul. 16, 2021 which claims priority from Spanish Patent Application No. P202030749 filed Jul. 17, 2020.

OBJECT OF THE INVENTION

The present invention relates to a monitoring and evaluation method of muscle hemodynamic performance, in particular a monitoring and evaluation method based on the use of near infrared sensors (NIRS).

The object of the present invention is to provide a method and a muscle hemodynamic monitoring and evaluation system that allows to evaluate and analyze the performance of muscle tissues in an analytical way and a global way overall performance of all muscle tissues during a cyclical locomotor activity.

BACKGROUND OF THE INVENTION

Nowadays, a lot of many assessment methods and devices, both invasive and non-invasive, are used to assess the physiological performance of the human body in a multitude of locomotor movements and in a wide variety of conditions. One of the most used methods to evaluate the physiological performance during exercise is the measurement of indirect calorimetry, from which derive variables relating to the exchange of gases in the human body.

Indirect calorimetry is a representation of the joint performance of all muscle tissues. On the other hand, this evaluation method doesn't allow to know what the performance of each one of the muscular tissues has been like.

Blood Lactate $[La_+]$ measurements are also widely very used in the research and sports world to correlate them with locomotor performance, since certain levels and increases in Blood Lactate values are associated with certain work intensities.

The closest method that allows to partially measure the performance of the muscular tissues during a Locomotor Activity or Cyclic Physical Activity (AFM) is the use of electromyography, whether invasive or surface. However, this method only allows obtaining the electrical activation values of each muscle tissue (TM).

Currently athletes and coaches use one to three NIRS devices to evaluate the physiological performance of an athlete in a physical activity. In these studies, only Muscular Oxygen Saturation ($SmO_2$) and Capillary Hemoglobin (ThB) values are used to establish in a very generic way what the athlete's performance limitation has been during exercise. Thus, the data obtained from one or two muscle tissues are used to determine that the subject evaluated has a general physiological limitation of this nature in his muscles, without taking into account the performance of other muscle tissues.

Likewise, state-of-the-art studies use only 1 or 2 NIRS devices to evaluate highly analytical aspects of the hemodynamic performance (% $SmO_2$, ThB, $O_2HHb$, HHb) of one or two muscle tissues (mainly: deltoid, vast lateral & rectus femoris). Data obtained from muscle tissues are used to represent the hemodynamic performance of all muscle tissues, assuming that there is symmetry in all active tissues.

DESCRIPTION OF THE INVENTION

The present invention refers to a method of monitoring and evaluating of muscle hemodynamic performance, in a non-invasive way, through the use of near-infrared spectroscopy (NIRS) devices, to establish the hemodynamic performance of multiple muscles tissues (TMs) of simultaneously during a Locomotor Activity or Cyclic Physical Activity (AFM) determined.

In general, the monitoring and evaluation method of the invention analyses three aspects of muscle hemodynamic performance which are:

1. The Physiological Thresholds: From the monitoring and evaluation of the redirection of blood flow developed in the TM, the Minimum Activation Threshold ($U_{Amin}$), the Aerobic Threshold ($U_{Ae}$) and the Anaerobic Threshold ($U_{Ana}$) can be established.
2. The Muscle Oxidative Capacity: The performance in the capacity that has each TM for consuming the oxygen that is delivered by the cardiovascular system for production of the energy necessary to develop locomotor movement.
3. The Delivery of Oxygen Loaded and Oxygen Discharged Blood: The performance in the capacity to deliver the oxygen-loaded blood necessary for $TM_s$ to be able to consume it and produce the energy necessary for locomotor movement. It also includes hemodynamic performance in the ability to maintain blood flow and venous return necessary for each work intensity.

Each one of these aspects determine the general hemodynamic performance of each muscle tissue and at the same time report a collective performance of the muscular system as a whole. Oxidative capacity and blood delivery have a series of sub-factors that determine specific aspects of their activity, offering information on the level of performance of each TM individually and collectively, in addition to the link with other physiological systems.

The method of the invention comprises in general the following differentiated parts:

1. Capture of hemodynamic data during locomotor performance: while the user that is evaluated, perform an AFM with certain characteristics, the NIRS devices are adhered to the human skin in each of the TMs involved in AFM, additionally they can be included other $TM_s$ involved in the inspiration and expiration phases. The hemodynamic values are registered by these devices and also the heart rate (HR) values can be registered with a monitor of HR. Also, record data on external locomotor performance developed during AFC, such as power or cadence data.
2. Data Management: Doing a process of downloading, synchronization, linking and filtering of the data obtained is carried out, through a data processing system.
3. Analysis and Evaluation of the Hemodynamic Data Obtained During Monitored Locomotor Activity or Cyclic Physical Activity ($AFC^M$): The hemodynamic data obtained with the NIRS devices and the other devices during the $AFC^M$ are evaluated and analysed analytically for each TM, and jointly for to establish which has been the physiological performance of the all TMs during the $AFC^M$, the physiological thresholds of each TM, the general physiological thresholds, the performance of each subfactor and the physiological factors limiting muscle hemodynamic performance during the developed $AFC^M$.

The invention refers to a Muscle Hemodynamic Monitoring and Evaluation Method that allows the evaluation and analysis of locomotor performance during $AFC^M$, allowing to analysis and determination of the systemic or analytical physiological factors that limit or impede the perfect locomotor performance of human muscle tissues. FIG. 1 shows the general scheme of all the factors that allows to evaluate and analyze.

In the first place, data capture is carried out, which refers to procedures prior to data recording of the evaluation and monitoring method of the invention.

1. The evaluation and monitoring method comprises a first stage of providing the subject to be evaluated of:
   Two or more near infrared sensors (NIRS).
   One Heart Rate (HR) monitor.
   One physical activity monitor or data recording device.
   One intensity meter or device (GPS, power meter, . . . ).
   Complementarily they can be provided of devices or meters of locomotor performance parameters (meter of cadence, pedometers, . . . ) or meters of other physiological variables (VO2/CO2 gas analyzers, surface electromyography, . . . ).

2. The NIRS are placed or adhered on the muscle tissues (TM) that will be evaluated and will participate in the Monitored Locomotor Activity or Cyclic Physical Activity ($AFM^M$).
   Likewise, the HR band will be placed on the subject's chest and any other monitor, devices and/or intensity and/or locomotor and/or physiological performance meter that requires it to obtain data will be placed or added.

3. The data recording of all devices and activity monitors begins, minimally from the start of the AFM.

The $AFM^M$ comprises one or more of the following characteristics:
The subject to be evaluated will carry out a $AFC^M$, such as running, swimming, pedalling, rowing, . . .
The devices record the data they capture and/or monitor during $AFC^M$.
The activity monitor records the full-time scale from the beginning to the end of the $AFC^M$, including the multiple intervals of work and/or rest if performed.
Complementary and/or necessary tools can be used for the development of $AFC^M$.
The data recording frequency of each device must be less than 6 seconds.
The $AFC^M$ can be continuous or intervallic.
The $AFC^M$ can be of stable, incremental, decreasing or variable locomotive intensity.
The $AFC^M$ may or may not include a warm-up/prior preparation, and if it does not include it, the $AFC^M$ may contain a warm-up exercise prior to monitoring without the need to be recorded.
The minimum number of records for each device will be equivalent to the minimum number of records to be able to generate the trend line of the variables that the device is monitoring.
The characteristics of locomotor exercise (volume, duration, density, intensity, number of intervals, intensity of each interval, properties of the environment, . . . ) will depend on the physiological factor or factors of muscle performance that want to be evaluated, having a composition, structure and own characteristics in each case.

External accessories or materials that participate in the locomotive activity may be introduced, such as a bicycle, a canoeing paddle or skis.

The processing system takes care of the data management stage, which includes downloading, synchronization, data filtering, and data analysis.

Thus, once the $AFC^M$ is finished, the following steps will be carried out:
1. Download all the data from each device with his temporary record of each value. The values downloaded by each device:
   a. NIRS: Muscular Oxygen Saturation (%-$SmO_2$%) and Capillary Hemoglobin (g/dL-ThB).
   b. Heart Rate Monitor: Heart Rate (bpm-HR)
   c. Activity Monitor and/or computing device: temporal scale of $AFC^M$
   d. Intensity device or monitor: Power (Watts)/Speed (Km/h)/Pace (min/Km)/Any locomotor intensity measurement
   e. External locomotor performance devices and/or monitors: Cadence (rpm)/Accelerometer/Pedometer/Any other type of device that provides data on external locomotor performance
   f. Devices and/or monitors of Physiological Locomotor Performance: Metabolic gas analyzers (VO2/CO2), lactate meters, thermal imaging cameras . . .
2. Sync, link and pair all values on a single grouped data timescale starting from the timescale collected by the activity monitor during $AFC^M$
3. Calculate the values for each Monitored Muscle Tissue ($TM^M$) that participate in the $AFC^M$ from the recorded data of $SmO_2^\%$ and ThB of:
   Oxygen-Charged Capillary Hemoglobin–g/dL ($O_2HHb$) % ($SmO_2$)*g/dL (ThB)=g/dL ($O_2HHb$)
   Oxygen Discharged Capillary Hemoglobin–g/dL (HHb) g/dL (ThB)–g/dL ($O_2HHb$)=g/dL (HHb)
   Muscle Blood Flow of Muscle Hemoglobin–g/dL/s ($\Phi ThB$). [g/dL (ThB)*(HR)]/60=g/dL/seg ($\Phi ThB$)
   Muscular Blood Flow of Oxygen-Charged Hemoglobin–g/dL/s ($\Phi O_2HHb$). [g/dL ($O_2HHb$)*(HR)]/60=g/dL/seg ($\Phi O_2HHb$)
   Muscular Blood Flow of Oxygen Discharged Hemoglobin–g/dL/s ($\Phi HHb$). [g/dL (HHb)*(HR)]/60=g/dL/seg ($\Phi HHb$)
4. Filter and exclude the data obtained erroneously and/or by registration error by the devices during $AFC^M$. Exclude the data that are not within the following ranges and all the data obtained from the calculation of any of them:
   a. SMO2% [Between 1% $SmO_2$ and 99% $SmO_2$]
   b. ThB [Between 9.5 g/dL and 14.9 g/dL]
   c. HR [Between 40 ppm and 230 ppm]
5. Filter and exclude the data that present a difference greater than that established in the following parameters, between the temporary records of the same previous and subsequent value, and all the data obtained from the calculation of any of them will also be excluded:
   a. Difference of $SmO_2^\%$ [>±10% SmO2%]
   b. Difference of ThB [>±0.3 g/dL]
   c. Difference of HR [>±7 ppm]

Then, through the processing system, an analysis and an evaluation of the data obtained during the $AFC^M$ is carried out.

Previously to the analysis of the physiological factors, the intensity or range of locomotor intensity equivalent to the Minimum Activation Threshold ($U_{Amin}$), the Aerobic Threshold ($U_{Ae}$) and the Anaerobic Threshold ($U_{Ana}$) that the user has developed during the $AFC^M$ will be established.

To be able to establish each of the thresholds mentioned, it will require that intensities above these thresholds have been developed in the $AFC^M$, in order to be monitored. Previous calculating the physiological thresholds, the trend line of each value obtained and/or calculated, for each $TM^M$ will be established.

Thus, it proceeds to perform, through the processing system, an analysis and evaluation of physiological thresholds and the calculation of a trend line of the values obtained.

To the Physiological Thresholds are obtaining from combination of all the data of $SmO_2\%$, ThB, $\Phi$ThB, $O_2$HHb, $\Phi O_2$HHb, HHb, $\Phi$HHb of all $TM^M$. The procedure for calculating the Thresholds, through the processing system, has got the following steps:

1. Filter and exclude all values obtained, calculated and/or recorded during all Rest Intervals (ID) or without AFC.
2. Filter and exclude all values obtained, calculated and/or recorded during the first minute of each work interval (IT).
3. Filter and exclude all the values obtained, calculated and/or registered when the value of locomotor intensity in the same time register is equivalent to "0".
4. Filter and exclude all the values obtained, calculated and/or registered when the value of locomotor movement frequency in the same time register is equivalent to "0".
5. Choose and perform at least one of the following procedures:

Procedure A

I. Calculate the statistical median value ($\check{Y}$) of the values SmO2%, ThB, $\Phi$ThB, O2HHb, $\Phi$O2HHb, HHb, $\Phi$HHb of each $TM^M$, during $AFC^M$, in each Locomotor Work Intensity ($INT^{TL}$) or in each Intensity Range of Locomotor Work ($R$-$INT^{TL}$), that participates in the $AFC^M$.
II. Establish the Trend Line ($Lin^{Trend}$) of the median values ($\check{Y}$-$INT^{TL}$) or ($\check{Y}$-$R$-$INT^{TL}$) obtained from $\check{Y}SmO_2\%$, $\check{Y}$ThB, $\check{Y}\Phi$ThB, $\check{Y}O_2$HHb, $\check{Y}\Phi O_2$HHb, $\check{Y}$HHb and $\check{Y}$HHb, in each $TM^M$.

Procedure B

I. Calculate the statistical average value ($\overline{Y}$) of the values of $SmO_2\%$, ThB, $\Phi$ThB, $O_2$HHb, $\Phi O_2$HHb, HHb, $\Phi$HHb, of each $TM^M$, during $AFC^M$, in each $INT^{TL}$ or $R$-$INT^{TL}$, which participates in the $AFC^M$.
II. Establish the $Lin^{Trend}$ of the average values ($\overline{Y}$-$INT^{TL}$) or ($\overline{Y}$-$R$-$INT^{TL}$) obtained from $\overline{Y}SmO_2\%$, $\overline{Y}$ThB, $\overline{Y}\Phi$ThB, $\overline{Y}O_2$HHb, $\overline{Y}\Phi O_2$HHb, $\overline{Y}$HHb and $\overline{Y}\Phi$HHb, in each $TM^M$.

Procedure C

I. Establish the $Lin^{Trend}$ (Value/$INT^{TL}$) or (Value/$R$-$INT^{TL}$), from all filtered values of $SmO_2\%$, ThB, $\Phi$ThB, $O_2$HHb, $\Phi O_2$HHb, HHb, $\Phi$HHb, in each $TM^M$.

6. Calculate all values of $Lin^{Trend}|Y|SmO_2\%$, |Y|ThB, |Y|$\Phi$ThB, |Y|$O_2$HHb, |Y|$\Phi O_2$HHb, |Y|HHb and |Y|$\Phi$HHb, of each $TM^M$, for each $INT^{TL}$ or $R$-$INT^{TL}$.
7. Calculate the Slope (p) between each of the values of |Y|$SmO_2\%$, |Y|ThB, |Y|$\Phi$ThB, |Y|$O_2$HHb, |Y|$\Phi O_2$HHb, |Y|HHb and |Y|$\Phi$HHb, from each $TM^M$.
8. Calculate, analyze and determine all the trend changes of (p) in each of the $Lin^{Trend}$, of all the values |Y|$SmO_2\%$, |Y|ThB, |Y|$\Phi$ThB, |Y|$O_2$HHb, |Y|$\Phi O_2$HHb, |Y|HHb and |Y|$\Phi$HHb, of each $TM^M$.
9. Calculate, analyze and establish between which two values of $INT^{TL}$ or $R$-$INT^{TL}$ occurs the 1st, 2nd and 3rd General Change of the trend of the slope (p) of $Lin^{Trend}|Y|SmO_2\%$, |Y|ThB, |Y|$\Phi$ThB, |Y|$O_2$HHb, |Y|$\Phi O_2$HHb, |Y|HHb and |Y|$\Phi$HHb, in each $TM^M$.
10. Establish the intensity range in which the 1st General Change of the slope (p) trend occurs, of each $TM^M$, through the combining at least 4 of the 7 $INT^{TL}$ or $R$-$INT^{TL}$ analyzed and established in the previous step (9), for each $TM^M$.
11. Establish the intensity range in which the 2nd General Change of the slope (p) trend occurs, of each $TM^M$, through the combining at least 4 of the 7 $INT^{TL}$ or $R$-$INT^{TL}$, analyzed and established in the previous step (9), for each $TM^M$.
12. Establish the intensity range in which the 3rd General Change of the slope (p) trend occurs, of each $TM^M$, through the combining at least 4 of the 7 $INT^{TL}$ or $R$-$INT^{TL}$, analyzed and established in the previous step (9), for each $TM^M$.
13. Establish the Physiological Thresholds of each $TM^M$ from the data calculated and established in the previous points:

|  | 1st General Change (p) $U_{Amin\ Individual}$ | 2nd General Change (p) $U_{Ae\ Individual}$ | 3rd General Change (p) $U_{Ana\ Individual}$ |
|---|---|---|---|
| $TM^M$ | Rank\|X\| (Watts) \|X\| (Watts) | Rank\|X\| (Watts) \|X\| (Watts) | Rank\|X\| (Watts) \|X\| (Watts) |

14. Establish the central $INT^{TL}$ or $R$-$INT^{TL}$ of the General Physiological Thresholds from the median of the values of the individual thresholds of all $TM_S^M$:

|  | 1st General Change (p) $U_{Amin}$ | 2nd General Change (p) $U_{Ae}$ | 3rd General Change (p) $U_{Ana}$ |
|---|---|---|---|
| $TM^M$ | Rank\|X\| (Watts) \|X\| (Watts) | Rank\|X\| (Watts) \|X\| (Watts) | Rank\|X\| (Watts) \|X\| (Watts) |

15. Coming up next, the processing system can then also determine the level of symmetry or asymmetry that has been obtained between at least two groups of values and/or trend of the values |Y|$SmO_2\%$, |Y|ThB, |Y|$\Phi$ThB, |Y|$O_2$HHb, |Y|$\Phi O_2$HHb, |Y|HHb and/or |Y|$\Phi$HHb, between two $INT^{TL}$ or two $R$-$INT^{TL}$, between at least two $TM_S^M$:

a) Coefficient of Symmetry Between Values (CSV)

To set whether a set of values |Y|$SmO_2\%$, |Y|ThB, |Y|$\Phi$ThB, |Y|$O_2$HHb, |Y|$\Phi O_2$HHb, |Y|HHb and/or |Y|$\Phi$HHb, between two $INT^{TL}$ or two $R$-$INT^{TL}$, of at least two $TM_S^M$ have some level of symmetry or asymmetry, the following procedure must be carried out:

Calculate, analyze and determine the CSV of the values of |Y|$SmO_2\%$, |Y|ThB, |Y|$\Phi$ThB, |Y|$O_2$HHb, |Y|$\Phi O_2$HHb, |Y|HHb or |Y|$\Phi$HHb, between two $INT^{TL}$ or two $R$-$INT^{TL}$ determined, between at least two determined $TM_S^M$:

$$CSV = \frac{\text{Standard Deviation } (\sigma) \text{ of the values of } |Y|}{\text{Average of the values of } |Y|}$$

Establish the Symmetry Level ($NS^{CSV}$) from the CSV value calculated from the values |Y|$SmO_2\%$, |Y|ThB, |Y|$\Phi$ThB, |Y|$O_2$HHb, |Y|$\Phi O_2$HHb, |Y|HHb or

|Y|HHb, between two $INT^{TL}$ or two $R\text{-}INT^{TL}$ determined, between at least two $TM_S^M$ determined:

| Symmetry Level | CSV | | | | | |
|---|---|---|---|---|---|---|
| ($NS^{CSV}$) | $SmO_2$ % | | $O_2HHb - HHb$ | | $\phi O2HHb - \phi HHb$ | |
| Perfect | ≤0.01 | | ≤0.001 | | ≤0.01 | |
| Optimum | >0.01 | ≤0.05 | >0.001 | ≤0.005 | >0.01 | ≤0.05 |
| Minimal | >0.05 | ≤0.20 | >0.005 | ≤0.02 | >0.05 | ≤0.2 |
| Asymmetry | >0.20 | | >0.02 | | >0.2 | |

B) Symmetry Coefficient Between the Trends of the Values-TGV (Coef-$\overrightarrow{(p)}$)

To establish whether the trend of the values |Y|$SmO_2$%, |Y|$O_2HHb$, |Y|$\Phi O_2HHb$, |Y|HHb and/or |Y|$\Phi HHb$, between two $INT^{TL}$ or two $R\text{-}INT^{TL}$ determined, of a $TM^M$ have some level of symmetry or asymmetry with the trend of the values |Y|$SmO_2$%, |Y|$O_2HHb$, |Y|$\Phi O_2HHb$, |Y|HHb and/or |Y|$\Phi HHb$, between two $INT^{TL}$ or two $R\text{-}INT^{TL}$ determined, of at least one other $TM^M$ or a set of $TM_S^M$, the following procedure must be carried out:

Calculate, analyze and determine the slope-trend $\overrightarrow{(p)}$|Y| of at |Y|$SmO_2$%, |Y|$O_2HHb$, |Y|$\Phi O_2HHb$, |Y|HHb and/or |Y|$\Phi HHb$, between two $INT^{TL}$ or two $R\text{-}INT^{TL}$ determined, of at least two $TM_S^M$ determined:

$$\overrightarrow{(p)} = \frac{|Y|2 - |Y|1}{|X|2 - |X|1};$$

where $\overrightarrow{(p)}$ is the slope-trend; |Y|1 the determined value of $SmO_2$%, $O_2HHb$, $\Phi O_2HHb$, HHb o $\Phi HHb$, of the 1ST $LNT^{TL}$ or $R\text{-}INT^{TL}$ determined and |Y|2 of the 2nd $INT^{TL}$ or $R\text{-}INT^{TL}$ determined; |X|1 is the 1ST $LNT^{TL}$ or $R\text{-}INT^{TL}$ and |X|2 the 2nd $INT^{TL}$ or $R\text{-}INT^{TL}$ determined.

Calculate, analyze and establish the Coef-$\overrightarrow{(p)}$ of $\overrightarrow{(p)}$|Y|$SmO_2$%, $\overrightarrow{(p)}$|Y|$O_2HHb$, $\overrightarrow{(p)}$|Y|$\Phi O_2HHb$, $\overrightarrow{(p)}$|Y|HHb and/or $\overrightarrow{(p)}$|Y|HHb between two $INT^{TL}$ or two $R\text{-}INT^{TL}$ determined, of one $TM^M$ determined with respect to the trend of the values $\overrightarrow{(p)}$|Y|$SmO_2$%, $\overrightarrow{(p)}$|Y|$O_2HHb$, $\overrightarrow{(p)}$|Y|$O_2HHb$, $\overrightarrow{(p)}$|Y|HHb and/or $\overrightarrow{(p)}$|Y|$\Phi HHb$ of another $TM^M$ or a set of trends of values $\overrightarrow{(p)}$|Y|$SmO_2$%, $\overrightarrow{(p)}$ Y|$O_2Hb$, $\overrightarrow{(p)}$|Y|$O_2HHb$, $\overrightarrow{(p)}$|Y|HHb and/or $\overrightarrow{(p)}$|Y|$\Phi HHb$ of two or more $TM_S^M$ determined:

Coef-$\overrightarrow{(p)}$ = [$\overrightarrow{(p)}$|Y|]−[$\overrightarrow{(p_1)}$|Y|]

Where $\overrightarrow{(p)}$|Y| is the median slope-trends of the compared $TM_S^M$ and $\overrightarrow{(p_1)}$|Y| is the slope-trend of the analyzed $TM^M$. Establish the Symmetry Level ($NS^{Coef(p)}$) from the calculated value of Coef-$\overrightarrow{(p)}$ $\overrightarrow{(p)}$|Y|$SmO_2$%, $\overrightarrow{(p)}$|Y|$O_2HHb$, $\overrightarrow{(p)}$|Y|HHb, $\overrightarrow{(p)}$|Y|HHb o $\overrightarrow{(p)}$|Y|$\Phi HHb$ of the analyzed $TM^M$:

| Symmetry Level | Coef-$\overrightarrow{(p)}$ | | | | | |
|---|---|---|---|---|---|---|
| ($NS^{Coef\text{-}(p)}$) | $SmO_2$% | | $O_2HHb\text{-}HHb$ | | $\Phi O_2HHb\text{-}\Phi HHB$ | |
| Perfect | ≤0.01 | | ≤0.001 | | ≤0.01 | |
| Optimum | >0.01 | ≤0.05 | >0.001 | ≤0.005 | >0.01 | ≤0.05 |
| Minimal | >0.05 | ≤0.15 | >0.005 | ≤0.015 | >0.05 | ≤0.15 |
| Asymmetry | >0.15 | | >0.015 | | >0.15 | |

16. The processing system coming up next determines if there are limitations on the performance of the subject to be analyzed and of what type these limitations are. To do this, a series of values and ranges of the measured and calculated variables are determined that indicate the presence of different types of limitations. The types of limitations that may exist and the steps to follow in determining the presence of each one in the subject's performance are explained below.

A. Muscle Oxidative Capacity

The oxidative capacity is the potential of the muscular tissues to consume the oxygen delivered in the muscular capillaries and with the objective of producing an amount of adenosine triphosphate (ATP) necessary for the locomotor movement.

When evaluating the hemodynamic performance, the performance of the global muscle oxidative capacity is established, that is, the global or average level of the entire locomotor system, and at the same time the individual performance level of each muscle tissue is established. Since there are multiple factors that can affect to the ability of consume oxygen of only one muscle tissue while the consumption potential remains intact in the other muscle tissues.

A perfect global or general muscle oxidative capacity occurs when each muscle tissue that participates in locomotor activity is capable of consuming all the oxygen delivered by the cardiovascular system.

On the contrary, limitations can occur with respect to the maximum potential of oxidative capacity when in at least one, a group or all the muscular tissues do not express the maximum capacity or potential to consume all the oxygen delivered by the cardiovascular system.

A1. Structural Factor of Oxidative Capacity

Factor (A1) is that factor that analyzes and evaluates the performance of the level of mitochondrial density and/or oxidative enzymes available to muscle tissues. Oxygen is consumed within the mitochondria and the enzymes participate in this process and establish the speed at which it is consumed, a low level of both means a low capacity to consume oxygen and produce high amounts of energy per unit of time. A limitation in this factor means a general limitation of oxidative capacity in practically almost all muscle fibers.

To establish that there is a Limitation in Factor A1, the following steps and criteria must be met:

Evaluate the value of |Y|$SmO_2$% in each $INT^{TL}$ or R-IN-$T^{TL}$, $INT^{TL}$ greater than or equal to $U_{Amin}$ and less than or equal to $U_{Ana}$.

Calculate, compare, evaluate and establish the Coefficient of Symmetry between Values (CSV) and the Level of Symmetry ($NS^{CSV}$) between |Y|$SmO_2$%, |Y|$O_2HHb$ and |Y|$\Phi O_2HHb$ of each $TM^M$ and his Contralateral Muscle Tissue Monitored ($TMC^M$), in each $INT^{TL}$ or $R\text{-}INT^{TL}$ $INT^{TL}$ greater than or equal to $U_{Amin}$ and less than or equal to $U_{Ana}$.

Calculate, compare and evaluate the General Trend of the Values (TGV [$\overrightarrow{(p)}$]) |Y|SmO$_2$%, |Y|ΦO$_2$HHb and |Y|O$_2$HHb, of all TM$_S^M$, in the R-INT$^{TL}$ (U$_{Amin}$-U$_{Ae}$) and (U$_{Ae}$-U$_{Ana}$).

Calculate, compare and establish the lowest value of Coef-$\overrightarrow{(p)}$ and the equivalent NS$^{Coef-(p)}$ of $\overrightarrow{(p)}$ |Y|SmO$_2$%, $\overrightarrow{(p)}$ |Y|PO$_2$HHb and $\overrightarrow{(p)}$ |Y|O$_2$HHb, between the combination of at least 70-75% of the TM$_S^M$, in the R-INT$^{TL}$ (U$_{Amin}$-U$_{Ae}$) and (U$_{Ae}$-U$_{Ana}$).

Determine that the following criteria are met to establish a limitation in Factor (A1):

1. The value of |Y|SmO$_2$% in each INT$^{TL}$ or R-INT$^{TL}$ INT$^{TL}$ greater or equal than U$_{Amin}$ and less than or equal to U$_{Ana}$, is ≥70% SmO$_2$%, in at least 70-75% of TM$_S^M$.
2. The values of |Y|SmO$_2$%, |Y|O$_2$HHb and |Y|ΦO$_2$HHb of each TM$^M$ and TMC$^M$, have at least one optimal symmetry, in each INT$^{TL}$ or R-INT$^{TL}$ greater than or equal to U$_{Amin}$ and less than or equal to U$_{Ana}$, in at least the 70-75% of TM$_S^M$.
3. The TGV of de $\overrightarrow{(p)}$ |Y|SmO$_2$%, $\overrightarrow{(p)}$ |Y|ΦO$_2$HHb and $\overrightarrow{(p)}$ |Y|O$_2$HHb is symmetric between the combination of at least 70-75% of TM$_S^M$, in the R-INT$^{TL}$ (U$_{Amin}$-U$_{Ae}$) and (U$_{Ae}$-U$_{Ana}$).
4. The TGV of de $\overrightarrow{(p)}$ |Y|SmO$_2$%, $\overrightarrow{(p)}$ |Y|ΦO$_2$HHb and $\overrightarrow{(p)}$ |Y|O$_2$HHb is symmetric between each TM$^M$ and his TMC$^M$, in at least 80-85% of TM$_S^M$, in the R-INT$^{TL}$ (U$_{Amin}$-U$_{Ae}$) and (U$_{Ae}$-U$_{Ana}$).

A2. Functional Factor of Oxidative Capacity by General Fatigue

The functional factor of oxidative capacity is that factor that analyzes and evaluates whether the muscle tissues have the potential or the capacity to consume large amounts of oxygen delivered by the cardiovascular system, but due to factors of general fatigue, the muscle tissues lose part or all its consumption potential. Once the general fatigue disappears, this limitation disappears, it is a temporary limitation of the performance of the oxidative capacity and it is observed in practically all the muscular tissues at the same time.

To establish a Limitation on Factor (A2) the following steps and criteria must be met:

Evaluate the values of |Y|SmO$_2$%, |Y|O$_2$HHb and |Y|O$_2$HHb of each TM$^M$, in each INT$^{TL}$ or R-INT$^{TL}$ greater than or equal to U$_{Amin}$.

Calculate and evaluate the difference of SmO$_2$% between the value of |Y|SmO$_2$% of each TM$^M$ and his TMC$^M$, in each INT$^{TL}$ or R-INT$^{TL}$ greater than or equal to U$_{Amin}$.

Compare, evaluate and determine the CSV and NS$^{CSV}$ between the values of |Y|SmO$_2$%, |Y|ΦO$_2$HHb and |Y|O$_2$HHb of each TM$^M$ and his TMC$^M$, in each INT$^{TL}$ or R-INT$^{TL}$ greater than or equal to U$_{Amin}$.

Calculate, compare and evaluate the TGV [$\overrightarrow{(p)}$] of |Y|SmO$_2$%, |Y|ΦO$_2$HHb and |Y|O$_2$HHb of all TM$_S^M$, in the R-INT$^{TL}$ (U$_{Amin}$-U$_{Ae}$) and (U$_{Ae}$-U$_{Ana}$).

Calculate, compare and establish the lowest value of Coef-$\overrightarrow{(p)}$ and the equivalent NS$^{Coef-(p)}$ of $\overrightarrow{(p)}$ |Y|SmO$_2$%, $\overrightarrow{(p)}$ |Y|ΦO$_2$Hb and $\overrightarrow{(p)}$ |Y|O$_2$Hb, between the combination of at least 50-55% of the TM$_S^M$, in the R-INT$^{TL}$ (U$_{Amin}$-U$_{Ae}$) and (U$_{Ae}$-U$_{Ana}$).

Determine that the following criteria are met to establish a limitation in Factor (A2):

1. The difference between the value of |Y|SmO$_2$% of each TM$^M$ and his TMC$^M$ is >5% SmO$_2$%, in the 95% of INT$^{TL}$ or R-INT$^{TL}$ greater than or equal to U$_{Amin}$, in at least the 70-75% of TM$_S^M$.
2. The value of |Y|SmO$_2$% is ≥55% SmO$_2$%, in the 80% of TM$_S^M$, in each INT$^{TL}$ or R-INT$^{TL}$ greater than or equal to U$_{Amin}$ and less than or equal to U$_{Ana}$.
3. The values of |Y|SmO$_2$%, |Y|O$_2$HHb and |Y|ΦO$_2$HHb are asymmetric in at least the 50% of INT$^{TL}$ or R-INT$^{TL}$ greater than or equal to U$_{Amin}$, between one TM$^M$ and his TMC$^M$, in at least the 70-75% of TM$_S^M$.
4. The TGV of de $\overrightarrow{(p)}$ |Y|SmO$_2$%, $\overrightarrow{(p)}$ |Y|ΦO$_2$HHb and $\overrightarrow{(p)}$ |Y|O$_2$HHb is asymmetric between the combination of at least the 50-55% of TM$_S^M$, in the R-INT$^{TL}$ (U$_{Amin}$-U$_{Ae}$) and (U$_{Ae}$-U$_{Ana}$).

If a second evaluation is carried out after a recovery period where the general fatigue disappears, it could be observed how all the muscular tissues regain their oxygen consumption potential and the asymmetries generated by the general fatigue also disappear and the muscle saturation would return to being symmetric in each muscle tissue compared with his contralateral muscle tissue.

A3. Functional Factor of Oxidative Capacity by Muscle Inhibition

The functional factor of the oxidative capacity due to Muscle Inhibition is that factor that analyzes each muscle tissue individually to assess whether the analyzed muscle tissue loses its potential or the ability to consume large amounts of oxygen temporarily due to a muscle inhibition. This factor is usually observed in isolated tissues, which lose their potential while the rest of the muscle tissues keep their oxygen consumption potential intact, unlike what happens in the functional factor due to general fatigue.

To establish a Limitation on Factor A3, the following steps and criteria must be met:

Evaluate the value of |Y|SmO$_2$% of at least one TM$^M$, in each INT$^{TL}$ or R-INT$^{TL}$ greater than or equal to U$_{Amin}$.

Calculate, compare and evaluate the value of |Y|SmO$_2$%, |Y|O$_2$HHb and |Y|ΦO$_2$HHb of at least one TM$^M$ with the values of his TMC$^M$, in each INT$^{TL}$ or R-INT$^{TL}$ greater than or equal to U$_{Amin}$.

Calculate, evaluate and determine the value of CSV and NS$^{CSV}$ of |Y|SmO$_2$%, |Y|ΦO$_2$HHb and |Y|O$_2$HHb, of at least one TM$^M$ and his TMC$^M$, in each INT$^{TL}$ or R-INT$^{TL}$ greater than or equal to U$_{Amin}$.

Calculate, compare and evaluate the TGV [$\overrightarrow{(p)}$] of |Y|SmO$_2$%, |Y|ΦO$_2$HHb and |Y|O$_2$HHb of all TM$_S^M$, in the R-INT$^{TL}$ (U$_{Amin}$-U$_{Ae}$) and (U$_{Ae}$-U$_{Ana}$).

Calculate, evaluate and determine the lowest value of Coef-$\overrightarrow{(p)}$ and the equivalent NS$^{Coef-(p)}$ between the values of $\overrightarrow{(p)}$ |Y|SmO$_2$%, $\overrightarrow{(p)}$ |Y|ΦO$_2$HHb and $\overrightarrow{(p)}$ |Y|O$_2$HHb, of at least the combination of the 50-55% TM$_S^M$.

Determine that the following criteria are met to establish a limitation on Factor (A3):

1. The value of |Y|SmO$_2$% is >50% SmO$_2$% in the TM$^M$ analyzed, in the 95% of INT$^{TL}$ or R-INT$^{TL}$ greater than or equal to U$_{Amin}$.
2. The values of |Y|SmO$_2$%, |Y|O$_2$HHb |Y|y ΦO$_2$HHb of the TM$^M$ analyzed are greater than the values of his TMC$^M$, in the 95% of INT$^{TL}$ or R-INT$^{TL}$ greater than or equal to U$_{Amin}$.

3. The TGV of $\overrightarrow{(p)}$ |Y|SmO$_2$%, $\overrightarrow{(p)}$ |Y|ΦO$_2$HHb and $\overrightarrow{(p)}$ |Y|O$_2$HHb is asymmetric between the TM$^M$ analyzed and his TMC$^M$, in the R-INT$^{TL}$ ($U_{Amin}$–$U_{Ae}$) and ($U_{Ae}$–$U_{Ana}$).

4. The TGV of $\overrightarrow{(p)}$ |Y|SmO$_2$%, $\overrightarrow{(p)}$ |Y|ΦO$_2$HHb and $\overrightarrow{(p)}$ |Y|O$_2$HHb is symmetric between the combination of at least the 50-55% of TM$_S^M$, in the R-INT$^{TL}$ ($U_{Amin}$–$U_{Ae}$) and ($U_{Ae}$–$U_{Ana}$).

A.4. Neuromuscular Factor of Oxidative Capacity (Intermuscular Coordination)

The Neuromuscular factor of Oxidative Capacity (Intermuscular Coordination) is that factor that analyzes and evaluates whether the muscle tissues have the potential or the ability to consume large amounts of oxygen delivered by the cardiovascular system, but certain evaluated muscle tissues that participate in the activity locomotive, they do not, while the other muscular tissues do develop their potential.

This occurs mainly due to two aspects, the muscle recruitment pattern by the nervous system and, on the other hand, the biomechanical pattern performed by the subject during locomotor movement.

The pattern of muscle recruitment by the nervous system (Intermuscular Coordination) refers to the level of activation and participation in locomotor activity, a perfect muscle recruitment would mean that all the muscle tissues that participate in said movement have the same level of metabolic activation and therefore, the same muscle oxygen consumption. The level of performance of this aspect is determined by the ability of the nervous system to recruit and activate all muscle tissues symmetrically during locomotor movement. When the nervous system is not efficient in muscle recruitment, it activates differently and to a greater or/or lesser degree the different muscle tissues involved in locomotor activity. It should be noted that when this happens, a symmetry is usually observed between muscle tissues and their contralateral muscle tissues in the hemodynamic and activation values. When a lesser degree of recruitment occurs in muscle tissues and its contralateral muscle for the reasons mentioned above, they may present a limitation in oxidative capacity, as they have the potential to consume large amounts of oxygen, but do not develop said potential during locomotor activity due to less nervous activation.

The biomechanical pattern refers to the physical movement carried out by the evaluated subject, any type of incorrect and/or inefficient biomechanical pattern may mean that the nervous system must recruit some muscle tissues to a greater or/or lesser extent than other muscle tissues that participate in locomotor activity to be able to cope with said alterations or inefficient biomechanical patterns.

When a muscle tissue and its contralateral muscle tissue are affected by this factor and their level of nerve activation is reduced, these muscle tissues do not express their maximum potential for oxygen consumption due to low nerve activation The two previous patterns or factors are the cause of a limitation of the Neuromuscular factor of Oxidative Capacity (Intermuscular Coordination). To establish a Limitation on Factor A4, the following steps and criteria must be met.

Evaluate the value of |Y|SmO$_2$%, |Y|ΦO$_2$HHb and |Y|O$_2$HHb, of each TM$^M$, in each INT$^{TL}$ or R-INT$^{TL}$ greater than or equal to $U_{Amin}$.

Calculate, evaluate and determine the value of CSV and the equivalent NS$^{CSV}$ of de |Y|SmO$_2$%, |Y|O$_2$HHb, of at least one TM$^M$ and his TMC$^M$, in each INT$^{TL}$ or R-INT$^{TL}$ greater than or equal to $U_{Amin}$.

Calculate, compare and evaluate the TGV [$\overrightarrow{(p)}$] of |Y|SmO$_2$%, |Y|ΦO$_2$HHb and |Y|O$_2$HHb of all TM$_S^M$, in the R-INT$^{TL}$ ($U_{Amin}$–$U_{Ae}$) and ($U_{Ae}$–$U_{Ana}$).

Calculate, evaluate and determine Coef-$\overrightarrow{(p)}$ and the equivalent NS$^{Coef-(p)}$ between the values $\overrightarrow{(p)}$ |Y|SmO$_2$%, $\overrightarrow{(p)}$ |Y|ΦO$_2$HHb and $\overrightarrow{(p)}$ |Y|O$_2$HHb, of each TM$^M$ and his TMC$^M$, in the R-INT$^{TL}$ ($U_{Amin}$–$U_{Ae}$) and ($U_{Ae}$–$U_{Ana}$).

Determine that the following criteria are met to establish a limitation on Factor (A4):

1. The value of |Y|SmO$_2$% of the TM$^M$ analyzed and of his TMC$^M$ is greater than or equal to 65% SmO$_2$%, in each INT$^{TL}$ or R-INT$^{TL}$ greater than or equal to $U_{Amin}$.

2. The trend of $\overrightarrow{(p)}$ |Y|SmO$_2$%, $\overrightarrow{(p)}$ |Y|ΦO$_2$HHb and $\overrightarrow{(p)}$ |Y|O$_2$HHb, in the 70% of TM$_S^M$ and their TM$_S$C$^M$ are minimally symmetric, in the R-INT$^{TL}$ ($U_{Amin}$–$U_{Ae}$) and ($U_{Ae}$–$U_{Ana}$).

3. The values of |Y|SmO$_2$%, |Y|ΦO$_2$HHb and |Y|O$_2$HHb of the TM$^M$ analyzed and his TMC$^M$ are greater than the values of at least the 70-75% of the remaining TM$_S^M$, in each INT$^{TL}$ or R-INT$^{TL}$ greater than or equal to $U_{Amin}$.

4. The values of |Y|SmO$_2$% of at least the 50-55% of TM$_S^M$ is ≤45% SmO$_2$%, in any INT$^{TL}$ or R-INT$^{TL}$ greater than or equal to $U_{Ae}$.

B. Oxygen-Loaded Blood Delivery Capacity in the Venous Return

The Capacity to Deliver Oxygen-Loaded Blood Flow and the Venous Return is a performance performed jointly, dependently, harmonically and synchronized by the different vascular, muscular and nervous tissues together with the multiple organs of the body involved in gas exchange, the maintenance of blood pressure, supply and redistribution of oxygen-laden blood flow throughout the body, the level of metabolic activation of each tissue, and venous return during locomotor movement.

To fully analyze and evaluate the performance of Oxygen-Charged Blood Delivery Capacity and Venous Return, the limiting factors for performance are divided according to the physiological system that interacts with some aspect of blood flow. The 3 systems into which the factors are divided are the pulmonary system, the cardiovascular system and the nervous system.

B1. Pulmonary System

B1.1. Pulmonary Structural Factor

The Structural Factor of the Pulmonary System is that factor that analyzes and evaluates if there is any type of limitation in the exchange of gases produced in the lung, negatively affecting and reducing the delivery of oxygen-charged haemoglobin to the muscle tissues.

The Pulmonary Structural Factor indirectly represents the state and performance of the pulmonary structures involved in gas exchange (for example, the pulmonary alveoli). Any deficiency in these structures can affect to the uptake of oxygen O$_2$ and the expulsion of CO$_2$ and H$_2$O from the bloodstream.

Any limitation related to problems in gas exchange or oxygen uptake is observed mainly in greater delays in terms of post-effort recovery periods and in oxygen replenishment in muscle tissues. In people without any type of alteration in this factor, the recovery or replenishment of oxygen is almost immediately, but in people with a certain limitation of this factor, the delay in replenishment can exceed 10 seconds or even reach half a minute in very evident cases.

This limitation is mainly observed in people with respiratory diseases diagnosed as COPD, people with 1 lung, asthmatics, or smokers generally.

To establish if there is a limitation of the Pulmonary Structural Factor, the following steps must be followed, and the established criteria must be met:

Calculate, analyze and evaluate the value of $|Y|SmO_2\%$ of at least one $TM^M$ involved in the breathing process [inspiration (inhalation) and expiration (exhalation)] during $AFC^M$, in each $INT^{TL}$ or $R\text{-}INT^{TL}$ greater than or equal to $U_{Amin}$.

Calculate, analyze and evaluate the trend $\overrightarrow{(p)}$ of the $SmO_2\%$ and $\Phi O_2HHb$ values of all $TM_S^M$, on the initial 5 and 10 seconds of at least one ID after an IT of $INT^{TL}$ or $R\text{-}INT^{TL}$ average greater than or equal to $U_{Ae}$.

determine that the following criteria are met to establish a limitation on Factor (B1.1):

1. The trend of the values $\overrightarrow{(p)} SmO_2\%$ and $\overrightarrow{(p)} \Phi O_2HHb$ in the initial 5 seconds, in all ID after an IT of $INT^{TL}$ or $R\text{-}INT^{TL}$ average greater than or equal to $U_{Ae}$, is less than [$\overrightarrow{(p)} <0000.5$], in at least 70% of $TM_S^M$.

2. The trend of the values $\overrightarrow{(p)} SmO_2\%$ and $\overrightarrow{(p)} \Phi O_2HHb$ in the initial 10 seconds, in all ID after an IT of $INT^{TL}$ or $R\text{-}INT^{TL}$ average greater than or equal to $U_{ANA}$, IS less than [$\overrightarrow{(p)} <0000.5$], in at least 70% of $TM_S^M$.

3. The value of $|Y|SmO_2\%$ is $>50\%$ $SmO_2\%$ in the $TM_S^M$ that participate in the breathing process [inspiration (inhalation) and expiration (exhalation)], in at least one $INT^{TL}$ or $R\text{-}INT^{TL}$ greater than or equal to $U_{Amin}$.

B1.2. Pulmonary Functional Factor (Respiratory Muscles)

The Pulmonary Functional Factor (Respiratory Muscles) is that factor that analyzes and evaluates if there is any type of limitation in the exchange of gases in the lungs produced by the inefficiency and/or incapacity of the muscular tissues in charge of the biomechanical phases of respiration [inspiration and expiration].

When there is an inefficiency in the performance of these muscle tissues, the maximum potential to introduce the greater volume of oxygen (L/min) into the lungs through negative pressure is reduced, which is generated by the contraction and elevation of the rib cage.

The effects are the same as the Pulmonary System Structural Factor, but with a different limiting cause. The magnitude of the limitation depends on the level of deconditioning or inefficiency of performance by the respiratory muscle tissues. Even any muscle blockage or "muscle contracture" in muscle tissues that limits the range of motion of the rib cage can prevent the maximum volume of oxygen introduced into the lungs from being generated.

To establish whether there is a limitation of the Pulmonary Functional Factor, the following steps must be followed and the established criteria must be met:

Calculate, analyze and evaluate the value of $|Y|SmO_2\%$ of at least one TM involved in the breathing process [inspiration (inhalation) and expiration (exhalation)] during $AFC^M$, in each $INT^{TL}$ or $R\text{-}INT^{TL}$ greater than or equal to $U_{Amin}$.

Calculate, analyze and evaluate the trend $\overrightarrow{(p)}$ of the $SmO_2\%$ and $\Phi O_2HHb$ values of all $TM_S^M$, in the initial 5 seconds, of at least one ID after an IT of $INT^{TL}$ or $R\text{-}INT^{TL}$ average greater than or equal to $U_{Ae}$.

determine that the following criteria are met to establish a limitation on Factor (B1.1):

1. The trend of the values $\overrightarrow{(p)} SmO_2\%$ and $\overrightarrow{(p)} \Phi O_2HHb$ in the initial 5 seconds, in all ID after an IT of $INT^{TL}$ or $R\text{-}INT^{TL}$ average greater than or equal to $U_{Ae}$, is less than [$\overrightarrow{(p)} <0000.5$], in at least 70% of $TM_S^M$.

2. The value of $|Y|SmO_2\%$ is $\leq 50\%$ $SmO_2\%$ in the $TM_S^M$ that participate in the breathing process [inspiration (inhalation) and expiration (exhalation)], in at least one $INT^{TL}$ or $R\text{-}INT^{TL}$ greater than or equal to $U_{Amin}$.

B2. Cardiovascular System

B2.1. Exercise Blood Flow Analytical Delivery Performance Factor

The Performance Factor of Analytical Delivery of Blood Flow during exercise is that factor that analyzes and evaluates cardiovascular performance in each of the muscle tissues that participate in locomotor activity. This factor analyzes how the cardiovascular system satisfies the demands of blood flow from the muscle and determines how the characteristics of the flow delivered to each muscle are.

In many cases, the delivery of blood flow is totally different in each of the muscle tissues, for that reason the characteristics of blood flow are analyzed individually, allowing to identify if there is some type of hierarchy of preference between muscle tissues in terms of the delivery of blood.

Composition of Muscular Blood Flow [% of Blood Flow Charged with Oxygen] (Factor B.2.1.1): It is the aspect or qualitative component of blood flow, it represents how much haemoglobin is charged with oxygen in the blood flow of said muscle tissue and whether the blood flow is rich or poor in oxygen.

Volume of Muscle Hemoglobin Delivery [Oxygen Charged ($O_2HHb$) or Discharged (HHb)] (Factor B.2.1.2): It is the absolute quantitative aspect of blood flow. The absolute amount of hemoglobin that is oxygen-loaded and discharged is determined. This aspect serves to know if the muscle tissue receives the correct amount of hemoglobin during locomotor work in the intensity or range of intensities analyzed.

Velocity/Rate of Blood Flow Delivery_[Charged ($\Phi O_2HHb$—Oxygen Discharged ($\Phi HHb$)] (Factor B.2.1.3): It is the aspect of intensity or speed with which a certain volume of oxygen charged or discharged hemoglobin is delivered This parameter is important to fully analyze the individual cardiovascular performance of muscle tissue because a tissue may have a blood flow with a lower "quality" and "quantity" of oxygen-laden blood delivery, but if the speed at which the blood is delivered is high enough, it may be sufficient to satisfy the metabolic oxygen demands during locomotor work in the intensity or range of intensities analyzed.

In order to evaluate and establish the performance of Factor (B2.1), the following steps must be followed and the established criteria must be met:

Calculate the value of $|Y|SmO_2\%$, $|Y|O_2HHb$, $|Y|\Phi O_2HHb$, of each $TM^M$, in at least one $INT^{TL}$ or $R\text{-}INT^{TL}$ greater than or equal to $U_{Amin}$.

Calculate the values of $SmO_2^\%$, $O_2HHb$ and $\Phi O_2HHb$ of the Upper Limit of the Optimal Zone (|lim sup|Zona$^{Op}$) and the Lower Limit of the Optimal Zone |lim inf|Zona$^{Op}$, in the determined $INT^{TL}$ or $R\text{-}INT^{TL}$, from the following calculation:

|lim sup|Zona$^{Op}$=(Median of $\{|Y|_1; |Y|_2; |Y|_3; \ldots\}$)±($\sigma\{|Y|_1; |Y|_2; |Y|_3; \ldots,\}$)/2

|lim inf|Zona$^{Op}$=(Median of $\{|Y|_1; |Y|_2; |Y|_3; \ldots\}$)−($\sigma\{|Y|_1; |Y|_2; |Y|_3; \ldots,\}$)/2 where |Y| is the value ($SmO_2^\%$, $O_2HHb$ or $\Phi O_2HHb$) of each $TM^M$ at the determined intensity; ($\sigma$) is the standard deviation of ($SmO_2^\%$, $O_2HHb$ or $\Phi O_2HHb$) of each $TM^M$ at the determined intensity.

Compare and evaluate the values of $|Y|SmO_2^\%$, $|Y|O_2HHb$ and $|Y|\Phi O_2HHb$, of at least one $TM^M$ with the values of $SmO_2^\%$, $O_2HHb$ and $\Phi O_2HHb$ of |lim inf|Zona$^{Op}$ and of |lim sup|Zona$^{Op}$, in $INT^{TL}$ or $R\text{-}INT^{TL}$ greater than or equal to $U_{Amin}$ analyzed.

Determine the type of performance of the Factor (B.2.1.1) that develops at least one $TM^M$ analyzed, in the analyzed $INT^{TL}$ or $R\text{-}INT^{TL}$, based on the following criteria:

Excessive Muscle Oxygen Amount if:
  The value of $|Y|SmO_2^\%$ of the $TM^M$ is ≤80% $SmO_2^\%$ in the analyzed $INT^{TL}$ or $R\text{-}INT^{TL}$.
  The value of $|Y|SmO_2^\%$ of the analyzed $TM^M$ is greater than $SmO_2^\%$|lim sup|Zona$^{Op}$, in the analyzed $INT^{TL}$ or $R\text{-}INT^{TL}$.
  The difference between the value of $|Y|SmO_2^\%$ of the analyzed $TM^M$ and $SmO_2^\%$|lim sup|Zona$^{Op}$ is ≥15% $SmO_2^\%$, in the analyzed $INT^{TL}$ or $R\text{-}INT^{TL}$.

Greater Amount of Muscular Oxygen if:
  The value of $|Y|SmO_2^\%$ of the analyzed $TM^M$ is greater than $SmO_2^\%$|lim sup|Zona$^{Op}$, in the analyzed $INT^{TL}$ or $R\text{-}INT^{TL}$.
  The difference between the value of $|Y|SmO_2^\%$ of the analyzed $TM^M$ and $SmO_2^\%$|lim sup|Zona$^{Op}$ is <15% $SmO_2^\%$, in the analyzed $INT^{TL}$ or $R\text{-}INT^{TL}$.

Optimal Amount of Muscular Oxygen if:
  The value of $|Y|SmO_2^\%$ of the analyzed $TM^M$ is equal or less than $SmO_2^\%$|lim sup|Zona$^{Op}$, in the analyzed $INT^{TL}$ or $R\text{-}INT^{TL}$.
  The value of $|Y|SmO_2^\%$ of the analyzed $TM^M$ is equal or greater than $SmO_2\%$ |lim inf|Zona$^{Op}$, in the analyzed $INT^{TL}$ or $R\text{-}INT^{TL}$.

Lower Amount of Muscular Oxygen if:
  The value of $|Y|SmO_2^\%$ of the analyzed $TM^M$ is greater than $SmO_2^\%$|lim inf|Zona$^{Op}$, in the analyzed $INT^{TL}$ or $R\text{-}INT^{TL}$.
  The value of $|Y|SmO_2^\%$ of the analyzed $TM^M$ is >20% $SmO_2^\%$, in the analyzed $INT^{TL}$ or $R\text{-}INT^{TL}$.

Inefficient or Low Amount of Muscular Oxygen if:
  The value of $|Y|SmO_2^\%$ of the analyzed $TM^M$ is greater than $SmO_2^\%$|lim inf|Zona$^{Op}$, in the analyzed $INT^{TL}$ or $R\text{-}INT^{TL}$.
  The value of $|Y|SmO_2^\%$ of the analyzed $TM^M$ is <20% $SmO_2^\%$, in the analyzed $INT^{TL}$ or $R\text{-}INT^{TL}$.

Determine the type of performance of the Factor (B.2.1.2) that develops at least one analyzed $TM^M$, in the analyzed $INT^{TL}$ or $R\text{-}INT^{TL}$, based on the following criteria:

Higher Hemoglobin Delivery Volume if:
  The value of $|Y|O_2HHb$ of the analyzed $TM^M$ is greater than $O_2HHb$ |lim sup|Zona$^{Op}$, in the $INT^{TL}$ or $R\text{-}INT^{TL}$ analyzed.

Optimal Hemoglobin Delivery Volume if:
  The value of $|Y|O_2HHb$ of the analyzed $TM^M$ analyzed is equal or less than $O_2HHb$ |lim sup|Zona$^{Op}$, in the analyzed $INT^{TL}$ or $R\text{-}INT^{TL}$.
  The value of $|Y|O_2HHb$ of the analyzed $TM^M$ is equal or greater than $O_2HHb$ |lim inf|Zona$^{Op}$, in the analyzed $INT^{TL}$ or $R\text{-}INT^{TL}$.

Lower Hemoglobin Delivery Volume if:
  The value of $|Y|O_2HHb$ of the analyzed $TM^M$ a is less than $O_2HHb$ |lim inf|Zona$^{Op}$, in the analyzed $INT^{TL}$ or $R\text{-}INT^{TL}$.

Determine the type of performance of the Factor (B.2.1.3) that develops at least one analyzed $TM^M$, in the analyzed $INT^{TL}$ or $R\text{-}INT^{TL}$, based on the following criteria:

Higher Blood Flow Delivery Rate if:
  The value of $|Y|\Phi O_2HHb$ of the analyzed $TM^M$ is greater than the value of $\Phi O_2HHb$|lim sup|Zona$^{Op}$, in the analyzed $INT^{TL}$ or $R\text{-}INT^{TL}$.

Optimal Blood Flow Delivery Rate if:
  The value of $|Y|\Phi O_2HHb$ of the analyzed $TM^M$ is equal or less than of $\Phi O_2HHb$|lim sup|Zona$^{Op}$, in the analyzed $INT^{TL}$ or $R\text{-}INT^{TL}$.
  The value of $|Y|\Phi O_2HHb$ of the analyzed $TM^M$ is equal or greater than $O_2HHb$ |lim inf|Zona$^{Op}$, in the analyzed $INT^{TL}$ or $R\text{-}INT^{TL}$.

Lower Blood Flow Delivery Rate if:
  The value of $|Y|\Phi O_2HHb$ of the analyzed $TM^M$ is less than $\Phi O_2HHb$ |lim inf|Zona$^{Op}$, in the analyzed $INT^{TL}$ or $R\text{-}INT^{TL}$.

B2.2. Functional Sympatholysis Factor for Blood Flow Redistribution

During exercise, the active muscles contract and vasodilation occurs due to various mechanical, nervous and metabolic factors. If this vasodilation occurs excessively, it can "threaten" the systemic regulation of blood pressure throughout the body, for that reason the sympathetic nervous system does a vascular vasoconstriction to maintain blood pressure and blood flow levels in order to maintain regular oxygen supply to the brain and vital organs (Functional Sympatholysis).

Regulation of blood flow to skeletal muscle is closely linked to metabolic oxygen demand and with a change in oxygen requirement leading to a proportional change in blood flow. The precise control of the regulation of blood flow serves to minimize the work of the heart, while ensuring an adequate supply of oxygen to the working muscles. The need for this precise control of blood flow to the muscle becomes apparent when you consider that active skeletal muscle comprises about ~40% of body mass and that muscle-specific blood flow can increase nearly 100-fold from rest to intense exercise. Given the limitation in maximum cardiac output, the heart can only supply a fraction of the active muscles with maximum blood flow and during high intensity exercises involving greater muscle mass, vascular conductance has to be well regulated or pressure blood pressure could drop.

This factor evaluates and analyzes the performance of Functional Sympatholysis, that is, the performance of the nervous system on cardiovascular function in the redistribution of blood flow. In order to analyze this factor, rest intervals are used, since once the exercise ceases, the vasoconstrictive effect of the nervous system ceases, but the opposing vasodilator effects at the muscular level remain active as they are slower. This allows to analyze the magnitude of their performance during the exercise that was previously carried out.

In order to evaluate and establish the performance of Factor (B2.2), the following steps must be followed and the established criteria must be met:

Calculate, compare and evaluate the maximum value of $SmO_2^\%$, $O_2HHb$ and $\Phi O_2HHb$ of all $TM_S^M$, in at least one ID.

Calculate, evaluate and determine the value of CSV and the equivalent $NS^{CSV}$ of the maximum value of $SmO_2^\%$, $\Phi O_2HHb$ and $O_2HHb$, of all $TM_S^M$, in at least one ID.

Calculate, evaluate and determine the lowest value of CSV and the equivalent $NS^{CSV}$ of the maximum value of $SmO_2^\%$, $\Phi O_2HHb$ and $O_2HHb$, from the combination of at least the 70-75% of the $TM_S^M$, in at least one ID.

Determine the type of performance of the Factor (B.2.2), just at the moment of cessation of locomotor work, based on the following criteria:

Perfect performance if:
The maximum values of $SmO_2^\%$, $O_2HHb$ and $\Phi O_2HHb$ are symmetrically perfect, between all $TM_S^M$, in the analyzed ID.

Optimal performance if:
The maximum values of $SmO_2^\%$, $O_2HHb$ and $\Phi O_2HHb$, are symmetrically optimal, between the combination of at least the 70-75% of the $TM_S^M$, in the analyzed ID.

Asymmetric Performance if:
The maximum values of $SmO_2^\%$, $O_2HHb$ and $\Phi O_2HHb$, are not symmetrically optimal, between the combination of at least the 70-75% of the $TM_S^M$, in the analyzed ID.

B2.3. Evolution Factor of Analytical Cardiovascular Performance (B2.3)

When multiple work intervals are performed with their respective rest intervals, the evolution of cardiovascular performance in the delivery/demand of blood flow of a muscle tissue can be evaluated. This factor analyzes the evolution of this performance and for this a comparison is made between the values of the analyzed muscle tissue, in the rest intervals analyzed.

In order to evaluate and establish the performance of Factor (B2.3), the following steps must be followed and the established criteria must be met:

Calculate, compare and evaluate the maximum value of $SmO_2^\%$ between two ID, separated by at least one IT of at least one $TM^M$.

Determine the type of performance of the Factor (B2.3) that develops, at least one analyzed $TM^M$, between two ID, separated by a IT, based on the following criteria:

Significant increase:
Increase >5% $SmO_2^\%$, in the maximum value of $SmO_2^\%$, of the analyzed $TM^M$, in the 2nd ID in compared to the 1ST LD.

Slight Increase:
Increase between [2.01-5%] $SmO_2^\%$, in the maximum value of $SmO_2^\%$, of the analyzed $TM^M$, in the 2nd ID in compared to the 1ST LD.

Slight decrease if:
Decrease between [2.01-5%] $SmO_2^\%$ in the maximum value of $SmO_2^\%$, of the analyzed $TM^M$, in the 2nd ID in compared to the 1ST LD.

Significant decrease if:
Decrease >5% $SmO_2^\%$, in the maximum value of $SmO_2^\%$ of the analyzed $TM^M$, in the 2nd ID in compared to the 1ST LD.

Maintenance if:
Decrease or increase of between [0-2%] $SmO_2^\%$, in the maximum value of $SmO_2^\%$, of the analyzed $TM^M$, in the 2nd ID in compared to the 1ST LD.

B2.4. Muscle Pumping Factor of Blood Flow

The Muscle Blood Flow Pumping Factor is that factor that analyzes and evaluates the performance of each muscle tissue during locomotor movement to perform muscle contraction and compress the blood vessels located in said muscle tissues. This compression of the blood vessels causes the venous return of blood flow to the heart.

Each muscle tissue must be able to generate sufficient mechanical stress on the blood vessels to drive blood flow through the venous system. The collective performance of this factor is important to maintain efficient venous return.

The cardiovascular system is a closed circuit system, any alteration of the maximum venous return potential affects the entire cardiovascular system, because if the maximum volume of blood that returns to the heart through the venous return decreases, cardiac filling will decrease, then the stroke volume will be lower, and later the arterial pressure will drop, since the volume of blood ejected by the heart will be lower.

To establish a Limitation on Factor (B2.4) in at least one $TM^M$, the following steps and criteria must be met:

Calculate, compare and evaluate the TGV [$\overrightarrow{(p)}$] of $\overleftarrow{(p)}$ |Y|ThB of at least one $TM^M$, in the R-$INT^{TL}$ ($U_{Ae}$–$U_{ANA}$) and ($U_{ANA}$-Maximum Intensity [$Int_{Max}$]).
The value of |Y|$SmO_2^\%$ of the analyzed $TM^M$ is less than or equal to 45% $SmO_2^\%$, in at least one $INT^{TL}$ or R-$INT^{TL}$ greater than or equal to $U_{Amin}$.

Determine if the following criteria are met to establish a limitation in Factor (B2.4):

The TGV $\overleftarrow{(p)}$ |Y|ThB of the analyzed $TM^M$ is $\overline{(p)}$ >0, 0005], in the R-$INT^{TL}$ ($U_{Ae}$–$U_{ANA}$) or ($U_{ANA}$–Maximum Intensity [$Int_{Max}$]).
The value of |Y|$SmO_2^\%$ of the analyzed $TM^M$ is less than or equal to 45% $SmO_2^\%$, in at least one $INT^{TL}$ or R-$INT^{TL}$ greater than or equal to $U_{Amin}$.

B3. Neurovascular System

B3.1. Neuromuscular Activation Factor (Intermuscular Coordination)

The Neuromuscular Activation Factor (Intermuscular Coordination) is that factor that analyzes and evaluates the performance of the nervous system to activate each muscle tissue during locomotor movement. This factor includes the analysis, evaluation and comparison between the different levels of metabolic activation generated by the nervous system between the muscular tissues that participate in locomotor activity (Intermuscular Coordination).

A perfect or efficient neuromuscular activation of all muscle tissues is one in which all muscle tissues involved in locomotor activity have the same level of metabolic activation to cope with the demands of locomotor movement.

When there are multiple levels of activation, an optimal (efficient) activation range is established to be able to assess the activation level of each muscle tissue individually. A muscle tissue that is below or above said optimal activation zone can be interpreted that that tissue has a higher u/or lower muscle activation and therefore the metabolic efficiency of the set of muscle tissues decreases.

A greater symmetry in the levels of muscle activation during locomotor work translates into a lower energy cost to cope with said locomotor work/movement, on the other hand, a greater asymmetry of the whole and/or a muscle tissue means a higher energy cost for cope with locomotor work/movement [Running Economy].

Therefore, there is an individual muscle activation level of each muscle tissue and a global muscle activation of all muscle tissues for each intensity of locomotor work of an evaluated subject, that is, multiple neuromuscular activation factors.

To establish a Factor Performance Level (B3.1) of at least one $TM^M$, the following steps and criteria must be met:

Evaluate the value $|Y|SmO_2^\%$, $|Y|O_2HHb$ and $|Y|\Phi O_2HHb$, of at least one $TM^M$, in at least one $INT^{TL}$ or $R\text{-}INT^{TL}$ greater or equal than $U_{Amin}$.

Calculate the $SmO_2^\%$, $O_2HHb$ and $\Phi O_2HHb$ values of the Upper Limit of the Optimal Zone ($|lim\ sup|Zona^{Op}$) and the Lower Limit of the Optimal Zone ($|lim\ inf|Zona^{Op}$), in the determined $INT^{TL}$ or $R\text{-}INT^{TL}$, from the following calculation:

$|lim\ sup|Zona^{Op} = (Mediana\ de\ \{|Y|_1;\ |Y|_2;\ |Y|_3;\ \ldots\}) \pm (\sigma\ \{|Y|_1;\ |Y|_2;\ |Y|_3;\ \ldots,\})/2$ $|lim\ inf|Zona^{Op} = (Mediana\ de\ \{|Y|_1;\ |Y|_2;\ |Y|_3;\ \ldots\}) - (\sigma\ \{|Y|_1;\ |Y|_2;\ |Y|_3;\ \ldots,\})/2$ where $|Y|$ is the value ($SmO_2^\%$, $O_2HHb$ or $\Phi O_2HHb$) of each $TM^M$, in the determined $INT^{TL}$ or $R\text{-}INT^{TL}$ and ($\sigma$) the standard deviation of ($SmO_2^\%$, $O_2HHb$ or $\Phi O_2HHb$) of each $TM^M$, in the determined $INT^{TL}$ or $R\text{-}INT^{TL}$ Compare and evaluate the values of $|Y|SmO_2^\%$, $|Y|O_2HHb$ and $|Y|\Phi O_2HHb$, of at least one $TM^M$ with the values of ($SmO_2^\%$, $O_2HHb$ and $\Phi O_2HHb$ of the $|lim\ sup|Zona^{Op}$ and the $|lim\ inf|Zona^{Op}$, in at least one determined $INT^{TL}$ or $R\text{-}INT^{TL}$ greater or equal than $U_{Amin}$.

determine the level of Neuromuscular Activation performed by at least one $TM^M$ (Factor B3.1), based on the following criteria:

Null or Very Low Neuromuscular Activation if:
The value of $|Y|SmO_2^\%$, $|Y|O_2HHb$ and $|Y|\Phi O_2HHb$ of the $TM^M$ analyzed is greater than $SmO_2^\%$, $O_2HHb$ and $\Phi O_2HHb |lim\ sup|Zona^{Op}$, in the determined $INT^{TL}$ or $R\text{-}INT^{TL}$.
The value of $|Y|SmO_2^\%$ of the $TM^M$ analyzed, is $\geq 75\%$ $SmO_2^\%$ in the determined $INT^{TL}$ or $R\text{-}INT^{TL}$.

Less or Low Neuromuscular Activation if:
The value of $|Y|SmO_2^\%$, $|Y|O_2HHb$ and $|Y|\Phi O_2HHb$ of the $TM^M$ analyzed is greater than $SmO_2^\%$, $O_2HHb$ and $\Phi O_2HHb |lim\ sup|Zona^{Op}$, in the determined $INT^{TL}$ or $R\text{-}INT^{TL}$.
The value of $|Y|SmO_2^\%$ of the $TM^M$ analyzed, is $< 75\%$ $SmO_2^\%$, in the determined $INT^{TL}$ or $R\text{-}INT^{TL}$.

Optimal Neuromuscular Activation if:
The value of $|Y|SmO_2^\%$, $|Y|O_2HHb$ and $|Y|\Phi O_2HHb$, of the $TM^M$ analyzed, is less than $SmO_2^\%$, $O_2HHb$ and $\Phi O_2HHb |lim\ sup|ZonaOp$, in the determined $INT^{TL}$ or $R\text{-}INT^{TL}$.
The value of $|Y|SmO_2^\%$, $|Y|O_2HHb$ and $|Y|\Phi O_2HHb$, of the $TM^M$ analyzed, is greater than $SmO_2^\%$, $O_2HHb$ and $\Phi O_2HHb |lim\ inf|Zona^{Op}$, in the determined $INT^{TL}$ or $R\text{-}INT^{TL}$.

Excessive or Priority Neuromuscular Activation if
The value of $|Y|SmO_2^\%$, $|Y|O_2HHb$ and $|Y|\Phi O_2HHb$, of the $TM^M$ analyzed, is less than $SmO_2^\%$, $O_2HHb$ and $\Phi O_2HHb |lim\ inf|Zona^{Op}$, in the determined $INT^{TL}$ or $R\text{-}INT^{TL}$.
The value of $|Y|SmO_2^\%$ of the $TM^M$ analyzed is $\leq 25\%$ $SmO_2^\%$, in some $INT^{TL}$ or $R\text{-}INT^{TL}$ High Neuromuscular Activation if:
The value of $|Y|SmO_2^\%$, $|Y|O_2HHb$ and $|Y|\Phi O_2HHb$, of the $TM^M$ analyzed, is less than $SmO_2^\%$, $O_2HHb$ and $\Phi O_2HHb |lim\ inf|Zona^{Op}$, in the determined $INT^{TL}$ or $R\text{-}INT^{TL}$.
The value of $|Y|SmO_2^\%$ of the $TM^M$ analyzed is $> 25\%$ $SmO_2^\%$, in all the $INT^{TL}$ or $R\text{-}INT^{TL}$ greater than or equal to $U_{Amin}$.

B3.2. Neurovascular Structural Factor (Speed and Power of Muscle Contraction)

The Neurovascular Structural Factor (Speed and Power of Muscle Contraction) is that factor that analyzes and evaluates the potential of [vasodilation vs vasoconstriction] in each muscle tissue evaluated.

When the action potential is produced in the muscle tissue to produce the muscle contraction necessary for locomotor movement, this nerve potential also has an inhibitory effect and some chain responses that cause an inhibition of the vasoconstrictive effect of the sympathetic nervous system. On the other hand, it causes marked vasodilation in the arteriolar tissues close to the place where the action potential is produced.

Therefore, vasodilation in muscle tissues is directly correlated with the speed of muscle contraction and/or the level of activation of said muscle tissue. Muscle tissue must have an optimal level of vasodilation to allow optimal oxygen-laden blood flow to arrive. Excessive vasodilation may mean that excessively vasodilated muscle tissue receives a greater volume of blood flow, more than is necessary to meet the metabolic oxygen demands that muscle tissue requires. This fact causes an inefficiency in the delivery of oxygen-laden blood flow by not being able to deliver this excess blood flow to other muscle tissues that do require it, causing a deficit in the delivery of oxygen-laden blood flow.

To establish a Limitation on Factor (B3.2) in at least one $TM^M$, the following steps and criteria must be met:

Calculate the median value of ThB ($\check{Y}ThB$), of at least one $TM^M$, in at least one IT of average $INT^{TL}$ or $R\text{-}INT^{TL}$ greater than or equal to $U_{Amin}$.

Calculate the standard deviation ($\sigma$) of at least one $TM^M$, in at least one IT of average $INT^{TL}$ or $R\text{-}INT^{TL}$ greater than or equal to $U_{Amin}$.

Calculate the minimum value of ThB in at least one ID perform after an IT analyzed, of average $INT^{TL}$ or $R\text{-}INT^{TL}$ greater than or equal to $U_{Amin}$.

Calculate and evaluate the difference between $[(\check{Y}ThB)-\sigma]$ of at least one IT and the minimum value of ThB of his posterior/successive ID.

Determine if the following criteria are met to establish a limitation in Factor (B3.2) in at least one $TM^M$:
The value [Median $\check{Y}ThB-\sigma ThB$] of the analyzed $TM^M$, of the analyzed IT of $INT^{TL}$ or $R\text{-}INT^{TL}$ greater than or equal to $U_{Amin}$, is greater than the minimum value of ThB of the successive ID to the analyzed IT.

B3.3. Muscle Contraction Speed

The Muscle Contraction Speed Factor is that factor that analyzes and evaluates the frequency at which muscle contractions occur during locomotor activity.

To produce a muscle contraction, the nervous system produces an electrical impulse that causes alterations in cellular metabolism to generate the contraction of muscle fibers. Said electrical impulse also has an inhibiting effect on the local vasoconstrictor receptors of the arteriolar network of the muscle.

A high production of these impulses produces a high inhibition of vasoconstrictors and consequently increases the vasodilation of the arteries in the TM. At a certain point, an excessive vasodilation produces an excess delivery of blood flow, whereas a low frequency of electrical impulse discharge in the muscle will produce a low vasodilation and a greater vasoconstriction, producing an arterial occlusion mediated by the sympathetic nervous system.

For this reason, this factor is in charge of evaluating muscle performance as a whole to establish which muscle contraction frequency (FCM) or Muscle Contraction Frequency Range (R-FCM) is optimal for the hemodynamic performance of the cardiovascular system.

To evaluate and establish the performance of Factor (B3.3) in the set of $TM^M$, the following steps and criteria must be met:

Calculate, compare and evaluate the median value ($\check{Y}$) of $SmO_2^\%$, $O_2HHb$, $\Phi O_2HHb$, $HHb$ and $\Phi HHb$, of each $TM^M$, in at least one determined $INT^{TL}$ or $R\text{-}INT^{TL}$, in each one of the developed FCM and in the determined environmental conditions, during the $AFC^M$.

Determine all the Optimal FCM or Optimal R-FCM, of at least one determined $INT^{TL}$ or $R\text{-}INT^{TL}$, under certain environmental conditions, during $AFC^M$, based on the fulfillment of the following criteria established for the factor (B3.3):

Have the highest value of $\check{Y}SmO_2^\%$ or a difference≤ (±2.5%) $SmO_2^\%$ with respect to the highest value $\check{Y}SmO_2^\%$, of all FCM or R-FCM, in at least the 78-81% of the $TM^M$, in the determined $INT^{TL}$ or $R\text{-}INT^{TL}$, during the determined $AFC^M$.

Have the highest value of $\check{Y}O_2HHb$ % or a difference≤ (±0.30 g/dL) $O_2HHb$ with respect to the highest value $\check{Y}O_2HHb$, of all FCM or R-FCM, in at least the 78-81% of the $TM^M$, in the determined $INT^{TL}$ or $R\text{-}INT^{TL}$, during the determined $AFC^M$.

Have the highest value of $\check{Y}\Phi O_2HHb$ % or a difference≤(±1.00 g/dL) $\Phi O_2HHb$ with respect to the highest value $\check{Y}\Phi O_2HHb$, of all FCM or R-FCM, in at least the 78-81% of the $TM^M$, in the determined $INT^{TL}$ or $R\text{-}INT^{TL}$, during the determined $AFC^M$.

Have the lowest value of $\check{Y}HHb^\%$ or a difference≤ (±1.00 g/dL) HHb with respect to the lowest value $\check{Y}HHb$, of all FCM or R-FCM, in at least the 78-81% of the $TM^M$, in the determined $INT^{TL}$ or $R\text{-}INT^{TL}$, during the determined $AFC^M$.

Have the lowest value of $\check{Y}\Phi HHb^\%$ or a difference≤ (±1.00 g/dL) $\Phi HHb$ with respect to the lowest value $YOHHb$, of all FCM or R-FCM, in at least the 78-81% of the $TM^M$, in the determined $INT^{TL}$ or $R\text{-}INT^{TL}$, during the determined $AFC^M$.

The method of the invention described is of particular interest in the following practical applications, in which its advantages are evident:

1) Sports and Physical Activity Area

Evaluation of sports performance and/or physical activity:
The method of the invention makes it possible to individually evaluate the hemodynamic performance of each $TM^M$ during an AFC and establish an individual performance level for each $TM^M$. It also allows you to analyze the global performance of all $TM_S^M$ developed during the AFC.

It allows identifying the physiological factor and/or factors that limit locomotor performance or affect positively and/or negatively, to a greater and/or lesser extent to performance.

It allows to quantify the economy/efficiency of locomotor performance and establish which factor or factors affect positively and negatively.

It allows to evaluate and monitor the fatigue of the sympathetic nervous system. It allows to evaluate, monitor and establish the multiple physiological thresholds associated to one $INT^{TL}$ or $R\text{-}INT^{TL}$.

It allows to evaluate, monitor and establish the optimal muscle contraction frequencies for the AFC performed.

Applications in Biomechanical Evaluations, performance evaluations of technical gestures and/or aerodynamic evaluations:
The described method allows to evaluate the performance of the $TM_S^M$ in different AFC conditions (modification of biomechanical patterns, technical gestures, body posture . . . ) and to establish which of the different conditions developed reports a better muscular hemodynamic performance for the analyzed subject.

Nutritional and pharmacological applications:
The method of the invention also makes it possible to evaluate the effect produced by the intake of nutritional supplements, the different dietary habits or the application of subcutaneous substances on muscle hemodynamic performance during AFC.

Applications in Rehabilitations, return to sport and injury prevention.
The method of the invention makes it possible to evaluate, monitor and establish the performance of $TM_S^M$ during evolution or recovery within a rehabilitation program, readaptation (return to sport) of one or more $TM_S^M$ after an injury, accident and/or illness.

It allows to evaluate, monitor and establish the performance of the $TM_S^M$ and detect possible alterations, decreases or inefficiencies in muscle performance during AFC that may pose a risk of injury during the next $AFC^M$ Monitoring the hemodynamic performance of $TM_S^M$ continuously during training plans:
The method of the invention makes it possible daily to evaluate performance during a training or physical activity plan to determine the evolution of the hemodynamic performance of at least some performance factors 2) Area of Medicine, Physiotherapy, Dietetics and Research:
Evaluate the effect of the application or introduction of medications, drugs, nutritional supplements, ergogenic or similar on muscle hemodynamic performance during locomotor exercise.

The method described allows to evaluate the variation in the hemodynamic performance due to the effect of the substance, either the immediate effect, evaluating the alterations that it produces immediately, or for a determined time by means of pre & post evaluation procedure.

Scientific studies: The method described allows to evaluate the effect caused by the application of invasive or non-invasive intervention protocols on the hemodynamic performance of muscle tissues during locomotor actions.

3) Industrial and Textile Area:
Evaluation of the effect produced by the use of different textile fabrics on muscle hemodynamic performance during locomotor exercise, either through variations in sizes, shapes, composition of materials, colours and/or others.

Adjustment of the dimensions and technical measurements of devices or tools that are used in AFC from the patterns obtained in the hemodynamic evaluation. For example, in the manufacture of bikes, prostheses or materials with which physical activity is carried out, adjusting the dimensions and measurements to each person. The monitoring method of the invention described makes it possible to evaluate and monitor the muscle hemodynamic performance of all $TM_S^M$ analytically, globally and both at the same time, during a AFC. This evaluation includes $TM_S^M$ that are not directly involved in locomotor work, such as the muscular tissues responsible for respiratory movements.

Likewise, the method of the invention allows the generation of an individualized physiological profile, as it offers complete information on the factors that affect or limit the analytical hemodynamic performance of each $TM^M$ and, at the same time, the general hemodynamic performance of all $TM_S^M$ as a whole. Thus establishing, in a very analytical way, the physiological factors that limit the performance of subject.

On the other hand, the method of the invention allows the analysis to be carried out in the training sessions themselves without the need to make any modification of the AFC that the subject is developing, or any specific protocol, or any environmental or environmental conditions. On the contrary, the usual evaluation methods generally require a controlled environment, in laboratories or closed places, moving away from the reality of the AFC developed by the majority of subjects.

The method of the invention also makes it possible to quantify the running economy or efficiency of work of $TM_S^M$ from an analytical physiological point of view. By analyzing the individual performance of each $TM^M$ separately, then jointly with other $TM_S^M$, it allows quantifying the running economy or efficiency of work to be able define it, as well as establishing the specific tissues and/or factors that positively affect and/or negatively to the economy of work.

The evaluation methods, up to now, measured and quantified the efficiency of locomotor performance from general values of the whole body such as the analysis of metabolic gases or blood lactate concentrations, or using external variables such as power development values or measurements of strength in exercises. However, with the method of the invention, the performance performed by each of the muscle tissues is directly evaluated and at the same time the global work, allowing to identify the muscle tissues that are negatively affecting the economy of work and, at the same time, evaluate how the performance is being in the set of muscular tissues.

By identifying the factors that negatively affect or limit performance, the method of the invention makes it possible to establish action or training protocols to specifically improve said factors optimally and improve locomotor performance.

Currently, there is no other monitoring method that allows offering analytical and global information on hemodynamic performance in a non-invasive way, with the advantages of the method of the invention.

The invention also refers to a monitoring and evaluation system of the physical performance of a subject comprising:
 two or more near infrared sensors (NIRS);
 a cardiac monitoring device;
 a locomotor work intensity device or monitor;
 a data processing system connected to the two or more near infrared sensors (NIRS), the cardiac monitoring device and the locomotor work intensity device or monitor and configured to carry out the steps of the method of the invention previously described.

DESCRIPTION OF THE DRAWINGS

To complement the description that is being made and in order to help a better understanding of the characteristics of the invention, according to a preferent example of a practical embodiment thereof, a set of drawings is attached as an integral part of said description, in which, for illustrative and non-limiting purposes, the following has been represented.

PREFERENTIAL REALIZATION OF THE INVENTION

Figure 1:
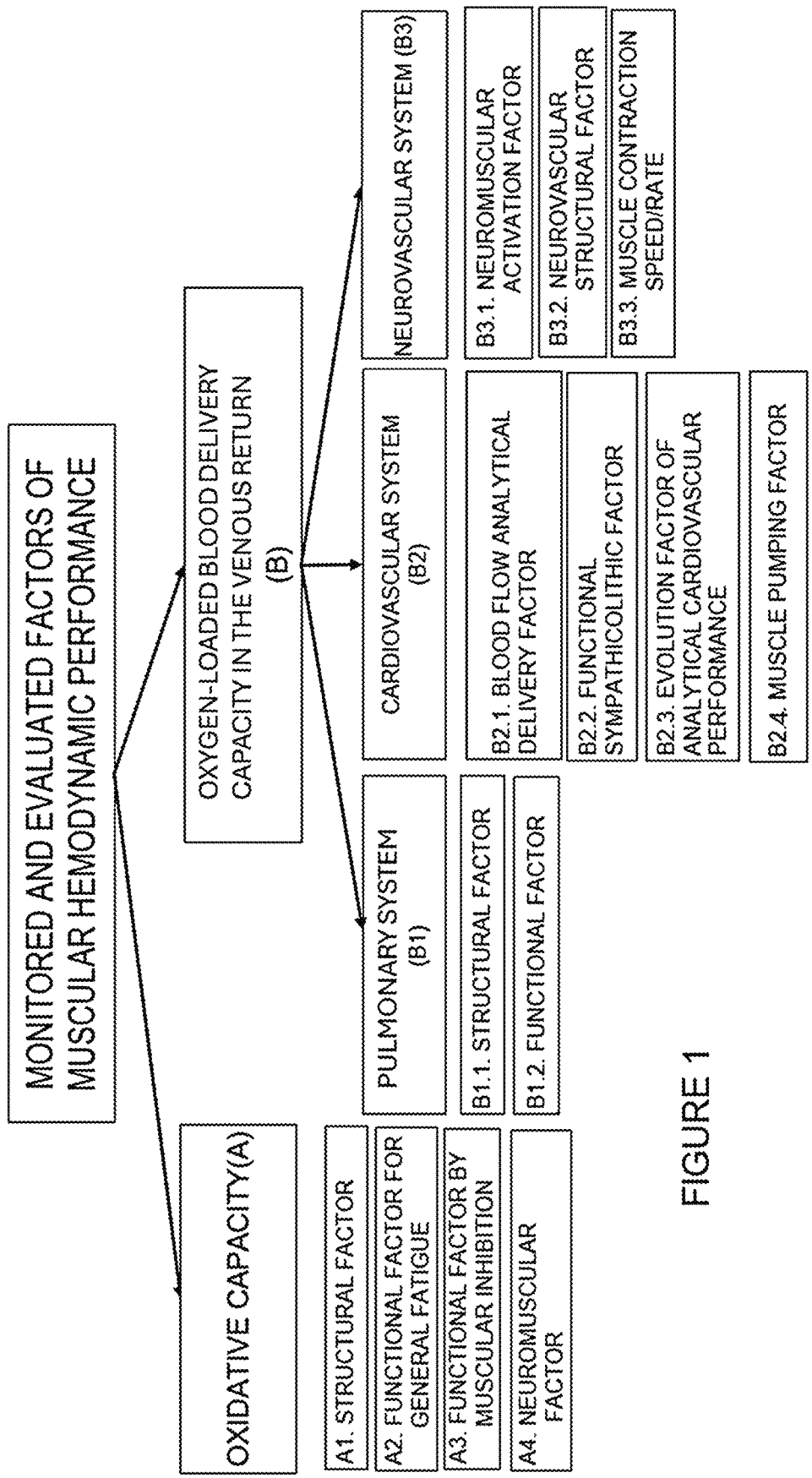
FIG. 1 shows the general scheme of all the factors that allows evaluating and analyzing the muscle hemodynamic performance of all muscle tissues as a whole or the analytical performance of each muscle tissue.
Figure 2:
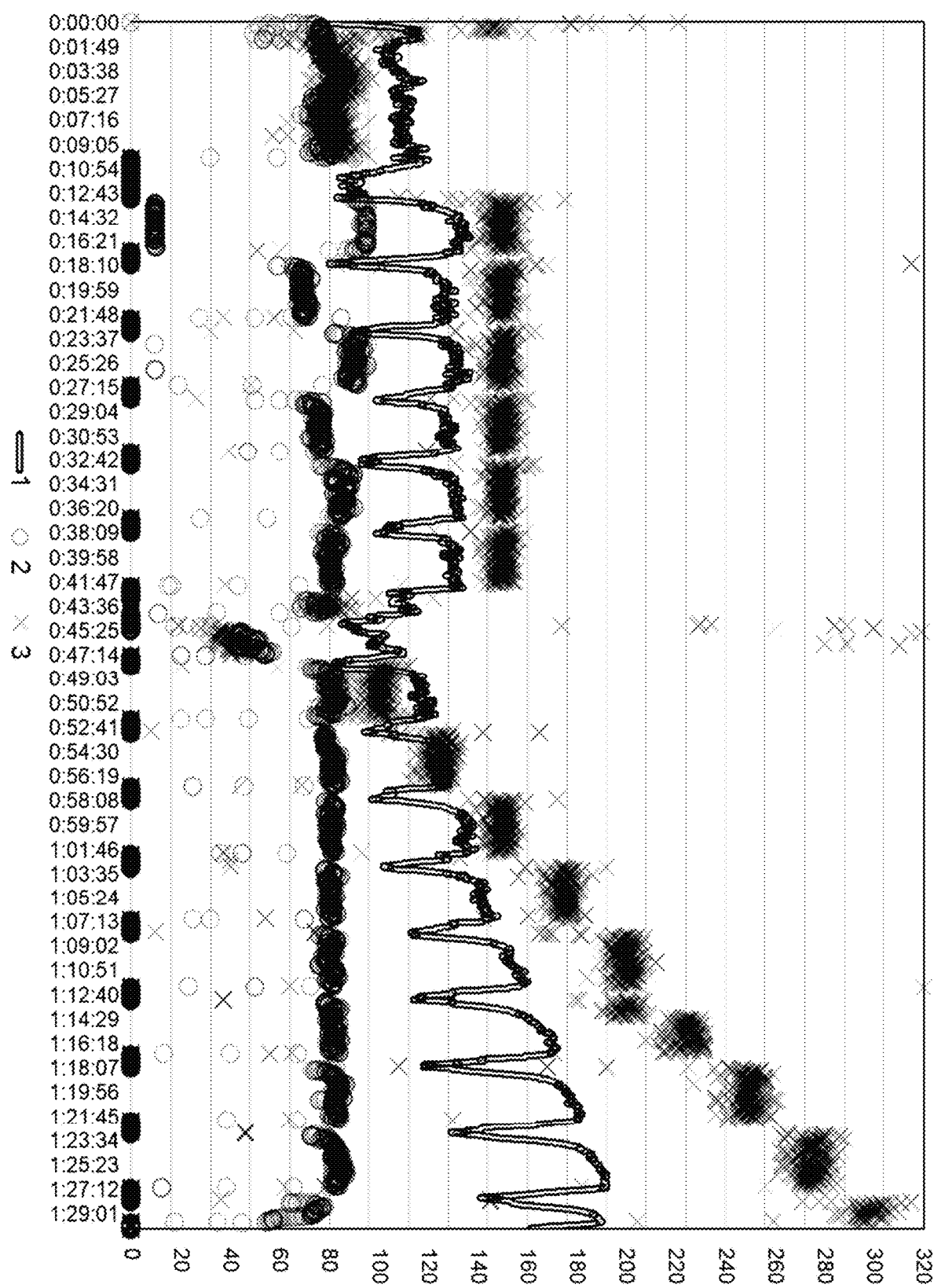
FIG. 2 graphically represent the cyclical Physical Activity performed by the subject and the values of (1) Heart Rate [bpm], (2) Pedalling Cadence [rpm] and (3) Power [Watts].

Subject Evaluated
  Age: 25 years
  Height: 178 cm
  Gender: Male
  Weight: 68 Kg
  Sport: Cycling
Material Used for the Activity or Monitored Locomotor Exercise
  14 NIRS devices
  1 Power Sensor
  1 Direct drive roller
  1 Cadence Sensor
  1 Heart Rate Band
  1 Activity Monitor
  1 Road Bike of the subject's own
Data Recording Procedures for the Evaluation and Monitoring Method
1. Place and adhere 12 near-infrared spectroscopy (NIRS) devices on each monitored muscle tissue that involved in locomotor activity during cycling (TM$^M$):
   a. Right Vastus Lateral (VL R) and Left Vastus Lateral (VL L)
   b. Right Rectus Femoris (RF R) and Left Rectus Femoris (RF L)
   c. Right Vast Internal (VI R) and Left Vast Internal (VI L)
   d. Right Semitendinosus (ST R) and Left Semitendinosus (ST L)
   e. Right Gluteus Maximus (GM R) and Left Gluteus Maximus (GM L)
   f. Right Gastrocnemius (GA R) and Left Gastrocnemius (GA L)
   g. Right Tibialis Anterior (AT R) and Left Tibialis Anterior (TA L)
2. Place the heart rate band superficially under the user's chest.
3. Start the data logging of all devices and activity monitors when the activity starts, recording of (hour: minute: second) exact of the start of the locomotive activity.
4. Locomotive Activity Monitored and Recorded (AFC$^M$):
   a. In the Table 1 shows the characteristics of the locomotor work session carried out and the data related to external locomotor performance parameters. In FIG. 2, can see the graphic representation of the external locomotor performance values developed by the subject during the session.

TABLE 1

The data of the session carried out

| | | Start | Power (Watts) | | | | Cadence (rpm) | | | | HR (ppm) | | | |
|---|---|---|---|---|---|---|---|---|---|---|---|---|---|---|
| Work Interval | Duration (hh:mm:ss) | Time (hh:mm:ss) | Average | Median | Desv Est | Max | Average | Median | Desv Est | Max | Average | Median | Desv Est | Max |
| IT 01 | 0:10:00 | 0:00:00 | 88 | 84 | 20 | 221 | 77 | 79 | 12 | 87 | 109 | 109 | 5.7 | 119 |
| ID 01 | 0:03:00 | 0:10:00 | | | | | | | | | 98 | 93 | 11 | |
| IT 02 | 0:04:00 | 0:13:00 | 148 | 150 | 15 | 175 | 34 | 0 | 45 | 95 | 127 | 131 | 12 | 137 |
| ID 02 | 0:01:00 | 0:17:00 | | | | | | | | | 116 | 123 | 15 | |
| IT 03 | 0:04:00 | 0:18:00 | 150 | 150 | 20 | 315 | 66 | 69 | 15 | 73 | 122 | 126 | 11 | 131 |
| ID 03 | 0:01:00 | 0:22:00 | | | | | | | | | 116 | 123 | 12 | |
| IT 04 | 0:04:00 | 0:23:00 | 148 | 150 | 14 | 163 | 84 | 90 | 22 | 95 | 126 | 130 | 11 | 137 |
| ID 04 | 0:01:00 | 0:27:00 | | | | | | | | | 120 | 120 | 7.6 | |
| IT 05 | 0:04:00 | 0:28:00 | 148 | 150 | 16 | 160 | 73 | 76 | 15 | 79 | 124 | 127 | 8.2 | 132 |
| ID 05 | 0:01:00 | 0:32:00 | | | | | | | | | 108 | 102 | 12 | |
| IT 06 | 0:04:00 | 0:33:00 | 149 | 150 | 12 | 163 | 82 | 85 | 15 | 90 | 127 | 130 | 9.5 | 134 |
| ID 06 | 0:01:00 | 0:37:00 | | | | | | | | | 114 | 110 | 9.9 | |
| IT 07 | 0:04:00 | 0:38:00 | 149 | 150 | 11 | 159 | 78 | 81 | 15 | 85 | 126 | 130 | 8.3 | 133 |
| ID 07 | 0:06:00 | 0:42:00 | | | | | | | | | 103 | 102 | 11 | |
| IT 08 | 0:04:00 | 0:48:00 | 99 | 101 | 10 | 113 | 77 | 81 | 16 | 87 | 114 | 116 | 9.7 | 123 |
| ID 08 | 0:01:00 | 0:52:00 | | | | | | | | | 106 | 104 | 5.7 | |
| IT 09 | 0:04:00 | 0:53:00 | 124 | 125 | 13 | 165 | 77 | 80 | 15 | 85 | 122 | 125 | 7.9 | 129 |
| ID 09 | 0:01:00 | 0:57:00 | | | | | | | | | 110 | 106 | 9.2 | |
| IT 10 | 0:04:00 | 0:58:00 | 148 | 150 | 14 | 172 | 78 | 81 | 15 | 83 | 131 | 134 | 8.8 | 139 |
| ID 10 | 0:01:00 | 1:02:00 | | | | | | | | | 122 | 125 | 9.2 | |
| IT 11 | 0:04:00 | 1:03:00 | 173 | 175 | 16 | 192 | 77 | 80 | 18 | 85 | 137 | 141 | 11 | 148 |
| ID 11 | 0:01:00 | 1:07:00 | | | | | | | | | 131 | 130 | 8.8 | |
| IT 12 | 0:04:00 | 1:08:00 | 195 | 200 | 25 | 212 | 77 | 80 | 15 | 84 | 148 | 153 | 13 | 160 |
| ID 12 | 0:01:00 | 1:12:00 | | | | | | | | | 135 | 130 | 14 | |
| IT 13 | 0:04:00 | 1:13:00 | 212 | 222 | 30 | 232 | 78 | 81 | 16 | 85 | 159 | 164 | 15 | 172 |
| ID 13 | 0:01:00 | 1:17:00 | | | | | | | | | 146 | 143 | 17 | |
| IT 14 | 0:04:00 | 1:18:00 | 245 | 249 | 23 | 261 | 79 | 83 | 16 | 87 | 169 | 176 | 17 | 182 |
| ID 14 | 0:01:00 | 1:22:00 | | | | | | | | | 157 | 160 | 16 | |
| IT 15 | 0:04:00 | 1:23:00 | 268 | 274 | 40 | 288 | 79 | 83 | 16 | 87 | 179 | 186 | 17 | 192 |
| ID 15 | 0:01:00 | 1:27:00 | | | | | | | | | 167 | 166 | 17 | |
| IT 16 | 0:01:37 | 1:28:00 | 277 | 297 | 66 | 315 | 52 | 72 | 33 | 78 | 175 | 181 | 14 | 190 |

5. Ending of locomotor activity and ending of data recording
6. Download, synchronization and union of all the data obtained by each device, through the individual registration timescale of each device used during the session.
7. The values are calculated for each $TM^M$ of Oxygen-Charged Capillary Hemoglobin ($O_2HHb$), Oxygen-Discharged Capillary Hemoglobin (HHb), Muscle Hemoglobin Blood Flow ($\Phi ThB$), Muscular Blood Flow of Oxygen-Charged Capillary Hemoglobin ($O_2HHb$) and Muscular Blood Flow of Oxygen-Discharged Hemoglobin ($\Phi HHb$), from the recorded data of Muscle Oxygen Saturation ($SmO_2$%) and Capillary Hemoglobin (ThB).
8. Data obtained erroneously and/or by device registration error during activity are filtered and excluded. Data that are not within the following parameters and all data obtained from the calculation of any of them are excluded:
   a. $SmO_2^\%$ [Between 1% $SmO_2$ and 99% $SmO_2$]
   b. ThB [Between 9.5 g/dL and 14.9 g/dL]
   c. HR [Between 40 bpm and 230 bpm]
9. The data that present a greater difference than that established in the following parameters between the determined value and the contiguous values in the temporary register are filtered and excluded, and all the data obtained from the calculation of any of the they:
   a. Difference of SMO2% [>±10% $SmO_2$%]
   b. Difference of ThB [>±0.3 g/dL]
   c. Difference of HR [>±7 ppm]
10. In FIGS. 3-9, the data obtained during the activity in dispersion data where the $SmO_2^\%$ values obtained and/or calculated are established on the axis (y) and the locomotor performance data values on the axis (x) external power developed during locomotive activity can be observed.
11. In FIGS. 10-16, the data obtained during the activity in dispersion data where the ThB values obtained and/or calculated are established on the axis (y) and the locomotor performance data values on the axis (x) external power developed during locomotive activity can be observed.
12. In FIGS. 17-23, the data obtained during the activity in dispersion data where the $\Phi ThB$ values obtained and/or calculated are established on the axis (y) and the locomotor performance data values on the axis (x) external power developed during locomotive activity can be observed.
13. In FIGS. 24-30, the data obtained during the activity in dispersion data where the $O_2HHb$ values obtained and/or calculated are established on the axis (y) and the locomotor performance data values on the axis (x) external power developed during locomotive activity can be observed.
14. In FIGS. 31-37, the data obtained during the activity in dispersion data where the HHb values obtained and/or calculated are established on the axis (y) and the locomotor performance data values on the axis (x) external power developed during locomotive activity can be observed.
15. In FIGS. 38-44, the data obtained during the activity in dispersion data where the $O_2HHb$ values obtained and/or calculated are established on the axis (y) and the locomotor performance data values on the axis (x) external power developed during locomotive activity can be observed.

16. In FIGS. 38-44, the data obtained during the activity in dispersion data where the ΦHHb values obtained and/or calculated are established on the axis (y) and the locomotor performance data values on the axis (x) external power developed during locomotive activity can be observed.

Analysis and Evaluation of the Recorded Data of the Locomotor Performance

1. Calculation of the Minimum Activation Threshold ($U_{Amin}$), Aerobic Threshold ($U_{Ae}$) and Anaerobic Threshold ($U_{ANA}$).

1.1. The values obtained of Power or Cadence of Pedalling equivalent to "0" are filtered and excluded.

Figure 58:
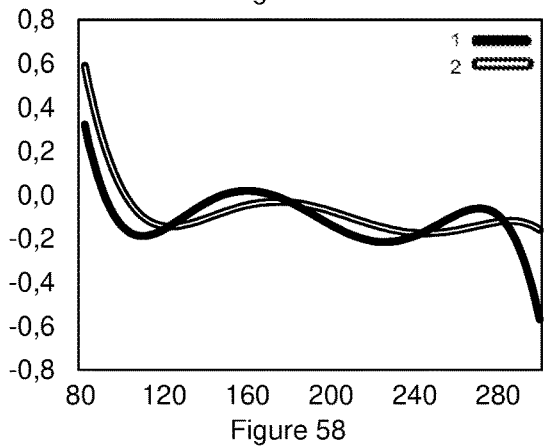
FIG. 58 graphically represent the relationship between the values of the slope $\overrightarrow{(p)}$ |Y|SmO$_2$% (Axis Y) of the TA L (1) and TA R (2), and the values of power (Axis X-Watts).
Figure 59:
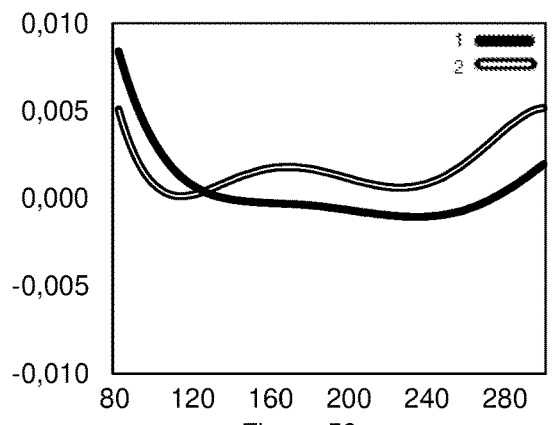
FIG. 59 graphically represent the relationship between the values of the slope $\overrightarrow{(p)}$ |Y|ThB (Axis) of the RF L (1) and RF R (2), and the values of power (Axis X-Watts).
Figure 60:
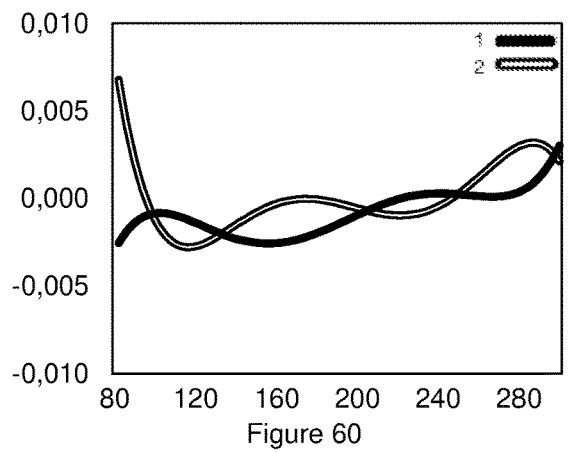
FIG. 60 graphically represent the relationship between the values of the slope $\overrightarrow{(p)}$ |Y|ThB (Axis Y) of the VL L (1) and VL R (2), and the values of power (Axis X-Watts).
Figure 61:
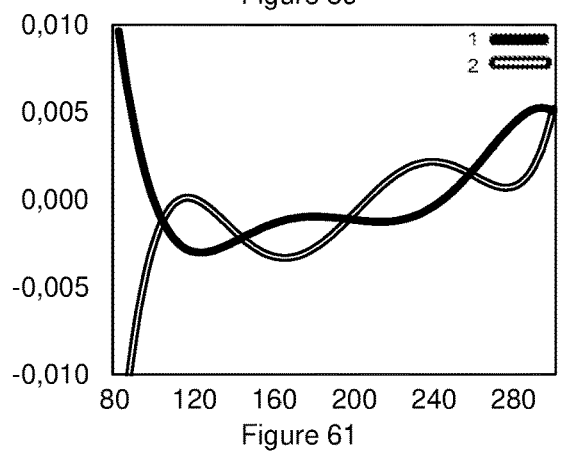
FIG. 61 graphically represent the relationship between the values of the slope $\overrightarrow{(p)}$ |Y|ThB (Axis Y) of the ST L (1) and ST R (2), and the values of power (Axis X-Watts).
Figure 62:
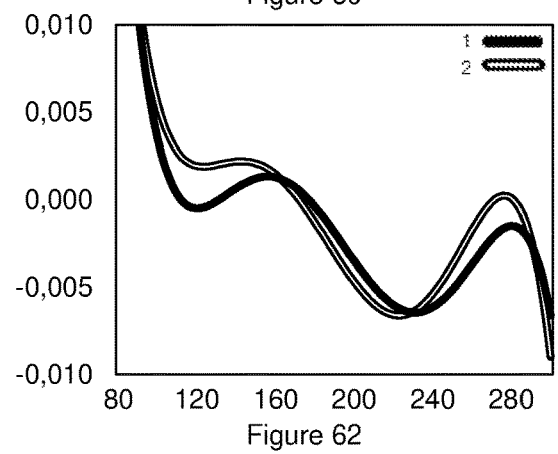
FIG. 62 graphically represent the relationship between the values of the slope $\overrightarrow{(p)}$ |Y|ThB (Axis Y) of the GM L (1) and GM R (2), and the values of power (Axis X-Watts).
Figure 63:
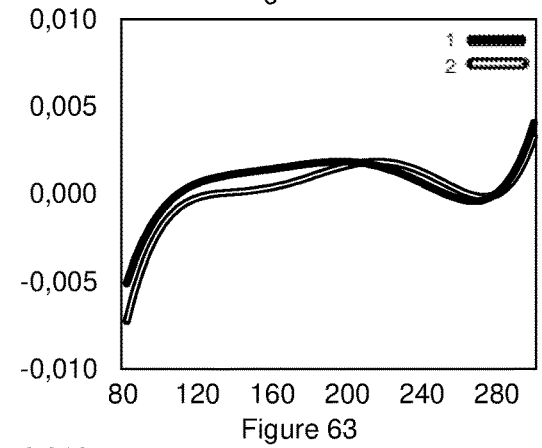
FIG. 63 graphically represent the relationship between the values of the slope $\overrightarrow{(p)}$ |Y|ThB (Axis Y) of the VI L (1) and VI R (2), and the values of power (Axis X-Watts).
Figure 64:
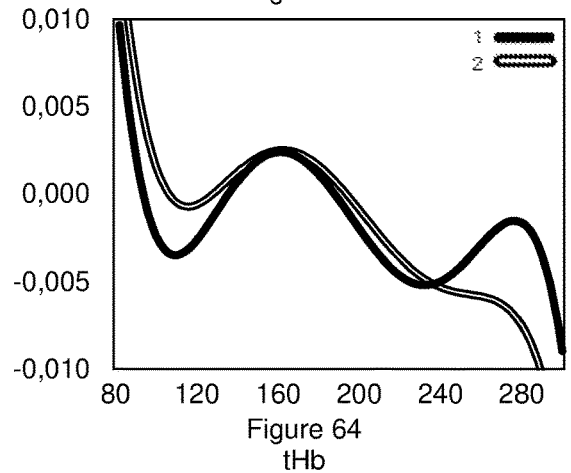
FIG. 64 graphically represent the relationship between the values of the slope $\overrightarrow{(p)}$ |Y|ThB (Axis Y) of the GA L (1) and GA R (2), and the values of power (Axis X-Watts).
Figure 65:
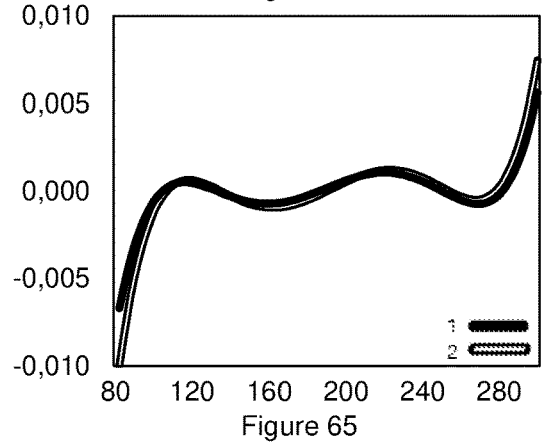
FIG. 65 graphically represent the relationship between the values of the slope $\overrightarrow{(p)}$ |Y|ThB (Axis Y) of the TA L (1) and TA R (2), and the values of power (Axis X-Watts).
Figure 66:
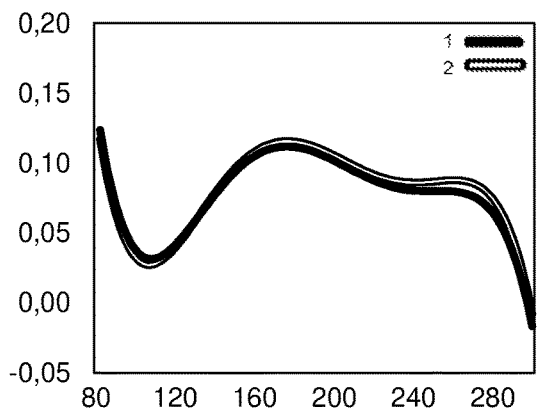
FIG. 66 graphically represent the relationship between the values of the slope $\overrightarrow{(p)}$ |Y|ΦThB (Axis Y) of the RF L (1) and RF R (2), and the values of power (Axis X-Watts).
Figure 67:
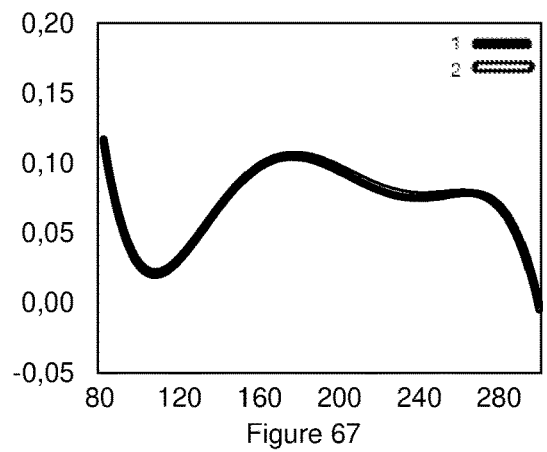
FIG. 67 graphically represent the relationship between the values of the slope $\overrightarrow{(p)}$ |Y|ΦThB (Axis Y) of the VL L (1) and VL R (2), and the values of power (Axis X-Watts).
Figure 68:
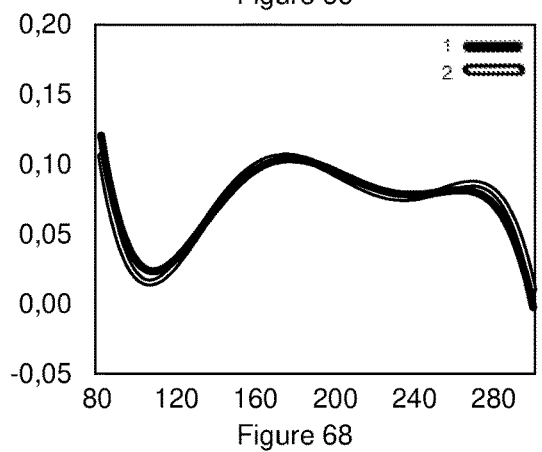
FIG. 68 graphically represent the relationship between the values of the slope $\overrightarrow{(p)}$ |Y|ΦThB (Axis Y) of the ST L (1) and ST R (2), and the values of power (Axis X-Watts).
Figure 69:
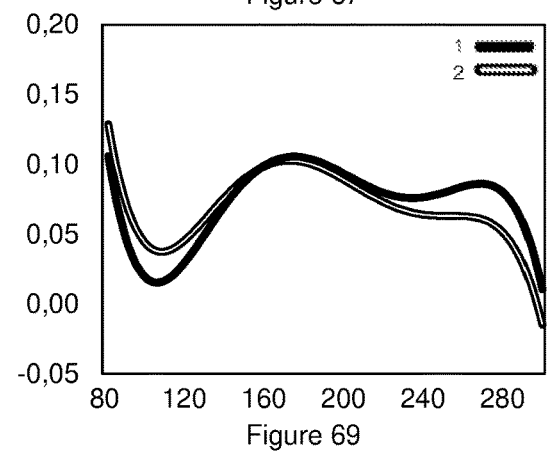
FIG. 69 graphically represent the relationship between the values of the slope $\overrightarrow{(p)}$ |Y|ΦThB (Axis Y) of the GM L (1) and GM R (2), and the values of power (Axis X-Watts).
Figure 70:
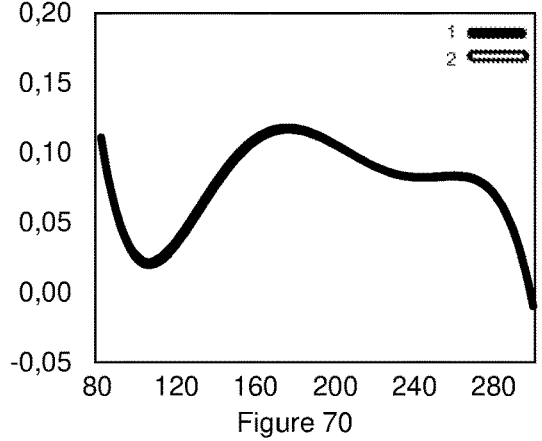
FIG. 70 graphically represent the relationship between the values of the slope $\overrightarrow{(p)}$ |Y|ΦThB (Axis Y) of the VI L (1) and VI R (2), and the values of power (Axis X-Watts).
Figure 71:
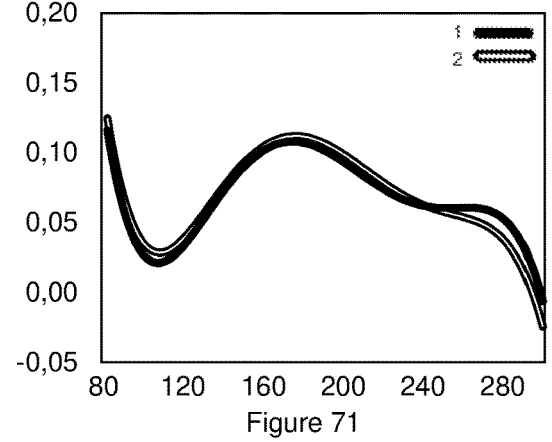
FIG. 71 graphically represent the relationship between the values of the slope $\overrightarrow{(p)}$ |Y|ΦThB (Axis Y) of the GA L (1) and GA R (2), and the values of power (Axis X-Watts).
Figure 72:
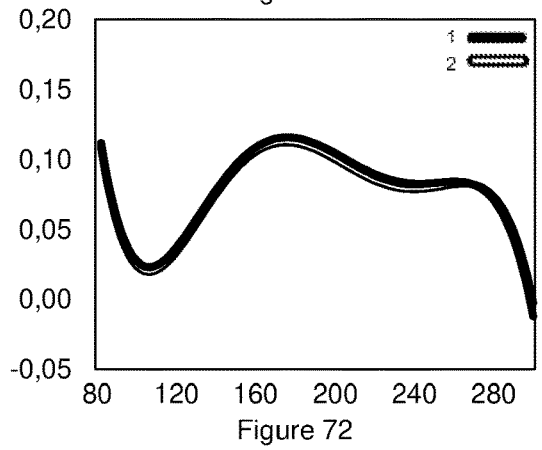
FIG. 72 graphically represent the relationship between the values of the slope $\overrightarrow{(p)}$ |Y|ΦThB (Axis Y) of the TA L (1) and TA R (2), and the values of power (Axis X-Watts).
Figure 73:
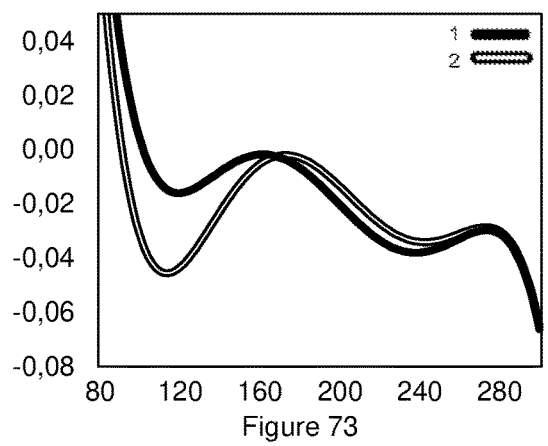
FIG. 73 graphically represent the relationship between the values of the slope $\overrightarrow{(p)}$ |Y|O$_2$HHb (Axis Y) of the RF L (1) and RF R (2), and the values of power (Axis X-Watts).
Figure 74:
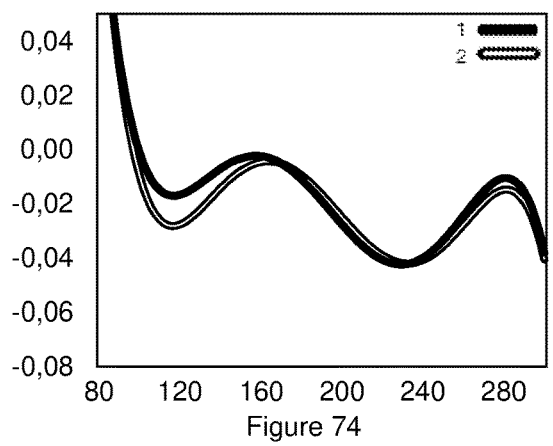
FIG. 74 graphically represent the relationship between the values of the slope $\overrightarrow{(p)}$ |Y|O$_2$HHb (Axis Y) of the VL L (1) and VL R (2), and the values of power (Axis X-Watts).
Figure 75:
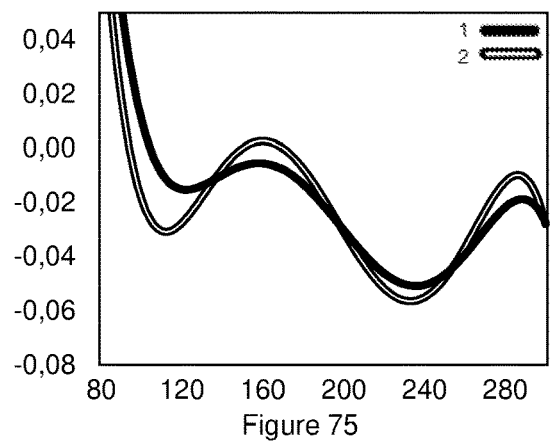
FIG. 75 graphically represent the relationship between the values of the slope $\overrightarrow{(p)}$ |Y|O$_2$HHb (Axis Y) of the ST L (1) and ST R (2), and the values of power (Axis X-Watts).
Figure 76:
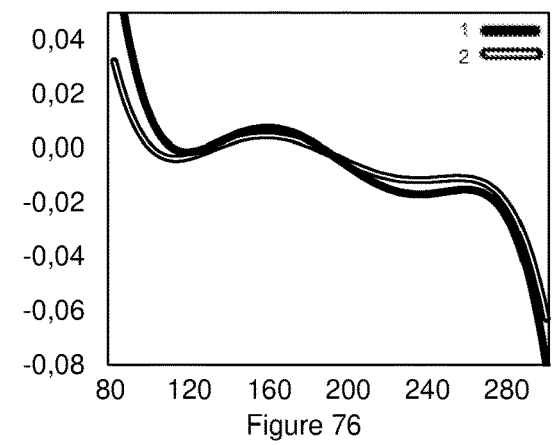
FIG. 76 graphically represent the relationship between the values of the slope $\overrightarrow{(p)}$ |Y|O$_2$HHb (Axis Y) of the GM L (1) and GM R (2), and the values of power (Axis X-Watts).
Figure 77:
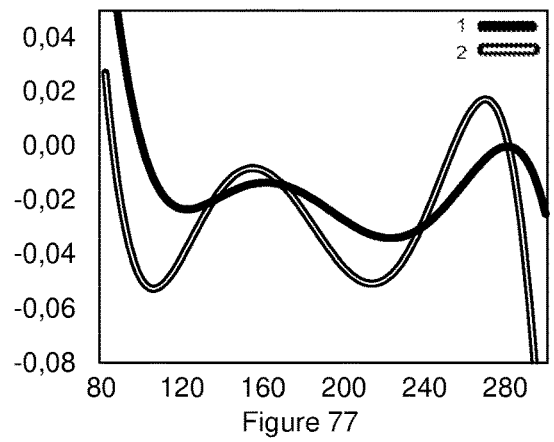
FIG. 77 graphically represent the relationship between the values of the slope $\overrightarrow{(p)}$ |Y|O$_2$HHb (Axis Y) of the VI L (1) and VI R (2), and the values of power (Axis X-Watts).
Figure 78:
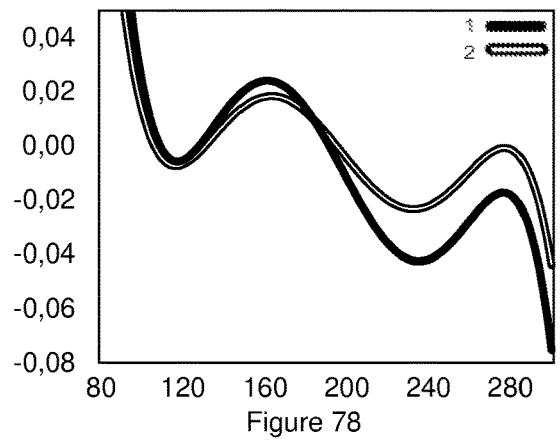
FIG. 78 graphically represent the relationship between the values of the slope $\overrightarrow{(p)}$ |Y|O$_2$HHb (Axis Y) of the GA L (1) and GA R (2), and the values of power (Axis X-Watts).
Figure 79:
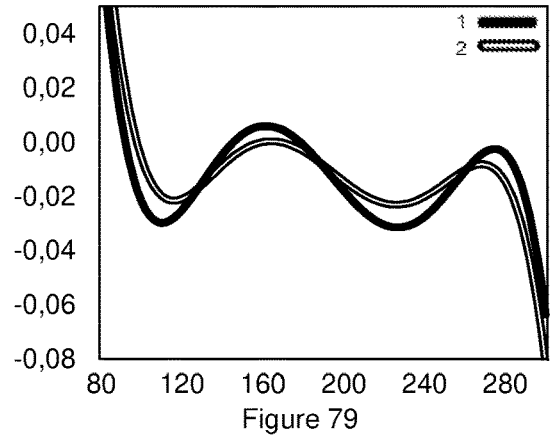
FIG. 79 graphically represent the relationship between the values of the slope $\overrightarrow{(p)}$ |Y|O$_2$HHb (Axis Y) of the TA L (1) and TA R (2), and the values of power (Axis X-Watts).
Figure 80:
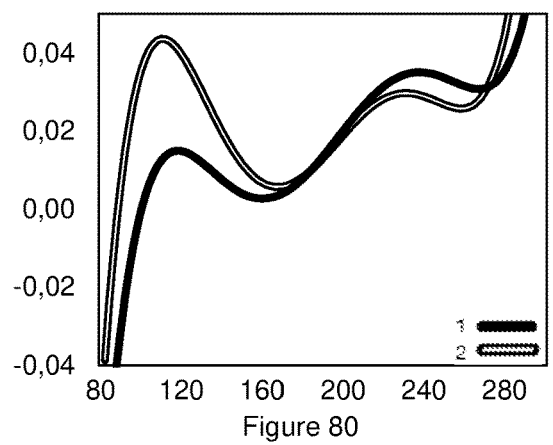
FIG. 80 graphically represent the relationship between the values of the slope $\overrightarrow{(p)}$ |Y|HHb (Axis Y) of the RF L (1) and RF R (2), and the values of power (Axis X-Watts).
Figure 81:
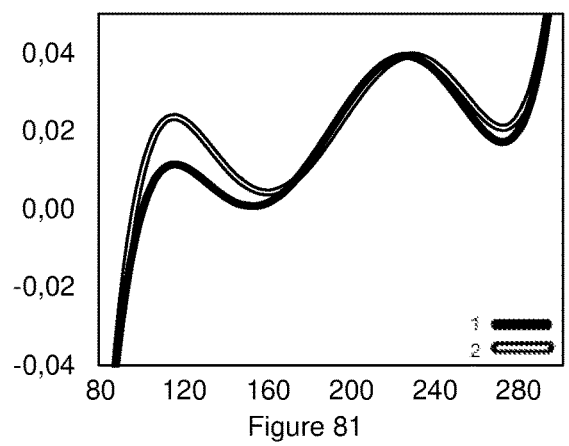
FIG. 81 graphically represent the relationship between the values of the slope $\overrightarrow{(p)}$ |Y|HHb (Axis Y) of the VL L (1) and VL R (2), and the values of power (Axis X-Watts).
Figure 82:
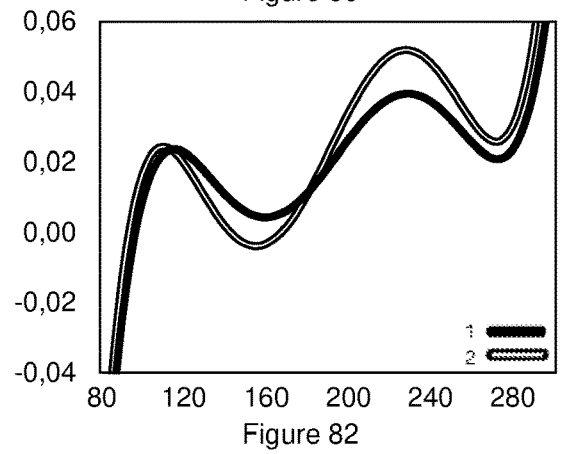
FIG. 82 graphically represent the relationship between the values of the slope $\overrightarrow{(p)}$ |Y|HHb (Axis Y) of the ST L (1) and ST R (2), and the values of power (Axis X-Watts).
Figure 83:
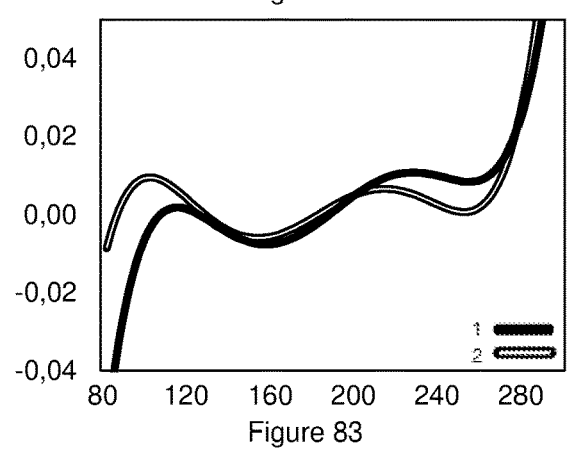
FIG. 83 graphically represent the relationship between the values of the slope $\overrightarrow{(p)}$ |Y|HHb (Axis Y) of the GM L (1) and GM R (2), and the values of power (Axis X-Watts).
Figure 84:
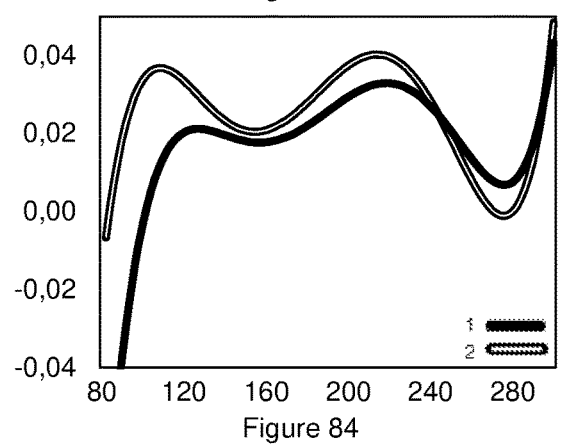
FIG. 84 graphically represent the relationship between the values of the slope $\overrightarrow{(p)}$ |Y|HHb (Axis Y) of the VI L (1) and VI R (2), and the values of power (Axis X-Watts).
Figure 85:
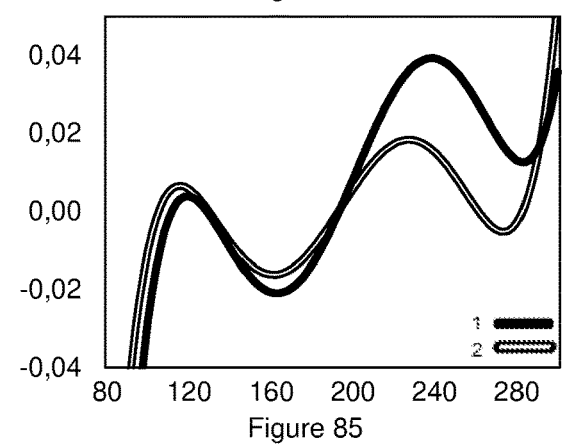
FIG. 85 graphically represent the relationship between the values of the slope $\overrightarrow{(p)}$ |Y|HHb (Axis Y) of the GA L (1) and GA R (2), and the values of power (Axis X-Watts).
Figure 86:
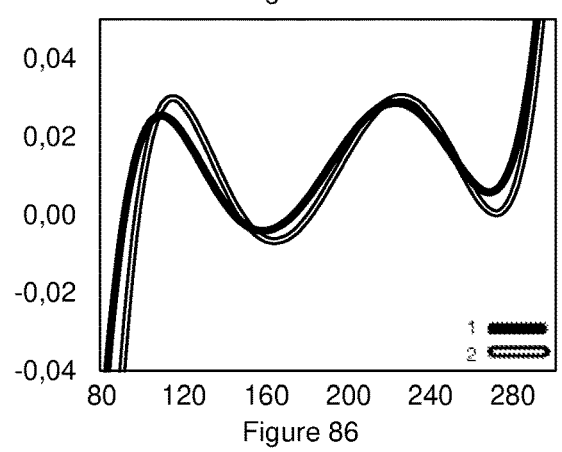
FIG. 86 graphically represent the relationship between the values of the slope $\overrightarrow{(p)}$ |Y|HHb (Axis Y) of the TA L (1) and TA R (2), and the values of power (Axis X-Watts).
Figure 87:
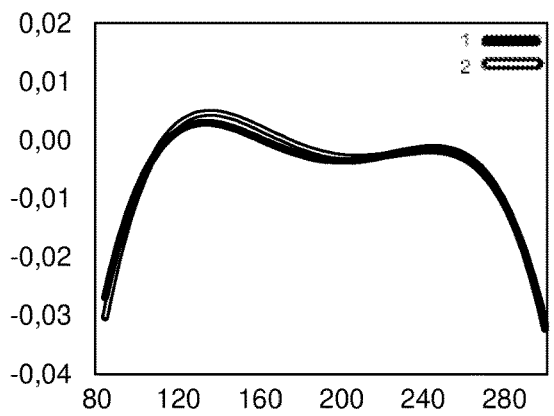
FIG. 87 graphically represent the relationship between the values of the slope $\overrightarrow{(p)}$ |Y|ΦO$_2$HHb (Axis Y) of the RF L (1) and RF R (2), and the values of power (Axis X-Watts).
Figure 88:
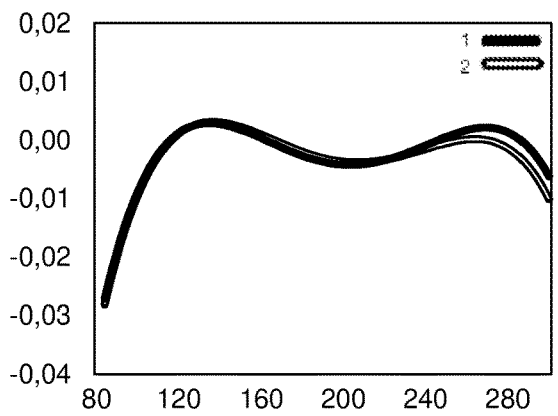
FIG. 88 graphically represent the relationship between the values of the slope $\overrightarrow{(p)}$ |Y|ΦO$_2$HHb (Axis Y) of the VL L (1) and VL R (2), and the values of power (Axis X-Watts).
Figure 89:
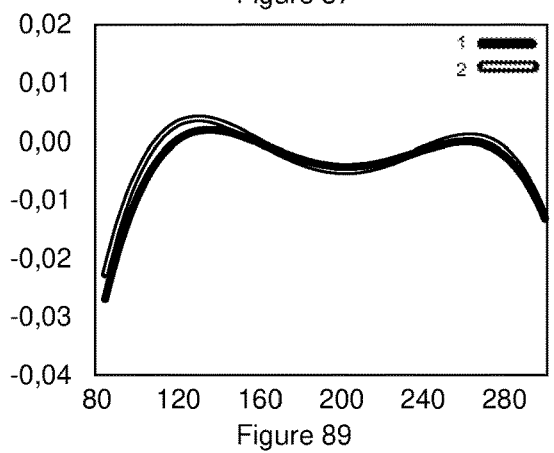
FIG. 89 graphically represent the relationship between the values of the slope $\overrightarrow{(p)}$ |Y|ΦO$_2$HHb (Axis Y) of the ST L (1) and ST R (2), and the values of power (Axis X-Watts).
Figure 90:
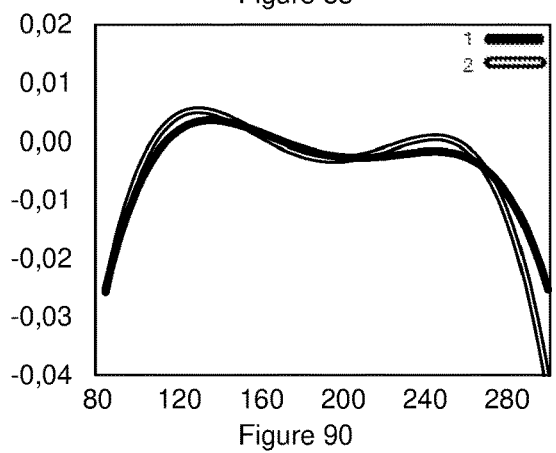
FIG. 90 graphically represent the relationship between the values of the slope $\overrightarrow{(p)}$ |Y|ΦO$_2$HHb (Axis Y) of the GM L (1) and GM R (2), and the values of power (Axis X-Watts).
Figure 91:
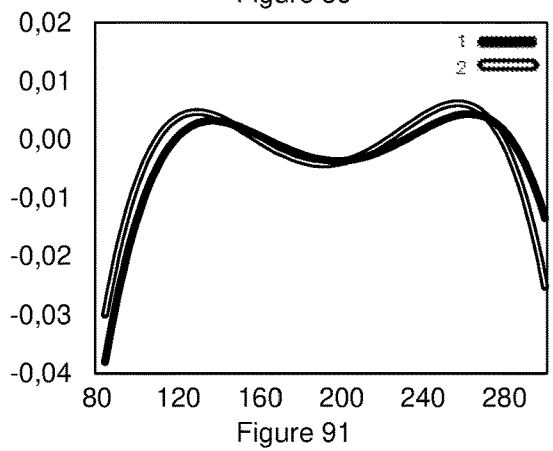
FIG. 91 graphically represent the relationship between the values of the slope $\overrightarrow{(p)}$ |Y|ΦO$_2$HHb (Axis Y) of the VI L (1) and VI R (2), and the values of power (Axis X-Watts).
Figure 92:
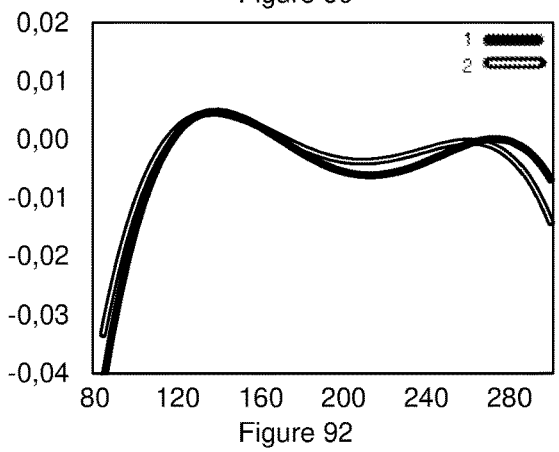
FIG. 92 graphically represent the relationship between the values of the slope $\overrightarrow{(p)}$ |Y|ΦO$_2$HHb (Axis Y) of the GA L (1) and GA R (2), and the values of power (Axis X-Watts).
Figure 93:
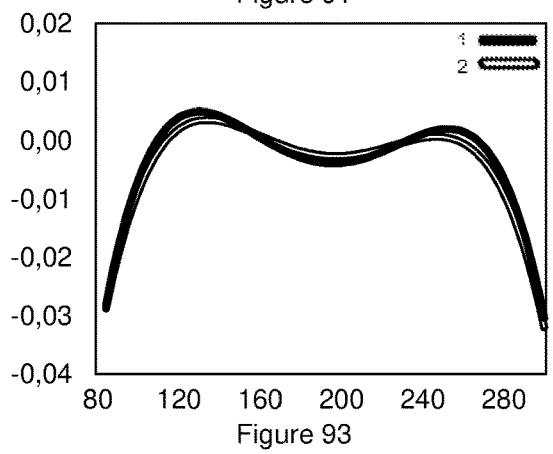
FIG. 93 graphically represent the relationship between the values of the slope $\overrightarrow{(p)}$ |Y|ΦO$_2$HHb (Axis Y) of the TA L (1) and TA R (2), and the values of power (Axis X-Watts).
Figure 94:
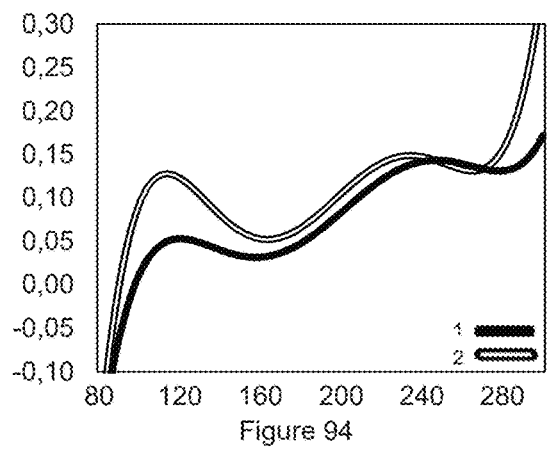
FIG. 94 graphically represent the relationship between the values of the slope $\overrightarrow{(p)}$ |Y|ΦHHb (Axis Y) of the RF L (1) and RF R (2), and the values of power (Axis X-Watts).
Figure 95:
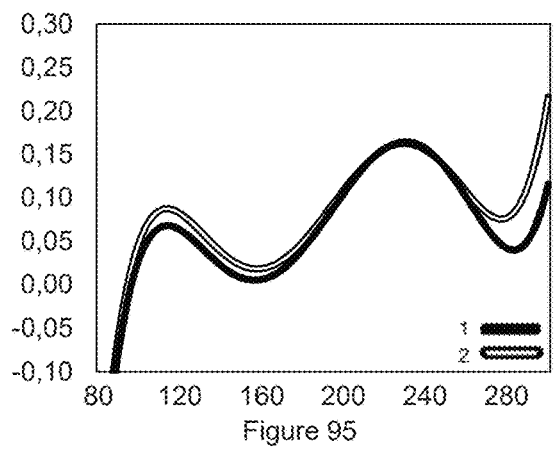
FIG. 95 graphically represent the relationship between the values of the slope $\overrightarrow{(p)}$ |Y|ΦHHb (Axis Y) of the VL L (1) and VL R (2), and the values of power (Axis X-Watts).
Figure 96:
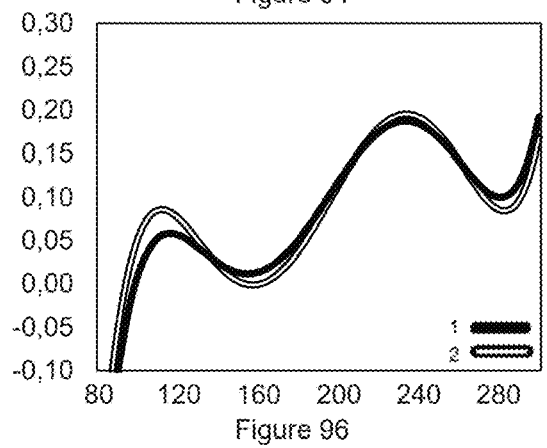
FIG. 96 graphically represent the relationship between the values of the slope $\overrightarrow{(p)}$ |Y|PHHb (Axis Y) of the ST L (1) and ST R (2), and the values of power (Axis X-Watts).
Figure 97:
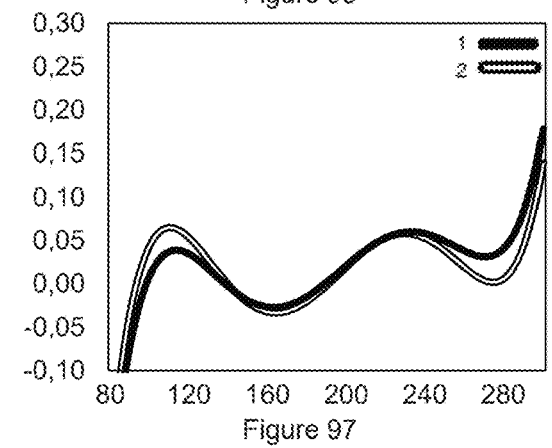
FIG. 97 graphically represent the relationship between the values of the slope $\overrightarrow{(p)}$ |Y|ΦHHb (Axis Y) of the GM L (1) and GM R (2), and the values of power (Axis X-Watts).
Figure 98:
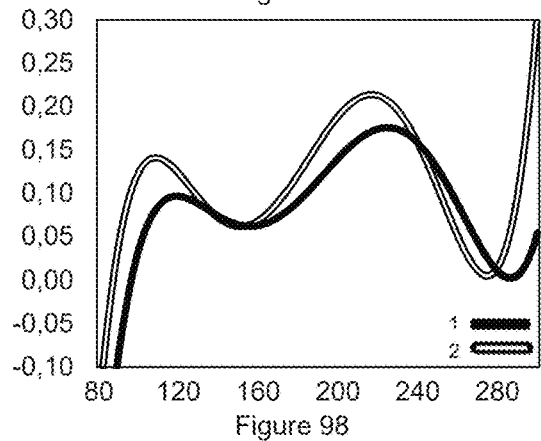
FIG. 98 graphically represent the relationship between the values of the slope $\overrightarrow{(p)}$ |Y|ΦHHb (Axis Y) of the VI L (1) and VI R (2), and the values of power (Axis X-Watts).
Figure 99:
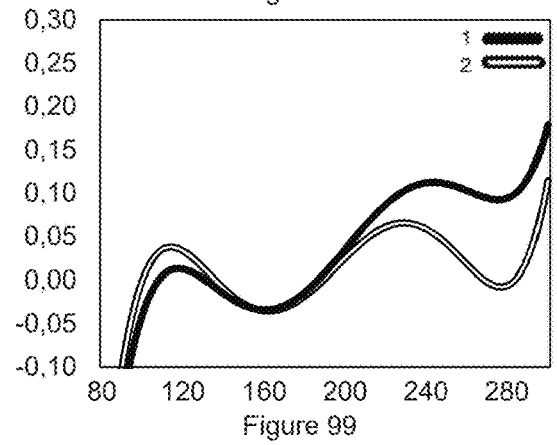
FIG. 99 graphically represent the relationship between the values of the slope $\overrightarrow{(p)}$ |Y|ΦHHb (Axis Y) of the GA L (1) and GA R (2), and the values of power (Axis X-Watts).
Figure 100:
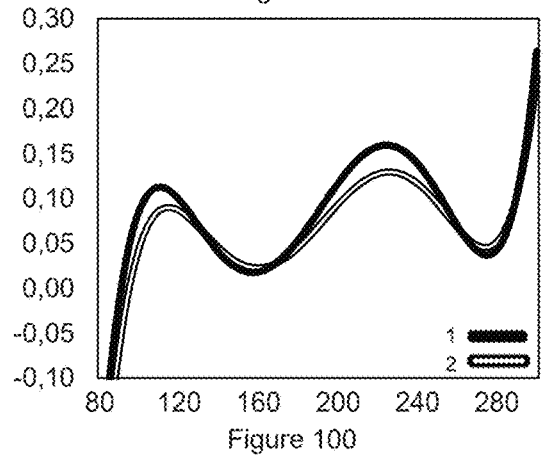
FIG. 100 graphically represent the relationship between the values of the slope $\overrightarrow{(p)}$ |Y|ΦHHb (Axis Y) of the TA L (1) and TA R (2), and the values of power (Axis X-Watts).

1.2. From the values represented in FIGS. 3-58, the General Trend Line of the Values is obtained for each graph.

1.3. In Table 2, the Equation of the Trend Line $|Y|SmO_2^\%$ calculated from the values of $SmO_2^\%$ of each $TM^M$ can be observed.

TABLE 2

Equation of the Trend Line of $|Y|SmO_2^\%$ of each $TM^M$

Figure 3:
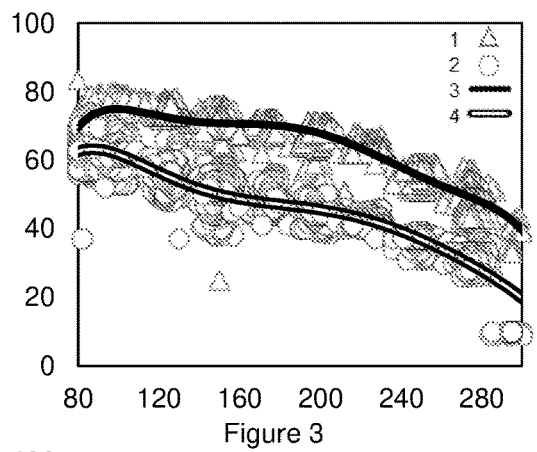
FIG. 3 graphically represent the relationship between the values of $SmO_2$% (Axis Y) of the RF L (1) and RF R (2) and the values of power (Axis X-Watts), in addition to the representation of the Line of Trend of RF L (3) and RF R (4).
Figure 4:
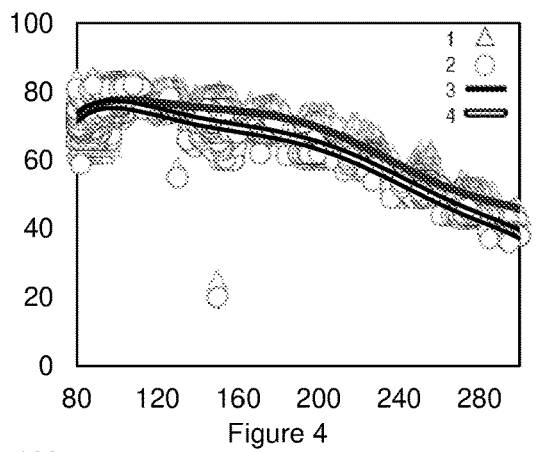
FIG. 4 graphically represent the relationship between the values of $SmO_2$% (Axis Y) of the VL L (1) and VL R (2) and the values of power (Axis X-Watts), in addition to the representation of the Line of Trend of VL L (3) and VL R (4).
Figure 5:
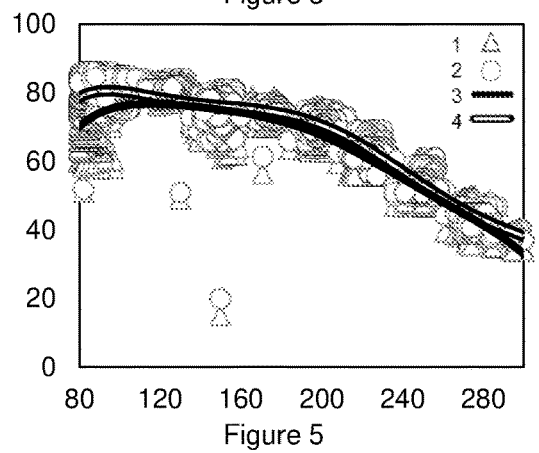
FIG. 5 graphically represent the relationship between the values of $SmO_2$% (Axis Y) of the ST L (1) and ST R (2) and the values of power (Axis X-Watts), in addition to the representation of the Line of Trend of ST L (3) and ST R (4).
Figure 6:
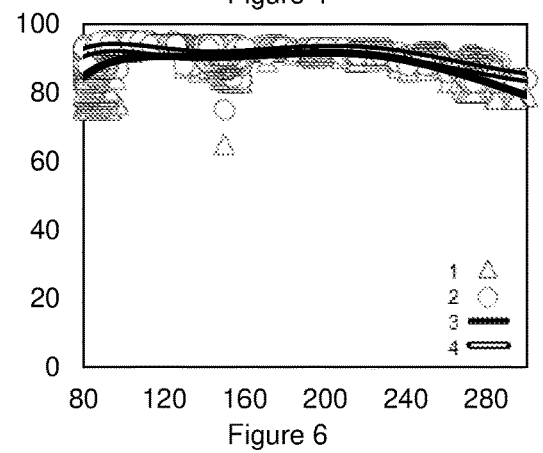
FIG. 6 graphically represent the relationship between the values of $SmO_2$% (Axis Y) of the GM L (1) and GM R (2) and the values of power (Axis X-Watts), in addition to the representation of the Line of Trend of GM L (3) and GM R (4).
Figure 7:
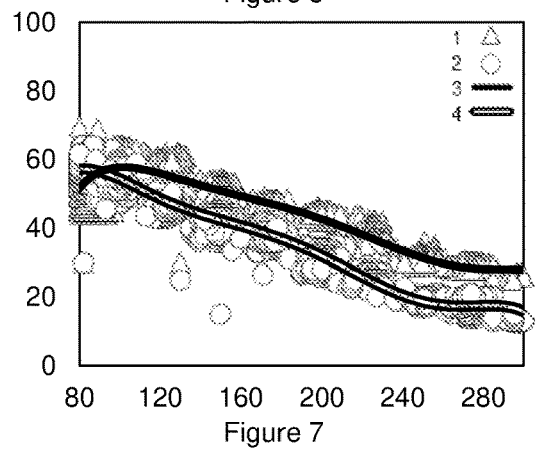
FIG. 7 graphically represent the relationship between the values of $SmO_2$% (Axis Y) of the VIL (1) and VI R (2) and the values of power (Axis X-Watts), in addition to the representation of the Line of Trend of VIL (3) and VI R (4).
Figure 8:
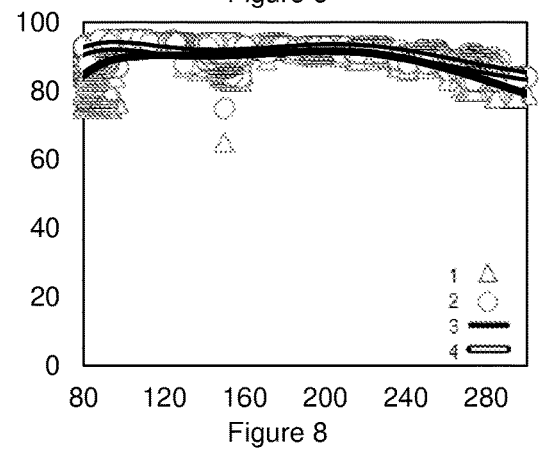
FIG. 8 graphically represent the relationship between the values of $SmO_2$% (Axis Y) of the GA L (1) and GA R (2) and the values of power (Axis X-Watts), in addition to the representation of the Line of Trend of GA L (3) and GA R (4).
Figure 9:
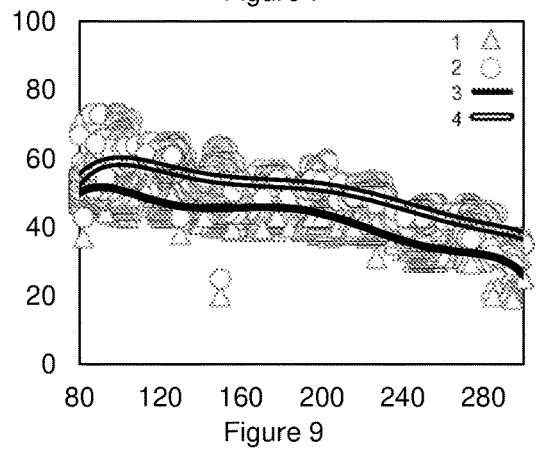
FIG. 9 graphically represent the relationship between the values of $SmO_2$% (Axis Y) of the TA L (1) and TA R (2) and the values of power (Axis X-Watts), in addition to the representation of the Line of Trend of TAL (3) and TA R (4).

| TM | | Equation of the Trend Line $|Y|SmO2$ |
|---|---|---|
| RF L | $|Y| =$ | $-2E-11x^6 + 3E-08x^5 - 1E-05x^4 + 0.0031x^3 - 0.4032x^2 + 27.173x - 657.15$ |
| RF R | $|Y| =$ | $-9E-12x^6 + 1E-08x^5 - 6E-06x^4 + 0.0014x^3 - 0.202x^2 + 14.059x - 315.89$ |
| | | Represented in FIG. 3 |
| VL L | $|Y| =$ | $-1E-11x^6 + 2E-08x^5 - 7E-06x^4 + 0.0018x^3 - 0.2428x^2 + 16.733x - 385.62$ |
| VL R | $|Y| =$ | $-1E-11x^6 + 1E-08x^5 - 7E-06x^4 + 0.0018x^3 - 0.2431x^2 + 16.924x - 392.28$ |
| | | Represented in FIG. 4 |
| ST L | $|Y| =$ | $-1E-11x^6 + 1E-08x^5 - 6E-06x^4 + 0.0014x^3 - 0.191x^2 + 13.395x - 306.51$ |
| ST R | $|Y| =$ | $-1E-11x^6 + 1E-08x^5 - 7E-06x^4 + 0.0017x^3 - 0.2249x^2 + 15.067x - 319.87$ |
| | | Represented in FIG. 5 |
| GM L | $|Y| =$ | $-5E-12x^6 + 6E-09x^5 - 3E-06x^4 + 0.0009x^3 - 0.1306x^2 + 9.7767x - 203.18$ |
| GM R | $|Y| =$ | $-5E-12x^6 + 7E-09x^5 - 4E-06x^4 + 0.0009x^3 - 0.1303x^2 + 9.1126x - 157.57$ |
| | | Represented in FIG. 6 |
| VI L | $|Y| =$ | $-1E-11x^6 + 2E-08x^5 - 8E-06x^4 + 0.002x^3 - 0.2713x^2 + 19.337x - 493.21$ |
| VI R | $|Y| =$ | $-2E-11x^6 + 2E-08x^5 - 1E-05x^4 + 0.0024x^3 - 0.2972x^2 + 18.768x - 407.38$ |
| | | Represented in FIG. 7 |
| GA L | $|Y| =$ | $2E-11x^6 - 2E-08x^5 + 1E-05x^4 - 0.0027x^3 + 0.3333x^2 - 20.338x + 545.65$ |
| GA R | $|Y| =$ | $2E-11x^6 - 3E-08x^5 + 1E-05x^4 - 0.0027x^3 + 0.3227x^2 - 19.531x + 537.28$ |
| | | Represented in FIG. 8 |
| TA L | $|Y| =$ | $-3E-11x^6 + 3E-08x^5 - 1E-05x^4 + 0.0033x^3 - 0.4137x^2 + 26.652x - 628.77$ |
| TA R | $|Y| =$ | $-1E-11x^6 + 2E-08x^5 - 8E-06x^4 + 0.002x^3 - 0.281x^2 + 19.933x - 502.86$ |
| | | Represented in FIG. 9 |

[(x) represents the analyzed power value; ($|Y|$) represents the value of $SmO_2^\%$]

1.4. In Table 3, the Equation of the Trend Line $|Y|ThB$ calculated from the values of ThB of each $TM^M$ can be observed.

TABLE 3

Equation of the Trend Line of $|Y|ThB$ of each $TM^M$

Figure 10:
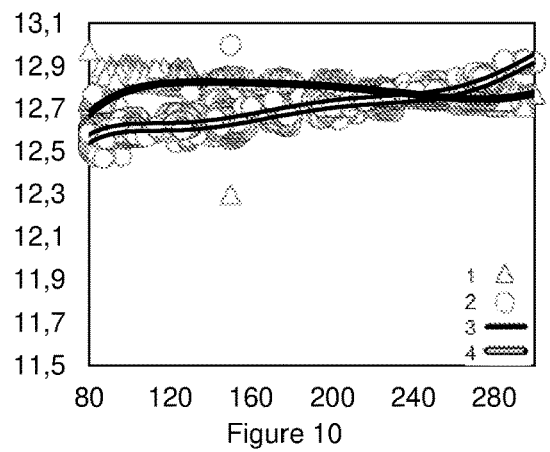
FIG. 10 graphically represent the relationship between the values of ThB (Axis Y) of the RF L (1) and RF R (2) and the values of power (Axis X-Watts), in addition to the representation of the Line of Trend of RF L (3) and RF R (4).
Figure 11:
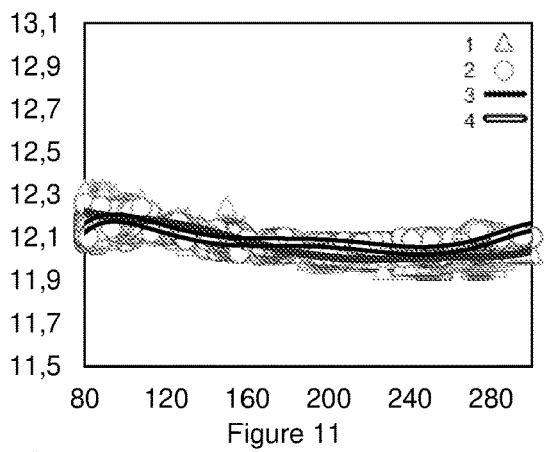
FIG. 11 graphically represent the relationship between the values of ThB (Axis Y) of the VL L (1) and VL R (2) and the values of power (Axis X-Watts), in addition to the representation of the Line of Trend of VL L (3) and VL R (4).
Figure 12:
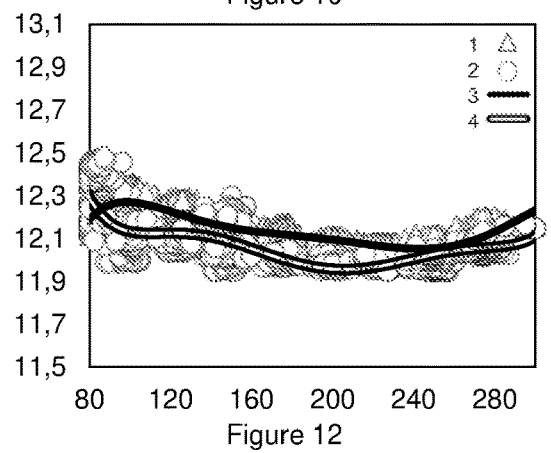
FIG. 12 graphically represent the relationship between the values of ThB (Axis Y) of the ST L (1) and ST R (2) and the values of power (Axis X-Watts), in addition to the representation of the Line of Trend of ST L (3) and ST R (4).
Figure 13:
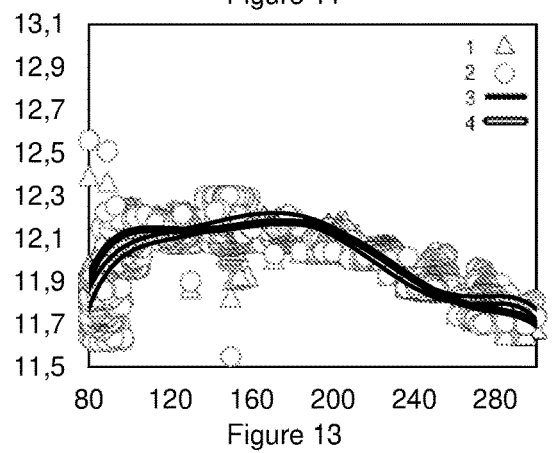
FIG. 13 graphically represent the relationship between the values of ThB (Axis Y) of the GM L (1) and GM R (2) and the values of power (Axis X-Watts), in addition to the representation of the Line of Trend of GM L (3) and GM R (4).
Figure 14:
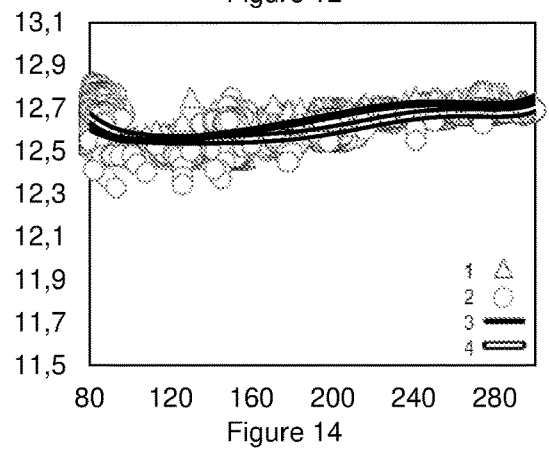
FIG. 14 graphically represent the relationship between the values of ThB (Axis Y) of the VI L (1) and VI R (2) and the values of power (Axis X-Watts), in addition to the representation of the Line of Trend of VI L (3) and VI R (4).
Figure 15:
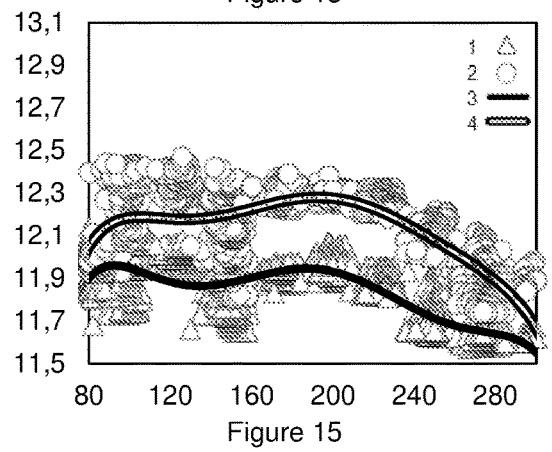
FIG. 15 graphically represent the relationship between the values of ThB (Axis Y) of the GA L (1) and GA R (2) and the values of power (Axis X-Watts), in addition to the representation of the Line of Trend of GA L (3) and GA R (4).
Figure 16:
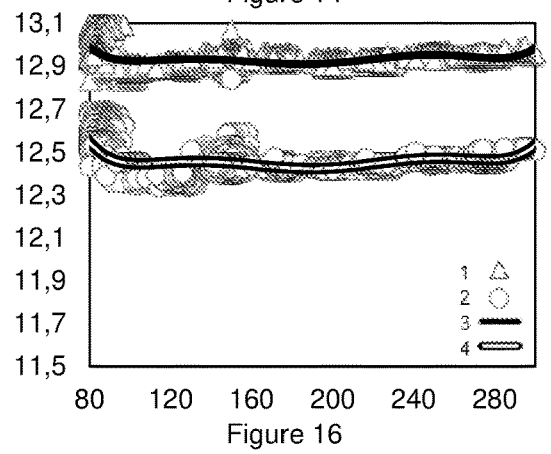
FIG. 16 graphically represent the relationship between the values of ThB (Axis Y) of the TA L (1) and TA R (2) and the values of power (Axis X-Watts), in addition to the representation of the Line of Trend of TA L (3) and TA R (4).

| TM | | Equation of the Trend Line $|Y|ThB$ |
|---|---|---|
| RF L | $|Y| =$ | $-5E-14x^6 + 7E-11x^5 - 4E-08x^4 + 1E-05x^3 - 0.0016x^2 + 0.1291x + 8.6505$ |
| RF R | $|Y| =$ | $-1E-13x^6 + 2E-10x^5 - 9E-08x^4 + 2E-05x^3 - 0.0029x^2 + 0.1952x + 7.2974$ |
| | | Represented in FIG. 10 |
| VL L | $|Y| =$ | $4E-13x^6 - 5E-10x^5 + 2E-07x^4 - 5E-05x^3 + 0.0063x^2 - 0.4036x + 22.558$ |
| VL R | $|Y| =$ | $-3E-13x^6 + 3E-10x^5 - 2E-07x^4 + 4E-05x^3 - 0.005x^2 + 0.3382x + 3.0815$ |
| | | Represented in FIG. 11 |
| ST L | $|Y|=$ | $-2E-13x^6 + 3E-10x^5 - 1E-07x^4 + 4E-05x^3 - 0.0051x^2 + 0.3543x + 2.395$ |
| ST R | $|Y|=$ | $4E-13x^6 - 5E-10x^5 + 3E-07x^4 - 6E-05x^3 + 0.0083x^2 - 0.5663x + 27.62$ |
| | | Represented in FIG. 12 |
| GM L | $|Y| =$ | $-6E-13x^6 + 7E-10x^5 - 3E-07x^4 + 8E-05x^3 - 0.0108x^2 + 0.7317x - 7.9018$ |
| GM R | $|Y| =$ | $-6E-13x^6 + 7E-10x^5 - 3E-07x^4 + 8E-05x^3 - 0.0103x^2 + 0.6872x - 6.6108$ |
| | | Represented in FIG. 13 |
| VI L | $|Y| =$ | $1E-13x^6 - 1E-10x^5 + 7E-08x^4 - 2E-05x^3 + 0.0021x^2 - 0.1426x + 16.574$ |
| VI R | $|Y| =$ | $2E-13x^6 - 2E-10x^5 + 9E-08x^4 - 2E-05x^3 + 0.003x^2 - 0.2031x + 18.268$ |
| | | Represented in FIG. 14 |
| GA L | $|Y| =$ | $-6E-13x^6 + 7E-10x^5 - 3E-07x^4 + 8E-05x^3 - 0.0104x^2 + 0.6759x - 5.4769$ |
| GA R | $|Y| =$ | $-5E-13x^6 + 6E-10x^5 - 3E-07x^4 + 6E-05x^3 - 0.0085x^2 + 0.5747x - 3.3749$ |
| | | Represented in FIG. 15 |
| TA L | $|Y| =$ | $2E-13x^6 - 3E-10x^5 + 1E-07x^4 - 3E-05x^3 + 0.004x^2 - 0.2698x + 20.29$ |
| TA R | $|Y| =$ | $4E-13x^6 - 4E-10x^5 + 2E-07x^4 - 5E-05x^3 + 0.0059x^2 - 0.3943x + 23.108$ |
| | | Represented in FIG. 16 |

[(x) represents the analyzed power value; ($|Y|$) represents the value of ThB]

1.5. In Table 4, the Equation of the Trend Line $|Y|\Phi ThB$ calculated from the values of $\Phi ThB$ of each $TM^M$ can be observed.

TABLE 4

Equation of the Trend Line of $|Y|\phi ThB$ of each $TM^M$
Ecuación de la Línea de Tendencia de $|Y|\phi ThB$

Figure 17:
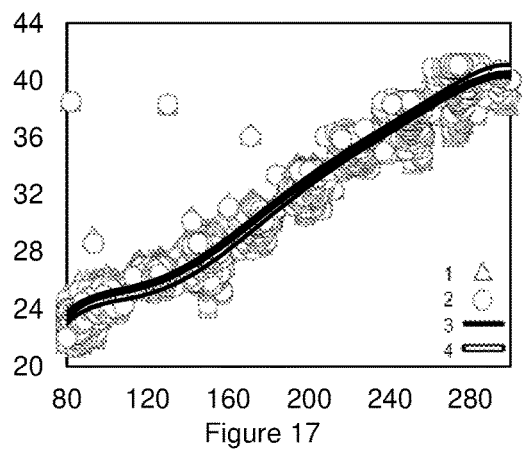
FIG. 17 graphically represent the relationship between the values of $\Phi$ThB (Axis Y) of the RF L (1) and RF R (2) and the values of power (Axis X-Watts), in addition to the representation of the Line of Trend of RF L (3) and RF R (4).
Figure 18:
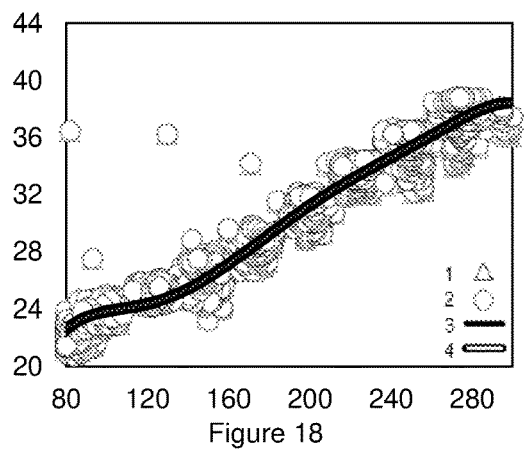
FIG. 18 graphically represent the relationship between the values of $\Phi$ThB (Axis Y) of the VL L (1) and VL R (2) and the values of power (Axis X-Watts), in addition to the representation of the Line of Trend of VL L (3) and VL R (4).
Figure 19:
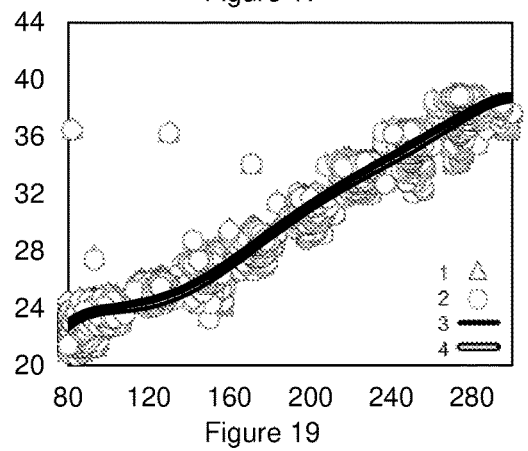
FIG. 19 graphically represent the relationship between the values of $\Phi$ThB (Axis Y) of the ST L (1) and ST R (2) and the values of power (Axis X-Watts), in addition to the representation of the Line of Trend of ST L (3) and ST R (4).
Figure 20:
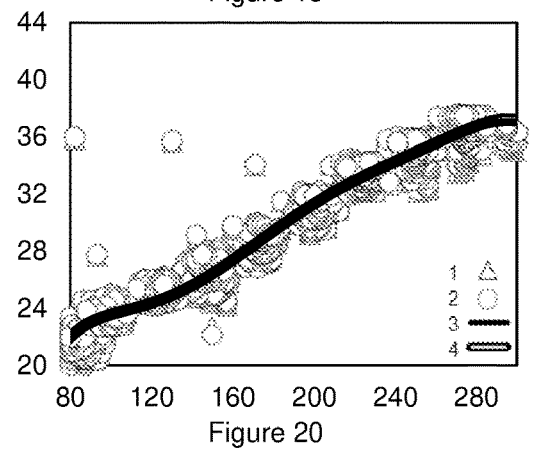
FIG. 20 graphically represent the relationship between the values of $\Phi$ThB (Axis Y) of the GM L (1) and GM R (2) and the values of power (Axis X-Watts), in addition to the representation of the Line of Trend of GM L (3) and GM R (4).
Figure 21:
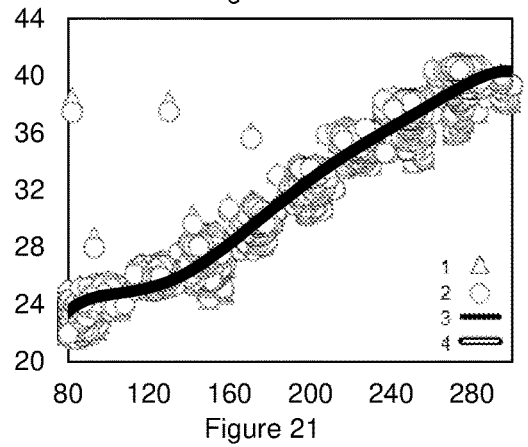
FIG. 21 graphically represent the relationship between the values of $\Phi$ThB (Axis Y) of the VI L (1) and VI R (2) and the values of power (Axis X-Watts), in addition to the representation of the Line of Trend of VI L (3) and VI R (4).
Figure 22:
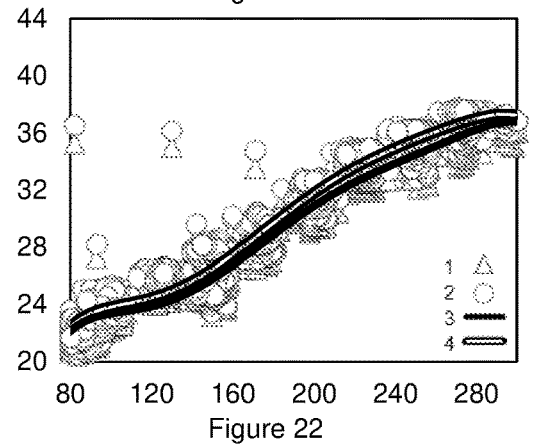
FIG. 22 graphically represent the relationship between the values of $\Phi$ThB (Axis Y) of the GA L (1) and GA R (2) and the values of power (Axis X-Watts), in addition to the representation of the Line of Trend of GA L (3) and GA R (4).
Figure 23:
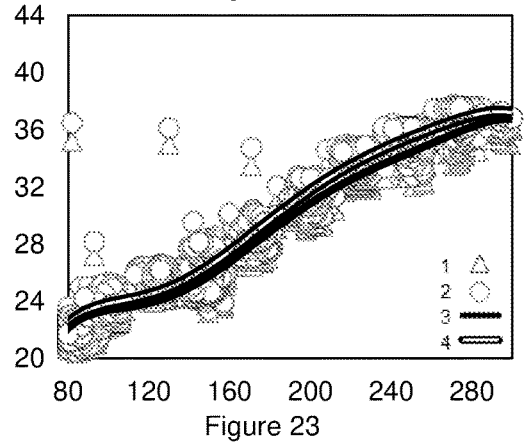
FIG. 23 graphically represent the relationship between the values of $\Phi$ThB (Axis Y) of the TA L (1) and TA R (2) and the values of power (Axis X-Watts), in addition to the representation of the Line of Trend of TA L (3) and TA R (4).

| TM | |
|---|---|
| RF L | $|Y| = -4E{-}12x^6 + 5E{-}09x^5 - 2E{-}06x^4 + 0.0006x^3 - 0.0731x^2 + 4.8586x - 105.1$ |
| RF R | $|Y| = -4E{-}12x^6 + 5E{-}09x^5 - 2E{-}06x^4 + 0.0006x^3 - 0.0757x^2 + 4.9991x - 108.03$ Represented in FIG. 17 |
| VL L | $|Y| = -4E{-}12x^6 + 5E{-}09x^5 - 2E{-}06x^4 + 0.0006x^3 - 0.0755x^2 + 5.006x - 109.18$ |
| VL R | $|Y| = -4E{-}12x^6 + 5E{-}09x^5 - 2E{-}06x^4 + 0.0006x^3 - 0.0744x^2 + 4.9425x - 108.01$ Represented in FIG. 18 |
| ST L | $|Y|= -4E{-}12x^6 + 5E{-}09x^5 - 2E{-}06x^4 + 0.0006x^3 - 0.0738x^2 + 4.9112x - 107.45$ |
| ST R | $|Y|= -5E{-}12x^6 + 5E{-}09x^5 - 3E{-}06x^4 + 0.0006x^3 - 0.0787x^2 + 5.1666x - 111.89$ Represented in FIG. 19 |
| GM L | $|Y| = -4E{-}12x^6 + 5E{-}09x^5 - 2E{-}06x^4 + 0.0005x^3 - 0.0699x^2 + 4.6867x - 103.1$ |
| GM R | $|Y| = -4E{-}12x^6 + 5E{-}09x^5 - 2E{-}06x^4 + 0.0005x^3 - 0.0682x^2 + 4.5589x - 99.743$ Represented in FIG. 20 |
| VI L | $|Y| = -4E{-}12x^6 + 5E{-}09x^5 - 2E{-}06x^4 + 0.0006x^3 - 0.0779x^2 + 5.1214x - 110.35$ |
| VI R | $|Y| = -4E{-}12x^6 + 5E{-}09x^5 - 2E{-}06x^4 + 0.0006x^3 - 0.0784x^2 + 5.1666x - 111.66$ Represented in FIG. 21 |
| GA L | $|Y| = -4E{-}12x^6 + 5E{-}09x^5 - 2E{-}06x^4 + 0.0006x^3 - 0.0758x^2 + 5.0374x - 110.73$ |
| GA R | $|Y| = -4E{-}12x^6 + 5E{-}09x^5 - 2E{-}06x^4 + 0.0005x^3 - 0.0717x^2 + 4.8132x - 105.99$ Represented in FIG. 22 |
| TA L | $|Y| = -4E{-}12x^6 + 5E{-}09x^5 - 2E{-}06x^4 + 0.0006x^3 - 0.0776x^2 + 5.1066x - 109.44$ |
| TA R | $|Y| = -5E{-}12x^6 + 5E{-}09x^5 - 3E{-}06x^4 + 0.0006x^3 - 0.0782x^2 + 5.1403x - 110.85$ Represented in FIG. 23 |

[(x) represents the analyzed power value; (|Y|) represents the value of $\phi ThB$]

1.6. In Table 5, the Equation of the Trend Line $|Y|O_2HHb$ calculated from the values of $O_2HHb$ of each $TM^M$ can be observed.

TABLE 5

Equation of the Trend Line of $|Y|O_2HHb$ of each $TM^M$

Figure 24:
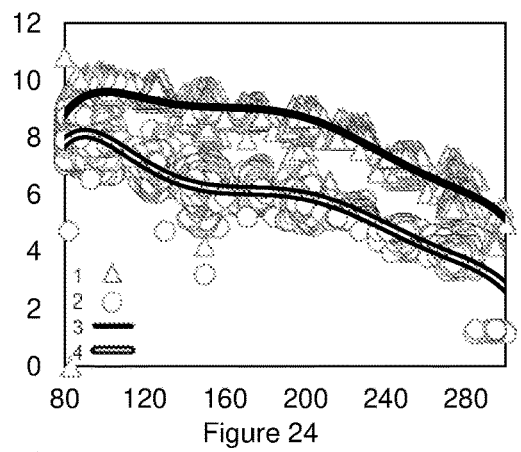
FIG. 24 graphically represent the relationship between the values of $O_2$HHb (Axis Y) of the RF L (1) and RF R (2) and the values of power (Axis X-Watts), in addition to the representation of the Line of Trend of RF L (3) and RF R (4).
Figure 25:
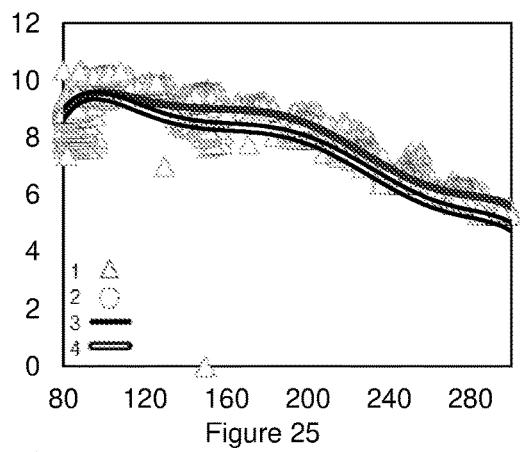
FIG. 25 graphically represent the relationship between the values of $O_2$HHb (Axis Y) of the VL L (1) and VL R (2) and the values of power (Axis X-Watts), in addition to the representation of the Line of Trend of VL L (3) and VL R (4).
Figure 26:
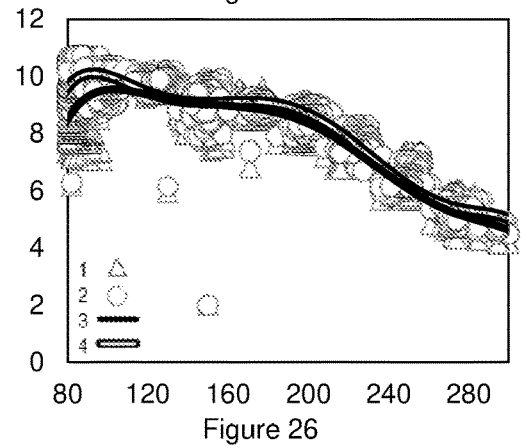
FIG. 26 graphically represent the relationship between the values of $O_2$HHb (Axis Y) of the ST L (1) and ST R (2) and the values of power (Axis X-Watts), in addition to the representation of the Line of Trend of ST L (3) and ST R (4).
Figure 27:
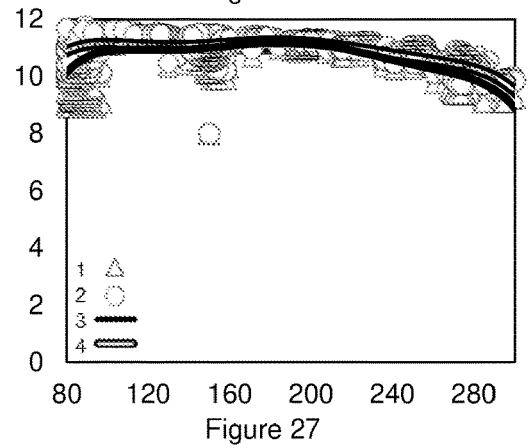
FIG. 27 graphically represent the relationship between the values of $O_2$HHb (Axis Y) of the GM L (1) and GM R (2) and the values of power (Axis X-Watts), in addition to the representation of the Line of Trend of GM L (3) and GM R (4).
Figure 28:
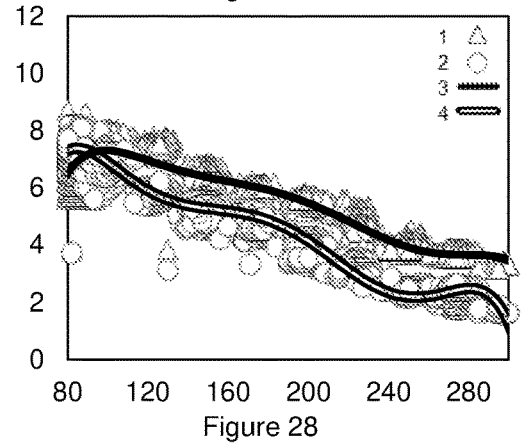
FIG. 28 graphically represent the relationship between the values of $O_2$HHb (Axis Y) of the VI L (1) and VI R (2) and the values of power (Axis X-Watts), in addition to the representation of the Line of Trend of VI L (3) and VI R (4).
Figure 29:
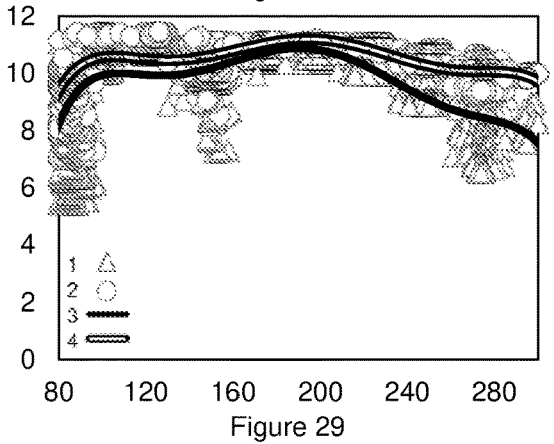
FIG. 29 graphically represent the relationship between the values of $O_2$HHb (Axis Y) of the GA L (1) and GA R (2) and the values of power (Axis X-Watts), in addition to the representation of the Line of Trend of GA L (3) and GA R (4).
Figure 30:
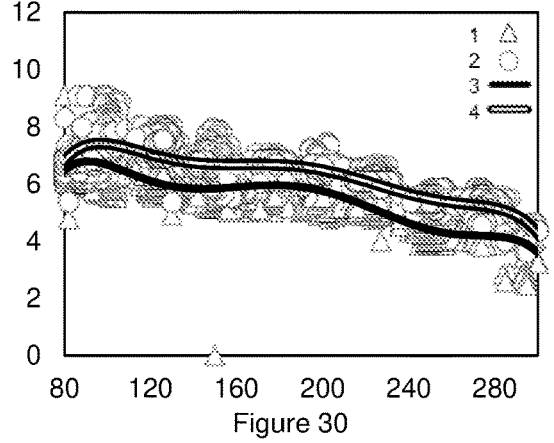
FIG. 30 graphically represent the relationship between the values of $O_2$HHb (Axis Y) of the TA L (1) and TA R (2) and the values of power (Axis X-Watts), in addition to the representation of the Line of Trend of TA L (3) and TA R (4).

| TM | Ecuación de la Línea de Tendencia de $|Y|O_2HHb$ |
|---|---|
| RF L | $|Y| = -3E{-}12x^6 + 3E{-}09x^5 - 2E{-}06x^4 + 0.0004x^3 - 0.0531x^2 + 3.614x - 88.785$ |
| RF R | $|Y| = -3E{-}12x^6 + 4E{-}09x^5 - 2E{-}06x^4 + 0.0005x^3 - 0.0609x^2 + 4.0896x - 99.856$ Represented in FIG. 24 |
| VL L | $|Y| = -3E{-}12x^6 + 4E{-}09x^5 - 2E{-}06x^4 + 0.0004x^3 - 0.0581x^2 + 3.8815x - 94.091$ |
| VL R | $|Y| = -4E{-}12x^6 + 4E{-}09x^5 - 2E{-}06x^4 + 0.0005x^3 - 0.0643x^2 + 4.3291x - 106.51$ Represented in FIG. 25 |
| ST L | $|Y| = -3E{-}12x^6 + 4E{-}09x^5 - 2E{-}06x^4 + 0.0004x^3 - 0.057x^2 + 3.9203x - 98.558$ |
| ST R | $|Y| = -4E{-}12x^6 + 5E{-}09x^5 - 2E{-}06x^4 + 0.0006x^3 - 0.0727x^2 + 4.7863x - 114.86$ Represented in FIG. 26 |
| GM L | $|Y| = -2E{-}12x^6 + 3E{-}09x^5 - 1E{-}06x^4 + 0.0003x^3 - 0.0403x^2 + 2.7221x - 63.193$ |
| GM R | $|Y| = -2E{-}12x^6 + 2E{-}09x^5 - 8E{-}07x^4 + 0.0002x^3 - 0.0248x^2 + 1.6246x - 31.521$ Represented in FIG. 27 |
| VI L | $|Y| = -3E{-}12x^6 + 3E{-}09x^5 - 2E{-}06x^4 + 0.0004x^3 - 0.0532x^2 + 3.6317x - 91.927$ |
| VI R | $|Y| = -6E{-}12x^6 + 7E{-}09x^5 - 3E{-}06x^4 + 0.0007x^3 - 0.0882x^2 + 5.4779x - 126.9$ Represented in FIG. 28 |
| GA L | $|Y| = -5E{-}12x^6 + 6E{-}09x^5 - 3E{-}06x^4 + 0.0007x^3 - 0.0971x^2 + 6.5766x - 169.02$ |
| GA R | $|Y| = -4E{-}12x^6 + 5E{-}09x^5 - 2E{-}06x^4 + 0.0005x^3 - 0.0722x^2 + 4.8761x - 121.62$ Represented in FIG. 29 |
| TA L | $|Y| = -4E{-}12x^6 + 5E{-}09x^5 - 2E{-}06x^4 + 0.0005x^3 - 0.0671x^2 + 4.3533x - 105.03$ |
| TA R | $|Y| = -4E{-}12x^6 + 4E{-}09x^5 - 2E{-}06x^4 + 0.0005x^3 - 0.0597x^2 + 3.9817x - 98.479$ Represented in FIG. 30 |

[(x) represents the analyzed power value; (|Y|) represents the value of $O_2HHb$]

1.7. In Table 6, the Equation of the Trend Line |Y|HHb calculated from the values of HHb of each $TM^M$ can be observed.

TABLE 6

Equation of the Trend Line of |Y|HHb of each $TM^M$

Figure 31:
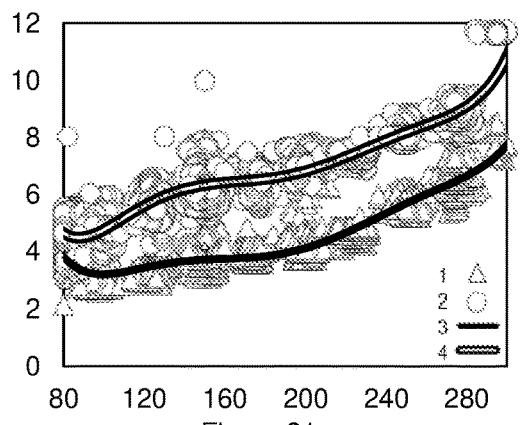
FIG. 31 graphically represent the relationship between the values of HHb (Axis Y) of the RF L (1) and RF R (2) and the values of power (Axis X-Watts), in addition to the representation of the Line of Trend of RF L (3) and RF R (4).
Figure 32:
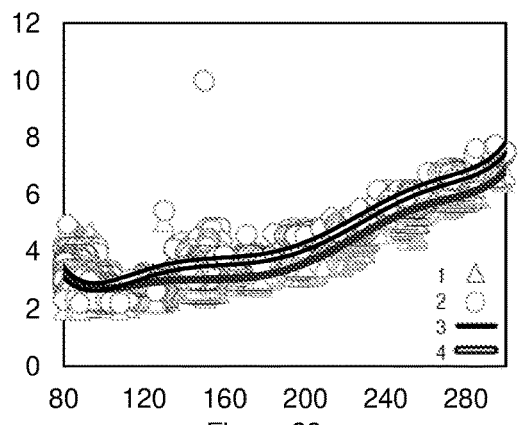
FIG. 32 graphically represent the relationship between the values of HHb (Axis Y) of the VL L (1) and VL R (2) and the values of power (Axis X-Watts), in addition to the representation of the Line of Trend of VL L (3) and VL R (4).
Figure 33:
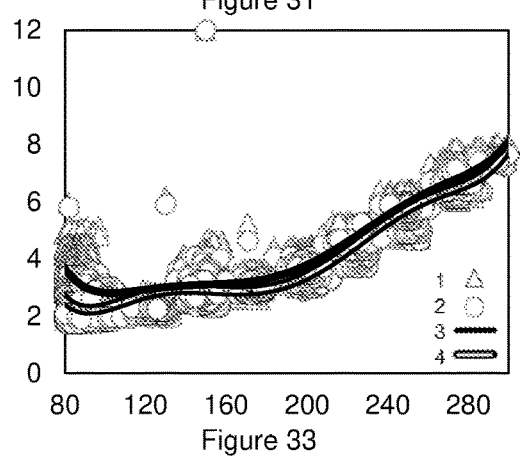
FIG. 33 graphically represent the relationship between the values of HHb (Axis Y) of the ST L (1) and ST R (2) and the values of power (Axis X-Watts), in addition to the representation of the Line of Trend of ST L (3) and ST R (4).
Figure 34:
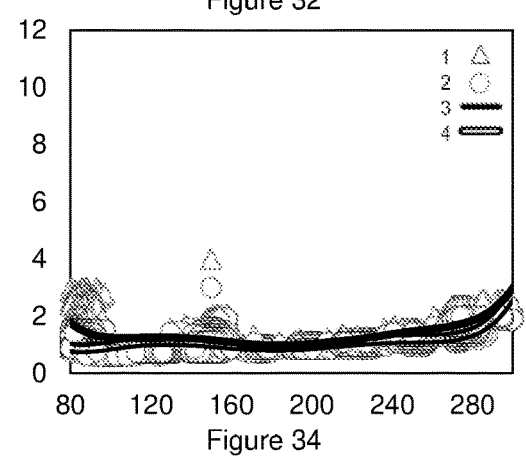
FIG. 34 graphically represent the relationship between the values of HHb (Axis Y) of the GM L (1) and GM R (2) and the values of power (Axis X-Watts), in addition to the representation of the Line of Trend of GM L (3) and GM R (4).
Figure 35:
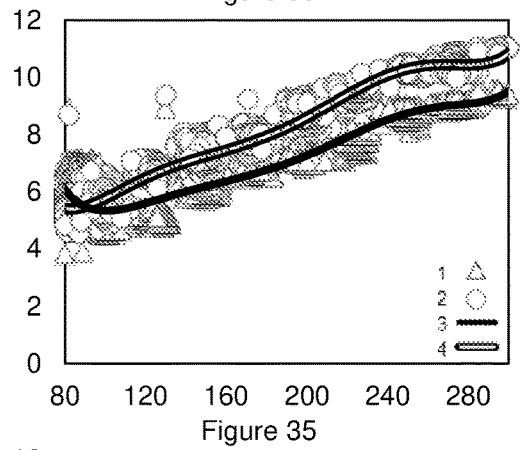
FIG. 35 graphically represent the relationship between the values of HHb (Axis Y) of the VI L (1) and VI R (2) and the values of power (Axis X-Watts), in addition to the representation of the Line of Trend of VI L (3) and VI R (4).
Figure 36:
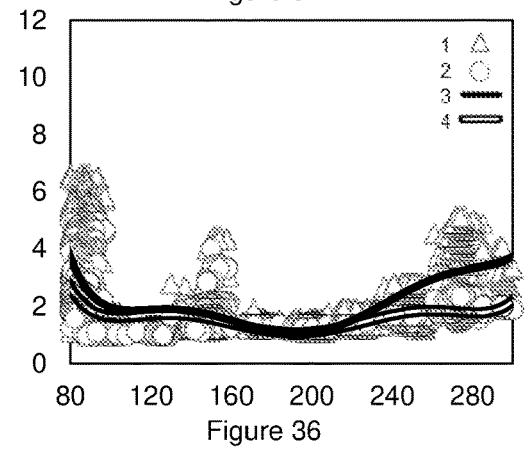
FIG. 36 graphically represent the relationship between the values of HHb (Axis Y) of the GA L (1) and GA R (2) and the values of power (Axis X-Watts), in addition to the representation of the Line of Trend of GA L (3) and GA R (4).
Figure 37:
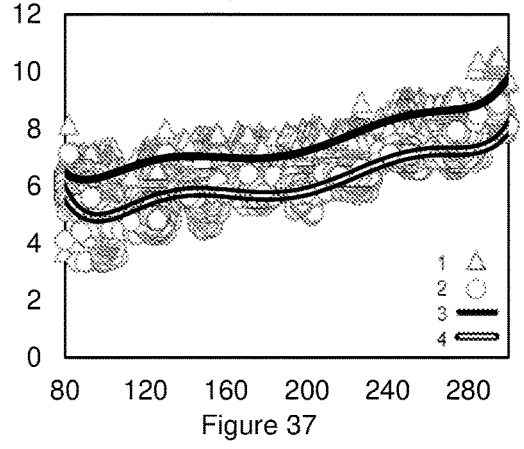
FIG. 37 graphically represent the relationship between the values of HHb (Axis Y) of the TA L (1) and TA R (2) and the values of power (Axis X-Watts), in addition to the representation of the Line of Trend of TA L (3) and TA R (4).

| TM | Ecuación de la Línea de Tendencia de |Y|HHb |
|---|---|
| RF L | $|Y| = 3E{-}12x^6 - 3E{-}09x^5 + 1E{-}06x^4 - 0.0004x^3 + 0.047x^2 - 3.1681x + 88.604$ |
| RF R | $|Y| = 4E{-}12x^6 - 4E{-}09x^5 + 2E{-}06x^4 - 0.0005x^3 + 0.0606x^2 - 3.9358x + 105.27$ |
| | Represented in FIG. 31 |
| VL L | $|Y| = 3E{-}12x^6 - 4E{-}09x^5 + 2E{-}06x^4 - 0.0004x^3 + 0.0531x^2 - 3.4848x + 94.389$ |
| VL R | $|Y| = 4E{-}12x^6 - 4E{-}09x^5 + 2E{-}06x^4 - 0.0005x^3 + 0.0598x^2 - 3.9644x + 107.4$ |
| | Represented in FIG. 32 |
| ST L | $|Y| = 3E{-}12x^6 - 4E{-}09x^5 + 2E{-}06x^4 - 0.0004x^3 + 0.0554x^2 - 3.6991x + 102.2$ |
| ST R | $|Y| = 5E{-}12x^6 - 5E{-}09x^5 + 2E{-}06x^4 - 0.0006x^3 + 0.071x^2 - 4.5624x + 118.74$ |
| | Represented in FIG. 33 |
| GM L | $|Y| = 2E{-}12x^6 - 3E{-}09x^5 + 1E{-}06x^4 - 0.0003x^3 + 0.036x^2 - 2.3767x + 64.476$ |
| GM R | $|Y| = 2E{-}12x^6 - 2E{-}09x^5 + 1E{-}06x^4 - 0.0002x^3 + 0.0262x^2 - 1.5959x + 39.38$ |
| | Represented in FIG. 34 |
| VI L | $|Y| = 3E{-}12x^6 - 3E{-}09x^5 + 1E{-}06x^4 - 0.0003x^3 + 0.0444x^2 - 3.0416x + 88.905$ |
| VI R | $|Y| = 3E{-}12x^6 - 3E{-}09x^5 + 1E{-}06x^4 - 0.0003x^3 + 0.0409x^2 - 2.562x + 68.472$ |
| | Represented in FIG. 35 |
| GA L | $|Y| = 4E{-}12x^6 - 5E{-}09x^5 + 2E{-}06x^4 - 0.0006x^3 + 0.0829x^2 - 5.7024x + 159.68$ |
| GA R | $|Y| = 4E{-}12x^6 - 5E{-}09x5 + 2E{-}06x^4 - 0.0005x^3 + 0.067x^2 - 4.4753x + 121.62$ |
| | Represented in FIG. 36 |
| TA L | $|Y| = 4E{-}12x^6 - 5E{-}09x^5 + 2E{-}06x^4 - 0.0005x^3 + 0.0606x^2 - 3.8733x + 104.39$ |
| TA R | $|Y| = 5E{-}12x^6 - 6E{-}09x^5 + 3E{-}06x^4 - 0.0007x^3 + 0.0885x^2 - 5.8788x + 160.53$ |
| | Represented in FIG. 37 |

[(x) represents the analyzed power value; (|Y|) represents the value of HHb]

1.8. In Table 7, the Equation of the Trend Line $|Y|O_2HHb$ calculated from the values of $\Phi O_2HHb$ of each $TM^M$ can be observed.

TABLE 7

Equation of the Trend Line of $|Y|\phi O_2HHb$ of each $TM^M$

Figure 38:
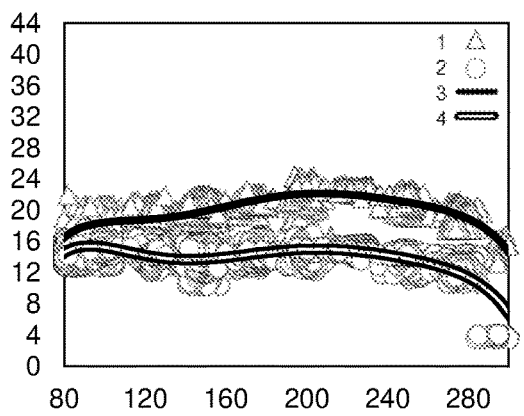
FIG. 38 graphically represent the relationship between the values of $\Phi O_2$HHb (Axis Y) of the RF L (1) and RF R (2) and the values of power (Axis X-Watts), in addition to the representation of the Line of Trend of RF L (3) and RF R (4).
Figure 39:
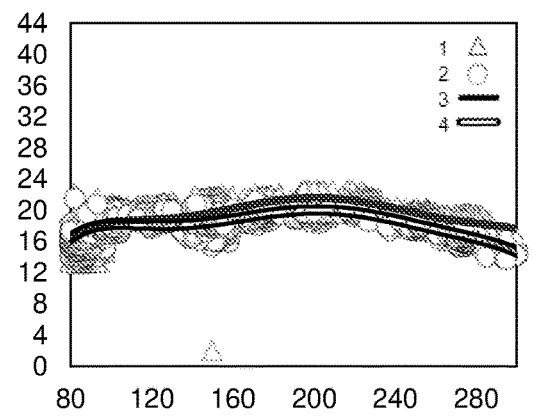
FIG. 39 graphically represent the relationship between the values of $\Phi O_2$HHb (Axis Y) of the VL L (1) and VL R (2) and the values of power (Axis X-Watts), in addition to the representation of the Line of Trend of VL L (3) and VL R (4).
Figure 40:
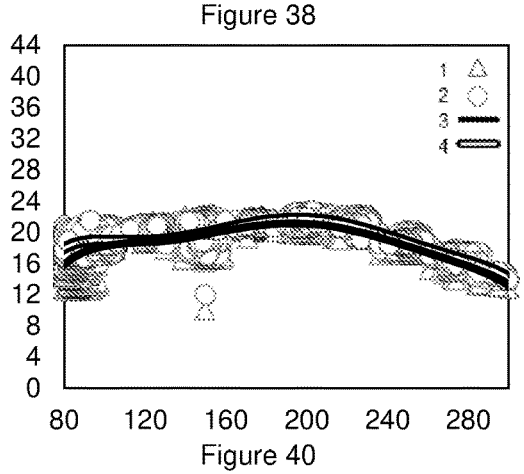
FIG. 40 graphically represent the relationship between the values of $\Phi O_2$HHb (Axis Y) of the ST L (1) and ST R (2) and the values of power (Axis X-Watts), in addition to the representation of the Line of Trend of ST L (3) and ST R (4).
Figure 41:
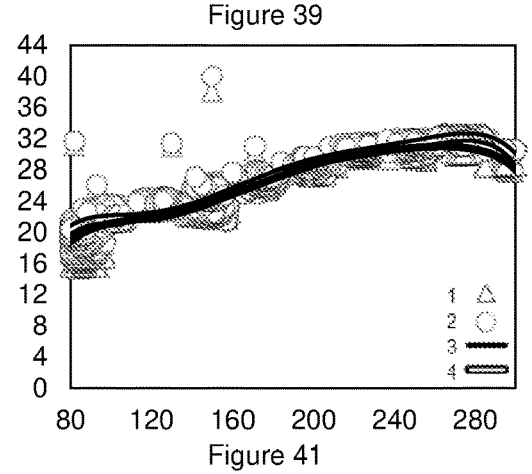
FIG. 41 graphically represent the relationship between the values of $\Phi O_2$HHb (Axis Y) of the GM L (1) and GM R (2) and the values of power (Axis X-Watts), in addition to the representation of the Line of Trend of GM L (3) and GM R (4).
Figure 42:
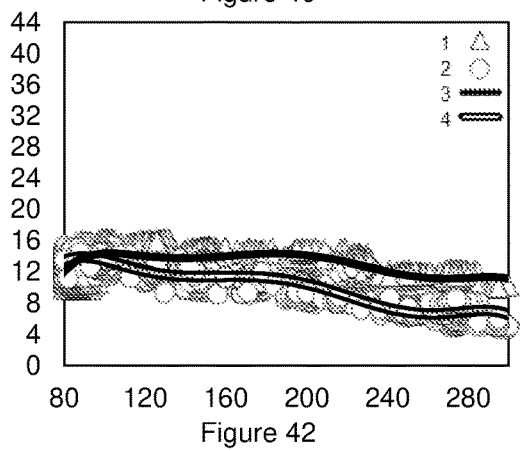
FIG. 42 graphically represent the relationship between the values of $\Phi O_2$HHb (Axis Y) of the VI L (1) and VI R (2) and the values of power (Axis X-Watts), in addition to the representation of the Line of Trend of VI L (3) and VI R (4).
Figure 43:
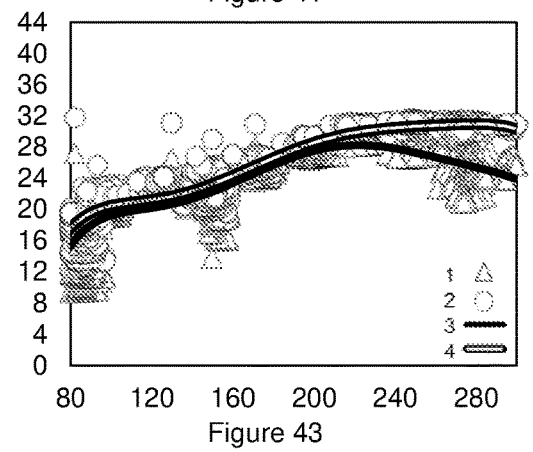
FIG. 43 graphically represent the relationship between the values of $\Phi O_2$HHb (Axis Y) of the GA L (1) and GA R (2) and the values of power (Axis X-Watts), in addition to the representation of the Line of Trend of GA L (3) and GA R (4).
Figure 44:
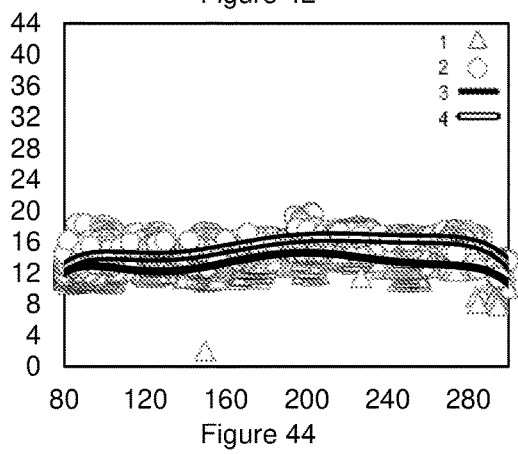
FIG. 44 graphically represent the relationship between the values of $\Phi O_2$HHb (Axis Y) of the TA L (1) and TA R (2) and the values of power (Axis X-Watts), in addition to the representation of the Line of Trend of TA L (3) and TA R (4).

| TM | Ecuación de la Línea de Tendencia de $|Y|\phi O_2HHb$ |
|---|---|
| RF L | $|Y| = -7E{-}12x^6 + 8E{-}09x^5 - 4E{-}06x^4 + 0.0009x^3 - 0.1144x^2 + 7.5826x - 184.2$ |
| RF R | $|Y| = -7E{-}12x^6 + 8E{-}09x^5 - 4E{-}06x^4 + 0.0009x^3 - 0.1242x^2 + 8.2442x - 201.37$ |
| | Represented in FIG. 38 |
| VL L | $|Y| = -6E{-}12x^6 + 7E{-}09x^5 - 3E{-}06x^4 + 0.0008x^3 - 0.1051x^2 + 7.1225x - 175.33$ |
| VL R | $|Y| = -5E{-}12x^6 + 7E{-}09x^5 - 3E{-}06x^4 + 0.0008x^3 - 0.1047x^2 + 7.14x - 176.47$ |
| | Represented in FIG. 39 |
| ST L | $|Y| = -6E{-}12x^6 + 7E{-}09x^5 - 3E{-}06x^4 + 0.0008x^3 - 0.1026x^2 + 6.98x - 173.68$ |
| ST R | $|Y| = -6E{-}12x^6 + 7E{-}09x^5 - 3E{-}06x^4 + 0.0008x^3 - 0.1069x^2 + 6.972x - 162.39$ |
| | Represented in FIG. 40 |
| GM L | $|Y| = -6E{-}12x^6 + 7E{-}09x^5 - 3E{-}06x^4 + 0.0008x^3 - 0.1023x^2 + 6.8896x - 166.47$ |
| GM R | $|Y| = -9E{-}12x^6 + 1E{-}08x^5 - 5E{-}06x^4 + 0.0011x^3 - 0.1328x^2 + 8.5201x - 197.46$ |
| | Represented in FIG. 41 |
| VI L | $|Y| = -8E{-}12x^6 + 9E{-}09x^5 - 4E{-}06x^4 + 0.0011x^3 - 0.1435x^2 + 9.7141x - 249.13$ |
| VI R | $|Y| = -1E{-}11x^6 + 1E{-}08x^5 - 5E{-}06x^4 + 0.0012x^3 - 0.1488x^2 + 9.5092x - 226.58$ |
| | Represented in FIG. 42 |
| GAL | $|Y| = -7E{-}12x^6 + 8E{-}09x^5 - 4E{-}06x^4 + 0.0011x^3 - 0.1459x^2 + 10.178x - 266.64$ |
| GA R | $|Y| = -6E{-}12x^6 + 8E{-}09x^5 - 4E{-}06x^4 + 0.0009x^3 - 0.1248x^2 + 8.551x - 215.44$ |
| | Represented in FIG. 43 |
| TA L | $|Y| = -9E{-}12x^6 + 1E{-}08x^5 - 5E{-}06x^4 + 0.0011x^3 - 0.1373x^2 + 8.8469x - 213.73$ |
| TA R | $|Y| = -8E{-}12x^6 + 9E{-}09x^5 - 4E{-}06x^4 + 0.001x^3 - 0.1229x^2 + 8.1145x - 200.43$ |
| | Represented in FIG. 44 |

[(x) represents the analyzed power value; (|Y|) represents the value of $\phi O_2HHb$]

1.9. In Table 8, the Equation of the Trend Line $|Y|\Phi HHb$ calculated from the values of $\Phi HHb$ of each $TM^M$ can be observed.

TABLE 8

Equation of the Trend Line of $|Y|\phi HHb$ of each $TM^M$

Figure 45:
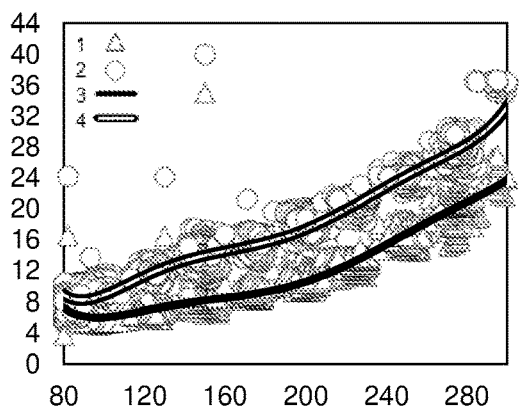
FIG. 45 graphically represent the relationship between the values of PHHb (Axis Y) of the RF L (1) and RF R (2) and the values of power (Axis X-Watts), in addition to the representation of the Line of Trend of RF L (3) and RF R (4).
Figure 46:
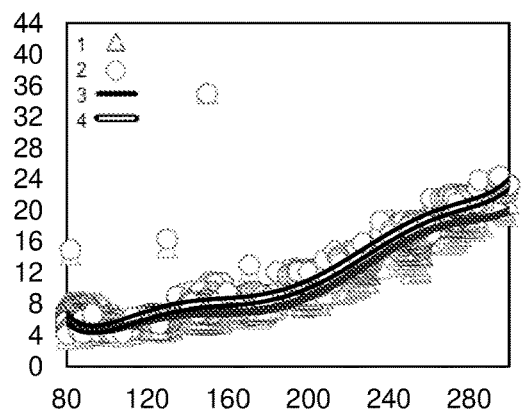
FIG. 46 graphically represent the relationship between the values of PHHb (Axis Y) of the VL L (1) and VL R (2) and the values of power (Axis X-Watts), in addition to the representation of the Line of Trend of VL L (3) and VL R (4).
Figure 47:
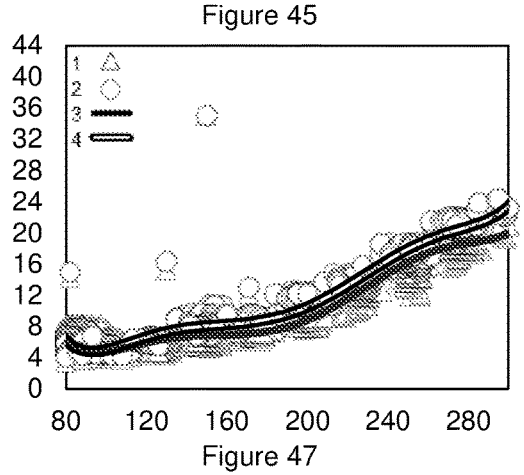
FIG. 47 graphically represent the relationship between the values of ΦHHb (Axis Y) of the ST L (1) and ST R (2) and the values of power (Axis X-Watts), in addition to the representation of the Line of Trend of ST L (3) and ST R (4).
Figure 48:
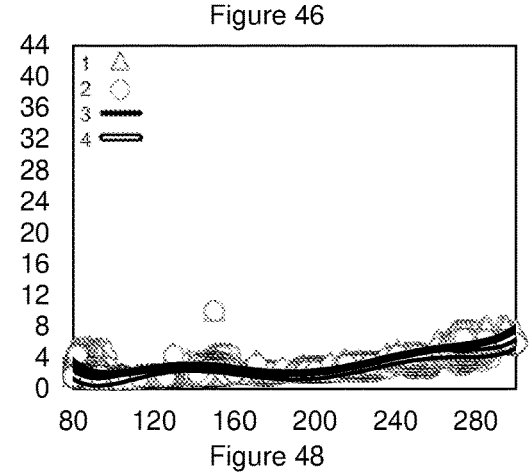
FIG. 48 graphically represent the relationship between the values of PHHb (Axis Y) of the GM L (1) and GM R (2) and the values of power (Axis X-Watts), in addition to the representation of the Line of Trend of GM L (3) and GM R (4).
Figure 49:
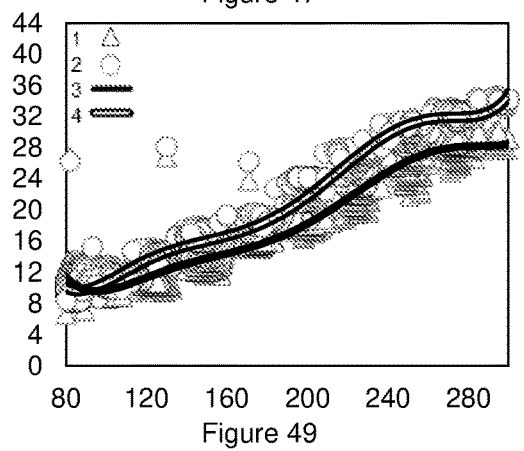
FIG. 49 graphically represent the relationship between the values of ΦHHb (Axis Y) of the VI L (1) and VI R (2) and the values of power (Axis X-Watts), in addition to the representation of the Line of Trend of VI L (3) and VI R (4).
Figure 50:
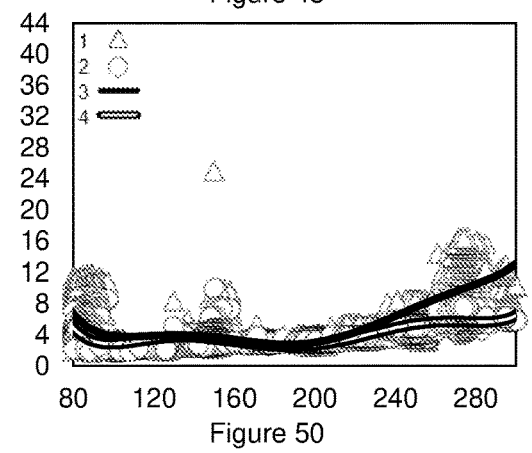
FIG. 50 graphically represent the relationship between the values of PHHb (Axis Y) of the GA L (1) and GA R (2) and the values of power (Axis X-Watts), in addition to the representation of the Line of Trend of GA L (3) and GA R (4).
Figure 51:
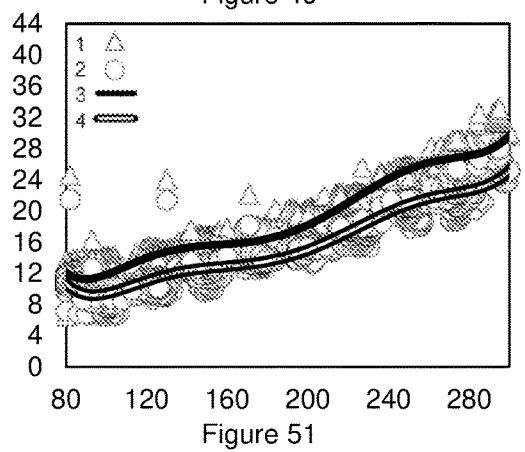
FIG. 51 graphically represent the relationship between the values of PHHb (Axis Y) of the TA L (1) and TA R (2) and the values of power (Axis X-Watts), in addition to the representation of the Line of Trend of TA L (3) and TA R (4).
Figure 52:
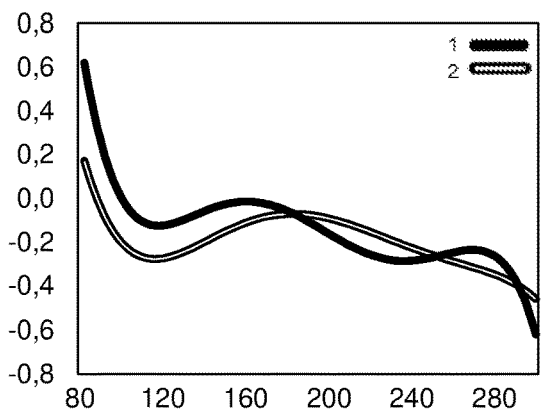
FIG. 52 graphically represent the relationship between the values of the slope $\overrightarrow{(p)}$ |Y|SmO$_2$% (Axis Y) of the RF L (1) and RF R (2), and the values of power (Axis X-Watts).
Figure 53:
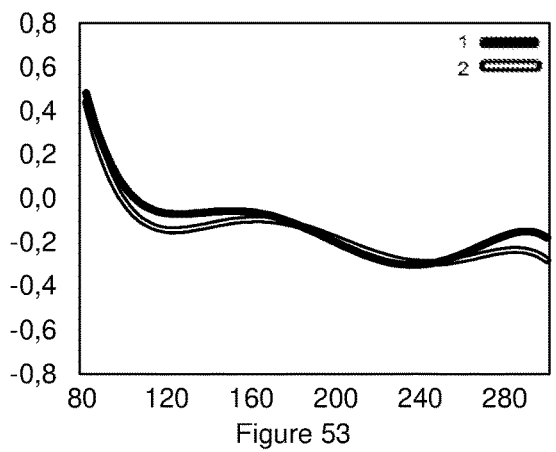
FIG. 53 graphically represent the relationship between the values of the slope $\overrightarrow{(p)}$ |Y|SmO$_2$% (Axis Y) of the VL L (1) and VL R (2), and the values of power (Axis X-Watts).
Figure 54:
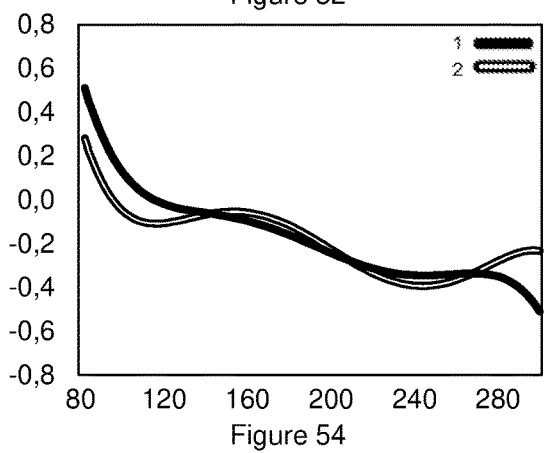
FIG. 54 graphically represent the relationship between the values of the slope $\overrightarrow{(p)}$ |Y|SmO$_2$% (Axis Y) of the ST L (1) and ST R (2), and the values of power (Axis X-Watts).
Figure 55:
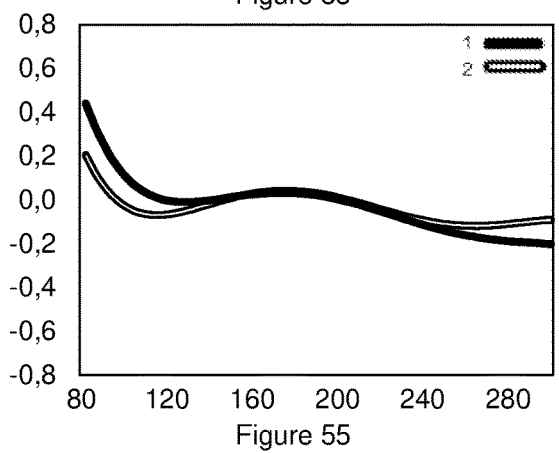
FIG. 55 graphically represent the relationship between the values of the slope $\overrightarrow{(p)}$ |Y|SmO$_2$% (Axis Y) of the GM L (1) and GM R (2), and the values of power (Axis X-Watts).
Figure 56:
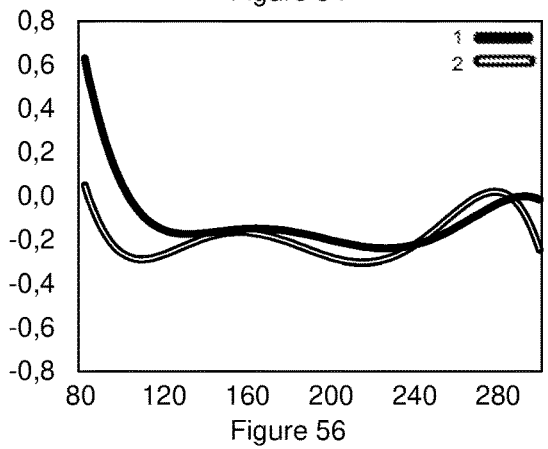
FIG. 56 graphically represent the relationship between the values of the slope $\overrightarrow{(p)}$ |Y|SmO$_2$% (Axis Y) of the VI L (1) and VI R (2), and the values of power (Axis X-Watts).
Figure 57:
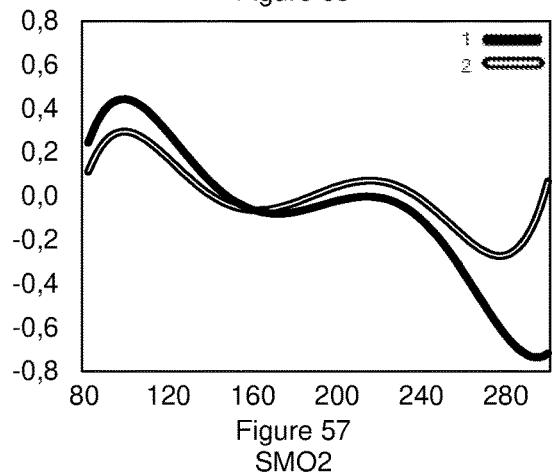
FIG. 57 graphically represent the relationship between the values of the slope $\overrightarrow{(p)}$ |Y|SmO$_2$% (Axis Y) of the GA L (1) and GA R (2), and the values of power (Axis X-Watts).

| TM | | Ecuación de la Línea de Tendencia de $|Y|\phi HHb$ |
|---|---|---|
| RF L | $|Y| =$ | $5E{-}12x^6 - 6E{-}09x^5 + 3E{-}06x^4 - 0.0008x^3 + 0.1026x^2 - 6.9946x + 195.71$ |
| RF R | $|Y| =$ | $1E{-}11x^6 - 1E{-}08x^5 + 5E{-}06x^4 - 0.0013x^3 + 0.1693x^2 - 11.132x + 297.01$ |
| | | Represented in FIG. 45 |
| VL L | $|Y| =$ | $1E{-}11x^6 - 1E{-}08x^5 + 6E{-}06x^4 - 0.0015x^3 + 0.1952x^2 - 12.865x + 342.15$ |
| VL R | $|Y| =$ | $1E{-}11x^6 - 1E{-}08x^5 + 7E{-}06x^4 - 0.0016x^3 + 0.201x^2 - 13.201x + 349.47$ |
| | | Represented in FIG. 46 |
| ST L | $|Y| =$ | $1E{-}11x^6 - 1E{-}08x^5 + 6E{-}06x^4 - 0.0015x^3 + 0.1898x^2 - 12.574x + 337.53$ |
| ST R | $|Y| =$ | $1E{-}11x^6 - 1E{-}08x^5 + 7E{-}06x^4 - 0.0016x^3 + 0.2103x^2 - 13.737x + 359.59$ |
| | | Represented in FIG. 47 |
| GM L | $|Y| =$ | $9E{-}12x^6 - 1E{-}08x^5 + 5E{-}06x^4 - 0.0011x^3 + 0.1484x^2 - 9.8392x + 262.16$ |
| GM R | $|Y| =$ | $1E{-}11x^6 - 1E{-}08x^5 + 5E{-}06x^4 - 0.0013x^3 + 0.1661x^2 - 10.856x + 282.1$ |
| | | Represented in FIG. 48 |
| VI L | $|Y| =$ | $1E{-}11x^6 - 1E{-}08x^5 + 6E{-}06x^4 - 0.0014x^3 + 0.1864x^2 - 12.48x + 342.46$ |
| VI R | $|Y| =$ | $2E{-}11x^6 - 2E{-}08x^5 + 8E{-}06x^4 - 0.0019x^3 + 0.2317x^2 - 14.531x + 369.98$ |
| | | Represented in FIG. 49 |
| GA L | $|Y| =$ | $9E{-}12x^6 - 1E{-}08x^5 + 5E{-}06x^4 - 0.0012x^3 + 0.1601x^2 - 10.892x + 301.26$ |
| GA R | $|Y| =$ | $9E{-}12x^6 - 1E{-}08x^5 + 5E{-}06x^4 - 0.0012x^3 + 0.1601x^2 - 10.892x + 301.26$ |
| | | Represented in FIG. 50 |
| TA L | $|Y| =$ | $1E{-}11x^6 - 2E{-}08x^5 + 8E{-}06x^4 - 0.0018x^3 + 0.2256x^2 - 14.502x + 380.63$ |
| TA R | $|Y| =$ | $1E{-}11x^6 - 1E{-}08x^5 + 7E{-}06x^4 - 0.0016x^3 + 0.2007x^2 - 13.228x + 355.97$ |
| | | Represented in FIG. 51 |

[(x) represents the analyzed power value; (|Y|) represents the value of $\phi HHb$]

1.10. In Table 9, Table 10 and Table 11, the calculated values of $|Y|SmO_2{}^\%$ of each $TM^M$, at each intensity can be observed.

TABLE 9

Trend Line Values $|Y|SmO_2{}^\%$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|ZonaOp\| | Lim Inf \|ZonaOp\| |
|---|---|---|---|---|---|---|---|---|---|---|---|---|---|---|---|---|
| 136 | 72 | 53 | 76 | 72 | 76 | 77 | 90 | 91 | 53 | 45 | 88 | 89 | 46 | 55 | 82 | 66 |
| 138 | 71 | 52 | 76 | 72 | 76 | 77 | 90 | 91 | 53 | 44 | 88 | 89 | 46 | 55 | 82 | 65 |
| 140 | 71 | 52 | 76 | 72 | 76 | 77 | 90 | 91 | 53 | 44 | 88 | 89 | 46 | 55 | 82 | 65 |
| 142 | 71 | 51 | 76 | 71 | 76 | 77 | 90 | 91 | 52 | 44 | 88 | 89 | 46 | 55 | 82 | 65 |
| 144 | 71 | 51 | 75 | 71 | 75 | 76 | 90 | 91 | 52 | 43 | 88 | 89 | 46 | 55 | 82 | 65 |
| 146 | 71 | 51 | 75 | 71 | 75 | 76 | 90 | 91 | 52 | 43 | 88 | 89 | 46 | 54 | 82 | 64 |
| 148 | 71 | 50 | 75 | 71 | 75 | 76 | 90 | 91 | 51 | 43 | 88 | 89 | 46 | 54 | 82 | 64 |
| 150 | 71 | 50 | 75 | 70 | 75 | 76 | 90 | 91 | 51 | 42 | 88 | 89 | 46 | 54 | 82 | 64 |
| 152 | 71 | 50 | 75 | 70 | 75 | 76 | 90 | 91 | 51 | 42 | 88 | 89 | 46 | 54 | 82 | 64 |
| 154 | 71 | 50 | 75 | 70 | 75 | 76 | 91 | 91 | 50 | 42 | 88 | 89 | 46 | 54 | 82 | 64 |
| 156 | 71 | 49 | 75 | 70 | 75 | 76 | 91 | 91 | 50 | 41 | 88 | 89 | 46 | 54 | 82 | 64 |
| 158 | 71 | 49 | 75 | 70 | 74 | 76 | 91 | 91 | 50 | 41 | 88 | 88 | 46 | 54 | 81 | 64 |
| 160 | 71 | 49 | 74 | 69 | 74 | 76 | 91 | 91 | 49 | 41 | 88 | 88 | 46 | 53 | 81 | 63 |
| 162 | 71 | 49 | 74 | 69 | 74 | 75 | 91 | 91 | 49 | 40 | 88 | 88 | 46 | 53 | 81 | 63 |
| 164 | 71 | 48 | 74 | 69 | 74 | 75 | 91 | 91 | 49 | 40 | 88 | 88 | 46 | 53 | 81 | 63 |
| 166 | 71 | 48 | 74 | 69 | 74 | 75 | 91 | 91 | 48 | 40 | 87 | 88 | 46 | 53 | 81 | 63 |
| 168 | 71 | 48 | 74 | 69 | 73 | 75 | 91 | 92 | 48 | 39 | 87 | 88 | 46 | 53 | 81 | 63 |
| 170 | 71 | 48 | 74 | 68 | 73 | 75 | 91 | 92 | 48 | 39 | 87 | 88 | 46 | 53 | 81 | 63 |
| 172 | 70 | 48 | 74 | 68 | 73 | 75 | 91 | 92 | 48 | 39 | 87 | 88 | 46 | 53 | 81 | 62 |
| 174 | 70 | 48 | 73 | 68 | 72 | 75 | 91 | 92 | 47 | 38 | 87 | 87 | 46 | 53 | 81 | 62 |
| 176 | 70 | 47 | 73 | 68 | 72 | 74 | 91 | 92 | 47 | 38 | 87 | 87 | 46 | 53 | 80 | 62 |
| 178 | 70 | 47 | 73 | 68 | 72 | 74 | 91 | 92 | 47 | 37 | 86 | 87 | 46 | 53 | 80 | 62 |
| 180 | 70 | 47 | 73 | 67 | 72 | 74 | 91 | 92 | 46 | 37 | 86 | 87 | 46 | 53 | 80 | 62 |
| 182 | 70 | 47 | 73 | 67 | 71 | 74 | 91 | 92 | 46 | 36 | 86 | 87 | 46 | 53 | 80 | 61 |
| 184 | 70 | 47 | 72 | 67 | 71 | 73 | 91 | 92 | 46 | 36 | 86 | 87 | 46 | 53 | 80 | 61 |
| 186 | 70 | 47 | 72 | 67 | 71 | 73 | 91 | 92 | 45 | 36 | 86 | 87 | 45 | 53 | 80 | 61 |
| 188 | 69 | 47 | 72 | 66 | 70 | 73 | 92 | 92 | 45 | 35 | 86 | 87 | 45 | 52 | 79 | 60 |
| 190 | 69 | 46 | 71 | 66 | 70 | 72 | 92 | 92 | 45 | 35 | 86 | 87 | 45 | 52 | 79 | 60 |
| 192 | 69 | 46 | 71 | 66 | 69 | 72 | 92 | 92 | 44 | 34 | 86 | 87 | 45 | 52 | 79 | 60 |
| 194 | 69 | 46 | 71 | 65 | 69 | 72 | 92 | 92 | 44 | 34 | 85 | 87 | 45 | 52 | 78 | 59 |
| 196 | 69 | 46 | 70 | 65 | 68 | 71 | 92 | 93 | 43 | 33 | 85 | 87 | 44 | 52 | 78 | 59 |
| 198 | 68 | 46 | 70 | 65 | 68 | 71 | 92 | 93 | 43 | 32 | 85 | 87 | 44 | 52 | 78 | 58 |
| 200 | 68 | 46 | 70 | 64 | 67 | 70 | 92 | 93 | 43 | 32 | 85 | 87 | 44 | 52 | 78 | 58 |
| Min | 68 | 46 | 70 | 64 | 67 | 70 | 90 | 91 | 43 | 32 | 85 | 87 | 44 | 52 | 78 | 58 |

TABLE 9-continued

Trend Line Values $|Y|SmO_2^{\%}$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|ZonaOp\| | Lim Inf \|ZonaOp\| |
|---|---|---|---|---|---|---|---|---|---|---|---|---|---|---|---|---|
| Max | 72 | 53 | 76 | 72 | 76 | 77 | 92 | 93 | 53 | 45 | 88 | 89 | 46 | 55 | 82 | 66 |
| σ | 0.9 | 2.0 | 1.8 | 2.2 | 2.5 | 1.9 | 0.5 | 0.6 | 3.1 | 3.8 | 1.1 | 0.8 | 0.5 | 0.9 | 1.4 | 2.1 |
| $\overline{Y}$ | 70 | 48 | 73 | 68 | 73 | 75 | 91 | 92 | 48 | 39 | 87 | 88 | 45 | 53 | 81 | 62 |
| $\tilde{Y}$ | 71 | 48 | 74 | 69 | 73 | 75 | 91 | 92 | 48 | 39 | 87 | 88 | 46 | 53 | 81 | 63 |

[(Min) Minimum value; (Max) Maximum value; (σ) standard deviation value; ($\overline{Y}$) average value; ($\tilde{Y}$) median value]

TABLE 10

Trend Line Values $|Y|SmO_2^{\%}$ between $U_{Ae}$ and $U_{ANA}$.

| Watts | RFL | RFR | VLL | VLR | STL | STR | GML | GMR | VIL | VIR | GAL | GAR | TAL | TAR | Lim Sup \|ZonaOp\| | Lim Inf \|ZonaOp\| |
|---|---|---|---|---|---|---|---|---|---|---|---|---|---|---|---|---|
| 202 | 68 | 45 | 69 | 64 | 67 | 70 | 92 | 93 | 42 | 31 | 85 | 87 | 44 | 52 | 77 | 57 |
| 204 | 67 | 45 | 69 | 64 | 66 | 69 | 92 | 93 | 42 | 31 | 85 | 88 | 43 | 51 | 77 | 57 |
| 206 | 67 | 45 | 68 | 63 | 66 | 69 | 92 | 93 | 41 | 30 | 85 | 88 | 43 | 51 | 76 | 56 |
| 208 | 66 | 45 | 68 | 63 | 65 | 68 | 92 | 93 | 41 | 29 | 85 | 88 | 43 | 51 | 76 | 56 |
| 210 | 66 | 45 | 67 | 62 | 65 | 68 | 92 | 93 | 40 | 29 | 85 | 88 | 42 | 51 | 76 | 55 |
| 212 | 65 | 44 | 67 | 62 | 64 | 67 | 92 | 93 | 40 | 28 | 85 | 88 | 42 | 51 | 75 | 55 |
| 214 | 65 | 44 | 66 | 61 | 64 | 67 | 91 | 92 | 40 | 28 | 85 | 88 | 42 | 50 | 75 | 54 |
| 216 | 65 | 44 | 66 | 61 | 63 | 66 | 91 | 92 | 39 | 27 | 85 | 88 | 41 | 50 | 74 | 53 |
| 218 | 64 | 43 | 65 | 60 | 62 | 65 | 91 | 92 | 39 | 26 | 85 | 89 | 41 | 50 | 74 | 53 |
| 220 | 64 | 43 | 65 | 60 | 62 | 65 | 91 | 92 | 38 | 26 | 85 | 89 | 40 | 50 | 73 | 52 |
| 222 | 63 | 43 | 64 | 59 | 61 | 64 | 91 | 92 | 38 | 25 | 85 | 89 | 40 | 49 | 73 | 51 |
| 224 | 62 | 42 | 64 | 59 | 61 | 63 | 91 | 92 | 37 | 25 | 85 | 89 | 39 | 49 | 72 | 51 |
| 226 | 62 | 42 | 63 | 58 | 60 | 63 | 91 | 92 | 37 | 24 | 85 | 89 | 39 | 49 | 72 | 50 |
| 228 | 61 | 42 | 62 | 58 | 59 | 62 | 91 | 92 | 36 | 24 | 85 | 89 | 39 | 48 | 71 | 49 |
| 230 | 61 | 41 | 62 | 57 | 59 | 61 | 90 | 92 | 36 | 23 | 85 | 89 | 38 | 48 | 71 | 49 |
| 232 | 60 | 41 | 61 | 57 | 58 | 60 | 90 | 92 | 35 | 22 | 85 | 89 | 38 | 48 | 70 | 48 |
| 234 | 60 | 41 | 61 | 56 | 57 | 60 | 90 | 91 | 35 | 22 | 85 | 89 | 37 | 47 | 70 | 47 |
| 236 | 59 | 40 | 60 | 55 | 56 | 59 | 90 | 91 | 34 | 21 | 85 | 89 | 37 | 47 | 69 | 46 |
| 238 | 59 | 40 | 59 | 55 | 56 | 58 | 90 | 91 | 34 | 21 | 84 | 89 | 37 | 47 | 68 | 46 |
| 240 | 58 | 39 | 59 | 54 | 55 | 57 | 89 | 91 | 33 | 20 | 84 | 89 | 36 | 46 | 68 | 45 |
| 242 | 57 | 39 | 58 | 54 | 54 | 56 | 89 | 91 | 33 | 20 | 84 | 89 | 36 | 46 | 67 | 44 |
| 244 | 57 | 38 | 58 | 53 | 54 | 56 | 89 | 90 | 33 | 20 | 84 | 89 | 35 | 46 | 66 | 43 |
| 246 | 56 | 38 | 57 | 53 | 53 | 55 | 89 | 90 | 32 | 19 | 83 | 89 | 35 | 45 | 65 | 42 |
| 248 | 56 | 37 | 56 | 52 | 52 | 54 | 88 | 90 | 32 | 19 | 83 | 89 | 35 | 45 | 65 | 42 |
| 250 | 55 | 37 | 56 | 51 | 52 | 53 | 88 | 90 | 31 | 19 | 82 | 89 | 35 | 45 | 64 | 41 |
| Min | 55 | 37 | 56 | 51 | 52 | 53 | 88 | 90 | 31 | 19 | 82 | 87 | 35 | 45 | 64 | 41 |
| Max | 68 | 45 | 69 | 64 | 67 | 70 | 92 | 93 | 42 | 31 | 85 | 89 | 44 | 52 | 77 | 57 |
| σ | 3.9 | 2.6 | 4.2 | 3.9 | 4.8 | 5.2 | 1.1 | 0.9 | 3.4 | 4.0 | 0.8 | 0.6 | 2.9 | 2.2 | 4.0 | 5.1 |
| $\overline{Y}$ | 62 | 42 | 63 | 58 | 60 | 62 | 90 | 92 | 37 | 24 | 85 | 89 | 39 | 49 | 71 | 50 |
| $\tilde{Y}$ | 62 | 42 | 63 | 58 | 60 | 63 | 91 | 92 | 37 | 24 | 85 | 89 | 39 | 49 | 72 | 50 |

[(Min) Minimum value; (Max) Maximum value; (σ) standard deviation value; ($\overline{Y}$) average value; ($\tilde{Y}$) median value]

TABLE 11

Trend Line Values $|Y|SmO_2^{\%} \geq U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 252 | 55 | 36 | 55 | 51 | 51 | 53 | 88 | 90 | 31 | 18 | 82 | 88 | 34 | 44 | 63 | 40 |
| 254 | 54 | 36 | 55 | 50 | 50 | 52 | 88 | 89 | 31 | 18 | 81 | 88 | 34 | 44 | 63 | 39 |
| 256 | 54 | 35 | 54 | 50 | 50 | 51 | 87 | 89 | 30 | 18 | 81 | 88 | 34 | 44 | 62 | 39 |
| 258 | 53 | 35 | 54 | 49 | 49 | 50 | 87 | 89 | 30 | 18 | 80 | 88 | 34 | 43 | 61 | 38 |
| 260 | 53 | 34 | 53 | 48 | 48 | 50 | 87 | 89 | 30 | 18 | 80 | 87 | 33 | 43 | 61 | 37 |
| 262 | 52 | 33 | 53 | 48 | 48 | 49 | 86 | 88 | 29 | 17 | 79 | 87 | 33 | 43 | 60 | 37 |
| 264 | 52 | 33 | 52 | 47 | 47 | 48 | 86 | 88 | 29 | 17 | 78 | 86 | 33 | 42 | 59 | 36 |
| 266 | 51 | 32 | 52 | 47 | 46 | 47 | 86 | 88 | 29 | 17 | 77 | 86 | 33 | 42 | 59 | 36 |
| 268 | 51 | 32 | 51 | 46 | 46 | 47 | 85 | 88 | 29 | 17 | 76 | 85 | 33 | 42 | 58 | 35 |
| 270 | 50 | 31 | 51 | 46 | 45 | 46 | 85 | 87 | 29 | 17 | 75 | 85 | 33 | 42 | 57 | 35 |

TABLE 11-continued

Trend Line Values $|Y|SmO_2^{\%} \geq U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 272 | 50 | 30 | 50 | 45 | 44 | 45 | 85 | 87 | 28 | 17 | 74 | 84 | 33 | 41 | 57 | 34 |
| 274 | 49 | 30 | 50 | 45 | 44 | 45 | 84 | 87 | 28 | 17 | 73 | 84 | 33 | 41 | 56 | 34 |
| 276 | 49 | 29 | 50 | 44 | 43 | 44 | 84 | 87 | 28 | 17 | 72 | 83 | 32 | 41 | 56 | 33 |
| 278 | 48 | 28 | 49 | 44 | 42 | 44 | 83 | 87 | 28 | 17 | 71 | 83 | 32 | 40 | 55 | 33 |
| 280 | 48 | 28 | 49 | 43 | 41 | 20 | 83 | 86 | 28 | 17 | 69 | 82 | 32 | 40 | 54 | 32 |
| 282 | 47 | 27 | 49 | 43 | 41 | 43 | 83 | 86 | 28 | 17 | 68 | 82 | 32 | 40 | 54 | 32 |
| 284 | 47 | 26 | 48 | 42 | 40 | 42 | 82 | 86 | 28 | 17 | 67 | 81 | 32 | 40 | 53 | 31 |
| 286 | 46 | 25 | 48 | 42 | 39 | 42 | 82 | 86 | 28 | 17 | 65 | 81 | 31 | 40 | 53 | 31 |
| 288 | 45 | 25 | 48 | 42 | 38 | 41 | 82 | 86 | 28 | 17 | 64 | 80 | 31 | 39 | 52 | 30 |
| 290 | 45 | 24 | 47 | 41 | 38 | 41 | 81 | 85 | 28 | 17 | 62 | 80 | 30 | 39 | 52 | 30 |
| 292 | 44 | 23 | 47 | 41 | 37 | 40 | 81 | 85 | 28 | 17 | 61 | 80 | 30 | 39 | 51 | 29 |
| 294 | 43 | 22 | 47 | 40 | 36 | 40 | 80 | 85 | 28 | 17 | 60 | 79 | 29 | 39 | 51 | 29 |
| 296 | 42 | 21 | 46 | 40 | 35 | 39 | 80 | 85 | 28 | 17 | 58 | 79 | 28 | 38 | 50 | 28 |
| 298 | 41 | 21 | 46 | 39 | 34 | 39 | 80 | 85 | 28 | 16 | 57 | 79 | 27 | 38 | 50 | 28 |
| 300 | 40 | 20 | 46 | 38 | 33 | 38 | 79 | 84 | 28 | 16 | 55 | 79 | 26 | 38 | 49 | 27 |
| Min | 40 | 20 | 46 | 38 | 33 | 38 | 79 | 84 | 28 | 16 | 55 | 79 | 26 | 38 | 49 | 27 |
| Max | 55 | 36 | 55 | 51 | 51 | 53 | 88 | 90 | 31 | 18 | 82 | 88 | 34 | 44 | 63 | 40 |
| σ | 4.3 | 5.1 | 2.8 | 3.7 | 5.3 | 4.4 | 2.7 | 1.6 | 1.0 | 0.5 | 8.5 | 3.3 | 2.1 | 2.0 | 4.3 | 3.8 |
| $\overline{Y}$ | 48 | 29 | 50 | 44 | 43 | 45 | 84 | 87 | 29 | 17 | 71 | 83 | 32 | 41 | 56 | 33 |
| $\tilde{Y}$ | 49 | 29 | 50 | 44 | 43 | 44 | 84 | 87 | 28 | 17 | 72 | 83 | 32 | 41 | 56 | 33 |

[(Min) Minimum value; (Max) Maximum value; (σ) standard deviation value; ($\overline{Y}$) average value; ($\tilde{Y}$) median value]

1.11. In Table 12, Table 13 and Table 14, the calculated values of $|Y|ThB$ of each $TM^M$, at each intensity can be observed.

TABLE 12

Trend Line Values $|Y|ThB$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 136 | 12.8 | 12.6 | 12.1 | 12.1 | 12.2 | 12.1 | 12.1 | 12.1 | 12.6 | 12.6 | 11.9 | 12.2 | 12.9 | 12.5 | 12.3 | 12.0 |
| 138 | 12.8 | 12.6 | 12.1 | 12.1 | 12.2 | 12.1 | 12.1 | 12.2 | 12.6 | 12.6 | 11.9 | 12.2 | 12.9 | 12.5 | 12.3 | 12.0 |
| 140 | 12.8 | 12.6 | 12.1 | 12.1 | 12.2 | 12.1 | 12.1 | 12.2 | 12.6 | 12.6 | 11.9 | 12.2 | 12.9 | 12.5 | 12.3 | 12.0 |
| 142 | 12.8 | 12.6 | 12.1 | 12.1 | 12.2 | 12.1 | 12.1 | 12.2 | 12.6 | 12.6 | 11.9 | 12.2 | 12.9 | 12.5 | 12.3 | 12.0 |
| 144 | 12.8 | 12.6 | 12.1 | 12.1 | 12.2 | 12.1 | 12.1 | 12.2 | 12.6 | 12.6 | 11.9 | 12.2 | 12.9 | 12.5 | 12.3 | 12.0 |
| 146 | 12.8 | 12.6 | 12.1 | 12.1 | 12.2 | 12.1 | 12.1 | 12.2 | 12.6 | 12.6 | 11.9 | 12.2 | 12.9 | 12.5 | 12.3 | 12.0 |
| 148 | 12.8 | 12.6 | 12.1 | 12.1 | 12.2 | 12.1 | 12.2 | 12.2 | 12.6 | 12.6 | 11.9 | 12.2 | 12.9 | 12.5 | 12.3 | 12.0 |
| 150 | 12.8 | 12.6 | 12.1 | 12.1 | 12.2 | 12.1 | 12.2 | 12.2 | 12.6 | 12.6 | 11.9 | 12.2 | 12.9 | 12.5 | 12.3 | 12.0 |
| 152 | 12.8 | 12.6 | 12.1 | 12.1 | 12.1 | 12.1 | 12.2 | 12.2 | 12.6 | 12.6 | 11.9 | 12.2 | 12.9 | 12.4 | 12.4 | 12.0 |
| 154 | 12.8 | 12.6 | 12.1 | 12.1 | 12.1 | 12.1 | 12.2 | 12.2 | 12.6 | 12.6 | 11.9 | 12.2 | 12.9 | 12.4 | 12.4 | 12.0 |
| 156 | 12.8 | 12.7 | 12.1 | 12.1 | 12.1 | 12.1 | 12.2 | 12.2 | 12.6 | 12.6 | 11.9 | 12.2 | 12.9 | 12.4 | 12.4 | 12.0 |
| 158 | 12.8 | 12.7 | 12.1 | 12.1 | 12.1 | 12.1 | 12.2 | 12.2 | 12.6 | 12.6 | 11.9 | 12.2 | 12.9 | 12.4 | 12.4 | 12.0 |
| 160 | 12.8 | 12.7 | 12.1 | 12.1 | 12.1 | 12.1 | 12.2 | 12.2 | 12.6 | 12.6 | 11.9 | 12.2 | 12.9 | 12.4 | 12.4 | 12.1 |
| 162 | 12.8 | 12.7 | 12.1 | 12.1 | 12.1 | 12.0 | 12.2 | 12.2 | 12.6 | 12.6 | 11.9 | 12.2 | 12.9 | 12.4 | 12.4 | 12.1 |
| 164 | 12.8 | 12.7 | 12.1 | 12.1 | 12.1 | 12.0 | 12.2 | 12.2 | 12.6 | 12.6 | 11.9 | 12.2 | 12.9 | 12.4 | 12.4 | 12.1 |
| 166 | 12.8 | 12.7 | 12.1 | 12.1 | 12.1 | 12.0 | 12.2 | 12.2 | 12.6 | 12.6 | 11.9 | 12.2 | 12.9 | 12.4 | 12.4 | 12.1 |
| 168 | 12.8 | 12.7 | 12.1 | 12.1 | 12.1 | 12.0 | 12.2 | 12.2 | 12.6 | 12.6 | 11.9 | 12.2 | 12.9 | 12.4 | 12.4 | 12.1 |
| 170 | 12.8 | 12.7 | 12.1 | 12.1 | 12.1 | 12.0 | 12.2 | 12.2 | 12.6 | 12.6 | 11.9 | 12.2 | 12.9 | 12.4 | 12.4 | 12.1 |
| 172 | 12.8 | 12.7 | 12.1 | 12.1 | 12.1 | 12.0 | 12.2 | 12.2 | 12.6 | 12.6 | 11.9 | 12.3 | 12.9 | 12.4 | 12.4 | 12.1 |
| 174 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 176 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 178 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 180 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 182 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 184 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 186 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 188 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 190 | 12.8 | 12.7 | 12.0 | 12.1 | 12.1 | 12.0 | 12.2 | 12.2 | 12.6 | 12.6 | 11.9 | 12.3 | 12.9 | 12.4 | 12.4 | 12.1 |
| 192 | 12.8 | 12.7 | 12.0 | 12.1 | 12.1 | 12.0 | 12.2 | 12.2 | 12.7 | 12.6 | 11.9 | 12.3 | 12.9 | 12.4 | 12.4 | 12.1 |
| 194 | 12.8 | 12.7 | 12.0 | 12.1 | 12.1 | 12.0 | 12.2 | 12.2 | 12.7 | 12.6 | 11.9 | 12.3 | 12.9 | 12.4 | 12.4 | 12.1 |
| 196 | 12.8 | 12.7 | 12.0 | 12.1 | 12.1 | 12.0 | 12.2 | 12.2 | 12.7 | 12.6 | 11.9 | 12.3 | 12.9 | 12.4 | 12.4 | 12.0 |
| 198 | 12.8 | 12.7 | 12.0 | 12.1 | 12.1 | 12.0 | 12.1 | 12.1 | 12.7 | 12.6 | 11.9 | 12.3 | 12.9 | 12.4 | 12.4 | 12.0 |
| 200 | 12.8 | 12.7 | 12.0 | 12.1 | 12.1 | 12.0 | 12.1 | 12.1 | 12.7 | 12.6 | 11.9 | 12.3 | 12.9 | 12.4 | 12.4 | 12.0 |
| Min | 12.8 | 12.6 | 12.0 | 12.1 | 12.1 | 12.0 | 12.1 | 12.1 | 12.6 | 12.6 | 11.9 | 12.2 | 12.9 | 12.4 | 12.3 | 12.0 |
| Max | 12.8 | 12.7 | 12.1 | 12.1 | 12.2 | 12.1 | 12.2 | 12.2 | 12.7 | 12.6 | 11.9 | 12.3 | 12.9 | 12.5 | 12.4 | 12.1 |

TABLE 12-continued

Trend Line Values |Y|ThB between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| σ | 0.0 | 0.0 | 0.0 | 0.0 | 0.0 | 0.1 | 0.0 | 0.0 | 0.0 | 0.0 | 0.0 | 0.0 | 0.0 | 0.0 | 0.0 | 0.0 |
| $\bar{Y}$ | 12.8 | 12.7 | 12.1 | 12.1 | 12.1 | 12.0 | 12.2 | 12.2 | 12.6 | 12.6 | 11.9 | 12.2 | 12.9 | 12.4 | 12.4 | 12.0 |
| $\tilde{Y}$ | 12.8 | 12.7 | 12.1 | 12.1 | 12.1 | 12.0 | 12.2 | 12.2 | 12.6 | 12.6 | 11.9 | 12.2 | 12.9 | 12.4 | 12.4 | 12.1 |

[(Min) Minimum value; (Max) Maximum value; (σ) standard deviation value; ($\bar{Y}$) average value; ($\tilde{Y}$) median value]

TABLE 13

Trend Line Values |Y|ThB between $U_{Ae}$ and $U_{ANA}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 202 | 12.8 | 12.7 | 12.0 | 12.1 | 12.1 | 12.0 | 12.1 | 12.1 | 12.7 | 12.6 | 11.9 | 12.3 | 12.9 | 12.4 | 12.4 | 12.0 |
| 204 | 12.8 | 12.7 | 12.0 | 12.1 | 12.1 | 12.0 | 12.1 | 12.1 | 12.7 | 12.6 | 11.9 | 12.3 | 12.9 | 12.4 | 12.4 | 12.0 |
| 206 | 12.8 | 12.7 | 12.0 | 12.1 | 12.1 | 12.0 | 12.1 | 12.1 | 12.7 | 12.6 | 11.9 | 12.3 | 12.9 | 12.4 | 12.4 | 12.0 |
| 208 | 12.8 | 12.7 | 12.0 | 12.1 | 12.1 | 12.0 | 12.1 | 12.1 | 12.7 | 12.6 | 11.9 | 12.3 | 12.9 | 12.4 | 12.4 | 12.0 |
| 210 | 12.8 | 12.7 | 12.0 | 12.1 | 12.1 | 12.0 | 12.1 | 12.1 | 12.7 | 12.6 | 11.9 | 12.3 | 12.9 | 12.4 | 12.4 | 12.0 |
| 212 | 12.8 | 12.7 | 12.0 | 12.1 | 12.1 | 12.0 | 12.1 | 12.1 | 12.7 | 12.6 | 11.9 | 12.3 | 12.9 | 12.4 | 12.3 | 12.0 |
| 214 | 12.8 | 12.7 | 12.0 | 12.1 | 12.1 | 12.0 | 12.1 | 12.1 | 12.7 | 12.6 | 11.9 | 12.2 | 12.9 | 12.4 | 12.3 | 12.0 |
| 216 | 12.8 | 12.7 | 12.0 | 12.1 | 12.1 | 12.0 | 12.1 | 12.0 | 12.7 | 12.6 | 11.9 | 12.2 | 12.9 | 12.4 | 12.3 | 12.0 |
| 218 | 12.8 | 12.7 | 12.0 | 12.1 | 12.1 | 12.0 | 12.0 | 12.0 | 12.7 | 12.6 | 11.9 | 12.2 | 12.9 | 12.4 | 12.3 | 12.0 |
| 220 | 12.8 | 12.7 | 12.0 | 12.1 | 12.1 | 12.0 | 12.0 | 12.0 | 12.7 | 12.6 | 11.9 | 12.2 | 12.9 | 12.4 | 12.3 | 12.0 |
| 222 | 12.8 | 12.7 | 12.0 | 12.1 | 12.1 | 12.0 | 12.0 | 12.0 | 12.7 | 12.6 | 11.8 | 12.2 | 12.9 | 12.4 | 12.3 | 12.0 |
| 224 | 12.8 | 12.7 | 12.0 | 12.1 | 12.1 | 12.0 | 12.0 | 12.0 | 12.7 | 12.6 | 11.8 | 12.2 | 12.9 | 12.5 | 12.3 | 11.9 |
| 226 | 12.8 | 12.7 | 12.0 | 12.0 | 12.1 | 12.0 | 12.0 | 12.0 | 12.7 | 12.6 | 11.8 | 12.2 | 12.9 | 12.5 | 12.3 | 11.9 |
| 228 | 12.8 | 12.7 | 12.0 | 12.0 | 12.1 | 12.0 | 12.0 | 12.0 | 12.7 | 12.6 | 11.8 | 12.2 | 12.9 | 12.5 | 12.3 | 11.9 |
| 230 | 12.8 | 12.7 | 12.0 | 12.0 | 12.1 | 12.0 | 12.0 | 11.9 | 12.7 | 12.7 | 11.8 | 12.2 | 12.9 | 12.5 | 12.3 | 11.9 |
| 232 | 12.8 | 12.7 | 12.0 | 12.0 | 12.1 | 12.0 | 12.0 | 11.9 | 12.7 | 12.7 | 11.8 | 12.2 | 12.9 | 12.5 | 12.3 | 11.9 |
| 234 | 12.8 | 12.7 | 12.0 | 12.0 | 12.1 | 12.0 | 11.9 | 11.9 | 12.7 | 12.7 | 11.8 | 12.2 | 12.9 | 12.5 | 12.3 | 11.9 |
| 236 | 12.8 | 12.8 | 12.0 | 12.0 | 12.1 | 12.0 | 11.9 | 11.9 | 12.7 | 12.7 | 11.8 | 12.2 | 12.9 | 12.5 | 12.3 | 11.9 |
| 238 | 12.8 | 12.8 | 12.0 | 12.0 | 12.1 | 12.0 | 11.9 | 11.9 | 12.7 | 12.7 | 11.8 | 12.1 | 12.9 | 12.5 | 12.3 | 11.9 |
| 240 | 12.8 | 12.8 | 12.0 | 12.0 | 12.1 | 12.0 | 11.9 | 11.9 | 12.7 | 12.7 | 11.8 | 12.1 | 13.0 | 12.5 | 12.3 | 11.9 |
| 242 | 12.8 | 12.8 | 12.0 | 12.0 | 12.1 | 12.0 | 11.9 | 11.9 | 12.7 | 12.7 | 11.7 | 12.1 | 13.0 | 12.5 | 12.3 | 11.9 |
| 244 | 12.8 | 12.8 | 12.0 | 12.0 | 12.1 | 12.0 | 11.9 | 11.9 | 12.7 | 12.7 | 11.7 | 12.1 | 13.0 | 12.5 | 12.3 | 11.9 |
| 246 | 12.8 | 12.8 | 12.0 | 12.0 | 12.1 | 12.0 | 11.9 | 11.9 | 12.7 | 12.7 | 11.7 | 12.1 | 13.0 | 12.5 | 12.3 | 11.9 |
| 248 | 12.8 | 12.8 | 12.0 | 12.0 | 12.1 | 12.0 | 11.9 | 11.9 | 12.7 | 12.7 | 11.7 | 12.1 | 13.0 | 12.5 | 12.3 | 11.9 |
| 250 | 12.8 | 12.8 | 12.0 | 12.0 | 12.1 | 12.0 | 11.9 | 11.8 | 12.7 | 12.7 | 11.7 | 12.1 | 13.0 | 12.5 | 12.3 | 11.9 |
| Min | 13 | 13 | 12 | 12 | 12 | 12 | 12 | 12 | 13 | 13 | 12 | 12 | 13 | 12 | 12 | 12 |
| Max | 13 | 13 | 12 | 12 | 12 | 12 | 12 | 12 | 13 | 13 | 12 | 12 | 13 | 12 | 12 | 12 |
| σ | 0.0 | 0.0 | 0.0 | 0.0 | 0.0 | 0.0 | 0.1 | 0.1 | 0.0 | 0.0 | 0.1 | 0.1 | 0.0 | 0.0 | 0.0 | 0.1 |
| $\bar{Y}$ | 13 | 13 | 12 | 12 | 12 | 12 | 12 | 12 | 13 | 13 | 12 | 12 | 13 | 12 | 12 | 12 |
| $\tilde{Y}$ | 13 | 13 | 12 | 12 | 12 | 12 | 12 | 12 | 13 | 13 | 12 | 12 | 13 | 12 | 12 | 12 |

[(Min) Minimum value; (Max) Maximum value; (σ) standard deviation value; ($\bar{Y}$) average value; ($\tilde{Y}$) median value]

TABLE 14

Trend Line Values |Y|ThB ≥ $U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 252 | 12.8 | 12.8 | 12.0 | 12.0 | 12.1 | 12.0 | 11.8 | 11.8 | 12.7 | 12.7 | 11.7 | 12.1 | 13.0 | 12.5 | 12.3 | 11.9 |
| 254 | 12.8 | 12.8 | 12.0 | 12.0 | 12.1 | 12.0 | 11.8 | 11.8 | 12.7 | 12.7 | 11.7 | 12.1 | 13.0 | 12.5 | 12.3 | 11.8 |
| 256 | 12.8 | 12.8 | 12.0 | 12.0 | 12.1 | 12.0 | 11.8 | 11.8 | 12.7 | 12.7 | 11.7 | 12.0 | 13.0 | 12.5 | 12.3 | 11.8 |
| 258 | 12.8 | 12.8 | 12.0 | 12.0 | 12.1 | 12.0 | 11.8 | 11.8 | 12.7 | 12.7 | 11.7 | 12.0 | 13.0 | 12.5 | 12.3 | 11.8 |
| 260 | 12.8 | 12.8 | 12.0 | 12.0 | 12.1 | 12.0 | 11.8 | 11.8 | 12.7 | 12.7 | 11.7 | 12.0 | 12.9 | 12.5 | 12.3 | 11.8 |
| 262 | 12.8 | 12.8 | 12.0 | 12.1 | 12.1 | 12.0 | 11.8 | 11.8 | 12.7 | 12.7 | 11.7 | 12.0 | 12.9 | 12.5 | 12.3 | 11.8 |
| 264 | 12.7 | 12.8 | 12.0 | 12.1 | 12.1 | 12.0 | 11.8 | 11.8 | 12.7 | 12.7 | 11.7 | 12.0 | 12.9 | 12.5 | 12.3 | 11.8 |
| 266 | 12.7 | 12.8 | 12.0 | 12.1 | 12.1 | 12.1 | 11.8 | 11.8 | 12.7 | 12.7 | 11.7 | 12.0 | 12.9 | 12.5 | 12.3 | 11.9 |
| 268 | 12.7 | 12.8 | 12.0 | 12.1 | 12.1 | 12.1 | 11.8 | 11.8 | 12.7 | 12.7 | 11.7 | 12.0 | 12.9 | 12.5 | 12.3 | 11.9 |

TABLE 14-continued

Trend Line Values $|Y|ThB \geq U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 270 | 12.7 | 12.8 | 12.0 | 12.1 | 12.1 | 12.1 | 11.8 | 11.8 | 12.7 | 12.7 | 11.7 | 12.0 | 12.9 | 12.5 | 12.3 | 11.9 |
| 272 | 12.7 | 12.8 | 12.0 | 12.1 | 12.1 | 12.1 | 11.8 | 11.8 | 12.7 | 12.7 | 11.7 | 11.9 | 12.9 | 12.5 | 12.3 | 11.9 |
| 274 | 12.7 | 12.8 | 12.0 | 12.1 | 12.1 | 12.1 | 11.8 | 11.8 | 12.7 | 12.7 | 11.6 | 11.9 | 12.9 | 12.5 | 12.3 | 11.9 |
| 276 | 12.7 | 12.8 | 12.0 | 12.1 | 12.1 | 12.1 | 11.8 | 11.8 | 12.7 | 12.7 | 11.6 | 11.9 | 12.9 | 12.5 | 12.3 | 11.9 |
| 278 | 12.7 | 12.8 | 12.0 | 12.1 | 12.1 | 12.1 | 11.8 | 11.8 | 12.7 | 12.7 | 11.6 | 11.9 | 12.9 | 12.5 | 12.3 | 11.9 |
| 280 | 12.7 | 12.8 | 12.0 | 12.1 | 12.1 | 12.1 | 11.8 | 11.8 | 12.7 | 12.7 | 11.6 | 11.9 | 12.9 | 12.5 | 12.3 | 11.9 |
| 282 | 12.8 | 12.9 | 12.0 | 12.1 | 12.1 | 12.1 | 11.8 | 11.8 | 12.7 | 12.7 | 11.6 | 11.9 | 12.9 | 12.5 | 12.3 | 11.9 |
| 284 | 12.8 | 12.9 | 12.0 | 12.1 | 12.2 | 12.1 | 11.8 | 11.8 | 12.7 | 12.7 | 11.6 | 11.9 | 12.9 | 12.5 | 12.4 | 11.9 |
| 286 | 12.8 | 12.9 | 12.0 | 12.1 | 12.2 | 12.1 | 11.8 | 11.8 | 12.7 | 12.7 | 11.6 | 11.8 | 12.9 | 12.5 | 12.4 | 11.9 |
| 288 | 12.8 | 12.9 | 12.0 | 12.1 | 12.2 | 12.1 | 11.8 | 11.8 | 12.7 | 12.7 | 11.6 | 11.8 | 12.9 | 12.5 | 12.4 | 11.9 |
| 290 | 12.8 | 12.9 | 12.0 | 12.1 | 12.2 | 12.1 | 11.7 | 11.8 | 12.7 | 12.7 | 11.6 | 11.8 | 12.9 | 12.5 | 12.4 | 11.9 |
| 292 | 12.8 | 12.9 | 12.0 | 12.1 | 12.2 | 12.1 | 11.7 | 11.8 | 12.7 | 12.7 | 11.6 | 11.8 | 13.0 | 12.5 | 12.4 | 11.9 |
| 294 | 12.8 | 12.9 | 12.0 | 12.1 | 12.2 | 12.1 | 11.7 | 11.8 | 12.7 | 12.7 | 11.6 | 11.8 | 13.0 | 12.5 | 12.4 | 11.9 |
| 296 | 12.8 | 12.9 | 12.0 | 12.1 | 12.2 | 12.1 | 11.7 | 11.8 | 12.7 | 12.7 | 11.6 | 11.7 | 13.0 | 12.5 | 12.4 | 11.9 |
| 298 | 12.8 | 12.9 | 12.0 | 12.1 | 12.2 | 12.1 | 11.7 | 11.8 | 12.7 | 12.7 | 11.6 | 11.7 | 13.0 | 12.5 | 12.4 | 11.9 |
| 300 | 12.8 | 12.9 | 12.0 | 12.2 | 12.2 | 12.1 | 11.7 | 11.7 | 12.8 | 12.7 | 11.5 | 11.7 | 13.0 | 12.5 | 12.4 | 11.9 |
| Min | 13 | 13 | 12 | 12 | 12 | 12 | 12 | 12 | 13 | 13 | 12 | 12 | 13 | 12 | 12 | 12 |
| Max | 13 | 13 | 12 | 12 | 12 | 12 | 12 | 12 | 13 | 13 | 12 | 12 | 13 | 13 | 12 | 12 |
| σ | 0.0 | 0.1 | 0.0 | 0.0 | 0.1 | 0.0 | 0.0 | 0.0 | 0.0 | 0.0 | 0.0 | 0.1 | 0.0 | 0.0 | 0.0 | 0.0 |
| $\bar{Y}$ | 13 | 13 | 12 | 12 | 12 | 12 | 12 | 12 | 13 | 13 | 12 | 12 | 13 | 12 | 12 | 12 |
| $\tilde{Y}$ | 13 | 13 | 12 | 12 | 12 | 12 | 12 | 12 | 13 | 13 | 12 | 12 | 13 | 12 | 12 | 12 |

[Min) Minimum value; (Max) Maximum value; (σ) standard deviation value; ($\bar{Y}$) average value; ($\tilde{Y}$) median value]

1.12. In Table 15, Table 16 and Table 17, the calculated values of $|Y|\Phi ThB$ of each $TM^M$, at each intensity can be observed.

TABLE 15

Trend Line Values $|Y|\phi ThB$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 136 | 26.6 | 26.2 | 25.2 | 25.1 | 25.3 | 25.1 | 25.1 | 25.3 | 26.0 | 26.0 | 24.7 | 25.3 | 26.8 | 25.8 | 25.6 | 25.0 |
| 138 | 26.8 | 26.4 | 25.3 | 25.3 | 25.4 | 25.2 | 25.2 | 25.4 | 26.2 | 26.2 | 24.8 | 25.5 | 26.9 | 25.9 | 25.8 | 25.1 |
| 140 | 26.9 | 26.5 | 25.4 | 25.4 | 25.6 | 25.3 | 25.3 | 25.6 | 26.4 | 26.3 | 24.9 | 25.6 | 27.1 | 26.1 | 25.9 | 25.3 |
| 142 | 27.1 | 26.7 | 25.6 | 25.6 | 25.7 | 25.5 | 25.5 | 25.7 | 26.5 | 26.5 | 25.1 | 25.8 | 27.3 | 26.2 | 26.1 | 25.4 |
| 144 | 27.3 | 26.9 | 25.7 | 25.7 | 25.9 | 25.6 | 25.6 | 25.9 | 26.7 | 26.6 | 25.3 | 25.9 | 27.4 | 26.4 | 26.3 | 25.6 |
| 146 | 27.4 | 27.0 | 25.9 | 25.9 | 26.0 | 25.8 | 25.8 | 26.1 | 26.9 | 26.8 | 25.4 | 26.1 | 27.6 | 26.6 | 26.4 | 25.8 |
| 148 | 27.6 | 27.2 | 26.0 | 26.0 | 26.2 | 26.0 | 26.0 | 26.3 | 27.1 | 27.0 | 25.6 | 26.3 | 27.8 | 26.8 | 26.6 | 25.9 |
| 150 | 27.8 | 27.4 | 26.2 | 26.2 | 26.4 | 26.1 | 26.1 | 26.4 | 27.3 | 27.2 | 25.8 | 26.5 | 28.0 | 26.9 | 26.8 | 26.1 |
| 152 | 28.0 | 27.6 | 26.4 | 26.4 | 26.5 | 26.3 | 26.3 | 26.6 | 27.5 | 27.4 | 26.0 | 26.7 | 28.2 | 27.1 | 27.0 | 26.3 |
| 154 | 28.2 | 27.8 | 26.6 | 26.6 | 26.7 | 26.5 | 26.5 | 26.8 | 27.7 | 27.6 | 26.1 | 26.9 | 28.4 | 27.3 | 27.2 | 26.5 |
| 156 | 28.4 | 28.0 | 26.8 | 26.9 | 26.7 | 26.7 | 26.7 | 27.0 | 27.9 | 27.8 | 26.3 | 27.1 | 28.6 | 27.5 | 27.4 | 26.7 |
| 158 | 28.6 | 28.2 | 26.9 | 26.9 | 27.1 | 26.9 | 26.9 | 27.2 | 28.1 | 28.0 | 26.5 | 27.3 | 28.8 | 27.7 | 27.6 | 26.9 |
| 160 | 28.8 | 28.5 | 27.1 | 27.1 | 27.3 | 27.1 | 27.1 | 27.4 | 28.3 | 28.2 | 26.7 | 27.5 | 29.0 | 28.0 | 27.8 | 27.1 |
| 162 | 29.0 | 28.7 | 27.3 | 27.3 | 27.5 | 27.3 | 27.3 | 27.6 | 28.5 | 28.4 | 26.9 | 27.7 | 29.3 | 28.2 | 28.0 | 27.3 |
| 164 | 29.3 | 28.9 | 27.5 | 27.5 | 27.7 | 27.5 | 27.5 | 27.8 | 28.8 | 28.7 | 27.2 | 27.9 | 29.5 | 28.4 | 28.2 | 27.5 |
| 166 | 29.5 | 29.1 | 27.7 | 27.7 | 27.9 | 27.7 | 27.7 | 28.0 | 29.0 | 28.9 | 27.4 | 28.1 | 29.7 | 28.6 | 28.4 | 27.7 |
| 168 | 29.7 | 29.4 | 28.0 | 28.0 | 28.1 | 27.9 | 27.9 | 28.2 | 29.2 | 29.1 | 27.6 | 28.3 | 29.9 | 28.8 | 28.6 | 27.9 |
| 170 | 29.9 | 29.6 | 28.2 | 28.2 | 28.3 | 28.1 | 28.1 | 28.4 | 29.5 | 29.3 | 27.8 | 28.6 | 30.2 | 29.1 | 28.9 | 28.1 |
| 172 | 30.1 | 29.8 | 28.4 | 28.4 | 28.5 | 28.3 | 28.3 | 28.6 | 29.7 | 29.6 | 28.0 | 28.8 | 30.4 | 29.3 | 29.1 | 28.3 |
| 174 | 30.4 | 30.0 | 28.6 | 28.6 | 28.7 | 28.5 | 28.5 | 28.8 | 29.9 | 29.8 | 28.2 | 29.0 | 30.6 | 29.5 | 29.3 | 28.5 |
| 176 | 30.6 | 30.3 | 28.8 | 28.8 | 28.9 | 28.7 | 28.7 | 29.0 | 30.2 | 30.0 | 28.4 | 29.2 | 30.9 | 29.7 | 29.5 | 28.7 |
| 178 | 30.8 | 30.5 | 29.0 | 29.0 | 29.1 | 28.9 | 28.9 | 29.2 | 30.4 | 30.3 | 28.7 | 29.4 | 31.1 | 30.0 | 29.7 | 28.9 |
| 180 | 31.0 | 30.7 | 29.2 | 29.2 | 29.3 | 29.2 | 29.2 | 29.4 | 30.6 | 30.5 | 28.9 | 29.7 | 31.3 | 30.2 | 30.0 | 29.1 |
| 182 | 31.3 | 31.0 | 29.4 | 29.4 | 29.5 | 29.4 | 29.4 | 29.6 | 30.9 | 30.7 | 29.1 | 29.9 | 31.6 | 30.4 | 30.2 | 29.3 |
| 184 | 31.5 | 31.2 | 29.6 | 29.6 | 29.7 | 29.6 | 29.6 | 29.8 | 31.1 | 31.0 | 29.3 | 30.1 | 31.8 | 30.6 | 30.4 | 29.6 |
| 186 | 31.7 | 31.4 | 29.8 | 29.9 | 29.9 | 29.8 | 29.8 | 30.0 | 31.3 | 31.2 | 29.5 | 30.3 | 32.0 | 30.8 | 30.6 | 29.8 |
| 188 | 31.9 | 31.6 | 30.0 | 30.1 | 30.1 | 30.0 | 30.0 | 30.2 | 31.6 | 31.4 | 29.7 | 30.5 | 32.2 | 31.1 | 30.8 | 30.0 |
| 190 | 32.1 | 31.9 | 30.2 | 30.3 | 30.3 | 30.2 | 30.2 | 30.4 | 31.8 | 31.6 | 29.9 | 30.8 | 32.5 | 31.3 | 31.0 | 30.2 |
| 192 | 32.3 | 32.1 | 30.4 | 30.5 | 30.5 | 30.4 | 30.4 | 30.6 | 32.0 | 31.9 | 30.1 | 31.0 | 32.7 | 31.5 | 31.2 | 30.4 |
| 194 | 32.6 | 32.3 | 30.6 | 30.7 | 30.7 | 30.6 | 30.6 | 30.8 | 32.2 | 32.1 | 30.3 | 31.2 | 32.9 | 31.7 | 31.4 | 30.5 |
| 196 | 32.8 | 32.5 | 30.8 | 30.9 | 30.9 | 30.8 | 30.8 | 31.0 | 32.5 | 32.3 | 30.5 | 31.4 | 33.1 | 31.9 | 31.6 | 30.7 |
| 198 | 33.0 | 32.7 | 31.0 | 31.1 | 31.1 | 31.0 | 31.0 | 31.2 | 32.7 | 32.5 | 30.7 | 31.6 | 33.3 | 32.1 | 31.8 | 30.9 |
| 200 | 33.2 | 33.0 | 31.2 | 31.3 | 31.3 | 31.2 | 31.2 | 31.3 | 32.9 | 32.7 | 30.9 | 31.8 | 33.5 | 32.3 | 32.0 | 31.1 |
| Min | 26.6 | 26.2 | 25.2 | 25.1 | 25.3 | 25.1 | 25.1 | 25.3 | 26.0 | 26.0 | 24.7 | 25.3 | 26.8 | 25.8 | 25.6 | 25.0 |

TABLE 15-continued

Trend Line Values |Y|φThB between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| Max | 33.2 | 33.0 | 31.2 | 31.3 | 31.3 | 31.2 | 31.2 | 31.3 | 32.9 | 32.7 | 30.9 | 31.8 | 33.5 | 32.3 | 32.0 | 31.1 |
| σ | 2.0 | 2.1 | 1.9 | 1.9 | 1.9 | 1.9 | 1.9 | 1.9 | 2.1 | 2.1 | 1.9 | 2.0 | 2.1 | 2.0 | 2.0 | 1.9 |
| $\overline{Y}$ | 29.8 | 29.4 | 28.0 | 28.0 | 28.2 | 28.0 | 28.0 | 28.2 | 29.3 | 29.2 | 27.6 | 28.4 | 30.0 | 28.9 | 28.7 | 27.9 |
| $\tilde{Y}$ | 29.7 | 29.4 | 28.0 | 28.0 | 28.1 | 27.9 | 27.9 | 28.2 | 29.2 | 29.1 | 27.6 | 28.3 | 29.9 | 28.8 | 28.6 | 27.9 |

[(Min) Minimum value; (Max) Maximum value; (σ) standard deviation value; ($\overline{Y}$) average value; ($\tilde{Y}$) median value]

TABLE 16

Trend Line Values |Y|φThB between $U_{Ae}$ and $U_{ANA}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 202 | 33.4 | 33.2 | 31.4 | 31.5 | 31.5 | 31.3 | 31.3 | 31.5 | 33.1 | 32.9 | 31.1 | 32.0 | 33.7 | 32.5 | 32.2 | 31.3 |
| 204 | 33.6 | 33.4 | 31.6 | 31.6 | 31.7 | 31.5 | 31.5 | 31.7 | 33.3 | 33.1 | 31.2 | 32.2 | 33.9 | 32.7 | 32.4 | 31.5 |
| 206 | 33.8 | 33.6 | 31.7 | 31.8 | 31.9 | 31.7 | 31.7 | 31.9 | 33.5 | 33.3 | 31.4 | 32.4 | 34.1 | 32.9 | 32.6 | 31.6 |
| 208 | 34.0 | 33.8 | 31.9 | 32.0 | 32.0 | 31.9 | 31.9 | 32.0 | 33.7 | 33.5 | 31.6 | 32.5 | 34.3 | 33.1 | 32.8 | 31.8 |
| 210 | 34.1 | 34.0 | 32.1 | 32.2 | 32.2 | 32.0 | 32.0 | 32.2 | 33.9 | 33.7 | 31.8 | 32.7 | 34.5 | 33.3 | 33.0 | 32.0 |
| 212 | 34.3 | 34.2 | 32.3 | 32.4 | 32.4 | 32.2 | 32.2 | 32.3 | 34.1 | 33.9 | 31.9 | 32.9 | 34.7 | 33.4 | 33.1 | 32.2 |
| 214 | 34.5 | 34.4 | 32.4 | 32.5 | 32.6 | 32.4 | 32.4 | 32.5 | 34.3 | 34.1 | 32.1 | 33.1 | 34.9 | 33.6 | 33.3 | 32.3 |
| 216 | 34.7 | 34.5 | 32.6 | 32.7 | 32.7 | 32.5 | 32.5 | 32.7 | 34.5 | 34.3 | 32.2 | 33.2 | 35.1 | 33.8 | 33.5 | 32.5 |
| 218 | 34.9 | 34.7 | 32.8 | 32.9 | 32.9 | 32.7 | 32.7 | 32.8 | 34.6 | 34.5 | 32.4 | 33.4 | 35.3 | 34.0 | 33.7 | 32.6 |
| 220 | 35.0 | 34.9 | 32.9 | 33.1 | 33.1 | 32.9 | 32.9 | 32.9 | 34.8 | 34.7 | 32.5 | 33.5 | 35.5 | 34.1 | 33.8 | 32.8 |
| 222 | 35.2 | 35.1 | 33.1 | 33.2 | 33.2 | 33.0 | 33.0 | 33.1 | 35.0 | 34.8 | 32.7 | 33.7 | 35.6 | 34.3 | 34.0 | 33.0 |
| 224 | 35.4 | 35.3 | 33.2 | 33.4 | 33.4 | 33.2 | 33.2 | 33.2 | 35.2 | 35.0 | 32.8 | 33.8 | 35.8 | 34.5 | 34.1 | 33.1 |
| 226 | 35.6 | 35.5 | 33.4 | 33.5 | 33.6 | 33.3 | 33.3 | 33.4 | 35.3 | 35.2 | 33.0 | 34.0 | 36.0 | 34.6 | 34.3 | 33.3 |
| 228 | 35.7 | 35.6 | 33.5 | 33.7 | 33.7 | 33.5 | 33.5 | 33.5 | 35.5 | 35.4 | 33.1 | 34.1 | 36.2 | 34.8 | 34.5 | 33.4 |
| 230 | 35.9 | 35.8 | 33.7 | 33.9 | 33.9 | 33.6 | 33.6 | 33.6 | 35.7 | 35.5 | 33.2 | 34.3 | 36.3 | 35.0 | 34.6 | 33.5 |
| 232 | 36.1 | 36.0 | 33.9 | 34.0 | 34.0 | 33.8 | 33.8 | 33.8 | 35.8 | 35.7 | 33.4 | 34.4 | 36.5 | 35.1 | 34.8 | 33.7 |
| 234 | 36.2 | 36.2 | 34.0 | 34.2 | 34.2 | 33.9 | 33.9 | 33.9 | 36.0 | 35.9 | 33.5 | 34.5 | 36.7 | 35.3 | 34.9 | 33.8 |
| 236 | 36.4 | 36.3 | 34.2 | 34.3 | 34.4 | 34.1 | 34.1 | 34.0 | 36.2 | 36.0 | 33.6 | 34.7 | 36.8 | 35.4 | 35.1 | 34.0 |
| 238 | 36.5 | 36.5 | 34.3 | 34.5 | 34.5 | 34.3 | 34.3 | 34.2 | 36.3 | 36.2 | 33.7 | 34.8 | 37.0 | 35.6 | 35.2 | 34.1 |
| 240 | 36.7 | 36.7 | 34.5 | 34.6 | 34.7 | 34.4 | 34.4 | 34.3 | 36.5 | 36.4 | 33.9 | 34.9 | 37.2 | 35.8 | 35.4 | 34.2 |
| 242 | 36.9 | 36.8 | 34.6 | 34.8 | 34.8 | 34.6 | 34.6 | 34.4 | 36.7 | 36.5 | 34.0 | 35.0 | 37.3 | 35.9 | 35.5 | 34.4 |
| 244 | 37.0 | 37.0 | 34.8 | 34.9 | 35.0 | 34.7 | 34.7 | 34.5 | 36.8 | 36.7 | 34.1 | 35.2 | 37.5 | 36.1 | 35.7 | 34.5 |
| 246 | 37.2 | 37.2 | 34.9 | 35.1 | 35.1 | 34.9 | 34.9 | 34.7 | 37.0 | 36.8 | 34.2 | 35.3 | 37.7 | 36.2 | 35.8 | 34.6 |
| 248 | 37.3 | 37.4 | 35.1 | 35.3 | 35.3 | 35.0 | 35.0 | 34.8 | 37.2 | 37.0 | 34.3 | 35.4 | 37.8 | 36.4 | 35.9 | 34.8 |
| 250 | 37.5 | 37.5 | 35.2 | 35.4 | 35.5 | 35.2 | 35.2 | 34.9 | 37.3 | 37.2 | 34.5 | 35.5 | 38.0 | 36.5 | 36.1 | 34.9 |
| Min | 33 | 33 | 31 | 31 | 32 | 31 | 31 | 32 | 33 | 33 | 31 | 32 | 34 | 33 | 32 | 31 |
| Max | 38 | 38 | 35 | 35 | 35 | 35 | 35 | 35 | 37 | 37 | 34 | 36 | 38 | 37 | 36 | 35 |
| σ | 1.3 | 1.3 | 1.2 | 1.2 | 1.2 | 1.2 | 1.2 | 1.0 | 1.3 | 1.3 | 1.0 | 1.1 | 1.3 | 1.2 | 1.2 | 1.1 |
| $\overline{Y}$ | 36 | 35 | 33 | 33 | 34 | 33 | 33 | 33 | 35 | 35 | 33 | 34 | 36 | 35 | 34 | 33 |
| $\tilde{Y}$ | 36 | 35 | 33 | 34 | 34 | 33 | 33 | 33 | 35 | 35 | 33 | 34 | 36 | 35 | 34 | 33 |

[(Min) Minimum value; (Max) Maximum value; (σ) standard deviation value; ($\overline{Y}$) average value; ($\tilde{Y}$) median value]

TABLE 17

Trend Line Values |Y|φThB ≥ $U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 202 | 33.4 | 33.2 | 31.4 | 31.5 | 31.5 | 31.3 | 31.3 | 31.5 | 33.1 | 32.9 | 31.1 | 32.0 | 33.7 | 32.5 | 32.2 | 31.3 |
| 204 | 33.6 | 33.4 | 31.6 | 31.6 | 31.7 | 31.5 | 31.5 | 31.7 | 33.3 | 33.1 | 31.2 | 32.2 | 33.9 | 32.7 | 32.4 | 31.5 |
| 206 | 33.8 | 33.6 | 31.7 | 31.8 | 31.9 | 31.7 | 31.7 | 31.9 | 33.5 | 33.3 | 31.4 | 32.4 | 34.1 | 32.9 | 32.6 | 31.6 |
| 208 | 34.0 | 33.8 | 31.9 | 32.0 | 32.0 | 31.9 | 31.9 | 32.0 | 33.7 | 33.5 | 31.6 | 32.5 | 34.3 | 33.1 | 32.8 | 31.8 |
| 210 | 34.1 | 34.0 | 32.1 | 32.2 | 32.2 | 32.0 | 32.0 | 32.2 | 33.9 | 33.7 | 31.8 | 32.7 | 34.5 | 33.3 | 33.0 | 32.0 |
| 212 | 34.3 | 34.2 | 32.3 | 32.4 | 32.4 | 32.2 | 32.2 | 32.3 | 34.1 | 33.9 | 31.9 | 32.9 | 34.7 | 33.4 | 33.1 | 32.2 |
| 214 | 34.5 | 34.4 | 32.4 | 32.5 | 32.6 | 32.4 | 32.4 | 32.5 | 34.3 | 34.1 | 32.1 | 33.1 | 34.9 | 33.6 | 33.3 | 32.3 |
| 216 | 34.7 | 34.5 | 32.6 | 32.7 | 32.7 | 32.5 | 32.5 | 32.7 | 34.5 | 34.3 | 32.2 | 33.2 | 35.1 | 33.8 | 33.5 | 32.5 |

TABLE 17-continued

Trend Line Values $|Y|\phi ThB \geq U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 218 | 34.9 | 34.7 | 32.8 | 32.9 | 32.9 | 32.7 | 32.7 | 32.8 | 34.6 | 34.5 | 32.4 | 33.4 | 35.3 | 34.0 | 33.7 | 32.6 |
| 220 | 35.0 | 34.9 | 32.9 | 33.1 | 33.1 | 32.9 | 32.9 | 32.9 | 34.8 | 34.7 | 32.5 | 33.5 | 35.5 | 34.1 | 33.8 | 32.8 |
| 222 | 35.2 | 35.1 | 33.1 | 33.2 | 33.2 | 33.0 | 33.0 | 33.1 | 35.0 | 34.8 | 32.7 | 33.7 | 35.6 | 34.3 | 34.0 | 33.0 |
| 224 | 35.4 | 35.3 | 33.2 | 33.4 | 33.4 | 33.2 | 33.2 | 33.2 | 35.2 | 35.0 | 32.8 | 33.8 | 35.8 | 34.5 | 34.1 | 33.1 |
| 226 | 35.6 | 35.5 | 33.4 | 33.5 | 33.6 | 33.3 | 33.3 | 33.4 | 35.3 | 35.2 | 33.0 | 34.0 | 36.0 | 34.6 | 34.3 | 33.3 |
| 228 | 35.7 | 35.6 | 33.5 | 33.7 | 33.7 | 33.5 | 33.5 | 33.5 | 35.5 | 35.4 | 33.1 | 34.1 | 36.2 | 34.8 | 34.5 | 33.4 |
| 230 | 35.9 | 35.8 | 33.7 | 33.9 | 33.9 | 33.6 | 33.6 | 33.6 | 35.7 | 35.5 | 33.2 | 34.3 | 36.3 | 35.0 | 34.6 | 33.5 |
| 232 | 36.1 | 36.0 | 33.9 | 24.0 | 34.0 | 33.8 | 33.8 | 33.8 | 35.8 | 35.7 | 33.4 | 34.4 | 36.5 | 35.1 | 34.8 | 33.7 |
| 234 | 36.2 | 36.2 | 34.0 | 34.2 | 34.2 | 33.9 | 33.9 | 33.9 | 36.0 | 35.9 | 33.5 | 34.5 | 36.7 | 35.3 | 34.9 | 33.8 |
| 236 | 36.4 | 36.3 | 34.2 | 34.3 | 34.4 | 34.1 | 34.1 | 34.0 | 36.2 | 36.0 | 33.6 | 34.7 | 36.8 | 35.4 | 35.1 | 34.0 |
| 238 | 36.5 | 36.5 | 34.3 | 34.5 | 34.5 | 34.3 | 34.3 | 34.2 | 36.3 | 36.2 | 33.7 | 34.8 | 37.0 | 35.6 | 35.2 | 34.1 |
| 240 | 36.7 | 36.7 | 34.5 | 34.6 | 34.7 | 34.4 | 34.4 | 34.3 | 36.5 | 36.4 | 33.9 | 34.9 | 37.2 | 35.8 | 35.4 | 34.2 |
| 242 | 36.9 | 36.8 | 34.6 | 34.8 | 34.8 | 34.6 | 34.6 | 34.4 | 36.7 | 36.5 | 34.0 | 35.0 | 37.3 | 35.9 | 35.5 | 34.4 |
| 244 | 37.0 | 37.0 | 34.8 | 34.9 | 35.0 | 34.7 | 34.7 | 34.5 | 36.8 | 36.7 | 34.1 | 35.2 | 37.5 | 36.1 | 35.7 | 34.5 |
| 246 | 37.2 | 37.2 | 34.9 | 35.1 | 35.1 | 34.9 | 34.9 | 34.7 | 37.0 | 36.8 | 34.2 | 35.3 | 37.7 | 36.2 | 35.8 | 34.6 |
| 248 | 37.3 | 37.4 | 35.1 | 35.3 | 35.3 | 35.0 | 35.0 | 34.8 | 37.2 | 37.0 | 34.3 | 35.4 | 37.8 | 36.4 | 35.9 | 34.8 |
| 250 | 37.5 | 37.5 | 35.2 | 35.4 | 35.5 | 35.2 | 35.2 | 34.9 | 37.3 | 37.2 | 34.5 | 35.5 | 38.0 | 36.5 | 36.1 | 34.9 |
| Min | 33 | 33 | 31 | 31 | 32 | 31 | 31 | 32 | 33 | 33 | 31 | 32 | 34 | 33 | 32 | 31 |
| Max | 38 | 38 | 35 | 35 | 35 | 35 | 35 | 35 | 37 | 37 | 34 | 36 | 38 | 37 | 36 | 35 |
| σ | 1.3 | 1.3 | 1.2 | 1.2 | 1.2 | 1.2 | 1.2 | 1.0 | 1.3 | 1.3 | 1.0 | 1.1 | 1.3 | 1.2 | 1.2 | 1.1 |
| $\bar{Y}$ | 36 | 35 | 33 | 33 | 34 | 33 | 33 | 33 | 35 | 35 | 33 | 34 | 36 | 35 | 34 | 33 |
| $\tilde{Y}$ | 36 | 35 | 33 | 34 | 34 | 33 | 33 | 33 | 35 | 35 | 33 | 34 | 36 | 35 | 34 | 33 |

[(Min) Minimum value; (Max) Maximum value; (σ) standard deviation value; ($\bar{Y}$) average value; ($\tilde{Y}$) median value]

1.13. In Table 18, Table 19 and Table 20, the calculated values of $|Y|O_2HHb$ of each $TM^M$, at each intensity can be observed.

TABLE 18

Trend Line Values $|Y|O_2HHb$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 136 | 9.2 | 6.5 | 9.1 | 8.6 | 9.1 | 9.1 | 10.9 | 11.1 | 6.6 | 5.4 | 10.0 | 10.5 | 5.9 | 6.8 | 10.1 | 8.2 |
| 138 | 9.2 | 6.5 | 9.1 | 8.6 | 9.1 | 9.1 | 10.9 | 11.1 | 6.6 | 5.4 | 10.0 | 10.5 | 5.9 | 6.8 | 10.1 | 8.1 |
| 140 | 9.1 | 6.4 | 9.1 | 8.5 | 9.1 | 9.1 | 10.9 | 11.1 | 6.5 | 5.4 | 10.0 | 10.5 | 5.8 | 6.8 | 10.1 | 8.1 |
| 142 | 9.1 | 6.4 | 9.1 | 8.5 | 9.1 | 9.1 | 10.9 | 11.1 | 6.5 | 5.4 | 10.0 | 10.5 | 5.8 | 6.7 | 10.0 | 8.1 |
| 144 | 9.1 | 6.3 | 9.1 | 8.5 | 9.1 | 9.1 | 11.0 | 11.1 | 6.5 | 5.3 | 10.1 | 10.5 | 5.8 | 6.7 | 10.0 | 8.1 |
| 146 | 9.1 | 6.3 | 9.0 | 8.5 | 9.1 | 9.1 | 11.0 | 11.1 | 6.4 | 5.3 | 10.1 | 10.6 | 5.8 | 6.7 | 10.0 | 8.1 |
| 148 | 9.1 | 6.3 | 9.0 | 8.5 | 9.0 | 9.1 | 11.0 | 11.1 | 6.4 | 5.3 | 10.1 | 10.6 | 5.8 | 6.7 | 10.0 | 8.0 |
| 150 | 9.1 | 6.3 | 9.0 | 8.4 | 9.0 | 9.1 | 11.0 | 11.1 | 6.4 | 5.3 | 10.2 | 10.6 | 5.8 | 6.7 | 10.0 | 8.0 |
| 152 | 9.1 | 6.2 | 9.0 | 8.4 | 9.0 | 9.1 | 11.0 | 11.1 | 6.3 | 5.3 | 10.2 | 10.7 | 5.9 | 6.7 | 10.0 | 8.0 |
| 154 | 9.1 | 6.2 | 9.0 | 8.4 | 9.0 | 9.1 | 11.0 | 11.1 | 6.3 | 5.2 | 10.3 | 10.7 | 5.9 | 6.7 | 10.0 | 8.0 |
| 156 | 9.1 | 6.2 | 9.0 | 8.4 | 9.0 | 9.1 | 11.0 | 11.1 | 6.3 | 5.2 | 10.3 | 10.7 | 5.9 | 6.7 | 10.0 | 8.0 |
| 158 | 9.1 | 6.2 | 9.0 | 8.4 | 9.0 | 9.1 | 11.1 | 11.2 | 6.2 | 5.2 | 10.4 | 10.8 | 5.9 | 6.7 | 10.0 | 8.0 |
| 160 | 9.1 | 6.2 | 9.0 | 8.4 | 9.0 | 9.1 | 11.1 | 11.2 | 6.2 | 5.2 | 10.4 | 10.8 | 5.9 | 6.7 | 10.0 | 8.0 |
| 162 | 9.1 | 6.2 | 9.0 | 8.4 | 9.0 | 9.1 | 11.1 | 11.2 | 6.2 | 5.2 | 10.5 | 10.8 | 5.9 | 6.7 | 10.0 | 7.9 |
| 164 | 9.1 | 6.2 | 9.0 | 8.4 | 8.9 | 9.1 | 11.1 | 11.2 | 6.2 | 5.1 | 10.5 | 10.9 | 5.9 | 6.7 | 10.0 | 7.9 |
| 166 | 9.0 | 6.2 | 9.0 | 8.4 | 8.9 | 9.1 | 11.1 | 11.2 | 6.1 | 5.1 | 10.6 | 10.9 | 5.9 | 6.7 | 10.0 | 7.9 |
| 168 | 9.0 | 6.1 | 9.0 | 8.3 | 8.9 | 9.1 | 11.1 | 11.2 | 6.1 | 5.1 | 10.6 | 10.9 | 5.9 | 6.7 | 10.0 | 7.9 |
| 170 | 9.0 | 6.1 | 9.0 | 8.3 | 8.9 | 9.1 | 11.1 | 11.2 | 6.1 | 5.1 | 10.6 | 11.0 | 6.0 | 6.7 | 10.0 | 7.9 |
| 172 | 9.0 | 6.1 | 9.0 | 8.3 | 8.9 | 9.1 | 11.1 | 11.2 | 6.1 | 5.0 | 10.7 | 11.0 | 6.0 | 6.7 | 10.0 | 7.8 |
| 174 | 9.0 | 6.1 | 8.9 | 8.3 | 8.9 | 9.1 | 11.2 | 11.2 | 6.0 | 5.0 | 10.7 | 11.0 | 6.0 | 6.7 | 10.0 | 7.8 |
| 176 | 9.0 | 6.1 | 8.9 | 8.3 | 8.8 | 9.1 | 11.2 | 11.2 | 6.0 | 5.0 | 10.8 | 11.1 | 6.0 | 6.7 | 10.0 | 7.8 |
| 178 | 9.0 | 6.1 | 8.9 | 8.3 | 8.8 | 9.1 | 11.2 | 11.2 | 6.0 | 4.9 | 10.8 | 11.1 | 6.0 | 6.7 | 10.0 | 7.8 |
| 180 | 9.0 | 6.1 | 8.9 | 8.3 | 8.8 | 9.1 | 11.2 | 11.2 | 5.9 | 4.9 | 10.8 | 11.1 | 6.0 | 6.7 | 9.9 | 7.7 |
| 182 | 9.0 | 6.1 | 8.9 | 8.2 | 8.8 | 9.1 | 11.2 | 11.2 | 5.9 | 4.8 | 10.8 | 11.1 | 6.0 | 6.7 | 9.9 | 7.7 |
| 184 | 9.0 | 6.1 | 8.8 | 8.2 | 8.7 | 9.0 | 11.2 | 11.2 | 5.8 | 4.7 | 10.9 | 11.2 | 6.0 | 6.7 | 9.9 | 7.7 |
| 186 | 8.9 | 6.1 | 8.8 | 8.2 | 8.7 | 9.0 | 11.2 | 11.2 | 5.8 | 4.7 | 10.9 | 11.2 | 5.9 | 6.6 | 9.9 | 7.6 |
| 188 | 8.9 | 6.1 | 8.8 | 8.2 | 8.7 | 9.0 | 11.2 | 11.2 | 5.8 | 4.6 | 10.9 | 11.2 | 5.9 | 6.6 | 9.8 | 7.6 |
| 190 | 8.9 | 6.1 | 8.7 | 8.1 | 8.6 | 8.9 | 11.2 | 11.2 | 5.7 | 4.5 | 10.9 | 11.2 | 5.9 | 6.6 | 9.8 | 7.5 |
| 192 | 8.9 | 6.1 | 8.7 | 8.1 | 8.6 | 8.9 | 11.2 | 11.2 | 5.7 | 4.5 | 10.9 | 11.2 | 5.9 | 6.6 | 9.8 | 7.5 |
| 194 | 8.8 | 6.0 | 8.6 | 8.1 | 8.5 | 8.8 | 11.2 | 11.2 | 5.6 | 4.4 | 10.9 | 11.2 | 5.9 | 6.6 | 9.7 | 7.4 |
| 196 | 8.8 | 6.0 | 8.6 | 8.0 | 8.5 | 8.8 | 11.2 | 11.2 | 5.6 | 4.3 | 10.9 | 11.2 | 5.8 | 6.5 | 9.7 | 7.4 |
| 198 | 8.7 | 6.0 | 8.5 | 8.0 | 8.4 | 8.7 | 11.2 | 11.2 | 5.5 | 4.2 | 10.8 | 11.2 | 5.8 | 6.5 | 9.6 | 7.3 |
| 200 | 8.7 | 6.0 | 8.5 | 7.9 | 8.3 | 8.7 | 11.1 | 11.2 | 5.5 | 4.1 | 10.8 | 11.2 | 5.8 | 6.5 | 9.6 | 7.2 |

TABLE 18-continued

Trend Line Values $|Y|O_2HHb$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| Min | 8.7 | 6.0 | 8.5 | 7.9 | 8.3 | 8.7 | 10.9 | 11.1 | 5.5 | 4.1 | 10.0 | 10.5 | 5.8 | 6.5 | 9.6 | 7.2 |
| Max | 9.2 | 6.5 | 9.1 | 8.6 | 9.1 | 9.1 | 11.2 | 11.2 | 6.6 | 5.4 | 10.9 | 11.2 | 6.0 | 6.8 | 10.1 | 8.2 |
| σ | 0.1 | 0.1 | 0.2 | 0.2 | 0.2 | 0.1 | 0.1 | 0.1 | 0.3 | 0.4 | 0.3 | 0.3 | 0.1 | 0.1 | 0.1 | 0.3 |
| $\bar{Y}$ | 9.0 | 6.2 | 8.9 | 8.3 | 8.9 | 9.0 | 11.1 | 11.2 | 6.1 | 5.0 | 10.5 | 10.9 | 5.9 | 6.7 | 9.9 | 7.8 |
| $\tilde{Y}$ | 9.0 | 6.1 | 9.0 | 8.3 | 8.9 | 9.1 | 11.1 | 11.2 | 6.1 | 5.1 | 10.6 | 10.9 | 5.9 | 6.7 | 10.0 | 7.9 |

[(Min) Minimum value; (Max) Maximum value; (σ) standard deviation value; ($\bar{Y}$) average value; ($\tilde{Y}$) median value]

TABLE 19

Trend Line Values $|Y|O_2HHb$ between $U_{Ae}$ and $U_{ANA}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 202 | 8.7 | 5.9 | 8.4 | 7.9 | 8.3 | 8.6 | 11.1 | 11.2 | 5.4 | 4.0 | 10.8 | 11.2 | 5.7 | 6.5 | 9.5 | 7.2 |
| 204 | 8.6 | 5.9 | 8.4 | 7.8 | 8.2 | 8.5 | 11.1 | 11.2 | 5.3 | 3.9 | 10.8 | 11.2 | 5.7 | 6.4 | 9.5 | 7.1 |
| 206 | 8.6 | 5.9 | 8.3 | 7.7 | 8.1 | 8.5 | 11.1 | 11.1 | 5.3 | 3.8 | 10.7 | 11.1 | 5.6 | 6.4 | 9.4 | 7.0 |
| 208 | 8.5 | 5.8 | 8.2 | 7.7 | 8.1 | 8.4 | 11.1 | 11.1 | 5.2 | 3.7 | 10.7 | 11.1 | 5.6 | 6.4 | 9.4 | 6.9 |
| 210 | 8.5 | 5.8 | 8.2 | 7.6 | 8.0 | 8.3 | 11.0 | 11.1 | 5.2 | 3.6 | 10.6 | 11.1 | 5.5 | 6.3 | 9.3 | 6.9 |
| 212 | 8.4 | 5.7 | 8.1 | 7.5 | 7.9 | 8.2 | 11.0 | 11.1 | 5.1 | 3.5 | 10.6 | 11.1 | 5.5 | 6.3 | 9.2 | 6.8 |
| 214 | 8.3 | 5.7 | 8.0 | 7.5 | 7.8 | 8.1 | 11.0 | 11.1 | 5.0 | 3.4 | 10.5 | 11.0 | 5.4 | 6.2 | 9.1 | 6.7 |
| 216 | 8.3 | 5.6 | 7.9 | 7.4 | 7.7 | 8.0 | 11.0 | 11.1 | 5.0 | 3.3 | 10.4 | 11.0 | 5.4 | 6.2 | 9.1 | 6.6 |
| 218 | 8.2 | 5.6 | 7.9 | 7.3 | 7.6 | 7.9 | 10.9 | 11.0 | 4.9 | 3.2 | 10.4 | 11.0 | 5.3 | 6.1 | 9.0 | 6.5 |
| 220 | 8.1 | 5.5 | 7.8 | 7.2 | 7.6 | 7.8 | 10.9 | 11.0 | 4.8 | 3.1 | 10.3 | 10.9 | 5.2 | 6.1 | 8.9 | 6.4 |
| 222 | 8.1 | 5.5 | 7.7 | 7.2 | 7.5 | 7.7 | 10.9 | 11.0 | 4.8 | 3.0 | 10.2 | 10.9 | 5.2 | 6.1 | 8.8 | 6.3 |
| 224 | 8.0 | 5.4 | 7.6 | 7.1 | 7.4 | 7.6 | 10.8 | 11.0 | 4.7 | 3.0 | 10.1 | 10.8 | 5.1 | 6.0 | 8.7 | 6.2 |
| 226 | 7.9 | 5.4 | 7.5 | 7.0 | 7.3 | 7.5 | 10.8 | 10.9 | 4.6 | 2.9 | 10.1 | 10.8 | 5.1 | 6.0 | 8.6 | 6.1 |
| 228 | 7.9 | 5.3 | 7.4 | 6.9 | 7.2 | 7.4 | 10.8 | 10.9 | 4.6 | 2.8 | 10.0 | 10.7 | 5.0 | 5.9 | 8.5 | 6.0 |
| 230 | 7.8 | 5.2 | 7.3 | 6.8 | 7.1 | 7.3 | 10.7 | 10.9 | 4.5 | 2.7 | 9.9 | 10.7 | 4.9 | 5.9 | 8.4 | 5.9 |
| 232 | 7.7 | 5.2 | 7.3 | 6.8 | 7.0 | 7.1 | 10.7 | 10.9 | 4.4 | 2.6 | 9.8 | 10.6 | 4.9 | 5.8 | 8.3 | 5.8 |
| 234 | 7.6 | 5.1 | 7.2 | 6.7 | 6.9 | 7.0 | 10.7 | 10.9 | 4.4 | 2.5 | 9.7 | 10.6 | 4.8 | 5.8 | 8.2 | 5.7 |
| 236 | 7.6 | 5.0 | 7.1 | 6.6 | 6.8 | 6.9 | 10.6 | 10.8 | 4.3 | 2.5 | 9.6 | 10.5 | 4.8 | 5.7 | 8.1 | 5.5 |
| 238 | 7.5 | 5.0 | 7.0 | 6.5 | 6.7 | 6.8 | 10.6 | 10.8 | 4.2 | 2.4 | 9.6 | 10.5 | 4.7 | 5.7 | 8.0 | 5.4 |
| 240 | 7.4 | 4.9 | 6.9 | 6.4 | 6.6 | 6.7 | 10.6 | 10.8 | 4.2 | 2.4 | 9.5 | 10.5 | 4.6 | 5.7 | 7.9 | 5.3 |
| 242 | 7.3 | 4.8 | 6.9 | 6.3 | 6.5 | 6.6 | 10.5 | 10.8 | 4.1 | 2.3 | 9.4 | 10.4 | 4.6 | 5.6 | 7.8 | 5.2 |
| 244 | 7.3 | 4.8 | 6.8 | 6.3 | 6.4 | 6.5 | 10.5 | 10.7 | 4.1 | 2.3 | 9.3 | 10.4 | 4.5 | 5.6 | 7.7 | 5.1 |
| 246 | 7.2 | 4.7 | 6.7 | 6.2 | 6.3 | 6.4 | 10.5 | 10.7 | 4.0 | 2.2 | 9.2 | 10.3 | 4.5 | 5.5 | 7.6 | 5.0 |
| 248 | 7.1 | 4.6 | 6.6 | 6.1 | 6.2 | 6.3 | 10.4 | 10.7 | 4.0 | 2.2 | 9.2 | 10.3 | 4.4 | 5.5 | 7.5 | 4.9 |
| 250 | 7.0 | 4.5 | 6.6 | 6.0 | 6.1 | 6.2 | 10.4 | 10.7 | 3.9 | 2.2 | 9.1 | 10.3 | 4.4 | 5.5 | 7.4 | 4.8 |
| Min | 7.0 | 4.5 | 6.6 | 6.0 | 6.1 | 6.2 | 10.4 | 10.7 | 3.9 | 2.2 | 9.1 | 10.3 | 4.4 | 5.5 | 7.4 | 4.8 |
| Max | 8.7 | 5.9 | 8.4 | 7.9 | 8.3 | 8.6 | 11.1 | 11.2 | 5.4 | 4.0 | 10.8 | 11.2 | 5.7 | 6.5 | 9.5 | 7.2 |
| σ | 0.5 | 0.4 | 0.6 | 0.6 | 0.7 | 0.8 | 0.2 | 0.2 | 0.5 | 0.6 | 0.6 | 0.3 | 0.4 | 0.3 | 0.7 | 0.7 |
| $\bar{Y}$ | 7.9 | 5.3 | 7.5 | 7.0 | 7.2 | 7.4 | 10.8 | 10.9 | 4.6 | 3.0 | 10.0 | 10.8 | 5.1 | 6.0 | 8.6 | 6.1 |
| $\tilde{Y}$ | 7.9 | 5.4 | 7.5 | 7.0 | 7.3 | 7.5 | 10.8 | 10.9 | 4.6 | 2.9 | 10.1 | 10.8 | 5.1 | 6.0 | 8.6 | 6.1 |

[(Min) Minimum value; (Max) Maximum value; (σ) standard deviation value; ($\bar{Y}$) average value; ($\tilde{Y}$) median value]

TABLE 20

Trend Line Values $|Y|O_2HHb \geq U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 252 | 7.0 | 4.5 | 6.5 | 00 | 6.0 | 6.1 | 10.4 | 10.6 | 3.9 | 2.2 | 9.0 | 10.2 | 4.4 | 5.5 | 7.3 | 4.7 |
| 254 | 6.9 | 4.4 | 6.4 | 5.9 | 5.9 | 6.0 | 10.4 | 10.6 | 3.8 | 2.2 | 8.9 | 10.2 | 4.3 | 5.4 | 7.3 | 4.6 |
| 256 | 6.8 | 4.4 | 6.4 | 5.8 | 5.8 | 5.9 | 10.3 | 10.6 | 3.8 | 2.2 | 8.9 | 10.2 | 4.3 | 5.4 | 7.2 | 4.6 |
| 258 | 6.8 | 4.3 | 6.3 | 5.8 | 5.7 | 5.8 | 10.3 | 10.6 | 3.8 | 2.2 | 8.8 | 10.2 | 4.3 | 5.4 | 7.1 | 4.5 |
| 260 | 6.7 | 4.2 | 6.3 | 5.7 | 5.6 | 5.8 | 10.3 | 10.6 | 3.7 | 2.2 | 8.8 | 10.1 | 4.3 | 5.4 | 7.0 | 4.4 |
| 262 | 6.6 | 4.2 | 6.2 | 5.7 | 5.6 | 5.7 | 10.2 | 10.5 | 3.7 | 2.2 | 8.7 | 10.1 | 4.2 | 5.3 | 7.0 | 4.4 |
| 264 | 6.6 | 4.1 | 6.2 | 5.6 | 5.5 | 5.6 | 10.2 | 10.5 | 3.7 | 2.3 | 8.7 | 10.1 | 4.2 | 5.3 | 6.9 | 4.3 |

TABLE 20-continued

Trend Line Values $|Y|O_2HHb \geq U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 266 | 6.5 | 4.0 | 6.2 | 5.6 | 5.4 | 5.6 | 10.2 | 10.5 | 3.7 | 2.3 | 8.6 | 10.1 | 4.2 | 5.3 | 6.9 | 4.3 |
| 268 | 6.4 | 4.0 | 6.1 | 5.5 | 5.4 | 5.5 | 10.1 | 10.5 | 3.7 | 2.3 | 8.6 | 10.1 | 4.2 | 5.3 | 6.8 | 4.2 |
| 270 | 6.4 | 3.9 | 6.1 | 5.5 | 5.3 | 5.5 | 10.1 | 10.4 | 3.7 | 2.4 | 8.5 | 10.1 | 4.2 | 5.3 | 6.8 | 4.2 |
| 272 | 6.3 | 3.9 | 6.1 | 5.5 | 5.3 | 5.4 | 10.1 | 10.4 | 3.7 | 2.4 | 8.5 | 10.1 | 4.2 | 5.3 | 6.7 | 4.2 |
| 274 | 6.3 | 3.8 | 6.0 | 5.4 | 5.2 | 5.4 | 10.0 | 10.4 | 3.6 | 2.4 | 8.5 | 10.1 | 4.2 | 5.2 | 6.7 | 4.1 |
| 276 | 6.2 | 3.8 | 6.0 | 5.4 | 5.1 | 5.4 | 10.0 | 10.3 | 3.6 | 2.5 | 8.4 | 10.1 | 4.2 | 5.2 | 6.7 | 4.1 |
| 278 | 6.1 | 3.7 | 6.0 | 5.4 | 5.1 | 5.3 | 9.9 | 10.3 | 3.6 | 2.5 | 8.4 | 10.1 | 4.2 | 5.2 | 6.6 | 4.1 |
| 280 | 6.1 | 3.6 | 6.0 | 5.3 | 5.1 | 5.3 | 9.9 | 10.3 | 3.6 | 2.5 | 8.4 | 10.1 | 4.2 | 5.2 | 6.6 | 4.1 |
| 282 | 6.0 | 3.6 | 6.0 | 5.3 | 5.0 | 5.3 | 9.8 | 10.2 | 3.6 | 2.5 | 8.3 | 10.1 | 4.2 | 5.1 | 6.6 | 4.0 |
| 284 | 5.9 | 3.5 | 5.9 | 5.3 | 5.0 | 5.3 | 9.8 | 10.2 | 3.6 | 2.5 | 8.3 | 10.1 | 4.1 | 5.1 | 6.5 | 4.0 |
| 286 | 5.9 | 3.4 | 5.9 | 5.2 | 4.9 | 5.3 | 9.7 | 10.1 | 3.6 | 2.4 | 8.2 | 10.0 | 4.1 | 5.0 | 6.5 | 4.0 |
| 288 | 5.8 | 3.4 | 5.9 | 5.2 | 4.9 | 5.2 | 9.6 | 10.1 | 3.6 | 2.4 | 8.2 | 10.0 | 4.1 | 5.0 | 6.5 | 4.0 |
| 290 | 5.7 | 3.3 | 5.8 | 5.2 | 4.9 | 5.2 | 9.5 | 10.0 | 3.6 | 2.3 | 8.1 | 10.0 | 4.0 | 4.9 | 6.5 | 3.9 |
| 292 | 5.6 | 3.2 | 5.8 | 5.1 | 4.8 | 5.2 | 9.4 | 9.9 | 3.6 | 2.2 | 8.0 | 10.0 | 4.0 | 4.8 | 6.4 | 3.9 |
| 294 | 5.5 | 3.1 | 5.8 | 5.1 | 4.8 | 5.2 | 9.3 | 9.8 | 3.6 | 2.0 | 7.9 | 9.9 | 3.9 | 4.7 | 6.4 | 3.9 |
| 296 | 5.4 | 3.0 | 5.7 | 5.0 | 4.7 | 5.1 | 9.2 | 9.7 | 3.6 | 1.8 | 7.8 | 9.9 | 3.8 | 4.6 | 6.3 | 3.8 |
| 298 | 5.3 | 2.9 | 5.7 | 4.9 | 4.7 | 5.1 | 9.0 | 9.6 | 3.5 | 1.6 | 7.7 | 9.8 | 3.7 | 4.5 | 6.3 | 3.7 |
| 300 | 5.2 | 2.8 | 5.6 | 4.9 | 4.6 | 5.0 | 8.9 | 9.5 | 3.5 | 1.3 | 7.6 | 9.7 | 3.6 | 4.3 | 6.2 | 3.7 |
| Min | 5.2 | 2.8 | 5.6 | 4.9 | 4.6 | 5.0 | 8.9 | 9.5 | 3.5 | 1.3 | 7.6 | 9.7 | 3.6 | 4.3 | 6.2 | 3.7 |
| Max | 7.0 | 4.5 | 6.5 | 6.0 | 6.0 | 6.1 | 10.4 | 10.6 | 3.9 | 2.5 | 9.0 | 10.2 | 4.4 | 5.5 | 7.3 | 4.7 |
| σ | 0.5 | 0.5 | 0.2 | 0.3 | 0.4 | 0.3 | 0.4 | 0.3 | 0.1 | 0.3 | 0.4 | 0.1 | 0.2 | 0.3 | 0.3 | 0.3 |
| $\overline{Y}$ | 6.2 | 3.7 | 6.0 | 5.4 | 5.2 | 5.5 | 9.9 | 10.2 | 3.7 | 2.2 | 8.4 | 10.0 | 4.1 | 5.1 | 6.7 | 4.1 |
| $\tilde{Y}$ | 6.2 | 3.8 | 6.0 | 5.4 | 5.1 | 5.4 | 10.0 | 10.3 | 3.6 | 2.3 | 8.4 | 10.1 | 4.2 | 5.2 | 6.7 | 4.1 |

[(Min) Minimum value; (Max) Maximum value; (σ) standard deviation value; ($\overline{Y}$) average value; ($\tilde{Y}$) median value]

1.14. In Table 21, Table 22 and Table 23, the calculated values of $|Y|\Phi O_2HHb$ of each $TM^M$, at each intensity can be observed.

TABLE 21

Trend Line Values $|Y|\phi O_2HHb$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 136 | 19.2 | 13.7 | 19.1 | 18.2 | 19.2 | 19.3 | 22.8 | 22.9 | 13.7 | 11.5 | 21.1 | 22.0 | 12.3 | 14.2 | 21.2 | 17.2 |
| 138 | 19.3 | 13.7 | 19.2 | 18.2 | 19.3 | 19.4 | 23.0 | 23.1 | 13.7 | 11.5 | 21.2 | 22.2 | 12.4 | 14.3 | 21.3 | 17.2 |
| 140 | 19.4 | 13.7 | 19.3 | 18.2 | 19.4 | 19.5 | 23.1 | 23.3 | 13.7 | 11.5 | 21.4 | 22.3 | 12.4 | 14.3 | 21.4 | 17.3 |
| 142 | 19.5 | 13.7 | 19.4 | 18.3 | 19.5 | 19.6 | 23.3 | 23.4 | 13.7 | 11.4 | 21.5 | 22.5 | 12.5 | 14.4 | 21.5 | 17.3 |
| 144 | 19.6 | 13.7 | 19.4 | 18.3 | 19.5 | 19.7 | 23.4 | 23.6 | 13.7 | 11.4 | 21.7 | 22.7 | 12.6 | 14.4 | 21.6 | 17.4 |
| 146 | 19.7 | 13.7 | 19.5 | 18.4 | 19.6 | 19.8 | 23.6 | 23.8 | 13.8 | 11.4 | 21.9 | 22.9 | 12.6 | 14.5 | 21.7 | 17.5 |
| 148 | 19.8 | 13.7 | 19.6 | 18.4 | 19.7 | 19.9 | 23.8 | 24.0 | 13.8 | 11.4 | 22.1 | 23.0 | 12.7 | 14.6 | 21.8 | 17.5 |
| 150 | 19.9 | 13.7 | 19.7 | 18.5 | 19.8 | 20.0 | 24.0 | 24.2 | 13.8 | 11.4 | 22.3 | 23.2 | 12.8 | 14.7 | 21.9 | 17.6 |
| 152 | 20.0 | 13.8 | 19.8 | 18.6 | 19.9 | 20.1 | 24.1 | 24.4 | 13.8 | 11.4 | 22.5 | 23.4 | 12.9 | 14.7 | 22.1 | 17.6 |
| 154 | 20.1 | 13.8 | 19.9 | 18.6 | 20.0 | 20.2 | 24.3 | 24.6 | 13.9 | 11.4 | 22.7 | 23.6 | 13.0 | 14.8 | 22.2 | 17.7 |
| 156 | 20.2 | 13.9 | 20.0 | 18.7 | 20.1 | 20.3 | 24.5 | 24.8 | 13.9 | 11.4 | 22.9 | 23.9 | 13.1 | 14.9 | 22.3 | 17.8 |
| 158 | 20.4 | 13.9 | 20.1 | 18.8 | 20.2 | 20.5 | 24.7 | 25.0 | 13.9 | 11.4 | 23.1 | 24.1 | 13.2 | 15.0 | 22.5 | 17.8 |
| 160 | 20.5 | 14.0 | 20.2 | 18.9 | 20.3 | 20.6 | 24.9 | 25.2 | 14.0 | 11.5 | 23.4 | 24.3 | 13.3 | 15.1 | 22.6 | 17.9 |
| 162 | 20.6 | 14.0 | 20.3 | 19.0 | 20.3 | 20.7 | 25.1 | 25.4 | 14.0 | 11.5 | 23.6 | 24.5 | 13.4 | 15.2 | 22.7 | 18.0 |
| 164 | 20.7 | 14.1 | 20.4 | 19.0 | 20.4 | 20.8 | 25.3 | 25.6 | 14.1 | 11.5 | 23.8 | 24.7 | 13.5 | 15.3 | 22.8 | 18.0 |
| 166 | 20.8 | 14.1 | 20.6 | 19.1 | 20.5 | 20.9 | 25.5 | 25.9 | 14.1 | 11.5 | 24.1 | 25.0 | 13.6 | 15.4 | 23.0 | 18.1 |
| 168 | 20.9 | 14.2 | 20.7 | 19.2 | 20.6 | 21.0 | 25.7 | 26.1 | 14.1 | 11.5 | 24.3 | 25.2 | 13.7 | 15.5 | 23.1 | 18.2 |
| 170 | 21.1 | 14.3 | 20.8 | 19.3 | 20.7 | 21.1 | 25.9 | 26.3 | 14.2 | 11.4 | 24.6 | 25.4 | 13.8 | 15.6 | 23.2 | 18.2 |
| 172 | 21.2 | 14.3 | 20.9 | 19.4 | 20.8 | 21.2 | 26.1 | 26.5 | 14.2 | 11.4 | 24.8 | 25.7 | 13.9 | 15.7 | 23.3 | 18.3 |
| 174 | 21.3 | 14.4 | 20.9 | 19.5 | 20.8 | 21.3 | 26.3 | 26.7 | 14.2 | 11.4 | 25.0 | 25.9 | 14.0 | 15.8 | 23.5 | 18.3 |
| 176 | 21.4 | 14.5 | 21.0 | 19.5 | 20.9 | 21.4 | 26.5 | 26.9 | 14.3 | 11.4 | 25.3 | 26.1 | 14.1 | 15.8 | 23.6 | 18.4 |
| 178 | 21.5 | 14.5 | 21.1 | 19.6 | 20.9 | 21.5 | 26.7 | 27.1 | 14.3 | 11.4 | 25.5 | 26.4 | 14.2 | 15.9 | 23.7 | 18.4 |
| 180 | 21.6 | 14.6 | 21.2 | 19.7 | 21.0 | 21.5 | 26.9 | 27.3 | 14.3 | 11.3 | 25.7 | 26.6 | 14.2 | 16.0 | 23.8 | 18.4 |
| 182 | 21.6 | 14.7 | 21.3 | 19.7 | 21.0 | 21.6 | 27.1 | 27.5 | 14.3 | 11.3 | 25.9 | 26.8 | 14.3 | 16.1 | 23.9 | 18.5 |
| 184 | 21.7 | 14.7 | 21.3 | 19.8 | 21.1 | 21.7 | 27.3 | 27.7 | 14.3 | 11.2 | 26.1 | 27.0 | 14.4 | 16.2 | 24.0 | 18.5 |
| 186 | 21.8 | 14.8 | 21.4 | 19.9 | 21.1 | 21.7 | 27.5 | 27.9 | 14.3 | 11.1 | 26.3 | 27.2 | 14.4 | 16.2 | 24.0 | 18.5 |
| 188 | 21.9 | 14.8 | 21.5 | 19.9 | 21.1 | 21.7 | 27.7 | 28.0 | 14.3 | 11.1 | 26.5 | 27.4 | 14.5 | 16.3 | 24.1 | 18.5 |
| 190 | 21.9 | 14.9 | 21.5 | 19.9 | 21.2 | 21.8 | 27.8 | 28.2 | 14.3 | 11.0 | 26.7 | 27.6 | 14.5 | 16.3 | 24.2 | 18.5 |
| 192 | 22.0 | 14.9 | 21.5 | 20.0 | 21.2 | 21.8 | 28.0 | 28.4 | 14.3 | 10.9 | 26.9 | 27.8 | 14.5 | 16.4 | 24.2 | 18.5 |
| 194 | 22.0 | 14.9 | 21.6 | 20.0 | 21.2 | 21.8 | 28.2 | 28.5 | 14.2 | 10.8 | 27.1 | 28.0 | 14.6 | 16.4 | 24.3 | 18.5 |
| 196 | 22.1 | 15.0 | 21.6 | 20.0 | 21.2 | 21.8 | 28.3 | 28.7 | 14.2 | 10.7 | 27.2 | 28.2 | 14.6 | 16.5 | 24.3 | 18.4 |
| 198 | 22.1 | 15.0 | 21.6 | 20.0 | 21.1 | 21.8 | 28.5 | 28.8 | 14.1 | 10.6 | 27.4 | 28.4 | 14.6 | 16.5 | 24.4 | 18.4 |

TABLE 21-continued

Trend Line Values $|Y|\phi O_2HHb$ between $U_{Amin}$ and $U_{Ae}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 200 | 22.1 | 15.0 | 21.6 | 20.1 | 21.1 | 21.8 | 28.6 | 28.9 | 14.1 | 10.5 | 27.5 | 28.6 | 14.6 | 16.5 | 24.4 | 18.3 |
| Min | 19.2 | 13.7 | 19.1 | 18.2 | 19.2 | 19.3 | 22.8 | 22.9 | 13.7 | 10.5 | 21.1 | 22.0 | 12.3 | 14.2 | 21.2 | 17.2 |
| Max | 22.1 | 15.0 | 21.6 | 20.1 | 21.2 | 21.8 | 28.6 | 28.9 | 14.3 | 11.5 | 27.5 | 28.6 | 14.6 | 16.5 | 24.4 | 18.5 |
| σ | 1.0 | 0.5 | 0.8 | 0.7 | 0.7 | 0.9 | 1.8 | 1.9 | 0.2 | 0.3 | 2.1 | 2.1 | 0.8 | 0.8 | 1.1 | 0.4 |
| $\overline{Y}$ | 20.8 | 14.3 | 20.6 | 19.2 | 20.4 | 20.8 | 25.7 | 26.0 | 14.0 | 11.3 | 24.3 | 25.2 | 13.6 | 15.4 | 23.0 | 18.0 |
| $\tilde{Y}$ | 20.9 | 14.2 | 20.7 | 19.2 | 20.6 | 21.0 | 25.7 | 26.1 | 14.1 | 11.4 | 24.3 | 25.2 | 13.7 | 15.5 | 23.1 | 18.2 |

[(Min) Minimum value; (Max) Maximum value; (σ) standard deviation value; ($\overline{Y}$) average value; ($\tilde{Y}$) median value]

TABLE 22

Trend Line Values $|Y|\phi O_2HHb$ between $U_{Ae}$ and $U_{ANA}$.

| Watts | RFL | RFR | VLL | VLR | STL | STR | GML | GMRef | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 202 | 22.1 | 15.0 | 21.6 | 20.1 | 21.1 | 21.8 | 28.8 | 29.1 | 14.0 | 10.3 | 27.6 | 28.7 | 14.6 | 16.6 | 24.4 | 18.3 |
| 204 | 22.2 | 15.0 | 21.6 | 20.0 | 21.0 | 21.7 | 28.9 | 29.2 | 14.0 | 10.2 | 27.7 | 28.9 | 14.6 | 16.6 | 24.4 | 18.2 |
| 206 | 22.2 | 15.0 | 21.6 | 20.0 | 21.0 | 21.7 | 29.1 | 29.3 | 13.9 | 10.1 | 27.8 | 29.0 | 14.5 | 16.6 | 24.4 | 18.1 |
| 208 | 22.2 | 15.0 | 21.6 | 20.0 | 20.9 | 21.6 | 29.2 | 29.4 | 13.8 | 9.9 | 27.9 | 29.2 | 14.5 | 16.6 | 24.4 | 18.1 |
| 210 | 22.2 | 15.0 | 21.5 | 20.0 | 20.9 | 21.5 | 29.3 | 29.5 | 13.7 | 9.8 | 28.0 | 29.3 | 14.5 | 16.6 | 24.4 | 18.0 |
| 212 | 22.1 | 15.0 | 21.5 | 19.9 | 20.8 | 21.5 | 29.4 | 29.6 | 13.6 | 9.6 | 28.1 | 29.4 | 14.4 | 16.6 | 24.4 | 17.9 |
| 214 | 22.1 | 15.0 | 21.4 | 19.9 | 20.7 | 21.4 | 29.6 | 29.7 | 13.5 | 9.4 | 28.1 | 29.5 | 14.4 | 16.6 | 24.3 | 17.8 |
| 216 | 22.1 | 14.9 | 21.4 | 19.9 | 20.6 | 21.3 | 29.7 | 29.8 | 13.4 | 9.3 | 28.2 | 29.6 | 14.4 | 16.6 | 24.3 | 17.6 |
| 218 | 22.1 | 14.9 | 21.3 | 19.8 | 20.5 | 21.2 | 29.8 | 29.9 | 13.3 | 9.1 | 28.2 | 29.7 | 14.3 | 16.6 | 24.2 | 17.5 |
| 220 | 22.0 | 14.9 | 21.2 | 19.7 | 20.4 | 21.1 | 29.9 | 30.0 | 13.2 | 8.9 | 28.2 | 29.8 | 14.2 | 16.6 | 24.1 | 17.3 |
| 222 | 22.0 | 14.8 | 21.2 | 19.7 | 20.3 | 20.9 | 30.0 | 30.1 | 13.1 | 8.8 | 28.2 | 29.9 | 14.2 | 16.6 | 24.1 | 17.2 |
| 224 | 21.9 | 14.8 | 21.1 | 19.6 | 20.2 | 20.8 | 30.0 | 30.2 | 13.0 | 8.6 | 28.2 | 30.0 | 14.1 | 16.6 | 24.0 | 17.0 |
| 226 | 21.9 | 14.7 | 21.0 | 19.5 | 20.1 | 20.7 | 30.1 | 30.3 | 12.9 | 8.4 | 28.2 | 30.1 | 14.0 | 16.6 | 23.9 | 16.9 |
| 228 | 21.8 | 14.7 | 20.9 | 19.4 | 19.9 | 20.5 | 30.2 | 30.4 | 12.7 | 8.3 | 28.2 | 30.2 | 14.0 | 16.5 | 23.8 | 16.7 |
| 230 | 21.8 | 14.6 | 20.8 | 19.3 | 19.8 | 20.4 | 30.3 | 30.4 | 12.6 | 8.1 | 28.1 | 30.2 | 13.9 | 16.5 | 23.7 | 16.5 |
| 232 | 21.7 | 14.5 | 20.7 | 19.2 | 19.6 | 20.2 | 30.4 | 30.5 | 12.5 | 7.9 | 28.1 | 30.3 | 13.8 | 16.5 | 23.5 | 16.3 |
| 234 | 21.7 | 14.5 | 20.6 | 19.1 | 19.5 | 20.1 | 30.4 | 30.6 | 12.4 | 7.8 | 28.0 | 30.3 | 13.8 | 16.5 | 23.4 | 16.2 |
| 236 | 21.6 | 14.4 | 20.5 | 19.0 | 19.3 | 19.9 | 30.5 | 30.7 | 12.3 | 7.6 | 28.0 | 30.4 | 13.7 | 16.5 | 23.3 | 16.0 |
| 238 | 21.5 | 14.3 | 20.4 | 18.9 | 19.2 | 19.8 | 30.5 | 30.8 | 12.2 | 7.5 | 27.9 | 30.4 | 13.6 | 16.5 | 23.2 | 15.8 |
| 240 | 21.4 | 14.2 | 20.2 | 18.8 | 19.0 | 19.6 | 30.6 | 30.9 | 12.0 | 7.4 | 27.8 | 30.5 | 13.6 | 16.4 | 23.0 | 15.6 |
| 242 | 21.4 | 14.1 | 20.1 | 18.7 | 18.9 | 19.4 | 30.6 | 30.9 | 11.9 | 7.3 | 27.7 | 30.5 | 13.5 | 16.4 | 22.9 | 15.4 |
| 244 | 21.3 | 14.1 | 20.0 | 18.6 | 18.7 | 19.3 | 30.7 | 31.0 | 11.8 | 7.1 | 27.6 | 30.6 | 13.5 | 16.4 | 22.8 | 15.2 |
| 246 | 21.2 | 14.0 | 19.9 | 18.4 | 18.6 | 19.1 | 30.7 | 31.1 | 11.7 | 7.0 | 27.5 | 30.6 | 13.4 | 16.4 | 22.6 | 15.0 |
| 248 | 21.1 | 13.9 | 19.8 | 18.3 | 18.4 | 18.9 | 30.8 | 31.2 | 11.7 | 6.9 | 27.4 | 30.6 | 13.4 | 16.4 | 22.5 | 14.9 |
| 250 | 21.0 | 13.8 | 19.7 | 18.2 | 18.2 | 18.8 | 30.8 | 31.3 | 11.6 | 6.9 | 27.3 | 30.7 | 13.3 | 16.4 | 22.3 | 14.7 |
| Min | 21.0 | 13.8 | 19.7 | 18.2 | 18.2 | 18.8 | 28.8 | 29.1 | 11.6 | 6.9 | 27.3 | 28.7 | 13.3 | 16.4 | 22.3 | 14.7 |
| Max | 22.2 | 15.0 | 21.6 | 20.1 | 21.1 | 21.8 | 30.8 | 31.3 | 14.0 | 10.3 | 28.2 | 30.7 | 14.6 | 16.6 | 24.4 | 18.3 |
| σ | 0.4 | 0.4 | 0.6 | 0.6 | 0.9 | 1.0 | 0.6 | 0.7 | 0.8 | 1.1 | 0.3 | 0.6 | 0.4 | 0.1 | 0.7 | 1.2 |
| $\overline{Y}$ | 21.8 | 14.6 | 20.9 | 19.4 | 19.9 | 20.5 | 30.0 | 30.2 | 12.8 | 8.5 | 27.9 | 29.9 | 14.0 | 16.5 | 23.7 | 16.7 |
| $\tilde{Y}$ | 21.9 | 14.7 | 21.0 | 19.5 | 20.1 | 20.7 | 30.1 | 30.3 | 12.9 | 8.4 | 28.0 | 30.1 | 14.0 | 16.6 | 23.9 | 16.9 |

[(Min) Minimum value; (Max) Maximum value; (σ) standard deviation value; ($\overline{Y}$) average value; ($\tilde{Y}$) median value]

TABLE 23

Trend Line Values $|Y|\phi O_2HHb \geq U_{Ana}$.

| Watts | RFL | RFR | VLL | VLR | STL | STR | GML | GMR | VIL | VIR | GAL | GAR | TAL | TAR | Lim Sup \|Zona Op\| | Lim Inf \|Zona Op\| |
|---|---|---|---|---|---|---|---|---|---|---|---|---|---|---|---|---|
| 252 | 20.9 | 13.7 | 19.5 | 18.1 | 18.1 | 18.6 | 30.9 | 31.4 | 11.5 | 6.8 | 27.2 | 30.7 | 13.3 | 16.4 | 22.2 | 14.5 |
| 254 | 20.8 | 13.6 | 19.4 | 18.0 | 17.9 | 18.4 | 30.9 | 31.5 | 11.4 | 6.7 | 27.0 | 30.7 | 13.2 | 16.4 | 22.1 | 14.3 |
| 256 | 20.7 | 13.4 | 19.3 | 17.8 | 17.7 | 18.3 | 30.9 | 31.6 | 11.4 | 6.7 | 26.9 | 30.7 | 13.2 | 16.4 | 21.9 | 14.2 |
| 258 | 20.6 | 13.3 | 19.2 | 17.7 | 17.6 | 18.1 | 30.9 | 31.7 | 11.3 | 6.7 | 26.8 | 30.8 | 13.2 | 16.4 | 21.8 | 14.0 |
| 260 | 20.5 | 13.2 | 19.1 | 17.6 | 17.4 | 17.9 | 30.9 | 31.8 | 11.3 | 6.7 | 26.7 | 30.8 | 13.2 | 16.3 | 21.7 | 13.8 |
| 262 | 20.4 | 13.1 | 19.0 | 17.5 | 17.2 | 17.8 | 31.0 | 31.8 | 11.2 | 6.6 | 26.5 | 30.8 | 13.1 | 16.3 | 21.5 | 13.7 |

TABLE 23-continued

Trend Line Values $|Y|\phi O_2 HHb \geq U_{Ana}$.

| Watts | RF L | RF R | VL L | VL R | ST L | ST R | GM L | GM R | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 264 | 20.3 | 12.9 | 18.9 | 17.3 | 17.1 | 17.6 | 31.0 | 31.9 | 11.2 | 6.7 | 26.4 | 30.8 | 13.1 | 16.3 | 21.4 | 13.5 |
| 266 | 20.2 | 12.8 | 18.8 | 17.2 | 16.9 | 17.4 | 31.0 | 32.0 | 11.2 | 6.7 | 26.3 | 30.9 | 13.1 | 16.3 | 21.3 | 13.4 |
| 268 | 20.0 | 12.6 | 18.7 | 17.1 | 16.7 | 17.3 | 30.9 | 32.1 | 11.2 | 6.7 | 26.2 | 30.9 | 13.1 | 16.3 | 21.2 | 13.2 |
| 270 | 19.9 | 12.5 | 18.7 | 17.0 | 16.5 | 17.1 | 30.9 | 32.1 | 11.2 | 6.7 | 26.0 | 30.9 | 13.0 | 16.3 | 21.0 | 13.1 |
| 272 | 19.7 | 12.3 | 18.6 | 16.9 | 16.4 | 17.0 | 30.9 | 32.2 | 11.2 | 6.8 | 25.9 | 30.9 | 13.0 | 16.2 | 20.9 | 12.9 |
| 274 | 19.6 | 12.1 | 18.5 | 16.7 | 16.2 | 16.8 | 30.8 | 32.2 | 11.2 | 6.8 | 25.8 | 30.9 | 13.0 | 16.2 | 20.8 | 12.8 |
| 276 | 19.4 | 11.9 | 18.4 | 16.6 | 16.0 | 16.7 | 30.8 | 32.2 | 11.2 | 6.9 | 25.6 | 31.0 | 12.9 | 16.1 | 20.6 | 12.7 |
| 278 | 19.2 | 11.6 | 18.4 | 16.5 | 15.8 | 16.5 | 30.7 | 32.2 | 11.2 | 6.9 | 25.5 | 31.0 | 12.9 | 16.0 | 20.5 | 12.5 |
| 280 | 18.9 | 11.4 | 18.3 | 16.4 | 15.7 | 16.3 | 30.6 | 32.2 | 11.3 | 7.0 | 25.4 | 31.0 | 12.8 | 15.9 | 20.3 | 12.4 |
| 282 | 18.7 | 11.1 | 18.3 | 16.2 | 15.5 | 16.2 | 30.5 | 32.1 | 11.3 | 7.0 | 25.3 | 31.0 | 12.7 | 15.8 | 20.2 | 12.2 |
| 284 | 18.4 | 10.8 | 18.2 | 16.1 | 15.3 | 16.0 | 30.4 | 32.0 | 11.3 | 7.0 | 25.1 | 31.0 | 12.7 | 15.7 | 20.0 | 12.1 |
| 286 | 18.1 | 10.4 | 18.1 | 16.0 | 15.1 | 15.8 | 30.2 | 31.8 | 11.3 | 7.1 | 25.0 | 30.9 | 12.5 | 15.5 | 19.9 | 11.9 |
| 288 | 17.7 | 10.1 | 18.1 | 15.8 | 14.8 | 15.6 | 30.0 | 31.7 | 11.3 | 7.1 | 24.9 | 30.9 | 12.4 | 15.3 | 19.7 | 11.7 |
| 290 | 17.3 | 9.6 | 18.0 | 15.7 | 14.6 | 15.4 | 29.8 | 31.4 | 11.4 | 7.1 | 24.7 | 30.8 | 12.2 | 15.1 | 19.5 | 11.6 |
| 292 | 16.9 | 9.2 | 18.0 | 15.5 | 14.4 | 15.2 | 29.5 | 31.2 | 11.4 | 7.0 | 24.6 | 30.8 | 12.0 | 14.8 | 19.3 | 11.4 |
| 294 | 16.4 | 8.7 | 17.9 | 15.3 | 14.1 | 15.0 | 29.3 | 30.8 | 11.3 | 7.0 | 24.4 | 30.7 | 11.7 | 14.5 | 19.1 | 11.2 |
| 296 | 15.9 | 8.1 | 17.8 | 15.1 | 13.8 | 14.7 | 28.9 | 30.4 | 11.3 | 6.9 | 24.2 | 30.6 | 11.4 | 14.1 | 18.9 | 10.9 |
| 298 | 15.3 | 7.5 | 17.7 | 14.9 | 13.5 | 14.5 | 28.5 | 29.9 | 11.2 | 6.7 | 24.1 | 30.5 | 11.1 | 13.7 | 18.7 | 10.7 |
| 300 | 14.7 | 6.8 | 17.6 | 14.7 | 13.2 | 14.2 | 28.1 | 29.3 | 11.2 | 6.5 | 23.9 | 30.3 | 10.6 | 13.2 | 18.4 | 10.4 |
| Min | 14.7 | 6.8 | 17.6 | 14.7 | 13.2 | 14.2 | 28.1 | 29.3 | 11.2 | 6.5 | 23.9 | 30.3 | 10.6 | 13.2 | 18.4 | 10.4 |
| Max | 20.9 | 13.7 | 19.5 | 18.1 | 18.1 | 18.6 | 31.0 | 32.2 | 11.5 | 7.1 | 27.2 | 31.0 | 13.3 | 16.4 | 22.2 | 14.5 |
| σ | 1.8 | 2.0 | 0.6 | 1.0 | 1.4 | 1.3 | 0.8 | 0.7 | 0.1 | 0.2 | 1.0 | 0.2 | 0.7 | 0.9 | 1.1 | 1.2 |
| $\overline{Y}$ | 18.8 | 11.3 | 18.5 | 16.5 | 15.9 | 16.6 | 30.3 | 31.6 | 11.3 | 6.8 | 25.6 | 30.8 | 12.6 | 15.7 | 20.5 | 12.6 |
| $\tilde{Y}$ | 19.4 | 11.9 | 18.4 | 16.6 | 16.0 | 16.7 | 30.8 | 31.8 | 11.3 | 6.8 | 25.6 | 30.8 | 12.9 | 16.1 | 20.6 | 12.7 |

[(Min) Minimum value; (Max) Maximum value; (σ) standard deviation value; ($\overline{Y}$) average value; ($\tilde{Y}$) median value]

1.15. In Table 24, Table 25 and Table 26, the calculated values of $|Y|HHb$ of each $TM^M$, at each intensity can be observed.

TABLE 24

Trend Line Values $|Y|HHb$ between $U_{Amin}$ and $U_{Ae}$.

| Watts | RF L | RF R | VL L | VL R | ST L | ST R | GM L | GM Ref | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 136 | 3.6 | 6.1 | 3.0 | 3.5 | 3.5 | 2.9 | 1.2 | 1.1 | 5.9 | 6.9 | 1.9 | 1.7 | 7.0 | 5.8 | 4.5 | 2.4 |
| 138 | 3.7 | 6.2 | 3.0 | 3.5 | 3.5 | 2.9 | 1.2 | 1.1 | 6.0 | 7.0 | 1.9 | 1.7 | 7.0 | 5.8 | 4.6 | 2.5 |
| 140 | 3.7 | 6.2 | 3.0 | 3.5 | 3.5 | 2.9 | 1.2 | 1.1 | 6.0 | 7.0 | 1.8 | 1.7 | 7.0 | 5.8 | 4.6 | 2.5 |
| 142 | 3.7 | 6.2 | 3.0 | 3.6 | 3.6 | 2.9 | 1.2 | 1.1 | 6.0 | 7.1 | 1.8 | 1.7 | 7.1 | 5.8 | 4.6 | 2.5 |
| 144 | 3.7 | 6.3 | 3.0 | 3.6 | 3.6 | 2.9 | 1.2 | 1.1 | 6.1 | 7.1 | 1.8 | 1.6 | 7.1 | 5.8 | 4.7 | 2.5 |
| 146 | 3.7 | 6.3 | 3.0 | 3.6 | 3.6 | 2.9 | 1.2 | 1.1 | 6.1 | 7.2 | 1.8 | 1.6 | 7.1 | 5.8 | 4.7 | 2.5 |
| 148 | 3.7 | 6.3 | 3.0 | 3.6 | 3.6 | 2.9 | 1.2 | 1.1 | 6.2 | 7.2 | 1.7 | 1.6 | 7.0 | 5.8 | 4.7 | 2.5 |
| 150 | 3.7 | 6.3 | 3.0 | 3.6 | 3.6 | 2.9 | 1.2 | 1.0 | 6.2 | 7.2 | 1.7 | 1.6 | 7.0 | 5.8 | 4.7 | 2.5 |
| 152 | 3.7 | 6.4 | 3.0 | 3.6 | 3.6 | 2.9 | 1.1 | 1.0 | 6.2 | 7.3 | 1.7 | 1.5 | 7.0 | 5.8 | 4.7 | 2.5 |
| 154 | 3.7 | 6.4 | 3.0 | 3.6 | 3.6 | 2.9 | 1.1 | 1.0 | 6.3 | 7.3 | 1.6 | 1.5 | 7.0 | 5.8 | 4.8 | 2.5 |
| 156 | 3.7 | 6.4 | 3.0 | 3.6 | 3.6 | 2.9 | 1.1 | 1.0 | 6.3 | 7.4 | 1.6 | 1.5 | 7.0 | 5.8 | 4.8 | 2.5 |
| 158 | 3.7 | 6.4 | 3.0 | 3.7 | 3.7 | 2.9 | 1.1 | 1.0 | 6.3 | 7.4 | 1.6 | 1.4 | 7.0 | 5.8 | 4.8 | 2.5 |
| 160 | 3.8 | 6.4 | 3.0 | 3.7 | 3.7 | 2.9 | 1.1 | 1.0 | 6.4 | 7.5 | 1.5 | 1.4 | 7.0 | 5.8 | 4.8 | 2.5 |
| 162 | 3.8 | 6.4 | 3.1 | 3.7 | 3.7 | 2.9 | 1.1 | 1.0 | 6.4 | 7.5 | 1.5 | 1.4 | 7.0 | 5.7 | 4.8 | 2.5 |
| 164 | 3.8 | 6.5 | 3.1 | 3.7 | 3.7 | 2.9 | 1.1 | 1.0 | 6.4 | 7.5 | 1.4 | 1.3 | 7.0 | 5.7 | 4.8 | 2.5 |
| 166 | 3.8 | 6.5 | 3.1 | 3.7 | 3.7 | 2.9 | 1.0 | 1.0 | 6.5 | 7.6 | 1.4 | 1.3 | 7.0 | 5.7 | 4.9 | 2.5 |
| 168 | 3.8 | 6.5 | 3.1 | 3.7 | 3.7 | 2.9 | 1.0 | 0.9 | 6.5 | 7.6 | 1.3 | 1.3 | 7.0 | 5.7 | 4.9 | 2.5 |
| 170 | 3.8 | 6.5 | 3.1 | 3.7 | 3.7 | 2.9 | 1.0 | 0.9 | 6.5 | 7.7 | 1.3 | 1.3 | 7.0 | 5.7 | 4.9 | 2.5 |
| 172 | 3.8 | 6.5 | 3.1 | 3.7 | 3.7 | 2.9 | 1.0 | 0.9 | 6.6 | 7.7 | 1.3 | 1.2 | 7.0 | 5.7 | 4.9 | 2.5 |
| 174 | 3.8 | 6.5 | 3.1 | 3.7 | 3.7 | 2.9 | 1.0 | 0.9 | 6.6 | 7.8 | 1.2 | 1.2 | 7.0 | 5.7 | 5.0 | 2.5 |
| 176 | 3.8 | 6.5 | 3.1 | 3.8 | 3.8 | 2.9 | 1.0 | 0.9 | 6.7 | 7.8 | 1.2 | 1.2 | 7.0 | 5.7 | 5.0 | 2.6 |
| 178 | 3.8 | 6.5 | 3.2 | 3.8 | 3.8 | 2.9 | 1.0 | 0.9 | 6.7 | 7.9 | 1.2 | 1.1 | 7.0 | 5.7 | 5.0 | 2.6 |
| 180 | 3.8 | 6.6 | 3.2 | 3.8 | 3.8 | 3.0 | 1.0 | 0.9 | 6.8 | 7.9 | 1.1 | 1.1 | 7.0 | 5.7 | 5.0 | 2.6 |
| 182 | 3.9 | 6.6 | 3.2 | 3.8 | 3.8 | 3.0 | 1.0 | 0.9 | 6.8 | 8.0 | 1.1 | 1.1 | 7.0 | 5.7 | 5.1 | 2.6 |
| 184 | 3.9 | 6.6 | 3.2 | 3.9 | 3.9 | 3.0 | 1.0 | 0.9 | 6.8 | 8.1 | 1.1 | 1.1 | 7.0 | 5.7 | 5.1 | 2.6 |
| 186 | 3.9 | 6.6 | 3.3 | 3.9 | 3.9 | 3.0 | 1.0 | 0.9 | 6.9 | 8.1 | 1.1 | 1.1 | 7.0 | 5.7 | 5.1 | 2.6 |
| 188 | 3.9 | 6.6 | 3.3 | 3.9 | 3.9 | 3.1 | 1.0 | 0.9 | 6.9 | 8.2 | 1.1 | 1.1 | 7.1 | 5.7 | 5.2 | 2.7 |
| 190 | 4.0 | 6.7 | 3.4 | 4.0 | 4.0 | 3.1 | 1.0 | 0.9 | 7.0 | 8.2 | 1.1 | 1.1 | 7.1 | 5.7 | 5.2 | 2.7 |
| 192 | 4.0 | 6.7 | 3.4 | 4.0 | 4.0 | 3.2 | 1.0 | 0.9 | 7.0 | 8.3 | 1.1 | 1.1 | 7.1 | 5.7 | 5.3 | 2.7 |
| 194 | 4.0 | 6.7 | 3.4 | 4.0 | 4.0 | 3.2 | 1.0 | 0.9 | 7.1 | 8.4 | 1.1 | 1.1 | 7.1 | 5.7 | 5.3 | 2.8 |
| 196 | 4.1 | 6.8 | 3.5 | 4.1 | 4.1 | 3.3 | 1.0 | 0.9 | 7.2 | 8.5 | 1.1 | 1.1 | 7.2 | 5.8 | 5.4 | 2.8 |

TABLE 24-continued

Trend Line Values |Y|HHb between $U_{Amin}$ and $U_{Ae}$.

| Watts | RF L | RF R | VL L | VL R | ST L | ST R | GM L | GM Ref | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 198 | 4.1 | 6.8 | 3.5 | 4.1 | 4.1 | 3.4 | 1.0 | 1.0 | 7.2 | 8.5 | 1.1 | 1.1 | 7.2 | 5.8 | 5.4 | 2.8 |
| 200 | 4.1 | 6.8 | 3.6 | 4.2 | 4.2 | 3.4 | 1.0 | 1.0 | 7.3 | 8.6 | 1.1 | 1.1 | 7.2 | 5.8 | 5.5 | 2.9 |
| Min | 3.6 | 6.1 | 3.0 | 3.5 | 3.5 | 2.9 | 1.0 | 0.9 | 5.9 | 6.9 | 1.1 | 1.1 | 7.0 | 5.7 | 4.5 | 2.4 |
| Max | 4.1 | 6.8 | 3.6 | 4.2 | 4.2 | 3.4 | 1.2 | 1.1 | 7.3 | 8.6 | 1.9 | 1.7 | 7.2 | 5.8 | 5.5 | 2.9 |
| σ | 0.1 | 0.2 | 0.2 | 0.2 | 0.2 | 0.1 | 1.0 | 1.0 | 0.4 | 0.5 | 0.3 | 0.2 | 0.1 | 0.1 | 0.3 | 0.1 |
| $\overline{Y}$ | 3.8 | 6.5 | 3.2 | 3.8 | 3.8 | 3.0 | 1.1 | 1.0 | 6.5 | 7.7 | 1.4 | 1.3 | 7.0 | 5.7 | 4.9 | 2.6 |
| $\tilde{Y}$ | 3.8 | 6.5 | 3.1 | 3.7 | 3.7 | 2.9 | 1.0 | 1.0 | 6.5 | 7.6 | 1.3 | 1.3 | 7.0 | 5.7 | 4.9 | 2.5 |

[(Min) Minimum value; (Max) Maximum value; (σ) standard deviation value; ($\overline{Y}$) average value; ($\tilde{Y}$) median value]

TABLE 25

Trend Line Values |Y|HHb between $U_{Ae}$ and $U_{ANA}$.

| Watts | RF L | RF R | VL L | VL R | ST L | ST R | GM L | GM R | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 202 | 4.2 | 6.9 | 3.7 | 4.3 | 4.3 | 3.5 | 1.0 | 1.0 | 7.3 | 8.7 | 1.1 | 1.1 | 7.3 | 5.9 | 5.5 | 2.9 |
| 204 | 4.2 | 6.9 | 3.7 | 4.3 | 4.3 | 3.6 | 1.0 | 1.0 | 7.4 | 8.8 | 1.1 | 1.1 | 7.3 | 5.9 | 5.6 | 2.9 |
| 206 | 4.3 | 7.0 | 3.8 | 4.4 | 4.4 | 3.7 | 1.0 | 1.0 | 7.5 | 8.8 | 1.2 | 1.1 | 7.4 | 5.9 | 5.6 | 3.0 |
| 208 | 4.3 | 7.0 | 3.9 | 4.4 | 4.4 | 3.7 | 1.0 | 1.0 | 7.5 | 8.9 | 1.2 | 1.2 | 7.4 | 6.0 | 5.7 | 3.0 |
| 210 | 4.4 | 7.1 | 3.9 | 4.5 | 4.5 | 3.8 | 1.1 | 1.0 | 7.6 | 9.0 | 1.2 | 1.2 | 7.5 | 6.0 | 5.8 | 3.1 |
| 212 | 4.4 | 7.1 | 4.0 | 4.6 | 4.6 | 3.9 | 1.1 | 1.0 | 7.6 | 9.1 | 1.3 | 1.2 | 7.5 | 6.1 | 5.8 | 3.2 |
| 214 | 4.5 | 7.2 | 4.1 | 4.6 | 4.6 | 4.0 | 1.1 | 1.1 | 7.7 | 9.2 | 1.3 | 1.3 | 7.6 | 6.1 | 5.9 | 3.2 |
| 216 | 4.5 | 7.2 | 4.1 | 4.7 | 4.7 | 4.1 | 1.1 | 1.1 | 7.8 | 9.2 | 1.4 | 1.3 | 7.6 | 6.2 | 6.0 | 3.3 |
| 218 | 4.6 | 7.3 | 4.2 | 4.8 | 4.8 | 4.2 | 1.1 | 1.1 | 7.8 | 9.3 | 1.5 | 1.3 | 7.7 | 6.3 | 6.1 | 3.3 |
| 220 | 4.7 | 7.3 | 4.3 | 4.9 | 4.9 | 4.3 | 1.2 | 1.1 | 7.9 | 9.4 | 1.5 | 1.4 | 7.8 | 6.3 | 6.1 | 3.4 |
| 222 | 4.7 | 7.4 | 4.4 | 4.9 | 4.9 | 4.4 | 1.2 | 1.1 | 8.0 | 9.5 | 1.6 | 1.4 | 7.8 | 6.4 | 6.2 | 3.5 |
| 224 | 4.8 | 7.4 | 4.5 | 5.0 | 5.0 | 4.5 | 1.2 | 1.1 | 8.0 | 9.5 | 1.6 | 1.4 | 7.9 | 6.4 | 6.3 | 3.5 |
| 226 | 4.9 | 7.5 | 4.5 | 5.1 | 5.1 | 4.6 | 1.2 | 1.1 | 8.1 | 9.6 | 1.7 | 1.5 | 7.9 | 6.5 | 6.4 | 3.6 |
| 228 | 4.9 | 7.6 | 4.6 | 5.2 | 5.2 | 4.7 | 1.2 | 1.1 | 8.2 | 9.7 | 1.8 | 1.5 | 8.0 | 6.6 | 6.5 | 3.7 |
| 230 | 5.0 | 7.6 | 4.7 | 5.3 | 5.3 | 4.8 | 1.3 | 1.2 | 8.2 | 9.8 | 1.9 | 1.5 | 8.0 | 6.6 | 6.5 | 3.7 |
| 232 | 5.1 | 7.7 | 4.8 | 5.3 | 5.3 | 4.9 | 1.3 | 1.2 | 8.3 | 9.8 | 1.9 | 1.6 | 8.1 | 6.7 | 6.6 | 3.8 |
| 234 | 5.1 | 7.7 | 4.8 | 5.4 | 5.4 | 5.0 | 1.3 | 1.2 | 8.4 | 9.9 | 2.0 | 1.6 | 8.1 | 6.7 | 6.7 | 3.9 |
| 236 | 5.2 | 7.8 | 4.9 | 5.5 | 5.5 | 5.1 | 1.3 | 1.2 | 8.4 | 10.0 | 2.1 | 1.6 | 8.2 | 6.8 | 6.8 | 3.9 |
| 238 | 5.3 | 7.9 | 5.0 | 5.6 | 5.6 | 5.2 | 1.3 | 1.2 | 8.5 | 10.0 | 2.2 | 1.7 | 8.2 | 6.8 | 6.9 | 4.0 |
| 240 | 5.4 | 7.9 | 5.1 | 5.6 | 5.6 | 5.3 | 1.4 | 1.2 | 8.5 | 10.1 | 2.3 | 1.7 | 8.3 | 6.9 | 6.9 | 4.1 |
| 242 | 5.4 | 8.0 | 5.1 | 5.7 | 5.7 | 5.4 | 1.4 | 1.2 | 8.6 | 10.1 | 2.3 | 1.7 | 8.3 | 6.9 | 7.0 | 4.1 |
| 244 | 5.5 | 8.0 | 5.2 | 5.8 | 5.8 | 5.5 | 1.4 | 1.2 | 8.6 | 10.2 | 2.4 | 1.8 | 8.4 | 7.0 | 7.1 | 4.2 |
| 246 | 5.6 | 8.1 | 5.3 | 5.9 | 5.9 | 5.6 | 1.4 | 1.2 | 8.7 | 10.2 | 2.5 | 1.8 | 8.4 | 7.0 | 7.2 | 4.3 |
| 248 | 5.6 | 8.1 | 5.3 | 5.9 | 5.9 | 5.7 | 1.4 | 1.2 | 8.7 | 10.3 | 2.6 | 1.8 | 8.4 | 7.1 | 7.2 | 4.4 |
| 250 | 5.7 | 8.2 | 5.4 | 6.0 | 6.0 | 5.8 | 1.5 | 1.2 | 8.8 | 10.3 | 2.6 | 1.8 | 8.5 | 7.1 | 7.3 | 4.4 |
| Min | 4.2 | 6.9 | 3.7 | 4.3 | 4.3 | 3.5 | 1.0 | 1.0 | 7.3 | 8.7 | 1.1 | 1.1 | 7.3 | 5.9 | 5.5 | 2.9 |
| Max | 5.7 | 8.2 | 5.4 | 6.0 | 6.0 | 5.8 | 1.5 | 1.2 | 8.8 | 10.3 | 2.6 | 1.8 | 8.5 | 7.1 | 7.3 | 4.4 |
| σ | 0.5 | 0.4 | 0.5 | 0.5 | 0.5 | 0.7 | 0.1 | 0.1 | 0.4 | 0.5 | 0.5 | 0.2 | 0.4 | 0.4 | 0.6 | 0.5 |
| $\overline{Y}$ | 4.9 | 7.5 | 4.5 | 5.1 | 5.1 | 4.6 | 1.2 | 1.1 | 8.1 | 9.6 | 1.8 | 1.5 | 7.9 | 6.5 | 6.4 | 3.6 |
| $\tilde{Y}$ | 4.9 | 7.5 | 4.5 | 5.1 | 5.1 | 4.6 | 1.2 | 1.1 | 8.1 | 9.6 | 1.7 | 1.5 | 7.9 | 6.5 | 6.4 | 3.6 |

[(Min) Minimum value; (Max) Maximum value; (σ) standard deviation value; ($\overline{Y}$) average value; ($\tilde{Y}$) median value]

TABLE 26

Trend Line Values |Y|HHb ≥ $U_{Ana}$.

| Watts | RF L | RF R | VL L | VL R | ST L | ST R | GM L | GM R | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 252 | 5.8 | 8.2 | 5.4 | 6.0 | 6.0 | 5.8 | 1.5 | 1.2 | 8.8 | 0 00 | 2.7 | 1.8 | 8.5 | 7.1 | 7.4 | 4.5 |
| 254 | 5.8 | 8.3 | 5.5 | 6.1 | 6.1 | 5.9 | 1.5 | 1.2 | 8.8 | 10.4 | 2.8 | 1.8 | 8.5 | 7.1 | 7.5 | 4.6 |
| 256 | 5.9 | 8.3 | 5.5 | 6.2 | 6.2 | 6.0 | 1.5 | 1.2 | 8.9 | 10.4 | 2.8 | 1.8 | 8.6 | 7.2 | 7.5 | 4.6 |
| 258 | 6.0 | 8.4 | 5.6 | 6.2 | 6.2 | 6.0 | 1.5 | 1.2 | 8.9 | 10.4 | 2.9 | 1.9 | 8.6 | 7.2 | 7.6 | 4.7 |
| 260 | 6.0 | 8.5 | 5.6 | 6.3 | 6.3 | 6.1 | 1.5 | 1.2 | 8.9 | 10.4 | 2.9 | 1.9 | 8.6 | 7.2 | 7.7 | 4.7 |

TABLE 26-continued

Trend Line Values $|Y|HHb \geq U_{Ana}$.

| Watts | RF L | RF R | VL L | VL R | ST L | ST R | GM L | GM R | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 262 | 6.1 | 8.5 | 5.7 | 6.3 | 6.3 | 6.2 | 1.6 | 1.2 | 8.9 | 10.4 | 3.0 | 1.9 | 8.6 | 7.2 | 7.7 | 4.8 |
| 264 | 6.1 | 8.6 | 5.7 | 6.4 | 6.4 | 6.2 | 1.6 | 1.2 | 9.0 | 10.4 | 3.1 | 1.9 | 8.6 | 7.2 | 7.8 | 4.8 |
| 266 | 6.2 | 8.6 | 5.8 | 6.4 | 6.4 | 6.3 | 1.6 | 1.2 | 9.0 | 10.5 | 3.1 | 1.8 | 8.6 | 7.2 | 7.8 | 4.9 |
| 268 | 6.3 | 8.7 | 5.8 | 6.4 | 6.4 | 6.3 | 1.6 | 1.2 | 9.0 | 10.5 | 3.1 | 1.8 | 8.6 | 7.2 | 7.9 | 4.9 |
| 270 | 6.3 | 8.7 | 5.8 | 6.5 | 6.5 | 6.4 | 1.7 | 1.3 | 9.0 | 10.5 | 3.2 | 1.8 | 8.7 | 7.2 | 7.9 | 5.0 |
| 272 | 6.4 | 8.8 | 5.9 | 6.5 | 6.5 | 6.4 | 1.7 | 1.3 | 9.0 | 10.5 | 3.2 | 1.8 | 8.7 | 7.2 | 8.0 | 5.0 |
| 274 | 6.5 | 8.9 | 5.9 | 6.6 | 6.6 | 6.5 | 1.7 | 1.3 | 9.0 | 10.5 | 3.2 | 1.8 | 8.7 | 7.2 | 8.0 | 5.1 |
| 276 | 6.5 | 8.9 | 5.9 | 6.6 | 6.6 | 6.5 | 1.7 | 1.3 | 9.1 | 10.4 | 3.3 | 1.8 | 8.7 | 7.2 | 8.1 | 5.1 |
| 278 | 6.6 | 9.0 | 6.0 | 6.7 | 6.7 | 6.6 | 1.8 | 1.4 | 9.1 | 10.4 | 3.3 | 1.8 | 8.7 | 7.2 | 8.1 | 5.2 |
| 280 | 6.7 | 9.1 | 6.0 | 6.7 | 6.7 | 6.7 | 1.8 | 1.4 | 9.1 | 10.4 | 3.3 | 1.8 | 8.8 | 7.2 | 8.2 | 5.2 |
| 282 | 6.7 | 9.2 | 6.1 | 6.8 | 6.8 | 6.7 | 1.9 | 1.5 | 9.1 | 10.4 | 3.4 | 1.8 | 8.8 | 7.3 | 8.2 | 5.3 |
| 284 | 6.8 | 9.3 | 6.1 | 6.8 | 6.8 | 6.8 | 2.0 | 1.6 | 9.1 | 10.5 | 3.4 | 1.8 | 8.8 | 7.3 | 8.3 | 5.3 |
| 286 | 6.9 | 9.4 | 6.2 | 6.9 | 6.9 | 6.9 | 2.0 | 1.7 | 9.1 | 10.5 | 3.4 | 1.8 | 8.9 | 7.3 | 8.4 | 5.4 |
| 288 | 7.0 | 9.6 | 6.2 | 6.9 | 6.9 | 7.0 | 2.1 | 1.8 | 9.2 | 10.5 | 3.4 | 1.8 | 9.0 | 7.4 | 8.4 | 5.5 |
| 290 | 7.1 | 9.7 | 6.3 | 7.0 | 7.0 | 7.1 | 2.2 | 1.9 | 9.2 | 10.5 | 3.5 | 1.8 | 9.0 | 7.4 | 8.5 | 5.6 |
| 292 | 7.2 | 9.9 | 6.4 | 7.1 | 7.1 | 7.2 | 2.3 | 2.0 | 9.2 | 10.5 | 3.5 | 1.9 | 9.1 | 7.5 | 8.6 | 5.7 |
| 294 | 7.3 | 10.1 | 6.5 | 7.2 | 7.2 | 7.4 | 2.5 | 2.2 | 9.3 | 10.6 | 3.5 | 1.9 | 9.3 | 7.6 | 8.7 | 5.8 |
| 296 | 7.5 | 10.3 | 6.6 | 7.3 | 7.3 | 7.5 | 2.6 | 2.4 | 9.4 | 10.7 | 3.6 | 2.0 | 9.4 | 7.7 | 8.9 | 5.9 |
| 298 | 7.6 | 10.6 | 6.7 | 7.5 | 7.5 | 7.7 | 2.8 | 2.6 | 9.4 | 10.7 | 3.7 | 2.1 | 9.6 | 7.9 | 9.0 | 6.1 |
| 300 | 7.8 | 10.9 | 6.9 | 7.6 | 7.6 | 7.9 | 3.0 | 2.8 | 9.5 | 10.8 | 3.7 | 2.2 | 9.8 | 8.1 | 9.2 | 6.2 |
| Min | 5.8 | 8.2 | 5.4 | 6.0 | 6.0 | 5.8 | 1.5 | 1.2 | 8.8 | 10.3 | 2.7 | 1.8 | 8.5 | 7.1 | 7.4 | 4.5 |
| Max | 7.8 | 10.9 | 6.9 | 7.6 | 7.6 | 7.9 | 3.0 | 2.8 | 9.5 | 10.8 | 3.7 | 2.2 | 9.8 | 8.1 | 9.2 | 6.2 |
| σ | 0.6 | 0.7 | 0.4 | 0.4 | 0.4 | 0.6 | 0.4 | 0.5 | 0.2 | 0.1 | 0.3 | 0.1 | 0.3 | 0.2 | 0.5 | 0.5 |
| $\bar{Y}$ | 6.6 | 9.1 | 6.0 | 6.7 | 6.7 | 6.7 | 1.9 | 1.6 | 9.1 | 10.5 | 3.2 | 1.9 | 8.8 | 7.3 | 8.1 | 5.2 |
| $\tilde{Y}$ | 6.5 | 8.9 | 5.9 | 6.6 | 6.6 | 6.5 | 1.7 | 1.3 | 9.1 | 10.5 | 3.3 | 1.8 | 8.7 | 7.2 | 8.1 | 5.1 |

[(Min) Minimum value; (Max) Maximum value; (σ) standard deviation value; ($\bar{Y}$) average value; ($\tilde{Y}$) median value]

1.16. In Table 27, Table 28 and Table 29, the calculated values of $|Y|\Phi HHb$ of each $TM^M$, at each intensity can be observed.

TABLE 27

Trend Line Values $|Y|\phi HHb$ between $U_{Amin}$ and $U_{Ae}$.

| Watts | RF L | RF R | VL L | VL R | ST L | ST R | GM L | GM Ref | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 136 | 7.7 | 13.0 | 6.6 | 7.6 | 6.7 | 6.4 | 2.9 | 2.8 | 12.8 | 15.1 | 3.9 | 3.7 | 15.1 | 12.1 | 9.4 | 4.9 |
| 138 | 7.7 | 13.1 | 6.7 | 7.7 | 6.7 | 6.4 | 2.9 | 2.8 | 12.9 | 15.2 | 3.9 | 3.7 | 15.2 | 12.2 | 9.5 | 5.0 |
| 140 | 7.8 | 13.3 | 6.7 | 7.8 | 6.8 | 6.5 | 2.9 | 2.8 | 13.1 | 15.3 | 3.9 | 3.7 | 15.3 | 12.3 | 9.6 | 5.0 |
| 142 | 7.9 | 13.4 | 6.8 | 7.8 | 6.8 | 6.5 | 2.9 | 2.8 | 13.2 | 15.5 | 3.9 | 3.7 | 15.4 | 12.4 | 9.6 | 5.0 |
| 144 | 8.0 | 13.6 | 6.8 | 7.9 | 6.8 | 6.5 | 2.8 | 2.7 | 13.4 | 15.6 | 3.8 | 3.6 | 15.4 | 12.5 | 9.7 | 5.0 |
| 146 | 8.0 | 13.7 | 6.8 | 8.0 | 6.9 | 6.6 | 2.8 | 2.7 | 13.5 | 15.7 | 3.8 | 3.6 | 15.5 | 12.5 | 9.8 | 5.1 |
| 148 | 8.1 | 13.9 | 6.8 | 8.0 | 6.9 | 6.6 | 2.8 | 2.7 | 13.6 | 15.9 | 3.7 | 3.6 | 15.5 | 12.6 | 9.9 | 5.1 |
| 150 | 8.2 | 14.0 | 6.8 | 8.1 | 6.9 | 6.6 | 2.7 | 2.6 | 13.8 | 16.0 | 3.7 | 3.5 | 15.6 | 12.7 | 9.9 | 5.1 |
| 152 | 8.2 | 14.1 | 6.9 | 8.1 | 7.0 | 6.6 | 2.7 | 2.6 | 13.9 | 16.1 | 3.6 | 3.4 | 15.6 | 12.7 | 10.0 | 5.1 |
| 154 | 8.3 | 14.2 | 6.9 | 8.1 | 7.0 | 6.6 | 2.6 | 2.5 | 14.0 | 16.2 | 3.5 | 3.4 | 15.6 | 12.8 | 10.0 | 5.1 |
| 156 | 8.4 | 14.3 | 6.9 | 8.2 | 7.0 | 6.6 | 2.6 | 2.5 | 14.1 | 16.4 | 3.5 | 3.3 | 15.7 | 12.8 | 10.1 | 5.1 |
| 158 | 8.4 | 14.4 | 6.9 | 8.2 | 7.0 | 6.6 | 2.5 | 2.4 | 14.2 | 16.5 | 3.4 | 3.2 | 15.7 | 12.9 | 10.2 | 5.1 |
| 160 | 8.5 | 14.5 | 6.9 | 8.2 | 7.1 | 6.6 | 2.5 | 2.3 | 14.4 | 16.6 | 3.3 | 3.2 | 15.8 | 12.9 | 10.2 | 5.1 |
| 162 | 8.6 | 14.6 | 6.9 | 8.3 | 7.1 | 6.6 | 2.4 | 2.3 | 14.5 | 16.8 | 3.3 | 3.1 | 15.8 | 13.0 | 10.3 | 5.1 |
| 164 | 8.6 | 14.7 | 6.9 | 8.3 | 7.1 | 6.6 | 2.4 | 2.2 | 14.6 | 16.9 | 3.2 | 3.0 | 15.8 | 13.0 | 10.4 | 5.1 |
| 166 | 8.7 | 14.8 | 7.0 | 8.4 | 7.2 | 6.6 | 2.3 | 2.1 | 14.8 | 17.1 | 3.1 | 3.0 | 15.9 | 13.1 | 10.4 | 5.1 |
| 168 | 8.8 | 15.0 | 7.0 | 8.4 | 7.2 | 6.6 | 2.3 | 2.1 | 14.9 | 17.3 | 3.1 | 2.9 | 15.9 | 13.1 | 10.5 | 5.1 |
| 170 | 8.8 | 15.1 | 7.0 | 8.5 | 7.3 | 6.6 | 2.2 | 2.0 | 15.0 | 17.4 | 3.0 | 2.8 | 16.0 | 13.2 | 10.6 | 5.1 |
| 172 | 8.9 | 15.2 | 7.1 | 8.5 | 7.3 | 6.7 | 2.2 | 1.9 | 15.2 | 17.6 | 3.0 | 2.8 | 16.1 | 13.2 | 10.7 | 5.1 |
| 174 | 9.0 | 15.3 | 7.1 | 8.6 | 7.4 | 6.7 | 2.1 | 1.9 | 15.4 | 17.8 | 2.9 | 2.7 | 16.1 | 13.3 | 10.8 | 5.2 |
| 176 | 9.1 | 15.4 | 7.2 | 8.7 | 7.5 | 6.8 | 2.1 | 1.8 | 15.5 | 18.0 | 2.9 | 2.7 | 16.2 | 13.4 | 10.9 | 5.2 |
| 178 | 9.2 | 15.5 | 7.3 | 8.8 | 7.6 | 6.8 | 2.1 | 1.8 | 15.7 | 18.3 | 2.8 | 2.6 | 16.3 | 13.5 | 11.1 | 5.3 |
| 180 | 9.3 | 15.7 | 7.3 | 8.9 | 7.7 | 6.9 | 2.0 | 1.8 | 15.9 | 18.5 | 2.8 | 2.6 | 16.4 | 13.6 | 11.2 | 5.3 |
| 182 | 9.4 | 15.8 | 7.4 | 9.0 | 7.8 | 7.0 | 2.0 | 1.7 | 16.1 | 18.8 | 2.8 | 2.6 | 16.6 | 13.7 | 11.4 | 5.4 |
| 184 | 9.5 | 15.9 | 7.5 | 9.1 | 7.9 | 7.1 | 2.0 | 1.7 | 16.3 | 19.0 | 2.8 | 2.5 | 16.7 | 13.8 | 11.5 | 5.5 |
| 186 | 9.6 | 16.1 | 7.6 | 9.2 | 8.1 | 7.2 | 2.0 | 1.7 | 16.5 | 19.3 | 2.8 | 2.5 | 16.8 | 13.9 | 11.7 | 5.6 |
| 188 | 9.7 | 16.3 | 7.8 | 9.4 | 8.2 | 7.4 | 2.0 | 1.7 | 16.7 | 19.6 | 2.8 | 2.5 | 17.0 | 14.0 | 11.9 | 5.7 |
| 190 | 9.8 | 16.4 | 7.9 | 9.5 | 8.4 | 7.5 | 2.0 | 1.7 | 16.9 | 19.9 | 2.8 | 2.5 | 17.2 | 14.2 | 12.1 | 5.8 |
| 192 | 10.0 | 16.6 | 8.1 | 9.7 | 8.6 | 7.7 | 2.0 | 1.7 | 17.2 | 20.3 | 2.8 | 2.5 | 17.4 | 14.3 | 12.3 | 6.0 |
| 194 | 10.1 | 16.8 | 8.3 | 9.9 | 8.8 | 7.9 | 2.0 | 1.7 | 17.4 | 20.6 | 2.9 | 2.6 | 17.6 | 14.5 | 12.5 | 6.1 |

TABLE 27-continued

Trend Line Values |Y|φHHb between $U_{Amin}$ and $U_{Ae}$.

| Watts | RF L | RF R | VL L | VL R | ST L | ST R | GM L | GM Ref | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 196 | 10.3 | 17.0 | 8.4 | 10.1 | 9.0 | 8.1 | 2.0 | 1.7 | 17.7 | 21.0 | 2.9 | 2.6 | 17.8 | 14.6 | 12.8 | 6.3 |
| 198 | 10.4 | 17.2 | 8.6 | 10.3 | 9.2 | 8.3 | 2.1 | 1.7 | 18.0 | 21.3 | 3.0 | 2.6 | 18.0 | 14.8 | 13.1 | 6.4 |
| 200 | 10.6 | 17.4 | 8.8 | 10.5 | 9.4 | 8.5 | 2.1 | 1.8 | 18.2 | 21.7 | 3.0 | 2.7 | 18.2 | 15.0 | 13.3 | 6.6 |
| Min | 7.7 | 13.0 | 6.6 | 7.6 | 6.7 | 6.4 | 2.0 | 1.7 | 12.8 | 15.1 | 2.8 | 2.5 | 15.1 | 12.1 | 9.4 | 4.9 |
| Max | 10.6 | 17.4 | 8.8 | 10.5 | 9.4 | 8.5 | 2.9 | 2.8 | 18.2 | 21.7 | 3.9 | 3.7 | 18.2 | 15.0 | 13.3 | 6.6 |
| σ | 0.8 | 1.2 | 0.6 | 0.8 | 0.8 | 0.6 | 0.3 | 0.4 | 1.6 | 1.9 | 0.4 | 0.4 | 0.8 | 0.8 | 1.1 | 0.5 |
| Ȳ | 8.9 | 15.0 | 7.3 | 8.7 | 7.5 | 6.9 | 2.4 | 2.1 | 15.1 | 17.7 | 3.2 | 3.0 | 16.2 | 13.3 | 10.8 | 5.3 |
| Ỹ | 8.8 | 15.0 | 7.0 | 8.4 | 7.2 | 6.6 | 2.3 | 2.1 | 14.9 | 17.3 | 3.1 | 2.9 | 15.9 | 13.1 | 10.5 | 5.1 |

[(Min) Minimum value; (Max) Maximum value; (σ) standard deviation value; (Ȳ) average value; (Ỹ) median value]

TABLE 28

Trend Line Values |Y|φHHb between $U_{Ae}$ and $U_{ANA}$.

| Watts | RF L | RF R | VL L | VL R | ST L | ST R | GM L | GM R | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 202 | 10.8 | 17.6 | 9.1 | 10.7 | 9.7 | 8.7 | 2.2 | 1.8 | 18.5 | 22.1 | 3.1 | 2.7 | 18.5 | 15.2 | 13.6 | 6.8 |
| 204 | 11.0 | 17.8 | 9.3 | 11.0 | 10.0 | 9.0 | 2.2 | 1.9 | 18.8 | 22.5 | 3.2 | 2.8 | 18.7 | 15.4 | 13.9 | 7.0 |
| 206 | 11.1 | 18.1 | 9.6 | 11.2 | 10.2 | 9.3 | 2.3 | 1.9 | 19.1 | 22.9 | 3.3 | 2.9 | 19.0 | 15.6 | 14.2 | 7.2 |
| 208 | 11.3 | 18.3 | 9.8 | 11.5 | 10.5 | 9.6 | 2.4 | 2.0 | 19.4 | 23.3 | 3.4 | 3.0 | 19.3 | 15.8 | 14.5 | 7.4 |
| 210 | 11.6 | 18.6 | 10.1 | 11.8 | 10.8 | 9.9 | 2.5 | 2.1 | 19.8 | 23.7 | 3.6 | 3.1 | 19.6 | 16.1 | 14.8 | 7.6 |
| 212 | 11.8 | 18.8 | 10.4 | 12.1 | 11.1 | 10.2 | 2.5 | 2.2 | 20.1 | 24.2 | 3.7 | 3.2 | 19.9 | 16.3 | 15.1 | 7.8 |
| 214 | 12.0 | 19.1 | 10.7 | 12.3 | 11.5 | 10.5 | 2.6 | 2.3 | 20.4 | 24.6 | 3.9 | 3.3 | 20.2 | 16.6 | 15.4 | 8.1 |
| 216 | 12.2 | 19.4 | 11.0 | 12.6 | 11.8 | 10.9 | 2.7 | 2.4 | 20.8 | 25.0 | 4.0 | 3.4 | 20.5 | 16.8 | 15.7 | 8.3 |
| 218 | 12.5 | 19.6 | 11.3 | 13.0 | 12.1 | 11.2 | 2.8 | 2.5 | 21.1 | 25.4 | 4.2 | 3.5 | 20.8 | 17.1 | 16.0 | 8.6 |
| 220 | 12.7 | 19.9 | 11.6 | 13.3 | 12.5 | 11.6 | 2.9 | 2.6 | 21.5 | 25.9 | 4.3 | 3.6 | 21.1 | 17.3 | 16.4 | 8.8 |
| 222 | 12.9 | 20.2 | 11.9 | 13.6 | 12.9 | 11.9 | 3.0 | 2.7 | 21.8 | 26.3 | 4.5 | 3.8 | 21.4 | 17.6 | 16.7 | 9.1 |
| 224 | 13.2 | 20.5 | 12.2 | 13.9 | 13.2 | 12.3 | 3.2 | 2.8 | 22.2 | 26.7 | 4.7 | 3.9 | 21.7 | 17.8 | 17.1 | 9.3 |
| 226 | 13.5 | 20.8 | 12.5 | 14.2 | 13.6 | 12.7 | 3.3 | 2.9 | 22.5 | 27.1 | 4.9 | 4.0 | 22.1 | 18.1 | 17.4 | 9.6 |
| 228 | 13.7 | 21.1 | 12.9 | 14.6 | 14.0 | 13.1 | 3.4 | 3.0 | 22.9 | 27.5 | 5.1 | 4.2 | 22.4 | 18.3 | 17.8 | 9.9 |
| 230 | 14.0 | 21.4 | 13.2 | 14.9 | 14.3 | 13.5 | 3.5 | 3.1 | 23.2 | 27.9 | 5.3 | 4.3 | 22.7 | 18.6 | 18.2 | 10.2 |
| 232 | 14.3 | 21.7 | 13.5 | 15.2 | 14.7 | 13.9 | 3.6 | 3.3 | 23.6 | 28.3 | 5.5 | 4.4 | 23.0 | 18.9 | 18.5 | 10.5 |
| 234 | 14.5 | 22.0 | 13.9 | 15.5 | 15.1 | 14.3 | 3.8 | 3.4 | 23.9 | 28.7 | 5.8 | 4.5 | 23.3 | 19.1 | 18.9 | 10.7 |
| 236 | 14.8 | 22.3 | 14.2 | 15.8 | 15.5 | 14.6 | 3.9 | 3.5 | 24.2 | 29.0 | 6.0 | 4.7 | 23.6 | 19.4 | 19.2 | 11.0 |
| 238 | 15.1 | 22.6 | 14.5 | 16.2 | 15.8 | 15.0 | 4.0 | 3.6 | 24.6 | 29.3 | 6.2 | 4.8 | 23.9 | 19.6 | 19.6 | 11.3 |
| 240 | 15.4 | 22.9 | 14.8 | 16.5 | 16.2 | 15.4 | 4.1 | 3.7 | 24.9 | 29.6 | 6.4 | 4.9 | 24.2 | 19.8 | 20.0 | 11.6 |
| 242 | 15.7 | 23.1 | 15.1 | 16.8 | 16.6 | 15.8 | 4.2 | 3.8 | 25.2 | 29.9 | 6.6 | 5.0 | 24.4 | 20.1 | 20.4 | 12.0 |
| 244 | 16.0 | 23.4 | 15.4 | 17.1 | 16.9 | 16.2 | 4.3 | 3.9 | 25.5 | 30.2 | 6.9 | 5.1 | 24.7 | 20.3 | 20.8 | 12.3 |
| 246 | 16.2 | 23.7 | 15.7 | 17.4 | 17.3 | 16.5 | 4.4 | 4.0 | 25.8 | 30.5 | 7.1 | 5.2 | 24.9 | 20.5 | 21.2 | 12.6 |
| 248 | 16.5 | 24.0 | 16.0 | 17.6 | 17.6 | 16.9 | 4.5 | 4.1 | 26.0 | 30.7 | 7.3 | 5.3 | 25.2 | 20.7 | 21.5 | 13.0 |
| 250 | 16.8 | 24.3 | 16.3 | 17.9 | 17.9 | 17.2 | 4.6 | 4.1 | 26.3 | 30.9 | 7.5 | 5.4 | 25.4 | 20.9 | 21.9 | 13.3 |
| Min | 10.8 | 17.6 | 9.1 | 10.7 | 9.7 | 8.7 | 2.2 | 1.8 | 18.5 | 22.1 | 3.1 | 2.7 | 18.5 | 15.2 | 13.6 | 6.8 |
| Max | 16.8 | 24.3 | 16.3 | 17.9 | 17.9 | 17.2 | 4.6 | 4.1 | 26.3 | 30.9 | 7.5 | 5.4 | 25.4 | 20.9 | 21.9 | 13.3 |
| σ | 1.9 | 2.1 | 2.3 | 2.3 | 2.6 | 2.7 | 0.8 | 0.8 | 2.4 | 2.8 | 1.4 | 0.9 | 2.2 | 1.8 | 2.6 | 2.0 |
| Ȳ | 13.6 | 20.8 | 12.6 | 14.3 | 13.7 | 12.8 | 3.3 | 2.9 | 22.5 | 26.9 | 5.1 | 4.0 | 22.0 | 18.1 | 17.5 | 9.8 |
| Ỹ | 13.5 | 20.8 | 12.5 | 14.2 | 13.6 | 12.7 | 3.3 | 2.9 | 22.5 | 27.1 | 4.9 | 4.0 | 22.1 | 18.1 | 17.4 | 9.6 |

[(Min) Minimum value; (Max) Maximum value; (σ) standard deviation value; (Ȳ) average value; (Ỹ) median value]

TABLE 29

Trend Line Values |Y|φHHb ≥ $U_{Ana}$.

| Watts | RF L | RF R | VL L | VL R | ST L | ST R | GM L | GM R | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 252 | 17.1 | 24.6 | 16.5 | 18.2 | 18.3 | 17.6 | 4.7 | 4.2 | 26.5 | 31.1 | 7.8 | 5.5 | 25.6 | 21.0 | 22.2 | 13.5 |
| 254 | 17.4 | 24.8 | 16.8 | 18.4 | 18.6 | 17.9 | 4.8 | 4.3 | 26.7 | 31.3 | 8.0 | 5.5 | 25.8 | 21.2 | 22.5 | 13.8 |
| 256 | 17.7 | 25.1 | 17.0 | 18.7 | 18.9 | 18.2 | 4.9 | 4.3 | 27.0 | 31.4 | 8.2 | 5.6 | 25.9 | 21.4 | 22.8 | 14.1 |
| 258 | 18.0 | 25.4 | 17.2 | 18.9 | 19.2 | 18.5 | 5.0 | 4.4 | 27.1 | 31.5 | 8.4 | 5.6 | 26.1 | 21.5 | 23.1 | 14.3 |

TABLE 29-continued

Trend Line Values $|Y|\phi HHb \geq U_{Ana}$.

| Watts | RF L | RF R | VL L | VL R | ST L | ST R | GM L | GM R | VI L | VI R | GA L | GA R | TA L | TA R | Lim Sup \|Zona Op\| | Lim Inf \|Zona Op\| |
|---|---|---|---|---|---|---|---|---|---|---|---|---|---|---|---|---|
| 260 | 18.2 | 25.6 | 17.4 | 19.1 | 19.5 | 18.8 | 5.1 | 4.4 | 27.3 | 31.6 | 8.6 | 5.7 | 26.2 | 21.6 | 23.3 | 14.5 |
| 262 | 18.5 | 25.9 | 17.6 | 19.3 | 19.7 | 19.1 | 5.1 | 4.4 | 27.5 | 31.7 | 8.8 | 5.7 | 26.3 | 21.8 | 23.6 | 14.8 |
| 264 | 18.8 | 26.2 | 17.8 | 19.5 | 20.0 | 19.3 | 5.2 | 4.5 | 27.6 | 31.8 | 9.0 | 5.7 | 26.5 | 21.9 | 23.8 | 15.0 |
| 266 | 19.1 | 26.4 | 17.9 | 19.7 | 20.3 | 19.6 | 5.3 | 4.5 | 27.7 | 31.8 | 9.2 | 5.7 | 26.6 | 22.0 | 24.1 | 15.2 |
| 268 | 19.3 | 26.7 | 18.1 | 19.9 | 20.5 | 19.8 | 5.3 | 4.5 | 27.8 | 31.9 | 9.4 | 5.7 | 26.7 | 22.1 | 24.3 | 15.4 |
| 270 | 19.6 | 27.0 | 18.2 | 20.0 | 20.7 | 20.0 | 5.4 | 4.5 | 27.9 | 31.9 | 9.6 | 5.7 | 26.7 | 22.2 | 24.5 | 15.5 |
| 272 | 19.9 | 27.2 | 18.3 | 20.2 | 20.9 | 20.2 | 5.5 | 4.5 | 28.0 | 31.9 | 9.8 | 5.7 | 26.8 | 22.3 | 24.7 | 15.7 |
| 274 | 20.1 | 27.5 | 18.4 | 20.3 | 21.2 | 20.4 | 5.5 | 4.5 | 28.1 | 31.9 | 10.0 | 5.7 | 26.9 | 22.4 | 24.9 | 15.9 |
| 276 | 20.4 | 27.8 | 18.5 | 20.5 | 21.4 | 20.6 | 5.6 | 4.5 | 28.1 | 31.9 | 10.1 | 5.7 | 27.0 | 22.5 | 25.1 | 16.0 |
| 278 | 20.6 | 28.1 | 18.6 | 20.6 | 21.6 | 20.8 | 5.7 | 4.5 | 28.1 | 31.9 | 10.3 | 5.7 | 27.0 | 22.6 | 25.2 | 16.2 |
| 280 | 20.9 | 28.4 | 18.7 | 20.8 | 21.8 | 20.9 | 5.8 | 4.5 | 28.2 | 32.0 | 10.5 | 5.7 | 27.1 | 22.7 | 25.5 | 16.4 |
| 282 | 21.2 | 28.7 | 18.8 | 21.0 | 22.0 | 21.1 | 5.9 | 4.6 | 28.2 | 32.0 | 10.7 | 5.7 | 27.2 | 22.8 | 25.7 | 16.6 |
| 284 | 21.4 | 29.1 | 18.9 | 21.1 | 22.2 | 21.3 | 6.0 | 4.6 | 28.2 | 32.1 | 10.9 | 5.7 | 27.3 | 22.9 | 25.9 | 16.8 |
| 286 | 21.7 | 29.5 | 19.0 | 21.3 | 22.4 | 21.4 | 6.1 | 4.6 | 28.2 | 32.2 | 11.1 | 5.7 | 27.5 | 23.1 | 26.2 | 17.0 |
| 288 | 22.0 | 29.9 | 19.0 | 21.5 | 22.6 | 21.6 | 6.2 | 4.7 | 28.2 | 32.3 | 11.3 | 5.7 | 27.7 | 23.2 | 26.4 | 17.2 |
| 290 | 22.3 | 30.3 | 19.1 | 21.7 | 22.8 | 21.8 | 6.4 | 4.8 | 28.2 | 32.5 | 11.6 | 5.7 | 27.9 | 23.4 | 26.7 | 17.4 |
| 292 | 22.5 | 30.8 | 19.3 | 22.0 | 23.1 | 22.0 | 6.6 | 4.9 | 28.2 | 32.8 | 11.8 | 5.8 | 28.1 | 23.7 | 26.9 | 17.6 |
| 294 | 22.8 | 31.3 | 19.4 | 22.3 | 23.4 | 22.2 | 6.8 | 5.0 | 28.2 | 33.1 | 12.1 | 5.9 | 28.4 | 24.0 | 27.2 | 17.9 |
| 296 | 23.2 | 31.9 | 19.6 | 22.6 | 23.7 | 22.5 | 7.1 | 5.2 | 28.3 | 33.5 | 12.4 | 6.1 | 28.8 | 24.3 | 27.6 | 18.2 |
| 298 | 23.5 | 32.5 | 19.7 | 23.0 | 24.0 | 22.8 | 7.4 | 5.5 | 28.4 | 34.0 | 12.7 | 6.2 | 29.2 | 24.7 | 28.0 | 18.5 |
| 300 | 23.8 | 33.2 | 20.0 | 23.4 | 24.4 | 23.1 | 7.7 | 5.7 | 28.5 | 34.6 | 13.1 | 6.5 | 29.8 | 25.2 | 28.4 | 18.8 |
| Min | 17.1 | 24.6 | 16.5 | 18.2 | 18.3 | 17.6 | 4.7 | 4.2 | 26.5 | 31.1 | 7.8 | 5.5 | 25.6 | 21.0 | 22.2 | 13.5 |
| Max | 23.8 | 33.2 | 20.0 | 23.4 | 24.4 | 23.1 | 7.7 | 5.7 | 28.5 | 34.6 | 13.1 | 6.5 | 29.8 | 25.2 | 28.4 | 18.8 |
| σ | 2.0 | 2.5 | 0.9 | 1.4 | 1.7 | 1.6 | 0.8 | 0.4 | 0.5 | 0.8 | 1.5 | 0.2 | 1.1 | 1.1 | 1.8 | 1.5 |
| $\overline{Y}$ | 20.4 | 28.2 | 18.4 | 20.6 | 21.3 | 20.5 | 5.8 | 4.6 | 27.9 | 32.2 | 10.2 | 5.8 | 27.2 | 22.7 | 25.1 | 16.1 |
| $\tilde{Y}$ | 20.4 | 27.8 | 18.5 | 20.5 | 21.4 | 20.6 | 5.6 | 4.5 | 28.1 | 31.9 | 10.1 | 5.7 | 27.0 | 22.5 | 25.1 | 16.0 |

[(Min) Minimum value; (Max) Maximum value; (σ) standard deviation value; ($\overline{Y}$) average value; ($\tilde{Y}$) median value]

1.17. In FIGS. 52-100, the graphical representation of the calculated values corresponding to the slope of the trend line $\overrightarrow{(p)}$ of $|Y|SmO_2^{\%}$, $|Y|O_2HHb$, $|Y|\Phi O_2HHb$, $|Y|HHb$, $|Y|\Phi HHb$, $|Y|ThB$ and $|Y|\Phi ThB$, of each $TM^M$ can be observed.

1.18. In Table 30, the intensity ranges which produce the 1st, 2nd and 3rd General Change in the Slopes of the Trend Lines of $\overrightarrow{(p)}$ $|Y|SmO_2^{\%}$, $\overrightarrow{(p)}$ $|Y|O_2HHb$, $\overrightarrow{(p)}$ $|Y|\Phi O_2HHb$, $\overrightarrow{(p)}$ $|Y|\Phi HHb$, $\overrightarrow{(p)}$ $|Y|HHb$, $\overrightarrow{(p)}$ $|Y|ThB$ and $\overrightarrow{(p)}$ $|Y|\Phi ThB$, of each $TM^M$ can be observed.

The 1st General Change $\overrightarrow{(p)}$ is equals the Minimum Activation Threshold ($U_{Amin}$), the 2nd General Change $\overrightarrow{(p)}$ is equals the Aerobic Threshold ($U_{Ae}$) and the 3rd General Change $\overrightarrow{(p)}$ is equals the Threshold Anaerobic ($U_{ANA}$), of each $TM^M$.

TABLE 30

General changes in trend and physiological thresholds of each $TM^M$.

| $TM^M$ | 1st Change (p) $U_{Amin}$ Individual Rango\|X\| (Watts) \|X\| (Watts) | 2nd Change (p) $U_{Ae}$ Individual Rango\|X\| (Watts) \|X\| (Watts) | 3rd Change (p) $U_{Ana}$ Individual Rango\|X\| (Watts) \|X\| (Watts) |
|---|---|---|---|
| RF L | 134 – 138 / 136 | 198 – 206 / 202 | 246 – 266 / 256 |
| RF R | 132 – 142 / 137 | 198 – 208 / 203 | 244 – 266 / 255 |
| VL L | 130 – 138 / 134 | 192 – 206 / 199 | 254 – 270 / 262 |
| VL R | 130 – 140 / 135 | 196 – 206 / 201 | 254 – 268 / 261 |
| ST L | 132 – 144 / 138 | 196 – 206 / 201 | 254 – 268 / 261 |
| ST R | 130 138 / 134 | 192 – 204 / 198 | 254 – 276 / 265 |
| GM L | 132 – 138 / 135 | 192 – 208 / 200 | 244 – 262 / 253 |
| GM R | 130 – 140 / 135 | 194 – 206 / 200 | 238 – 262 / 250 |
| VI L | 132 – 150 / 141 | 190 – 206 / 198 | 244 – 270 / 257 |
| VI R | 126 – 140 / 133 | 184 – 206 / 195 | 250 – 258 / 254 |
| GA L | 126 – 138 / 132 | 194 – 214 / 204 | 258 – 274 / 266 |
| GA R | 126 138 / 132 | 190 – 212 / 201 | 256 – 260 / 258 |
| TA L | 130 – 138 / 134 | 192 – 206 / 199 | 252 – 258 / 255 |
| TA R | 132 – 144 / 138 | 194 – 210 / 202 | 246 – 270 / 258 |

1.19. In Table 31, the median values of all the general changes of (p) of the set of $TM_S^M$, that are equivalent to $U_{Amin}$, $U_{Ae}$ and $U_{ANA}$ of the global locomotor system can be observed.

TABLE 31

General Change in Trend and Global Physiological Thresholds

|  | 1st General Change (p) $U_{Amin}$ | 2nd General Change (p) $U_{Ae}$ | 3rd General Change (p) $U_{Ana}$ |
|---|---|---|---|
| Rango $|\tilde{X}|$ (Watts) | 130 – 138 | 192 – 206 | 252 – 268 |
| $|\tilde{X}|$ (Watts) | 136 | 201 | 258 |

2. Analysis and Evaluation of Locomotor Performance Factors

A3. Factor Functional por Inhibición Muscular de la Capacidad Oxidativa

In Table 9-11 and Table 18-23, the calculated value of $|Y|SmO_2^{\%}$, $|Y|O_2HHb$ and $|Y|\Phi O_2HHb$, of each $TM^M$, in each $INT^{TL}$ greater than or equal to $U_{Amin}$ can be observed.

In Table 32-37, the results of the CSV of $|Y|SmO_2^{\%}$, $|Y|\Phi O_2HHb$ and $|Y|O_2HHb$, of each $TM^M$ and his $TMC^M$, in each $INT^{TL}$ greater than or equal to $U_{Amin}$ can be observed.

In Table 38, can be observed $NS^{CSV}$ equivalent to the value of CSV.

In Table 39, Table 40 and Table 41, the values of Coef-$\overline{(p)}$ of $\overline{(p)}$ $|Y|SmO_2^{\%}$, $\overline{(p)}$ $|Y|O_2HHb$ and $\overline{(p)}$ $|Y|\Phi O_2HHb$, between each $TM^M$ and his $TMC^M$ can be observed.

In Table 42, the equivalence of Coef-$\overline{(p)}$ with the $NS^{Coef-(p)}$ of the general trend between each $TM^M$ and his $TMC^M$ can be observed.

TABLE 32

CSV of each $TM^M$ and hiss $TMC^M$ of $|Y|SmO_2^{\%}$ in each $INT^{TL} \geq U_{Amin}$ and $< U_{Ae}$

| Watts | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 136 | 0.22 | | 0.04 | | 0.01 | | 0.01 | | 0.12 | | 0.01 | | 0.13 | |
| 138 | 0.22 | | 0.04 | | 0.01 | | 0.01 | | 0.12 | | 0.01 | | 0.13 | |
| 140 | 0.22 | | 0.04 | | 0.01 | | 0.01 | | 0.12 | | 0.01 | | 0.13 | |
| 142 | 0.23 | | 0.04 | | 0.01 | | 0.00 | | 0.12 | | 0.01 | | 0.13 | |
| 144 | 0.23 | | 0.04 | | 0.01 | | 0.00 | | 0.13 | | 0.01 | | 0.13 | |
| 146 | 0.24 | | 0.04 | | 0.0 | | 0.00 | | 0.13 | | 0.01 | | 0.12 | |
| 148 | 0.24 | | 0.04 | | 0.01 | | 0.00 | | 0.13 | | 0.00 | | 0.12 | |
| 150 | 0.24 | | 0.05 | | 0.01 | | 0.00 | | 0.13 | | 0.00 | | 0.12 | |
| 152 | 0.25 | | 0.05 | | 0.01 | | 0.00 | | 0.13 | | 0.00 | | 0.12 | |
| 154 | 0.25 | | 0.05 | | 0.01 | | 0.00 | | 0.13 | | 0.00 | | 0.12 | |
| 156 | 0.25 | | 0.05 | | 0.01 | | 0.00 | | 0.13 | | 0.00 | | 0.11 | |
| 158 | 0.26 | | 0.05 | | 0.01 | | 0.00 | | 0.13 | | 0.00 | | 0.11 | |
| 160 | 0.26 | | 0.05 | | 0.01 | | 0.00 | | 0.14 | | 0.00 | | 0.11 | |
| 162 | 0.26 | | 0.05 | | 0.01 | | 0.00 | | 0.14 | | 0.00 | | 0.11 | |
| 164 | 0.26 | | 0.05 | | 0.02 | | 0.00 | | 0.14 | | 0.00 | | 0.11 | |
| 166 | 0.27 | | 0.05 | | 0.02 | | 0.00 | | 0.14 | | 0.00 | | 0.11 | |
| 168 | 0.27 | | 0.05 | | 0.02 | | 0.00 | | 0.14 | | 0.00 | | 0.10 | |
| 170 | 0.27 | | 0.05 | | 0.02 | | 0.00 | | 0.15 | | 0.00 | | 0.10 | |
| 172 | 0.27 | | 0.05 | | 0.02 | | 0.01 | | 0.15 | | 0.01 | | 0.10 | |
| 174 | 0.27 | | 0.05 | | 0.02 | | 0.01 | | 0.15 | | 0.01 | | 0.10 | |
| 176 | 0.28 | | 0.05 | | 0.02 | | 0.01 | | 0.15 | | 0.01 | | 0.10 | |
| 178 | 0.28 | | 0.05 | | 0.02 | | 0.01 | | 0.16 | | 0.01 | | 0.10 | |
| 180 | 0.28 | | 0.05 | | 0.02 | | 0.01 | | 0.16 | | 0.01 | | 0.10 | |
| 182 | 0.28 | | 0.05 | | 0.02 | | 0.01 | | 0.16 | | 0.01 | | 0.10 | |
| 184 | 0.28 | | 0.05 | | 0.02 | | 0.01 | | 0.17 | | 0.01 | | 0.10 | |
| 186 | 0.28 | | 0.06 | | 0.03 | | 0.01 | | 0.17 | | 0.01 | | 0.10 | |
| 188 | 0.28 | | 0.06 | | 0.03 | | 0.01 | | 0.17 | | 0.01 | | 0.10 | |
| 190 | 0.28 | | 0.06 | | 0.03 | | 0.01 | | 0.18 | | 0.01 | | 0.11 | |
| 192 | 0.28 | | 0.06 | | 0.03 | | 0.01 | | 0.18 | | 0.01 | | 0.11 | |
| 194 | 0.28 | | 0.06 | | 0.03 | | 0.01 | | 0.19 | | 0.01 | | 0.11 | |
| 196 | 0.28 | | 0.06 | | 0.03 | | 0.01 | | 0.19 | | 0.01 | | 0.11 | |
| 198 | 0.28 | | 0.06 | | 0.03 | | 0.01 | | 0.20 | | 0.02 | | 0.11 | |
| 200 | 0.28 | | 0.06 | | 0.03 | | 0.01 | | 0.20 | | 0.02 | | 0.12 | |

TABLE 33

CSV of each $TM^M$ and hiss $TMC^M$ of $|Y|SmO_2^{\%}$ in each $INT^{TL} \geq U_{Ae}$ and $< U_{Ana}$

| Watts | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 202 | 0.28 | | 0.06 | | 0.03 | | 0.01 | | 0.21 | | 0.02 | | 0.12 | |
| 204 | 0.28 | | 0.06 | | 0.03 | | 0.01 | | 0.22 | | 0.02 | | 0.12 | |
| 206 | 0.28 | | 0.05 | | 0.03 | | 0.01 | | 0.22 | | 0.02 | | 0.12 | |
| 208 | 0.28 | | 0.05 | | 0.03 | | 0.01 | | 0.23 | | 0.02 | | 0.13 | |
| 210 | 0.27 | | 0.05 | | 0.03 | | 0.01 | | 0.24 | | 0.02 | | 0.13 | |
| 212 | 0.27 | | 0.05 | | 0.03 | | 0.01 | | 0.24 | | 0.02 | | 0.13 | |
| 214 | 0.27 | | 0.05 | | 0.03 | | 0.01 | | 0.25 | | 0.02 | | 0.14 | |

TABLE 33-continued

CSV of each TM$^M$ and hiss TMC$^M$ of |Y|SmO$_2$$^\%$ in each INT$^{TL}$ ≥ U$_{Ae}$ and < U$_{Ana}$

| Watts | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 216 | 0.27 | 0.05 | 0.03 | 0.01 | | | | | 0.26 | | 0.03 | | 0.14 | |
| 218 | 0.27 | 0.05 | 0.03 | 0.01 | | | | | 0.26 | | 0.03 | | 0.14 | |
| 220 | 0.27 | 0.05 | 0.03 | 0.01 | | | | | 0.27 | | 0.03 | | 0.15 | |
| 222 | 0.27 | 0.05 | 0.03 | 0.01 | | | | | 0.28 | | 0.03 | | 0.15 | |
| 224 | 0.27 | 0.05 | 0.03 | 0.01 | | | | | 0.29 | | 0.03 | | 0.15 | |
| 226 | 0.27 | 0.05 | 0.03 | 0.01 | | | | | 0.29 | | 0.03 | | 0.16 | |
| 228 | 0.27 | 0.05 | 0.03 | 0.01 | | | | | 0.30 | | 0.03 | | 0.16 | |
| 230 | 0.27 | 0.05 | 0.03 | 0.01 | | | | | 0.31 | | 0.03 | | 0.16 | |
| 232 | 0.27 | 0.05 | 0.03 | 0.01 | | | | | 0.31 | | 0.04 | | 0.17 | |
| 234 | 0.27 | 0.05 | 0.03 | 0.01 | | | | | 0.32 | | 0.04 | | 0.17 | |
| 236 | 0.27 | 0.05 | 0.03 | 0.01 | | | | | 0.33 | | 0.04 | | 0.17 | |
| 238 | 0.27 | 0.06 | 0.03 | 0.01 | | | | | 0.33 | | 0.04 | | 0.17 | |
| 240 | 0.27 | 0.06 | 0.03 | 0.01 | | | | | 0.34 | | 0.04 | | 0.18 | |
| 242 | 0.27 | 0.06 | 0.03 | 0.01 | | | | | 0.34 | | 0.04 | | 0.18 | |
| 244 | 0.27 | 0.06 | 0.02 | 0.01 | | | | | 0.35 | | 0.05 | | 0.18 | |
| 246 | 0.28 | 0.06 | 0.02 | 0.01 | | | | | 0.35 | | 0.05 | | 0.18 | |
| 248 | 0.28 | 0.06 | 0.02 | 0.01 | | | | | 0.36 | | 0.05 | | 0.18 | |
| 250 | 0.28 | 0.06 | 0.02 | 0.01 | | | | | 0.36 | | 0.05 | | 0.18 | |

TABLE 34

CSV of each TM$^M$ and hiss TMC$^M$ of |Y|O$_2$HHb in each INT$^{TL}$ ≥ U$_{Amin}$ and < U$_{Ae}$

| Watts | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 136 | 0.239 | 0.040 | 0.000 | 0.009 | | | | | 0.136 | | 0.035 | | 0.103 | |
| 138 | 0.243 | 0.041 | 0.000 | 0.009 | | | | | 0.136 | | 0.035 | | 0.103 | |
| 140 | 0.247 | 0.042 | 0.001 | 0.009 | | | | | 0.136 | | 0.034 | | 0.102 | |
| 142 | 0.250 | 0.044 | 0.001 | 0.009 | | | | | 0.136 | | 0.033 | | 0.101 | |
| 144 | 0.253 | 0.045 | 0.002 | 0.008 | | | | | 0.136 | | 0.033 | | 0.100 | |
| 146 | 0.256 | 0.046 | 0.003 | 0.008 | | | | | 0.135 | | 0.032 | | 0.099 | |
| 148 | 0.258 | 0.047 | 0.004 | 0.008 | | | | | 0.134 | | 0.031 | | 0.098 | |
| 150 | 0.261 | 0.047 | 0.005 | 0.008 | | | | | 0.133 | | 0.030 | | 0.097 | |
| 152 | 0.263 | 0.048 | 0.006 | 0.007 | | | | | 0.132 | | 0.029 | | 0.095 | |
| 154 | 0.264 | 0.049 | 0.007 | 0.007 | | | | | 0.131 | | 0.028 | | 0.094 | |
| 156 | 0.266 | 0.049 | 0.008 | 0.006 | | | | | 0.130 | | 0.027 | | 0.092 | |
| 158 | 0.267 | 0.050 | 0.009 | 0.006 | | | | | 0.130 | | 0.026 | | 0.091 | |
| 160 | 0.268 | 0.050 | 0.011 | 0.006 | | | | | 0.129 | | 0.025 | | 0.089 | |
| 162 | 0.268 | 0.051 | 0.012 | 0.005 | | | | | 0.129 | | 0.024 | | 0.088 | |
| 164 | 0.269 | 0.051 | 0.013 | 0.005 | | | | | 0.128 | | 0.024 | | 0.087 | |
| 166 | 0.269 | 0.051 | 0.014 | 0.005 | | | | | 0.129 | | 0.023 | | 0.086 | |
| 168 | 0.269 | 0.051 | 0.016 | 0.004 | | | | | 0.129 | | 0.022 | | 0.084 | |
| 170 | 0.269 | 0.051 | 0.017 | 0.004 | | | | | 0.130 | | 0.022 | | 0.083 | |
| 172 | 0.269 | 0.051 | 0.018 | 0.004 | | | | | 0.131 | | 0.021 | | 0.082 | |
| 174 | 0.269 | 0.051 | 0.019 | 0.003 | | | | | 0.132 | | 0.020 | | 0.081 | |
| 176 | 0.269 | 0.051 | 0.020 | 0.003 | | | | | 0.134 | | 0.020 | | 0.081 | |
| 178 | 0.269 | 0.051 | 0.021 | 0.003 | | | | | 0.137 | | 0.020 | | 0.080 | |
| 180 | 0.268 | 0.051 | 0.022 | 0.003 | | | | | 0.139 | | 0.019 | | 0.080 | |
| 182 | 0.268 | 0.051 | 0.023 | 0.003 | | | | | 0.143 | | 0.019 | | 0.079 | |
| 184 | 0.267 | 0.051 | 0.024 | 0.002 | | | | | 0.147 | | 0.019 | | 0.079 | |
| 186 | 0.267 | 0.050 | 0.025 | 0.002 | | | | | 0.151 | | 0.019 | | 0.079 | |
| 188 | 0.267 | 0.050 | 0.025 | 0.002 | | | | | 0.156 | | 0.020 | | 0.079 | |
| 190 | 0.266 | 0.050 | 0.026 | 0.002 | | | | | 0.161 | | 0.020 | | 0.080 | |
| 192 | 0.266 | 0.050 | 0.026 | 0.002 | | | | | 0.167 | | 0.020 | | 0.080 | |
| 194 | 0.266 | 0.050 | 0.027 | 0.002 | | | | | 0.173 | | 0.021 | | 0.081 | |
| 196 | 0.265 | 0.049 | 0.027 | 0.002 | | | | | 0.180 | | 0.022 | | 0.082 | |
| 198 | 0.265 | 0.049 | 0.027 | 0.002 | | | | | 0.188 | | 0.023 | | 0.083 | |
| 200 | 0.265 | 0.049 | 0.027 | 0.003 | | | | | 0.196 | | 0.024 | | 0.084 | |

TABLE 35

CSV of each $TM^M$ and hiss $TMC^M$ of $|Y|O_2HHb$ in each $INT^{TL} \geq U_{Ae}$ and $< U_{Ana}$

| Watts | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 202 | 0.27 | | 0.05 | | 0.03 | | 0.00 | | 0.20 | | 0.02 | | 0.09 | |
| 204 | 0.27 | | 0.05 | | 0.03 | | 0.00 | | 0.21 | | 0.03 | | 0.09 | |
| 206 | 0.27 | | 0.05 | | 0.03 | | 0.00 | | 0.22 | | 0.03 | | 0.09 | |
| 208 | 0.27 | | 0.05 | | 0.03 | | 0.00 | | 0.23 | | 0.03 | | 0.09 | |
| 210 | 0.27 | | 0.05 | | 0.03 | | 0.00 | | 0.24 | | 0.03 | | 0.09 | |
| 212 | 0.27 | | 0.05 | | 0.03 | | 0.00 | | 0.25 | | 0.03 | | 0.10 | |
| 214 | 0.27 | | 0.05 | | 0.03 | | 0.01 | | 0.26 | | 0.03 | | 0.10 | |
| 216 | 0.27 | | 0.05 | | 0.02 | | 0.01 | | 0.28 | | 0.04 | | 0.10 | |
| 218 | 0.27 | | 0.05 | | 0.02 | | 0.01 | | 0.29 | | 0.04 | | 0.10 | |
| 220 | 0.27 | | 0.05 | | 0.02 | | 0.01 | | 0.30 | | 0.04 | | 0.11 | |
| 222 | 0.27 | | 0.05 | | 0.02 | | 0.01 | | 0.31 | | 0.04 | | 0.11 | |
| 224 | 0.27 | | 0.05 | | 0.02 | | 0.01 | | 0.32 | | 0.05 | | 0.11 | |
| 226 | 0.27 | | 0.05 | | 0.02 | | 0.01 | | 0.33 | | 0.05 | | 0.12 | |
| 228 | 0.28 | | 0.05 | | 0.02 | | 0.01 | | 0.34 | | 0.05 | | 0.12 | |
| 230 | 0.28 | | 0.05 | | 0.02 | | 0.01 | | 0.35 | | 0.05 | | 0.12 | |
| 232 | 0.28 | | 0.05 | | 0.02 | | 0.01 | | 0.36 | | 0.06 | | 0.13 | |
| 234 | 0.28 | | 0.05 | | 0.02 | | 0.01 | | 0.37 | | 0.06 | | 0.13 | |
| 236 | 0.28 | | 0.05 | | 0.02 | | 0.01 | | 0.38 | | 0.06 | | 0.13 | |
| 238 | 0.29 | | 0.05 | | 0.02 | | 0.01 | | 0.39 | | 0.07 | | 0.14 | |
| 240 | 0.29 | | 0.05 | | 0.01 | | 0.01 | | 0.39 | | 0.07 | | 0.14 | |
| 242 | 0.29 | | 0.06 | | 0.01 | | 0.01 | | 0.40 | | 0.07 | | 0.14 | |
| 244 | 0.29 | | 0.06 | | 0.01 | | 0.01 | | 0.40 | | 0.08 | | 0.15 | |
| 246 | 0.30 | | 0.06 | | 0.01 | | 0.02 | | 0.40 | | 0.08 | | 0.15 | |
| 248 | 0.30 | | 0.06 | | 0.01 | | 0.02 | | 0.40 | | 0.08 | | 0.15 | |
| 250 | 0.30 | | 0.06 | | 0.01 | | 0.02 | | 0.40 | | 0.09 | | 0.15 | |

TABLE 36

CSV of each $TM^M$ and hiss $TMC^M$ of $|Y|\phi O_2HHb$ in each $INT^{TL} \geq U_{Amin}$ and $< U_{Ae}$

| Watts | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 136 | 0.237 | | 0.038 | | 0.004 | | 0.003 | | 0.123 | | 0.033 | | 0.102 | |
| 138 | 0.241 | | 0.039 | | 0.004 | | 0.003 | | 0.125 | | 0.032 | | 0.102 | |
| 140 | 0.245 | | 0.040 | | 0.004 | | 0.004 | | 0.126 | | 0.032 | | 0.101 | |
| 142 | 0.248 | | 0.041 | | 0.005 | | 0.004 | | 0.128 | | 0.032 | | 0.100 | |
| 144 | 0.251 | | 0.042 | | 0.005 | | 0.005 | | 0.129 | | 0.031 | | 0.099 | |
| 146 | 0.254 | | 0.043 | | 0.006 | | 0.005 | | 0.131 | | 0.031 | | 0.098 | |
| 148 | 0.257 | | 0.044 | | 0.006 | | 0.006 | | 0.132 | | 0.030 | | 0.097 | |
| 150 | 0.259 | | 0.045 | | 0.007 | | 0.006 | | 0.133 | | 0.030 | | 0.096 | |
| 152 | 0.261 | | 0.046 | | 0.008 | | 0.007 | | 0.135 | | 0.029 | | 0.095 | |
| 154 | 0.263 | | 0.047 | | 0.008 | | 0.007 | | 0.136 | | 0.029 | | 0.093 | |
| 156 | 0.265 | | 0.048 | | 0.009 | | 0.008 | | 0.138 | | 0.028 | | 0.092 | |
| 158 | 0.266 | | 0.048 | | 0.010 | | 0.008 | | 0.139 | | 0.028 | | 0.091 | |
| 160 | 0.268 | | 0.049 | | 0.011 | | 0.009 | | 0.141 | | 0.027 | | 0.090 | |
| 162 | 0.269 | | 0.050 | | 0.011 | | 0.009 | | 0.142 | | 0.027 | | 0.089 | |
| 164 | 0.269 | | 0.050 | | 0.012 | | 0.009 | | 0.144 | | 0.026 | | 0.087 | |
| 166 | 0.270 | | 0.051 | | 0.013 | | 0.010 | | 0.146 | | 0.026 | | 0.086 | |
| 168 | 0.271 | | 0.051 | | 0.014 | | 0.010 | | 0.148 | | 0.025 | | 0.086 | |
| 170 | 0.271 | | 0.052 | | 0.014 | | 0.010 | | 0.150 | | 0.025 | | 0.085 | |
| 172 | 0.271 | | 0.052 | | 0.015 | | 0.010 | | 0.153 | | 0.025 | | 0.084 | |
| 174 | 0.272 | | 0.052 | | 0.016 | | 0.010 | | 0.155 | | 0.024 | | 0.084 | |
| 176 | 0.272 | | 0.053 | | 0.017 | | 0.010 | | 0.158 | | 0.024 | | 0.083 | |
| 178 | 0.272 | | 0.053 | | 0.017 | | 0.010 | | 0.161 | | 0.024 | | 0.083 | |
| 180 | 0.272 | | 0.053 | | 0.018 | | 0.010 | | 0.164 | | 0.024 | | 0.083 | |
| 182 | 0.272 | | 0.053 | | 0.018 | | 0.010 | | 0.168 | | 0.024 | | 0.083 | |
| 184 | 0.272 | | 0.053 | | 0.019 | | 0.010 | | 0.171 | | 0.024 | | 0.083 | |
| 186 | 0.272 | | 0.053 | | 0.019 | | 0.010 | | 0.175 | | 0.024 | | 0.083 | |
| 188 | 0.272 | | 0.053 | | 0.020 | | 0.009 | | 0.179 | | 0.024 | | 0.083 | |
| 190 | 0.271 | | 0.053 | | 0.020 | | 0.009 | | 0.184 | | 0.024 | | 0.084 | |
| 192 | 0.271 | | 0.053 | | 0.021 | | 0.009 | | 0.188 | | 0.024 | | 0.085 | |
| 194 | 0.271 | | 0.053 | | 0.021 | | 0.008 | | 0.193 | | 0.025 | | 0.085 | |
| 196 | 0.271 | | 0.053 | | 0.021 | | 0.008 | | 0.198 | | 0.025 | | 0.086 | |
| 198 | 0.271 | | 0.053 | | 0.022 | | 0.008 | | 0.203 | | 0.026 | | 0.088 | |
| 200 | 0.271 | | 0.053 | | 0.022 | | 0.007 | | 0.209 | | 0.026 | | 0.089 | |

TABLE 37

CSV of each $TM^M$ and hiss $TMC^M$ of $|Y|\phi O_2HHb$ in each $INT^{TL} \geq U_{Ae}$ and $< U_{Ana}$

| Watts | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 202 | 0.27 | 0.05 | 0.02 | 0.01 | | | 0.21 | 0.03 | | | | | 0.09 | |
| 204 | 0.27 | 0.05 | 0.02 | 0.01 | | | 0.22 | 0.03 | | | | | 0.09 | |
| 206 | 0.27 | 0.05 | 0.02 | 0.01 | | | 0.23 | 0.03 | | | | | 0.09 | |
| 208 | 0.27 | 0.05 | 0.02 | 0.01 | | | 0.23 | 0.03 | | | | | 0.10 | |
| 210 | 0.27 | 0.05 | 0.02 | 0.01 | | | 0.24 | 0.03 | | | | | 0.10 | |
| 212 | 0.27 | 0.05 | 0.02 | 0.00 | | | 0.25 | 0.03 | | | | | 0.10 | |
| 214 | 0.27 | 0.05 | 0.02 | 0.00 | | | 0.25 | 0.03 | | | | | 0.10 | |
| 216 | 0.27 | 0.05 | 0.02 | 0.00 | | | 0.26 | 0.04 | | | | | 0.10 | |
| 218 | 0.27 | 0.05 | 0.02 | 0.00 | | | 0.27 | 0.04 | | | | | 0.11 | |
| 220 | 0.27 | 0.05 | 0.02 | 0.00 | | | 0.27 | 0.04 | | | | | 0.11 | |
| 222 | 0.28 | 0.05 | 0.02 | 0.00 | | | 0.28 | 0.04 | | | | | 0.11 | |
| 224 | 0.28 | 0.05 | 0.02 | 0.00 | | | 0.29 | 0.04 | | | | | 0.11 | |
| 226 | 0.28 | 0.05 | 0.02 | 0.00 | | | 0.29 | 0.05 | | | | | 0.12 | |
| 228 | 0.28 | 0.05 | 0.02 | 0.00 | | | 0.30 | 0.05 | | | | | 0.12 | |
| 230 | 0.28 | 0.05 | 0.02 | 0.00 | | | 0.31 | 0.05 | | | | | 0.12 | |
| 232 | 0.28 | 0.05 | 0.02 | 0.00 | | | 0.32 | 0.05 | | | | | 0.12 | |
| 234 | 0.28 | 0.05 | 0.02 | 0.00 | | | 0.32 | 0.06 | | | | | 0.13 | |
| 236 | 0.28 | 0.05 | 0.02 | 0.00 | | | 0.33 | 0.06 | | | | | 0.13 | |
| 238 | 0.28 | 0.05 | 0.02 | 0.01 | | | 0.33 | 0.06 | | | | | 0.13 | |
| 240 | 0.29 | 0.05 | 0.02 | 0.01 | | | 0.34 | 0.07 | | | | | 0.13 | |
| 242 | 0.29 | 0.05 | 0.02 | 0.01 | | | 0.35 | 0.07 | | | | | 0.14 | |
| 244 | 0.29 | 0.05 | 0.02 | 0.01 | | | 0.35 | 0.07 | | | | | 0.14 | |
| 246 | 0.29 | 0.05 | 0.02 | 0.01 | | | 0.35 | 0.08 | | | | | 0.14 | |
| 248 | 0.29 | 0.05 | 0.02 | 0.01 | | | 0.36 | 0.08 | | | | | 0.14 | |
| 250 | 0.30 | 0.05 | 0.02 | 0.01 | | | 0.36 | 0.08 | | | | | 0.15 | |

TABLE 38

$NS^{CSV}$ equivalent to the values of CSV

| Symmetry Level | CSV | | |
|---|---|---|---|
| ($NS^{CSV}$) | $SmO_2\%$ | $O_2HHb$-$HHb$ | $\phi O_2HHb$-$\phi HHb$ |
| Perfect | ≤0.01 | ≤0.001 | ≤0.01 |
| Optimum | >0.01 ≤0.05 | >0.001 ≤0.005 | >0.01 ≤0.05 |
| Minimal | >0.05 ≤0.20 | >0.005 ≤0.02 | >0.05 ≤0.2 |
| Asymmetry | >0.20 | >0.02 | >0.2 |

There is a Functional Factor Limitation due to Muscular Inhibition of Oxidative Capacity in the Left Rectus Femoris (RF L) because it meets the established criteria of Factor (A3) that can be determined:

1) In Table 9 and Table 10, the minimum value of $|Y|SmO_2\%$ of RF L, is greater than 50% $SmO_2\%$, in the 100% of $INT^{TL}$ greater than or equal to Use and less than $U_{Ana}$, can be observed
2) In Table 34-37, the CSV of $|Y|SmO_2\%$, $|Y|O_2HHb$ and $|Y|\Phi O_2HHb$ of RF L with respect to RF R is asymmetric, in all $INT^{TL}$ greater than or equal to Use and less than $U_{Ana}$ can be observed.
3) In Table 39, Table 40 and Table 41, the general trend $\overline{(p)}\ |Y|SmO_2\%$, $\overline{(p)}\ |Y|O_2HHb$ and $\overline{(p)}\ |Y|\Phi O_2HHb$ is symmetric in the >70% of the $TM_S^M$ with respect their $TM_SC^M$, in the R-$INT^{TL}$ ($U_{Amin}$–$U_{Ae}$) and ($U_{Ae}$–$U_{Ana}$) can be observed.

TABLE 39

Values of $SmO2\%$ of the R-$INT^{TL}$ ($U_{Amin}$ – $U_{Ae}$) and ($U_{Ae}$ – $U_{Ana}$), Coef-$\overline{(p)}$ and the equivalent symmetry level ($NS^{Coef-(p)}$)

| TM | $U_{Amin}$ $SmO_2\%$ | $U_{Ae}$ $SmO_2\%$ | (p) | Coef-$\overline{(p)}$ | Symmetry | $U_{Ae}$ $SmO_2\%$ | $U_{Ana}$ $SmO_2\%$ | (p) | Coef-$\overline{(p)}$ | Symmetry |
|---|---|---|---|---|---|---|---|---|---|---|
| RF L | 72 | 68 | −0.06 | −0.018 | Min | 68 | 55 | −0.26 | −0.014 | Min |
| RF R | 53 | 46 | −0.11 | | | 45 | 37 | −0.18 | | |
| VL L | 76 | 70 | −0.10 | −0.002 | Perf | 69 | 56 | −0.28 | 0.000 | Perf |
| VL R | 72 | 64 | −0.12 | | | 64 | 51 | −0.26 | | |
| ST L | 76 | 67 | −0.13 | −0.003 | Perf | 67 | 52 | −0.32 | −0.001 | Perf |
| ST R | 77 | 70 | −0.10 | | | 70 | 53 | −0.35 | | |
| GM L | 90 | 92 | 0.02 | 0.000 | Perf | 92 | 88 | −0.07 | −0.002 | Perf |
| GM R | 91 | 93 | 0.02 | | | 93 | 90 | −0.06 | | |
| VI L | 54 | 43 | −0.17 | −0.004 | Perf | 42 | 31 | −0.23 | −0.003 | Perf |
| VI R | 45 | 32 | −0.20 | | | 31 | 19 | −0.26 | | |
| GA L | 88 | 85 | −0.04 | −0.002 | Perf | 85 | 82 | −0.06 | −0.195 | Min |
| GA R | 89 | 87 | −0.02 | | | 87 | 89 | 0.02 | | |
| TA L | 46 | 44 | −0.03 | −0.009 | Opt | 44 | 35 | −0.19 | −0.006 | Opt |
| TA R | 56 | 52 | −0.06 | | | 52 | 45 | −0.14 | | |

Min: NS Minimum;
Opt: NS Optimal;
Perf: NS Perfect;
(Asi) NS Asymmetric

TABLE 40

Values of $O_2HHb$ of the R-INT$^{TL}$ ($U_{Amin} - U_{Ae}$) and ($U_{Ae} - U_{Ana}$), Coef-$\overrightarrow{(p)}$ and the equivalent symmetry level (NS$^{Coef-(p)}$)

| TM | $U_{Amin}$ $O_2HHb$ | $U_{Ae}$ $O_2HHb$ | (p) | Coef-$\overrightarrow{(p)}$ | Symmetry | $U_{Ae}$ $O_2HHb$ | $U_{Ana}$ $O_2HHb$ | (p) | Coef-$\overrightarrow{(p)}$ | Symmetry |
|---|---|---|---|---|---|---|---|---|---|---|
| RF L | 9.2 | 8.7 | −0.01 | −0.0002 | Perf | 8.66 | 7.03 | −0.03 | −0.0004 | Perf |
| RF R | 6.6 | 6.0 | −0.01 | | | 5.93 | 4.55 | −0.03 | | |
| VL L | 9.1 | 8.5 | −0.01 | −0.0001 | Perf | 8.42 | 6.57 | −0.04 | 0.0000 | Perf |
| VL R | 8.6 | 7.9 | −0.01 | | | 7.86 | 6.04 | −0.04 | | |
| ST L | 9.2 | 8.3 | −0.01 | −0.0012 | Min | 8.28 | 6.07 | −0.05 | −0.0002 | Perf |
| ST R | 9.2 | 8.7 | −0.01 | | | 8.60 | 6.18 | −0.05 | | |
| GM L | 10.9 | 11.1 | 0.00 | 0.0005 | Opt | 11.12 | 10.41 | −0.01 | −0.0007 | Opt |
| GM R | 11.1 | 11.2 | 0.00 | | | 11.17 | 10.67 | −0.01 | | |
| VI L | 6.6 | 5.5 | −0.02 | −0.0002 | Min | 5.40 | 3.91 | −0.03 | −0.0008 | Opt |
| VI R | 5.5 | 4.1 | −0.02 | | | 4.04 | 2.19 | −0.04 | | |
| GA L | 10.0 | 10.8 | 0.01 | 0.0002 | Min | 10.79 | 9.08 | −0.04 | −0.0050 | Asi |
| GA R | 10.5 | 11.2 | 0.01 | | | 11.18 | 10.26 | −0.02 | | |
| TA L | 5.9 | 5.8 | 0.00 | −0.0014 | Min | 5.72 | 4.41 | −0.03 | −0.0010 | Opt |
| TA R | 6.8 | 6.5 | 0.00 | | | 6.46 | 5.49 | −0.02 | | |

Min: NS Minimum;
Opt: NS Optimal;
Perf: NS Perfect;
(Asi) NS Asymmetric

TABLE 41

Values of $\Phi O_2HHb$ of the R-INT$^{TL}$ ($U_{Amin} - U_{Ae}$) and ($U_{Ae} - U_{Ana}$), Coef-$\overrightarrow{(p)}$ and the equivalent symmetry level (NS$^{Coef-(p)}$)

| TM | $U_{Amin}$ $\phi O_2HHb$ | $U_{Ae}$ $\phi O_2HHb$ | (p) | Coef-$\overrightarrow{(p)}$ | Symmetry | $U_{Ae}$ $\Phi O_2HHb$ | $U_{Ana}$ $\Phi O_2HHb$ | (p) | Coef-$\overrightarrow{(p)}$ | Symmetry |
|---|---|---|---|---|---|---|---|---|---|---|
| RF L | 19.2 | 22.1 | 0.05 | 0.010 | Opt | 22.15 | 21.03 | −0.02 | 0.00 | Opt |
| RF R | 13.7 | 15.0 | 0.02 | | | 15.02 | 13.77 | −0.03 | | |
| VL L | 19.1 | 21.6 | 0.04 | 0.001 | Perf | 21.62 | 19.66 | −0.04 | 0.00 | Opt |
| VL R | 18.1 | 20.1 | 0.03 | | | 20.05 | 18.20 | −0.04 | | |
| ST L | 19.2 | 21.1 | 0.03 | 0.001 | Pef | 21.09 | 18.22 | −0.06 | 0.00 | Perf |
| ST R | 19.3 | 21.8 | 0.04 | | | 21.76 | 18.76 | −0.06 | | |
| GM L | 22.7 | 28.6 | 0.09 | 0.000 | Perf | 28.79 | 30.82 | 0.04 | 0.00 | Perf |
| GM R | 22.8 | 28.9 | 0.09 | | | 29.07 | 31.31 | 0.05 | | |
| VI L | 13.7 | 14.1 | 0.01 | −0.043 | Asi | 14.03 | 11.57 | −0.05 | 0.00 | Perf |
| VI R | 11.6 | 10.5 | −0.02 | | | 10.34 | 6.87 | −0.07 | | |
| GA L | 20.9 | 27.5 | 0.10 | 0.000 | Perf | 27.63 | 27.28 | −0.01 | 0.07 | Opt |
| GA R | 21.9 | 28.6 | 0.10 | | | 28.72 | 30.65 | 0.04 | | |
| TA L | 12.3 | 14.6 | 0.04 | 0.000 | Perf | 14.58 | 13.32 | −0.03 | −0.02 | Perf |
| TA R | 14.2 | 16.5 | 0.04 | | | 16.57 | 16.39 | 0.00 | | |

Min: NS Minimum;
Opt: NS Optimal;
Perf: NS Perfect;
(Asi) NS Asymmetric

TABLE 42

NS$^{Coef-(p)}$ equivalent to the values Coef-$\overrightarrow{(p)}$

| Symmetry Level (NS$^{Coef-(p)}$) | Coef-$\overrightarrow{(p)}$ | | | | | |
|---|---|---|---|---|---|---|
| | $SmO_2\%$ | | $O_2HHb - HHb$ | | $\Phi O_2HHb - \Phi HHb$ | |
| Perfect | ≤0.01 | | ≤0.001 | | ≤0.01 | |
| Optimum | >0.01 | ≤0.05 | >0.001 | ≤0.005 | >0.01 | ≤0.05 |
| Minimal | >0.05 | ≤0.15 | >0.005 | ≤0.015 | >0.05 | ≤0.15 |
| Asymmetry | >0.15 | | >0.015 | | >0.15 | | a.4. Neuromuscular Factor of Oxidative Capacity (Intermuscular Coordination).

In Table 9-29, the calculated value and minimum value |Y|SmO$_2\%$, |Y|ΦO$_2$HHb and |Y|O$_2$HHb, of all TM$_S^M$, in each INT$^{TL}$ greater than or equal to U$_{Amin}$ can be observed.

In Table 32-37, the CSV between the value of |Y|SmO$_2\%$, |Y|O$_2$HHb and |Y|ΦO$_2$HHb, of each TM$^M$ and his TMC$^M$, in each INT$^{TL}$ greater than or equal to U$_{Amin}$ and less than U$_{Ana}$ can be observed.

In FIGS. 52-100, $\overrightarrow{(p)}$ calculated from |Y|SmO$_2\%$, $\overrightarrow{(p)}$ |Y|±O$_2$HHb and $\overrightarrow{(p)}$ |Y|O$_2$HHb, of all TM$_S^M$, in each INT$^{TL}$ greater than or equal to U$_{Ae}$ can be observed.

In Table 32-37, the values and NS$^{Coef-(p)}$ of $\overrightarrow{(p)}$ |Y|SmO$_2\%$, $\overrightarrow{(p)}$ |Y|±O$_2$Hb and $\overrightarrow{(p)}$ |Y|O$_2$HHb, between each TM$^M$ and his TMC$^M$, in the R-INT$^{TL}$ (U$_{Amin}$–U$_{Ae}$) and (U$_{Ae}$–U$_{Ana}$) can be observed.

The TM$_S^M$ (GM L, GM R, GA L and GA R) present a Limitation of the Neuromuscular Factor of Oxidative Capacity by meeting the criteria of Factor (A.4) that can be established:

1) In Table 9 and 10, the calculated values of |Y|SmO$_2\%$ of (GM L, GM R, GA L and GA R) are ≥65% SmO$_2\%$, in each INT$^{TL}$ greater than or equal to U$_{Amin}$ and less than U$_{Ana}$ can be observed.

2) In Table 32-37, the general trend of $\overrightarrow{(p)}$ |Y|SmO$_2$%, $\overrightarrow{(p)}$ |Y|ΦO$_2$HHb and $\overrightarrow{(p)}$ |Y|O$_2$HHb, of each TM$^M$ and his TMC$^M$ is symmetrically optimal, in more than 70% of TM$_S^M$ and their TM$_S$C$^M$, in the R-INT$^{TL}$ (U$_{Amin}$-U$_{Ae}$) and (U$_{Ae}$-U$_{Ana}$) can be observed.

3) In Table 9-11 and Table 18-23, the calculated values of |Y|SmO$_2$%, |Y|ΦO$_2$HHb and |Y|O$_2$HHb of (GM L, GM R, GA L and GA R) are greater than the values of |Y|SmO$_2$%, |Y|ΦO$_2$HHb and |Y|O$_2$HHb, of the other TM$_S^M$, in all INT$^{TL}$ greater than or equal to U$_{Amin}$ can be observed.

4) In Table 9-11, the calculated values of |Y|SmO$_2$% of the TM$_S^M$, in more than 60% of the TM$_S^M$ (RF L, RF R, VL R, ST L, ST R, VI L, VI R, TA L, TA R), present values≤45% SmO$_2$%, in at least one INT$^{TL}$ greater than or equal to U$_{Ae}$ can be observed.

B2.1. Performance Factor of Analytical Delivery of Blood Flow During Exercise

In Table 9-11 and Table 18-23, the calculated values of |Y|SmO$_2$%, |Y|O$_2$HHb and |Y|ΦO$_2$HHb of each TM$^M$, in each INT$^{TL}$ greater than or equal to U$_{Amin}$ can be observed.

In Table 9-11 and Table 18-23, the calculated values of SmO$_2$%, O$_2$HHb and ΦO$_2$HHb, of the Upper Limit of the Optimal Zone |lim sup|Zona$^{Op}$), in each INT$^{TL}$ greater than or equal to U$_{Amin}$ can be observed.

In Table 9-11 and Table 18-23, the calculated values of SmO$_2$%, O$_2$HHb and ΦO$_2$HHb, of the Lower Limit of the Optimal Zone |lim inf|Zona$^{Op}$), in each INT$^{TL}$ greater than or equal to U$_{Amin}$ can be observed.

In Table 43, the type of Analytical Muscular Blood Flow Composition of each TM$^M$, established from the criteria of Factor (B2.1) can be observed.

In Table 43, the type of Hemoglobin Delivery Volume of each TM$^M$, established from the criteria of Factor (B2.2) can be observed.

In Table 43, the type of Blood Flow Delivery Rate of each TM$^M$, established from the criteria of Factor (B2.3) can be observed.

TABLE 43

Type of Performance of each TM$^M$ of factors (B2.1), (B2.2) and (B2.3), in each R-INT$^{TL}$.

| TM | Rank intensity | Flow Composition | Delivery Volume | Delivery rate |
|---|---|---|---|---|
| RF L | U$_{Amin}$ - U$_{Ae}$ | Optimal | Optimal | Optimal |
|  | U$_{Ae}$ - U$_{Ana}$ |  |  |  |
|  | >U$_{Ana}$ |  |  |  |
| RF R | U$_{Amin}$ - U$_{Ae}$ | Lesser | Lesser | Lesser |
|  | U$_{Ae}$ - U$_{Ana}$ |  |  |  |
|  | >U$_{Ana}$ |  |  |  |
| VL L | U$_{Amin}$ - U$_{Ae}$ | Optimal | Optimal | Optimal |
|  | U$_{Ae}$ - U$_{Ana}$ |  |  |  |
|  | >U$_{Ana}$ |  |  |  |
| VL R | U$_{Amin}$ - U$_{Ae}$ | Optimal | Optimal | Optimal |
|  | U$_{Ae}$ - U$_{Ana}$ |  |  |  |
|  | >U$_{Ana}$ |  |  |  |

TABLE 43-continued

Type of Performance of each TM$^M$ of factors (B2.1), (B2.2) and (B2.3), in each R-INT$^{TL}$.

| TM | Rank intensity | Flow Composition | Delivery Volume | Delivery rate |
|---|---|---|---|---|
| ST L | U$_{Amin}$ - U$_{Ae}$ | Optimal | Optimal | Optimal |
|  | U$_{Ae}$ - U$_{Ana}$ |  |  |  |
|  | >U$_{Ana}$ |  |  |  |
| ST R | U$_{Amin}$ - U$_{Ae}$ | Optimal | Optimal | Optimal |
|  | U$_{Ae}$ - U$_{Ana}$ |  |  |  |
|  | >U$_{Ana}$ |  |  |  |
| GM L | U$_{Amin}$ - U$_{Ae}$ | Excessive | Lesser | Lesser |
|  | U$_{Ae}$ - U$_{Ana}$ |  |  |  |
|  | >U$_{Ana}$ |  |  |  |
| GM R | U$_{Amin}$ - U$_{Ae}$ | Excessive | Lesser | Lesser |
|  | U$_{Ae}$ - U$_{Ana}$ |  |  |  |
|  | >U$_{Ana}$ |  |  |  |
| VI L | U$_{Amin}$ - U$_{Ae}$ | Lesser | Lesser | Lesser |
|  | U$_{Ae}$ - U$_{Ana}$ |  |  |  |
|  | >U$_{Ana}$ |  |  |  |
| VI R | U$_{Amin}$ - U$_{Ae}$ | Lesser | Lesser | Lesser |
|  | >U$_{Ana}$ |  |  |  |
|  | U$_{Ae}$ - U$_{Ana}$ | Inefficient |  |  |
| GA L | U$_{Amin}$ - U$_{Ae}$ | Excessive | Lesser | Lesser |
|  | >U$_{Ana}$ |  |  |  |
|  | U$_{Ae}$ - U$_{Ana}$ | Higher |  |  |
| GA R | U$_{Amin}$ - U$_{Ae}$ | Excessive | Lesser | Lesser |
|  | U$_{Ae}$ - U$_{Ana}$ |  |  |  |
|  | >U$_{Ana}$ |  |  |  |
| TA L | U$_{Amin}$ - U$_{Ae}$ | Lesser | Lesser | Lesser |
|  | U$_{Ae}$ - U$_{Ana}$ |  |  |  |
|  | >U$_{Ana}$ |  |  |  |
| TA R | U$_{Amin}$ - U$_{Ae}$ | Lesser | Lesser | Lesser |
|  | >U$_{Ana}$ |  |  |  |
|  | U$_{Ae}$ - U$_{Ana}$ | Optimal | Optimal | Optimal |

B2.2. Functional Sympatholysis Factor of Blood Flow Redistribution

In Table 44-46, the maximum values of SmO$_2$%, O$_2$HHb and ΦO$_2$HHb of each MM, in each of the rest intervals (ID) performed can be observed.

In Table 47, the highest level of symmetry (NS$^{CSV}$) calculated between the combination of >70% of the maximum values of SmO$_2$%, O$_2$HHb and ΦO$_2$HHb, of each ID after a work interval (IT) of average INT$^{TL}$ greater than or equal to U$_{Amin}$ can be observed.

TABLE 44

Maximum values of SmO$_2$%, in each ID of each TM$^M$

| ID | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 01 | 76 | 78 | 83 | 79 | 83 | 87 | 89 | 94 | 69 | 71 | 80 | 87 | 56 | 59 |
| 02 | 83 | 69 | 82 | 81 | 82 | 86 | 90 | 89 | 66 | 71 | 86 | 87 | 68 | 64 |
| 03 | 85 | 62 | 83 | 79 | 82 | 86 | 91 | 89 | 67 | 74 | 89 | 91 | 59 | 65 |
| 04 | 81 | 64 | 84 | 78 | 83 | 81 | 90 | 90 | 67 | 71 | 89 | 91 | 79 | 65 |
| 05 | 79 | 61 | 86 | 82 | 85 | 83 | 92 | 92 | 72 | 69 | 92 | 92 | 67 | 62 |
| 06 | 85 | 61 | 85 | 82 | 86 | 85 | 93 | 93 | 74 | 70 | 92 | 92 | 63 | 64 |
| 07 | 87 | 81 | 89 | 88 | 90 | 87 | 94 | 95 | 81 | 81 | 92 | 93 | 80 | 74 |
| 08 | 87 | 76 | 89 | 88 | 90 | 87 | 94 | 95 | 82 | 79 | 93 | 93 | 72 | 73 |
| 09 | 85 | 84 | 87 | 85 | 89 | 89 | 94 | 95 | 78 | 73 | 93 | 92 | 71 | 79 |
| 10 | 88 | 81 | 87 | 84 | 88 | 87 | 94 | 95 | 75 | 77 | 93 | 92 | 70 | 78 |
| 11 | 85 | 66 | 86 | 83 | 87 | 86 | 94 | 94 | 74 | 75 | 92 | 92 | 64 | 71 |
| 12 | 83 | 61 | 84 | 83 | 85 | 85 | 94 | 94 | 78 | 74 | 92 | 92 | 61 | 70 |
| 13 | 81 | 69 | 84 | 81 | 84 | 83 | 93 | 94 | 79 | 75 | 92 | 92 | 63 | 65 |
| 14 | 80 | 67 | 86 | 82 | 83 | 82 | 92 | 93 | 84 | 79 | 92 | 92 | 61 | 66 |
| 15 | 76 | 57 | 86 | 83 | 79 | 77 | 92 | 92 | 84 | 78 | 90 | 90 | 55 | 60 |

TABLE 45

Maximum values of $O_2HHb$, in each ID of each $TM^M$

| ID | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 01 | 9.7 | 9.8 | 10.3 | 9.7 | 10.2 | 11.0 | 10.6 | 11.2 | 8.8 | 9.0 | 9.5 | 10.7 | 7.3 | 7.4 |
| 02 | 10.7 | 8.6 | 10.1 | 9.9 | 10.1 | 10.8 | 11.0 | 11.1 | 8.4 | 8.9 | 10.4 | 10.8 | 8.8 | 8.1 |
| 03 | 11.0 | 7.8 | 10.3 | 9.7 | 10.1 | 10.8 | 11.2 | 11.3 | 8.5 | 9.1 | 10.8 | 11.5 | 7.6 | 8.2 |
| 04 | 10.4 | 8.0 | 10.4 | 9.6 | 10.3 | 10.0 | 11.1 | 11.3 | 8.5 | 8.7 | 10.8 | 11.5 | 10.2 | 8.1 |
| 05 | 10.2 | 7.7 | 10.7 | 10.1 | 10.6 | 10.2 | 11.4 | 11.6 | 9.2 | 8.6 | 11.3 | 11.7 | 8.6 | 7.8 |
| 06 | 11.1 | 7.7 | 10.6 | 10.1 | 10.7 | 10.5 | 11.6 | 11.9 | 9.4 | 8.7 | 11.2 | 11.7 | 8.1 | 8.0 |
| 07 | 11.3 | 10.2 | 11.2 | 11.0 | 11.4 | 10.7 | 11.8 | 11.9 | 10.2 | 10.2 | 11.3 | 11.8 | 10.4 | 9.3 |
| 08 | 11.3 | 9.6 | 11.1 | 11.0 | 11.3 | 10.8 | 11.5 | 11.8 | 10.4 | 10.0 | 11.4 | 11.8 | 9.3 | 9.1 |
| 09 | 11.0 | 10.7 | 10.8 | 10.5 | 11.2 | 11.0 | 11.6 | 11.7 | 9.9 | 9.0 | 11.4 | 11.7 | 9.1 | 9.9 |
| 10 | 11.5 | 10.2 | 10.8 | 10.4 | 11.1 | 10.7 | 11.6 | 11.7 | 9.5 | 9.5 | 11.4 | 11.7 | 9.0 | 9.8 |
| 11 | 11.0 | 8.3 | 10.6 | 10.2 | 10.9 | 10.6 | 11.6 | 11.6 | 9.4 | 9.2 | 11.3 | 11.7 | 8.2 | 8.8 |
| 12 | 10.7 | 7.7 | 10.4 | 10.2 | 10.6 | 10.5 | 11.5 | 11.6 | 10.0 | 9.2 | 11.3 | 11.7 | 7.9 | 8.7 |
| 13 | 10.5 | 8.7 | 10.4 | 10.0 | 10.4 | 10.2 | 11.4 | 11.6 | 10.2 | 9.3 | 11.3 | 11.7 | 8.1 | 8.1 |
| 14 | 10.3 | 8.4 | 10.8 | 10.2 | 10.3 | 10.0 | 11.3 | 11.5 | 10.9 | 9.9 | 11.3 | 11.6 | 7.8 | 8.2 |
| 15 | 9.8 | 7.2 | 10.7 | 10.4 | 9.7 | 9.5 | 11.2 | 11.3 | 10.8 | 9.8 | 10.9 | 11.4 | 7.1 | 7.5 |

TABLE 46

Maximum values of $\phi O_2HHb$, in each ID of each $TM^M$

| ID | RF L | RF R | VL L | VL R | ST L | ST R | GM L | GM R | VI L | VI R | GA L | GA R | TA L | TA R |
|---|---|---|---|---|---|---|---|---|---|---|---|---|---|---|
| 01 | 18.4 | 16.9 | 20.1 | 19.1 | 19.1 | 21.6 | 20.8 | 22.1 | 17.0 | 16.4 | 18.6 | 21.3 | 13.7 | 13.7 |
| 02 | 20.4 | 16.5 | 20.6 | 20.2 | 20.4 | 22.1 | 23.4 | 24.3 | 16.9 | 18.4 | 20.5 | 23.1 | 17.8 | 16.5 |
| 03 | 21.0 | 15.9 | 21.2 | 19.9 | 20.5 | 20.9 | 23.6 | 23.9 | 17.0 | 18.6 | 22.9 | 24.4 | 14.0 | 14.4 |
| 04 | 21.6 | 14.8 | 21.7 | 20.3 | 20.8 | 19.9 | 24.3 | 25.0 | 17.4 | 16.5 | 23.1 | 24.9 | 18.9 | 16.4 |
| 05 | 21.0 | 15.4 | 21.0 | 20.1 | 20.5 | 20.5 | 24.0 | 24.8 | 17.5 | 16.5 | 23.2 | 24.4 | 15.2 | 15.5 |
| 06 | 21.8 | 14.6 | 21.4 | 20.6 | 21.0 | 20.9 | 24.6 | 25.6 | 17.8 | 16.7 | 23.8 | 25.4 | 15.7 | 17.3 |
| 07 | 22.0 | 17.3 | 22.6 | 21.1 | 21.5 | 20.2 | 25.3 | 26.1 | 18.5 | 19.1 | 24.1 | 25.7 | 19.5 | 17.6 |
| 08 | 20.9 | 17.7 | 20.8 | 20.4 | 20.9 | 20.9 | 23.3 | 23.7 | 16.6 | 16.7 | 22.5 | 23.2 | 16.1 | 18.3 |
| 09 | 21.2 | 19.1 | 21.7 | 21.3 | 21.6 | 21.5 | 24.4 | 24.6 | 17.2 | 16.3 | 23.5 | 24.6 | 16.3 | 17.8 |
| 10 | 22.2 | 19.6 | 23.1 | 22.2 | 22.9 | 22.2 | 26.1 | 26.5 | 20.2 | 20.2 | 24.7 | 26.0 | 17.3 | 18.5 |
| 11 | 22.2 | 16.7 | 24.2 | 22.9 | 22.6 | 22.9 | 27.5 | 27.9 | 20.6 | 20.0 | 26.3 | 27.8 | 15.3 | 16.9 |
| 12 | 24.3 | 16.9 | 24.8 | 23.1 | 22.6 | 22.8 | 29.5 | 29.6 | 22.5 | 18.9 | 28.0 | 29.8 | 16.9 | 19.8 |
| 13 | 23.4 | 18.8 | 26.9 | 24.6 | 23.3 | 23.9 | 31.0 | 31.5 | 25.1 | 20.7 | 29.2 | 31.8 | 16.8 | 18.1 |
| 14 | 23.7 | 18.1 | 28.5 | 26.3 | 23.2 | 23.7 | 31.6 | 32.1 | 28.0 | 22.9 | 30.0 | 32.2 | 16.9 | 18.9 |
| 15 | 22.8 | 17.4 | 28.2 | 28.7 | 22.1 | 22.1 | 31.6 | 32.6 | 27.1 | 24.6 | 28.9 | 31.5 | 16.6 | 18.4 |

In Table 47, the CSV values of the 100% of $TM_S^M$ and 71% of $TM_S^M$ with higher $NS^{CSV}$ in addition to the type of performance of Factor (B2.2) that the cardiovascular system performs in each IT can be observed.

TABLE 47

CSV and Performance of Factor B2.2 in each IT

| | CSV with 100% $TM^M$ | | | CSV with 71% $TM^M$ | | | Type of Sympatholytic |
|---|---|---|---|---|---|---|---|
| ID | SmO2 | O2HHb | O2HHb | SmO2 | O2HHb | O2HHb | Performance |
| 02 | 0.12 | 0.11 | 0.13 | 0.06 | 0.06 | 0.08 | Asymmetric |
| 03 | 0.14 | 0.14 | 0.17 | 0.07 | 0.07 | 0.09 | Asymmetric |
| 04 | 0.12 | 0.12 | 0.16 | 0.08 | 0.08 | 0.12 | Asymmetric |
| 05 | 0.14 | 0.14 | 0.17 | 0.09 | 0.09 | 0.12 | Asymmetric |
| 06 | 0.15 | 0.14 | 0.18 | 0.08 | 0.09 | 0.12 | Asymmetric |
| 07 | 0.07 | 0.07 | 0.14 | 0.05 | 0.05 | 0.11 | Asymmetric |
| 10 | 0.09 | 0.09 | 0.13 | 0.06 | 0.06 | 0.09 | Asymmetric |
| 11 | 0.13 | 0.12 | 0.19 | 0.07 | 0.07 | 0.11 | Asymmetric |
| 12 | 0.14 | 0.13 | 0.19 | 0.07 | 0.07 | 0.15 | Asymmetric |
| 13 | 0.13 | 0.12 | 0.20 | 0.07 | 0.07 | 0.15 | Asymmetric |
| 14 | 0.13 | 0.12 | 0.20 | 0.07 | 0.06 | 0.14 | Asymmetric |
| 15 | 0.16 | 0.15 | 0.21 | 0.08 | 0.07 | 0.15 | Asymmetric |

B2.3. Evolution Factor of Analytical Cardiovascular Performance

In Table 44-46, the calculated maximum value of $SmO_2$% in each ID, of each $TM^M$ can be observed.

In Table 48, the difference calculated between the maximum values of $SmO_2$%, between the successive ID, of each $TM^M$ can be observed.

In Table 48, the type of Evolution of Delivery of Oxygen-Loaded Blood established in each $TM^M$ analyzed, between each of the successive rest intervals based on the criteria established by Factor (B2.3) can be observed:

TABLE 48

Difference of $SmO_2$% of each $TM^M$ between ID

| ID | 1-2 | 2-3 | 3-4 | 4-5 | 5-6 | 6-7 | 7-8 | 8-9 | 9-10 | 10-11 | 11-12 | 12-13 | 13-14 | 14-15 |
|---|---|---|---|---|---|---|---|---|---|---|---|---|---|---|
| RF L | −7 | −2 | 4 | 2 | −6 | −2 | 0 | 2 | −3 | 3 | 2 | 2 | 1 | 4 |
|  | DS | M | AL | M | DS | M | M | M | DL | AL | M | M | M | AL |
| RF R | 9 | 7 | −2 | 3 | 0 | −20 | 5 | −8 | 3 | 15 | 5 | −8 | 2 | 10 |
|  | AS | AS | M | AL | M | DS | AL | DS | AL | AS | AL | DS | M | AS |
| VL L | 1 | −1 | −1 | −2 | 1 | −4 | 0 | 2 | 0 | 1 | 2 | 0 | −2 | 1 |
|  | M | M | M | M | M | DL | M | M | M | M | M | M | M | M |
| VL R | −2 | 2 | 1 | −4 | 0 | −6 | 0 | 3 | 1 | 2 | −1 | 2 | −1 | −1 |
|  | M | M | M | DL | M | DS | M | AL | M | M | M | M | M | M |
| ST L | 1 | 0 | −1 | −2 | −1 | −4 | 0 | 1 | 1 | 1 | 2 | 1 | 1 | 4 |
|  | M | M | M | M | M | DL | M | M | M | M | M | M | M | AL |
| ST R | 1 | 0 | 5 | −2 | −2 | −2 | 0 | −2 | 2 | 1 | 1 | 2 | 1 | 5 |
|  | M | M | AL | M | M | M | M | M | M | M | M | M | M | AL |
| GM L | −1 | −1 | 1 | −2 | −1 | −1 | 0 | 0 | 0 | 0 | 0 | 1 | 1 | 0 |
|  | M | M | M | M | M | M | M | M | M | M | M | M | M | M |
| GM R | 5 | 0 | −1 | −2 | −1 | −2 | 0 | 0 | 0 | 1 | 0 | 0 | 1 | 1 |
|  | AL | M | M | M | M | M | M | M | M | M | M | M | M | M |
| VI L | 3 | −1 | 0 | −5 | −2 | −7 | −1 | 4 | 3 | 1 | −4 | −1 | −5 | 0 |
|  | AL | M | M | DL | M | DS | M | AL | AL | M | DL | M | DL | M |
| VI R | 0 | −3 | 3 | 2 | −1 | −11 | 2 | 6 | −4 | 2 | 1 | −1 | −4 | 1 |
|  | M | DL | AL | M | M | DS | M | AS | DL | M | M | M | DL | M |
| GA L | −6 | −3 | 0 | −3 | 0 | 0 | −1 | 0 | 0 | 1 | 0 | 0 | 0 | 2 |
|  | DS | DL | M | DL | M | M | M | M | M | M | M | M | M | M |
| GA R | 0 | −4 | 0 | −1 | 0 | −1 | 0 | 1 | 0 | 0 | 0 | 0 | 0 | 2 |
|  | M | DL | M | M | M | M | M | M | M | M | M | M | M | M |
| TA L | −12 | 9 | −20 | 13 | 4 | −17 | 8 | 1 | 1 | 6 | 3 | −2 | 2 | 6 |
|  | DS | AS | DS | AS | AL | DS | AS | M | M | AS | AL | M | M | AS |
| TA R | −5 | −1 | 0 | 3 | −2 | −10 | 1 | −6 | 1 | 7 | 1 | 5 | −1 | 6 |
|  | DL | M | M | AL | M | DS | M | DS | M | AS | M | AL | M | AS |

(AS) Significant increase;
(AL) Slight Increase;
(DL) Slight Decrease;
(DS) Significant decrease;
(M) Maintenance B2.4. Muscle Blood Flow Pump Factor-Venous Return In Table 49, the calculated values of |Y|ThB, in each of the Thresholds and in the maximum intensity recorded, of each $TM^M$ can be observed.

In Table 49, the values of $\overrightarrow{(p)}$ ThB of each $TM^M$, between in the R-INT$^{TL}$ ($U_{Ae}$–$U_{Ana}$) and ($U_{Ae}$–$U_{Ana}$–$Int_{Max}$) can be observed.

In Table 49 and Table 11, the minimum calculated values of $SmO_2$% of each $TM^M$ can be observed.

In Table 49, the $TM^M$ that present a Limitation in the Performance Factor of the Muscle Pumping Factor for Venous Return by meeting the criteria of the Factor (B2.4) that can be observed:

The general trend of $\overrightarrow{(p)}$ ThB of $TM^M$ is [$\overrightarrow{(p)}$ >0.0005] in one of the two R-INT$^{TL}$ ($U_{Ae}$–$U_{Ana}$) and/or ($U_{Ae}$–$U_{Ana}$–$Int_{Max}$).

The values of $SmO_2$% of the $TM^M$ analyzed decrease to values <50% $SmO_2$% during R-INT$^{TL}$ greater than or equal to $U_{Ae}$.

TABLE 49

Values of ThB in each Threshold and of each $TM^M$, $\vec{(p)}$ between each threshold and the minimum value of $SmO_2^\%$

| | | | | Rank $\vec{(p)}$ ThB | | Min | |
|---|---|---|---|---|---|---|---|
| | $U_{Ae}$ | $U_{Ana}$ | $Int_{Work}$ | $U_{Ae} - U_{Ana}$ | $>U_{Ana}$ | $|\tilde{Y}|SmO_2^\%$ | Factor B2.4 |
| RF L | 12.81 | 12.76 | 12.77 | −0.0009 | 0.0003 | 40 | |
| RF R | 12.72 | 12.77 | 12.94 | 0.0008* | 0.0035* | 20 | Limitation in $>U_{Ae}$ |
| VL L | 12.01 | 12.01 | 12.04 | 0.0000 | 0.0007* | 46 | Limitation in $>U_{Ana}$ |
| VL R | 12.07 | 12.04 | 12.15 | −0.0007 | 0.0022* | 38 | Limitation in $>U_{Ana}$ |
| ST L | 12.10 | 12.06 | 12.23 | −0.0008 | 0.0035* | 33 | Limitation in $>U_{Ana}$ |
| ST R | 11.96 | 12.03 | 12.11 | 0.0014* | 0.0017* | 38 | Limitation in $>U_{Ae}$ |
| GM L | 12.14 | 11.85 | 11.70 | −0.0057 | −0.0031 | 79 | |
| GM R | 12.13 | 11.85 | 11.75 | −0.0057 | −0.0020 | 84 | |
| VI L | 12.66 | 12.72 | 12.75 | 0.0011* | 0.0006* | 28 | Limitation in $>U_{Ae}$ |
| VI R | 12.60 | 12.67 | 12.70 | 0.0015* | 0.0006* | 16 | Limitation in $>U_{Ae}$ |
| GA L | 11.93 | 11.71 | 11.55 | −0.0044 | −0.0033 | 55 | |
| GA R | 12.27 | 12.08 | 11.67 | −0.0040 | −0.0082 | 79 | |
| TA L | 12.91 | 12.95 | 12.98 | 0.0008* | 0.0006* | 26 | Limitation in $>U_{Ae}$ |
| TA R | 12.43 | 12.47 | 12.53 | 0.0009* | 0.0012* | 38 | Limitation in $>U_{Ae}$ |

B3. Neurovascular System

B3.1. Neuromuscular Activation Factor (Intermuscular Coordination)

In Table 50, the calculated median values of de $|\tilde{Y}|SmO_2^\%$, $|\tilde{Y}|O_2HHb$, $|\tilde{Y}|\pm O_2HHb$, of each $TM^M$, in each R-INT$^{TL}$ can be observed.

In Table 9-11 and Table 18-23, the median calculated values of $|\tilde{Y}|SmO_2^\%$, $|\tilde{Y}|O_2HHb$, $|\tilde{Y}|\Phi O_2HHb$, of the Upper Limit of the Optimal Zone ($|lim\ sup|Zona^{Op}$) and the Lower Limit of the Optimal Zone ($|lim\ inf|Zona^{Op}$) can be observed.

In Table 50, the Type of Neuromuscular Activation Factor performed by each $TM^M$, in each R-INT$^{TL}$, based on the criteria established in Factor (B3.1) can be observed:

TABLE 50

Values of $|\tilde{Y}|SmO_2^\%$, $|\tilde{Y}|O_2HHb$, $|\tilde{Y}|\Phi O_2HHb$, of each $TM^M$, in each R-INT$^{TL}$ and the performance of Factor (B3.1)

| | Range | | | | | | | | | | | |
|---|---|---|---|---|---|---|---|---|---|---|---|---|
| | $U_{Amin} - U_{Ae}$ | | | Activation Level | $U_{Ae} - U_{Ana}$ | | | Activation Level | $>U_{Ana}$ | | | Activation Level |
| $TM^M$ | $|\tilde{Y}|$ $SmO_2^\%$ | $|\tilde{Y}|$ $O_2HHb$ | $|\tilde{Y}|$ $\phi O_2HHb$ | Factor B3.1 | $|\tilde{Y}|$ $SmO_2^\%$ | $|\tilde{Y}|$ $O_2HHb$ | $|\tilde{Y}|$ $\phi O_2HHb$ | Factor B3.1 | $|\tilde{Y}|$ $SmO_2^\%$ | $|\tilde{Y}|$ $O_2HHb$ | $|\tilde{Y}|$ $\phi O_2HHb$ | Factor B3.1 |
| RF L | 71 | 9.0 | 20.9 | Opt | 62 | 7.9 | 21.9 | Opt | 49 | 6.2 | 19.4 | Opt |
| RF R | 48 | 6.1 | 14.2 | A | 42 | 5.4 | 14.7 | A | 29 | 3.8 | 11.9 | A |
| VL L | 74 | 9.0 | 20.7 | Opt | 63 | 7.5 | 21.0 | Opt | 50 | 6.0 | 18.4 | Opt |
| VL R | 69 | 8.3 | 19.2 | Opt | 58 | 7.0 | 19.5 | Opt | 44 | 5.4 | 16.6 | Opt |
| ST L | 73 | 8.9 | 20.6 | Opt | 60 | 7.3 | 20.1 | Opt | 20 | 5.1 | 16.0 | Opt |
| ST R | 75 | 9.1 | 21.0 | Opt | 63 | 7.5 | 20.7 | Opt | 44 | 5.4 | 16.7 | Opt |
| GM L | 91 | 11.1 | 25.7 | Exc | 91 | 10.8 | 30.1 | Exc | 84 | 10.0 | 30.8 | Exc |
| GM R | 92 | 11.2 | 26.1 | Exc | 92 | 10.9 | 30.3 | Exc | 87 | 10.3 | 31.8 | Exc |
| VI L | 48 | 6.1 | 14.1 | | 37 | 4.6 | 12.9 | A | 28 | 3.6 | 11.3 | A |
| VI R | 39 | 5.1 | 11.4 | Ex | 24 | 2.9 | 8.4 | Ex | 17 | 2.3 | 6.8 | Ex |
| GA L | 87 | 10.6 | 24.3 | N | 85 | 10.1 | 28.0 | N | 72 | 8.4 | 25.6 | Men |
| GA R | 88 | 10.9 | 25.2 | N | 89 | 10.8 | 30.1 | N | 83 | 10.1 | 30.8 | N |
| TA L | 46 | 5.9 | 13.7 | A | 39 | 5.1 | 14.0 | A | 32 | 4.2 | 12.9 | A |
| TA R | 53 | 6.7 | 15.5 | A | 49 | 6.0 | 16.6 | A | 41 | 5.2 | 16.1 | Opt |
| | Optimal Zone Limits | | | | | | | | | | | |
| $|lim\ Sup|$ | 81 | 10.0 | 23.1 | | 72 | 8.6 | 23.9 | | 56 | 6.7 | 20.6 | |
| $|lim\ Inf|$ | 63 | 7.9 | 18.2 | | 50 | 6.1 | 16.9 | | 33 | 4.1 | 12.7 | |

B.3.2. Neurovascular Structural Factor (Speed and Power of Muscle Contraction)
- In Table 51, the median values and standard deviation (σ) of ThB of (RF R, VI R and TA L), in each work interval (IT) can be observed.
- In Table 51, the minimum value of ThB of (RF R, VI R and TA L), in each of the rest intervals (ID), the average work intensity, the average pedalling cadence and the average HR of the previous IT can be observed.
- In Table 51, the calculation of the [(Median Value)−(σ)], of each IT can be observed.
- There is a Limitation in the Neurovascular Structural Factor of the (RF R, VI R and TA L) during each of the work intervals, of average intensity greater than or equal to $U_{Amin}$, followed by one ID, when complying the criteria established for Factor (B3.2) that can be observed

TABLE 51

Analysis values for Performance of Factor (B3.2)

| Interval | | RF R ThB (g/dL) | σ | VI R ThB (g/dL) | σ | TA L ThB (g/dL) | σ | POWER Watts | CADENCE Rpm | HR ppm | Intensity range |
|---|---|---|---|---|---|---|---|---|---|---|---|
| T 02 | \|Ỹ\|ThB | 12.68 | 0.073 | 12.60 | 0.035 | 12.97 | 0.040 | 148 | 34 | 127 | $>U_{Amin}$ |
|  | \|Ỹ\| − σ | 12.61 |  | 12.65 |  | 12.93 |  |  |  |  | $<U_{Ae}$ |
| D 02 | $ThB_{min}$ | 12.57 |  | 12.44 |  | 12.85 |  |  |  |  |  |
| T 03 | \|Ỹ\|ThB | 12.60 | 0.030 | 12.50 | 0.016 | 12.93 | 0.023 | 150 | 66 | 122 | $>U_{Amin}$ |
|  | \|Ỹ\| − σ | 12.57 |  | 12.57 |  | 12.85 |  |  |  |  | $<U_{AE}$ |
| D 03 | $ThB_{min}$ | 12.59 |  | 12.18 |  | 12.85 |  |  |  |  |  |
| T 04 | \|Ỹ\|ThB | 12.67 | 0.043 | 12.58 | 0.015 | 12.93 | 0.028 | 148 | 84 | 126 | $>U_{Amin}$ |
|  | \|Ỹ\| − σ | 12.63 |  | 12.60 |  | 12.90 |  |  |  |  | $<U_{Ae}$ |
| D 04 | $ThB_{min}$ | 12.58 |  | 12.07 |  | 12.83 |  |  |  |  |  |
| T 05 | \|Ỹ\|ThB | 12.64 | 0.023 | 12.58 | 0.013 | 12.92 | 0.027 | 148 | 73 | 124 | $>U_{Amin}$ |
|  | \|Ỹ\| − σ | 12.61 |  | 12.62 |  | 12.89 |  |  |  |  | $<U_{Ae}$ |
| D 05 | $ThB_{min}$ | 12.57 |  | 12.32 |  | 12.83 |  |  |  |  |  |
| T 06 | \|Ỹ\|ThB | 12.67 | 0.034 | 12.54 | 0.016 | 12.89 | 0.021 | 149 | 82 | 127 | $>U_{Amin}$ |
|  | \|Ỹ\| − σ | 12.64 |  | 12.60 |  | 12.86 |  |  |  |  | $<U_{Ae}$ |
| D 06 | $ThB_{min}$ | 12.59 |  | 12.28 |  | 12.84 |  |  |  |  |  |
| T 07 | \|Ỹ\|ThB | 12.64 | 0.037 | 12.56 | 0.015 | 12.90 | 0.019 | 149 | 78 | 126 | $>U_{Amin}$ |
|  | \|Ỹ\| − σ | 12.60 |  | 12.61 |  | 12.88 |  |  |  |  | $<U_{Ae}$ |
| D 07 | $ThB_{min}$ | 12.49 |  | 12.20 |  | 12.80 |  |  |  |  |  |
| T 10 | \|Ỹ\|ThB | 12.64 | 0.031 | 12.61 | 0.017 | 12.92 | 0.025 | 148 | 78 | 131 | $>U_{Amin}$ |
|  | \|Ỹ\| − σ | 12.61 |  | 12.48 |  | 12.89 |  |  |  |  | $<U_{Ae}$ |
| D 10 | $ThB_{min}$ | 12.54 |  | 12.14 |  | 12.85 |  |  |  |  |  |
| T 11 | \|Ỹ\|ThB | 12.68 | 0.038 | 12.66 | 0.014 | 12.93 | 0.024 | 173 | 77 | 137 | $>U_{Amin}$ |
|  | \|Ỹ\| − σ | 12.64 |  | 12.51 |  | 12.90 |  |  |  |  | $<U_{Ae}$ |
| D 11 | $ThB_{min}$ | 12.60 |  | 12.14 |  | 12.86 |  |  |  |  |  |
| T 12 | \|Ỹ\|ThB | 12.69 | 0.040 | 12.68 | 0.030 | 12.92 | 0.018 | 195 | 77 | 148 | $>U_{Ae}$ |
|  | \|Ỹ\| − σ | 12.65 |  | 12.53 |  | 12.90 |  |  |  |  | $<U_{Ana}$ |
| D 12 | $ThB_{min}$ | 12.62 |  | 12.28 |  | 12.83 |  |  |  |  |  |
| T 13 | \|Ỹ\|ThB | 12.74 | 0.053 | 12.68 | 0.016 | 12.92 | 0.026 | 212 | 78 | 159 | $>U_{Ae}$ |
|  | \|Ỹ\| − σ | 12.69 |  | 12.64 |  | 12.89 |  |  |  |  | $<U_{Ana}$ |
| D 13 | $ThB_{min}$ | 12.63 |  | 12.31 |  | 12.85 |  |  |  |  |  |
| T 14 | \|Ỹ\|ThB | 12.78 | 0.053 | 12.71 | 0.021 | 12.95 | 0.032 | 245 | 79 | 169 | $>U_{Ana}$ |
|  | \|Ỹ\| − σ | 12.73 |  | 12.64 |  | 12.92 |  |  |  |  |  |
| D 14 | $ThB_{min}$ | 12.64 |  | 12.25 |  | 12.86 |  |  |  |  |  |
| T 15 | \|Ỹ\|ThB | 12.81 | 0.037 | 12.73 | 0.024 | 12.94 | 0.024 | 268 | 79 | 179 | $>U_{Ana}$ |
|  | \|Ỹ\| − σ | 12.77 |  | 12.66 |  | 12.92 |  |  |  |  |  |
| D 15 | $ThB_{min}$ | 12.68 |  | 12.28 |  | 12.88 |  |  |  |  |  |

B3.3. Optimal Muscle Contraction Speed

In Table 52, the median values of $SmO_2^{\%}$, $O_2HHb$, $\Phi O_2HHb$, $HHb$ and $\Phi HHb$ of each $TM^M$, in each muscle contraction frequency range (R-FCM), in the $R\text{-}INT^{TL}$ of 140-160 w can be observed.

In Table 52, the difference in the median value of $SmO_2^{\%}$, $O_2HHb$, $\Phi O_2HHb$, $HHb$ and $HHb$ of each $TM^M$, of each R-FCM, with respect to the highest value of $SmO_2^{\%}$, $O_2HHb$, $\Phi O_2HHb$, $HHb$ and $HHb$, of all R-FCM can be observed.

In Table 52, the difference in the median value of $HHb$ and $\Phi HHb$ of each $TM^M$, of each R-FCM, with respect to the lowest value of $HHb$ and $\Phi HHb$, of all R-FCM can be observed.

The following R-FCM are optimal because meeting the criteria established for Factor (B3.3) that can be established:
R-FCM Optimal: 79-80 Rpm
R-FCM Optimal: 81-82 Rpm

TABLE 52

Median value of $SmO_2^\%$, $O_2HHb$, $\Phi O_2HHb$, HHb and $\Phi HHb$, of each R-FCM, of each $TM^M$, in the R-INT$^{IL}$ of 140-160 w.

| Rango FCM | RF L | RF R | VL L | VL R | SM I | SM D | GM L | GM R | VI L | VI R | GA L | GA R | TA L | TA R |
|---|---|---|---|---|---|---|---|---|---|---|---|---|---|---|
| \multicolumn{15}{c}{$SmO_2^\%$} |
| 71-72 | 72 | 50 | 73 | 70 | 70 | 77 | 88 | 88 | 51 | 44 | 84 | 85 | 48 | 52 |
|  | -1.5 | -3.0 | -4.0 | -2.0 | -7.0 | 0.0 | -4.0 | -6.0 | -1.0 | 0.0 | -5.0 | -5.0 | -1.0 | -4.0 |
| 73-74 | 72 | 51 | 74 | 70 | 74 | 76 | 89 | 90 | 50 | 44 | 87 | 88 | 48 | 54 |
|  | -1.5 | -2.0 | -3.0 | -2.0 | -3.0 | -1.0 | -3.0 | -4.0 | -2.0 | 0.0 | -2.0 | -2.0 | -1.0 | -2.0 |
| 75-76 | 72 | 52 | 74 | 70 | 75 | 75 | 89 | 90 | 51 | 44 | 88 | 88 | 47 | 54 |
|  | -1.0 | -1.5 | -3.0 | -2.0 | -2.0 | -1.8 | -3.0 | -4.0 | -1.0 | 0.0 | -1.0 | -2.0 | -2.0 | -1.8 |
| 77-78 | 72 | 52 | 74 | 71 | 75 | 76 | 89 | 90 | 50 | 44 | 88 | 89 | 48 | 56 |
|  | -1.0 | -1.0 | -3.0 | -1.0 | -2.0 | -1.0 | -3.0 | -4.0 | -2.0 | 0.0 | -1.0 | -1.0 | -1.0 | 0.0 |
| 79-80 | 73 | 53 | 76 | 72 | 77 | 76 | 91 | 93 | 52 | 43 | 88 | 90 | 47 | 56 |
|  | 0.0 | 0.0 | -1.0 | 0.0 | 0.0 | -1.0 | -1.0 | -1.0 | 0.0 | -1.0 | -1.0 | 0.0 | -1.8 | 0.0 |
| 81-82 | 72 | 52 | 77 | 72 | 77 | 77 | 92 | 94 | 51 | 43 | 88 | 90 | 48 | 56 |
|  | -1.0 | -1.0 | 0.0 | 0.0 | 0.0 | 0.0 | 0.0 | 0.0 | -1.0 | -1.0 | -1.0 | 0.0 | -1.5 | 0.0 |
| 83-84 | 72 | 50 | 74 | 71 | 76 | 75 | 90 | 91 | 49 | 43 | 88 | 89 | 48 | 55 |
|  | -1.0 | -3.5 | -3.0 | -1.5 | -1.0 | -2.5 | -2.0 | -3.0 | -3.0 | -1.0 | -1.0 | -1.0 | -1.0 | -1.0 |
| 85-86 | 72 | 49 | 74 | 70 | 77 | 74 | 90 | 91 | 50 | 43 | 89 | 89 | 49 | 55 |
|  | -1.0 | -4.0 | -3.0 | -2.0 | -0.5 | -3.0 | -2.0 | -3.0 | -2.5 | -1.0 | 0.0 | -1.0 | 0.0 | -1.3 |
| 87-88 | 72 | 48 | 74 | 70 | 73 | 73 | 88 | 90 | 50 | 43 | 86 | 88 | 48 | 54 |
|  | -1.0 | -5.5 | -3.5 | -2.0 | -4.0 | -4.0 | -4.0 | -4.5 | -2.0 | -1.5 | -3.0 | -2.0 | -1.0 | -2.0 |
| 89-90 | 71 | 48 | 73 | 68 | 72 | 72 | -4.0 | 89 | 49 | 41 | 84 | 86 | 47 | 54 |
|  | -2.5 | -5.0 | -4.0 | -4.0 | -5.0 | -5.0 | 88 | -5.0 | -3.0 | -3.0 | -5.0 | -4.0 | -2.5 | -2.0 |
| 91-92 | 71 | 49 | 73 | 68 | 72 | 72 | 88 | 89 | 49 | 42 | 84 | 36 | 45 | 53 |
|  | -2.0 | -4.0 | -4.0 | -4.0 | -5.0 | -5.0 | -4.0 | -5.0 | -3.0 | -2.0 | -5.5 | -4.0 | -3.8 | -3.0 |
| 93-94 | 71 | 50 | 72 | 67 | 71 | 73 | 88 | 88 | 50 | 44 | 82 | 84 | 47 | 53 |
|  | -2.0 | -3.0 | -5.0 | -5.0 | -6.0 | -4.0 | -4.0 | -6.0 | -2.0 | 0.0 | -7.0 | -6.0 | -2.5 | -3.0 |
| 95-96 | 69 | 49 | 69 | 66 | 67 | 77 | 85 | 88 | 50 | 44 | 71 | 82 | 45 | 51 |
|  | -4.0 | -4.0 | -8.0 | -6.0 | -10 | 0.0 | -7.0 | -6.0 | -2.0 | 0.0 | -18 | -8.0 | -3.8 | -5.0 |
| \multicolumn{15}{c}{$O_2HHb$} |
| 71-72 | 9.2 | 6.0 | 8.8 | 8.5 | 8.5 | 9.2 | 10.7 | 10.8 | 6.4 | 5.0 | 9.9 | 10.2 | 6.2 | 6.5 |
|  | -0.2 | -0.7 | -0.4 | -0.3 | -0.9 | -0.1 | -0.5 | -0.6 | -0.1 | -0.6 | -0.7 | -0.8 | -0.1 | -0.5 |
| 73-74 | 9.2 | 6.1 | 9.0 | 8.5 | 9.0 | 9.2 | 10.9 | 11.1 | 6.3 | 5.6 | 10.3 | 10.7 | 6.2 | 6.7 |
|  | -0.2 | -0.6 | -0.3 | -0.3 | -0.4 | -0.1 | -0.3 | -0.4 | -0.2 | 0.0 | -0.3 | -0.4 | -0.1 | -0.2 |
| 75-76 | 9.2 | 6.5 | 9.0 | 8.5 | 9.1 | 9.1 | 10.9 | 11.1 | 6.4 | 5.5 | 10.5 | 10.8 | 6.1 | 6.8 |
|  | -0.1 | -0.2 | -0.3 | -0.2 | -0.3 | -0.2 | -0.3 | -0.4 | -0.1 | 0.0 | -0.3 | -0.2 | -0.2 | -0.2 |
| 77-78 | 9.2 | 6.6 | 9.0 | 8.6 | 9.2 | 9.1 | 10.9 | 11.2 | 6.3 | 5.6 | 10.5 | 10.9 | 6.2 | 6.9 |
|  | -0.1 | -0.1 | -0.3 | -0.1 | -0.3 | -0.1 | -0.3 | -0.3 | -0.2 | 0.0 | -0.1 | -0.1 | -0.1 | 0.0 |
| 79-80 | 9.4 | 6.7 | 9.2 | 8.7 | 9.4 | 9.2 | 11.1 | 11.4 | 6.5 | 5.4 | 10.5 | 11.1 | 6.1 | 6.9 |
|  | 0.0 | 0.0 | -0.1 | 0.0 | 0.0 | -0.1 | 0.0 | 0.0 | 0.0 | -0.2 | -0.1 | 0.0 | -0.2 | 0.0 |
| 81-82 | 9.3 | 6.6 | 9.3 | 8.7 | 9.4 | 9.3 | 11.2 | 11.4 | 6.4 | 5.3 | 10.5 | 11.1 | 6.1 | 6.9 |
|  | -0.1 | -0.1 | 0.0 | 0.0 | 0.0 | 0.0 | 0.0 | 0.0 | -0.1 | -0.3 | -0.1 | 0.0 | -0.2 | 0.0 |
| 83-84 | 9.2 | 6.3 | 9.0 | 8.5 | 9.3 | 9.0 | 11.0 | 11.3 | 6.2 | 5.4 | 10.5 | 10.9 | 6.2 | 6.8 |
|  | -0.1 | -0.4 | -0.3 | -0.2 | -0.1 | -0.3 | -0.2 | -0.2 | -0.4 | -0.1 | -0.1 | -0.1 | -0.1 | -0.1 |
| 85-86 | 9.2 | 6.2 | 8.9 | 8.5 | 9.3 | 8.9 | 11.0 | 11.2 | 6.2 | 5.4 | 10.6 | 10.9 | 6.3 | 6.8 |
|  | -0.1 | -0.5 | -0.3 | -0.3 | -0.1 | -0.4 | -0.2 | -0.2 | -0.3 | -0.1 | 0.0 | -0.1 | 0.0 | -0.1 |
| 87-88 | 9.2 | 6.0 | 8.9 | 8.5 | 8.9 | 8.7 | 10.7 | 11.0 | 6.3 | 5.4 | 10.2 | 10.7 | 6.2 | 6.7 |
|  | -0.1 | -0.7 | -0.4 | -0.3 | -0.6 | -0.5 | -0.5 | -0.4 | -0.3 | -0.2 | -0.4 | -0.3 | -0.1 | -0.2 |
| 89-90 | 9.0 | 6.1 | 8.8 | 8.2 | 8.7 | 8.7 | 10.7 | 10.9 | 6.2 | 5.2 | 9.9 | 10.4 | 6.0 | 6.7 |
|  | -0.3 | -0.6 | -0.4 | -0.5 | -0.7 | -0.6 | -0.5 | -0.5 | -0.4 | -0.4 | -0.7 | -0.6 | -0.3 | -0.2 |
| 91-92 | 9.1 | 6.2 | 8.9 | 8.2 | 8.7 | 8.7 | 10.7 | 10.9 | 6.2 | 5.3 | 9.8 | 10.4 | 5.9 | 6.6 |
|  | -0.3 | -0.5 | -0.4 | -0.5 | -0.7 | -0.6 | -0.5 | -0.4 | -0.3 | -0.3 | -0.8 | -0.7 | -0.5 | -0.3 |
| 93-94 | 9.1 | 6.3 | 8.7 | 8.1 | 8.6 | 8.8 | 10.7 | 10.7 | 6.3 | 5.0 | 9.6 | 10.1 | 6.0 | 6.6 |
|  | -0.3 | -0.4 | -0.6 | -0.6 | -0.8 | -0.5 | -0.5 | -0.7 | -0.2 | -0.6 | -1.0 | -1.0 | -0.3 | -0.3 |
| 95-96 | 8.8 | 6.2 | 8.4 | 8.0 | 8.1 | 8.7 | 10.3 | 10.7 | 6.3 | 5.0 | 8.3 | 9.8 | 5.9 | 6.4 |
|  | -0.5 | -0.5 | -0.9 | -0.8 | -1.3 | -0.6 | -0.9 | -0.7 | -0.2 | -0.6 | -2.3 | -1.3 | -0.5 | -0.6 |
| \multicolumn{15}{c}{$\Phi HHb$} |
| 71-72 | 3.7 | 6.2 | 3.3 | 3.6 | 3.6 | 2.8 | 1.5 | 1.5 | 6.1 | 7.1 | 1.9 | 1.8 | 6.7 | 6.0 |
|  | 0.2 | 0.3 | 0.5 | 0.2 | 0.8 | 0.0 | 0.5 | 0.7 | 0.1 | 0.0 | 0.6 | 0.6 | 0.1 | 0.5 |
| 73-74 | 3.7 | 6.1 | 3.2 | 3.6 | 3.2 | 2.9 | 1.3 | 1.2 | 6.3 | 7.1 | 1.5 | 1.5 | 6.7 | 5.7 |
|  | 0.2 | 0.2 | 0.4 | 0.2 | 0.4 | 0.1 | 0.4 | 0.5 | 0.2 | 0.0 | 0.2 | 0.2 | 0.1 | 0.3 |
| 75-76 | 3.6 | 6.1 | 3.2 | 3.6 | 3.0 | 3.0 | 1.3 | 1.2 | 6.2 | 7.1 | 1.4 | 1.5 | 6.9 | 5.7 |
|  | 0.1 | 0.2 | 0.4 | 0.2 | 0.2 | 0.2 | 0.4 | 0.5 | 0.1 | 0.0 | 0.1 | 0.2 | 0.3 | 0.2 |
| 77-78 | 3.6 | 6.1 | 3.2 | 3.5 | 3.0 | 2.9 | 1.3 | 1.2 | 6.3 | 7.1 | 1.4 | 1.4 | 6.7 | 5.5 |
|  | 0.1 | 0.1 | 0.4 | 0.1 | 0.2 | 0.1 | 0.4 | 0.5 | 0.2 | 0.0 | 0.1 | 0.1 | 0.1 | 0.0 |
| 79-80 | 3.5 | 5.9 | 2.9 | 3.4 | 2.8 | 2.9 | 1.1 | 0.9 | 6.1 | 7.1 | 1.4 | 1.2 | 6.8 | 5.5 |
|  | 0.0 | 0.0 | 0.1 | 0.0 | 0.0 | 0.1 | 0.1 | 0.1 | 0.0 | 0.1 | 0.1 | 0.1 | 0.2 | 0.0 |
| 81-82 | 3.6 | 6.1 | 2.8 | 3.4 | 2.8 | 2.8 | 1.0 | 0.7 | 6.2 | 7.3 | 1.4 | 1.2 | 6.8 | 5.5 |
|  | 0.1 | 0.1 | 0.0 | 0.0 | 0.0 | 0.0 | 0.0 | 0.0 | 0.1 | 0.2 | 0.1 | 0.0 | 0.2 | 0.0 |
| 83-84 | 3.6 | 6.4 | 3.1 | 3.6 | 2.9 | 3.1 | 1.2 | 1.1 | 6.4 | 7.2 | 1.4 | 1.3 | 6.7 | 5.6 |
|  | 0.1 | 0.4 | 0.4 | 0.2 | 0.1 | 0.3 | 0.2 | 0.4 | 0.3 | 0.1 | 0.1 | 0.1 | 0.1 | 0.1 |
| 85-86 | 3.6 | 6.5 | 3.1 | 3.6 | 2.9 | 3.1 | 1.2 | 1.1 | 6.3 | 7.2 | 1.3 | 1.3 | 6.6 | 5.6 |
|  | 0.1 | 0.5 | 0.4 | 0.2 | 0.1 | 0.3 | 0.2 | 0.4 | 0.3 | 0.1 | 0.0 | 0.1 | 0.0 | 0.2 |

TABLE 52-continued

Median value of $SmO_2\%$, $O_2HHb$, $\Phi O_2HHb$, $HHb$ and $\Phi HHb$, of each R-FCM, of each $TM^M$, in the R-INT$^{IL}$ of 140-160 w.

| Rango FCM | RF L | RF R | VL L | VL R | SM I | SM D | GM L | GM R | VI L | VI R | GA L | GA R | TA L | TA R |
|---|---|---|---|---|---|---|---|---|---|---|---|---|---|---|
| 87-88 | 3.6 | 6.7 | 3.2 | 3.6 | 3.3 | 3.3 | 1.5 | 1.3 | 6.3 | 7.3 | 1.7 | 1.5 | 6.7 | 5.7 |
|  | 0.1 | 0.7 | 0.4 | 0.2 | 0.5 | 0.5 | 0.5 | 0.6 | 0.2 | 0.2 | 0.3 | 0.2 | 0.1 | 0.3 |
| 89-90 | 3.8 | 6.6 | 3.3 | 3.9 | 3.4 | 3.4 | 1.5 | 1.3 | 6.4 | 7.5 | 1.9 | 1.7 | 6.9 | 5.7 |
|  | 0.3 | 0.6 | 0.5 | 0.5 | 0.6 | 0.6 | 0.5 | 0.6 | 0.4 | 0.4 | 0.6 | 0.5 | 0.3 | 0.3 |
| 91-92 | 3.7 | 6.5 | 3.3 | 3.9 | 3.4 | 3.4 | 1.5 | 1.4 | 6.4 | 7.3 | 1.9 | 1.7 | 7.1 | 5.9 |
|  | 0.3 | 0.5 | 0.5 | 0.5 | 0.6 | 0.6 | 0.5 | 0.6 | 0.4 | 0.3 | 0.6 | 0.5 | 0.5 | 0.4 |
| 93-94 | 3.7 | 6.3 | 3.4 | 4.0 | 3.5 | 3.3 | 1.5 | 1.5 | 6.3 | 7.1 | 2.1 | 1.9 | 6.9 | 5.9 |
|  | 0.2 | 0.4 | 0.6 | 0.6 | 0.7 | 0.5 | 0.5 | 0.7 | 0.2 | 0.0 | 0.8 | 0.7 | 0.3 | 0.4 |
| 95-96 | 4.0 | 6.5 | 3.8 | 4.1 | 4.0 | 3.3 | 1.8 | 1.5 | 6.3 | 7.2 | 3.4 | 2.1 | 7.1 | 6.1 |
|  | 0.5 | 0.5 | 1.0 | 0.7 | 1.2 | 0.5 | 0.8 | 0.7 | 0.2 | 0.1 | 2.1 | 0.9 | 0.5 | 0.7 |
| $\Phi O_2HHb$ | | | | | | | | | | | | | | |
| 71-72 | 19.2 | 14.6 | 18.7 | 17.7 | 18.0 | 19.8 | 22.6 | 22.9 | 13.4 | 11.7 | 21.0 | 21.6 | 13.0 | 13.6 |
|  | -1.4 | -0.3 | -1.7 | -1.8 | -3.0 | -0.6 | -2.1 | -2.5 | -0.9 | -0.2 | -2.4 | -2.8 | -0.9 | -1.7 |
| 73-74 | 19.4 | 14.3 | 18.7 | 17.8 | 19.1 | 19.2 | 23.0 | 23.4 | 13.2 | 11.7 | 21.6 | 22.7 | 12.8 | 14.5 |
|  | -1.2 | -0.5 | -1.7 | -1.7 | -1.9 | -1.2 | -1.7 | -2.0 | -1.1 | -0.2 | -1.8 | -1.7 | -1.1 | -0.8 |
| 75-76 | 19.5 | 13.8 | 19.0 | 18.1 | 19.3 | 19.1 | 23.0 | 23.4 | 13.5 | 11.7 | 22.0 | 22.7 | 12.9 | 14.4 |
|  | -1.1 | -1.0 | -1.4 | -1.4 | -1.7 | -1.3 | -1.7 | -2.0 | -0.9 | -0.2 | -1.4 | -1.7 | -1.0 | -0.9 |
| 77-78 | 19.7 | 13.9 | 19.0 | 18.2 | 19.6 | 19.5 | 23.1 | 23.8 | 13.5 | 11.8 | 22.2 | 23.1 | 13.3 | 14.8 |
|  | -0.9 | -0.9 | -1.4 | -1.2 | -1.4 | -0.9 | -1.6 | -1.6 | -0.9 | -0.1 | -1.2 | -1.3 | -0.6 | -0.6 |
| 79-80 | 20.6 | 14.8 | 19.9 | 19.1 | 20.7 | 20.0 | 24.2 | 25.2 | 14.3 | 11.9 | 23.1 | 24.2 | 13.5 | 15.3 |
|  | 0.0 | 0.0 | -0.5 | -0.4 | -0.3 | -0.4 | -0.5 | -0.2 | -0.1 | 0.0 | -0.3 | -0.2 | -0.4 | 0.0 |
| 81-82 | 20.5 | 14.6 | 20.4 | 19.5 | 21.0 | 20.4 | 24.7 | 25.4 | 14.3 | 11.8 | 23.4 | 24.4 | 13.7 | 15.3 |
|  | -0.1 | -0.2 | 0.0 | 0.0 | 0.0 | 0.0 | 0.0 | 0.0 | -0.1 | 0.0 | 0.0 | 0.0 | -0.2 | 0.0 |
| 83-84 | 20.0 | 13.5 | 19.4 | 18.5 | 20.2 | 19.5 | 24.0 | 24.7 | 13.5 | 11.8 | 23.0 | 23.8 | 13.6 | 14.9 |
|  | -0.5 | -1.3 | -1.0 | -1.0 | -0.7 | -0.9 | -0.7 | -0.7 | -0.8 | -0.1 | -0.4 | -0.6 | -0.3 | -0.4 |
| 85-86 | 20.2 | 13.6 | 19.5 | 18.6 | 20.3 | 19.6 | 24.0 | 24.5 | 13.5 | 11.8 | 23.0 | 23.9 | 13.9 | 14.8 |
|  | -0.4 | -1.2 | -0.9 | -0.9 | -0.6 | -0.8 | -0.7 | -0.9 | -0.8 | -0.1 | -0.4 | -0.5 | 0.0 | -0.5 |
| 87-88 | 20.1 | 13.2 | 19.4 | 18.3 | 19.4 | 19.1 | 23.8 | 24.1 | 13.8 | 11.7 | 22.8 | 23.4 | 13.5 | 14.6 |
|  | -0.4 | -1.6 | -1.0 | -1.2 | -1.5 | -1.3 | -0.9 | -1.3 | -0.6 | -0.2 | -0.6 | -1.0 | -0.4 | -0.7 |
| 89-90 | 19.7 | 13.3 | 19.2 | 17.9 | 18.9 | 18.7 | 23.4 | 23.8 | 13.5 | 11.2 | 21.5 | 22.7 | 13.0 | 14.5 |
|  | -0.9 | -1.5 | -1.2 | -1.6 | -2.0 | -1.7 | -1.3 | -1.6 | -0.8 | -0.7 | -2.0 | -1.7 | -0.9 | -0.8 |
| 91-92 | 19.7 | 13.4 | 19.3 | 18.0 | 18.9 | 18.8 | 23.3 | 23.8 | 13.4 | 11.6 | 21.3 | 22.8 | 12.9 | 14.3 |
|  | -0.8 | -1.5 | -1.1 | -1.4 | -2.0 | -1.6 | -1.4 | -1.5 | -0.9 | -0.4 | -2.1 | -1.6 | -1.0 | -1.0 |
| 93-94 | 19.7 | 13.7 | 18.9 | 17.4 | 18.5 | 19.1 | 23.1 | 23.4 | 13.7 | 11.4 | 20.8 | 21.9 | 13.1 | 14.3 |
|  | -0.9 | -1.1 | -1.5 | -2.0 | -2.4 | -1.3 | -1.6 | -2.0 | -0.6 | -0.5 | -2.6 | -2.5 | -0.8 | -1.0 |
| 95-96 | 19.1 | 13.6 | 18.3 | 17.4 | 17.7 | 19.1 | 22.4 | 23.4 | 13.9 | 11.2 | 18.1 | 21.3 | 12.8 | 13.8 |
|  | -1.5 | -1.2 | -2.1 | -2.1 | -3.3 | -1.3 | -2.3 | -2.0 | -0.5 | -0.7 | -5.3 | -3.0 | -1.1 | -1.5 |
| $\Phi HHb$ | | | | | | | | | | | | | | |
| 71-72 | 7.7 | 13.0 | 7.0 | 7.7 | 7.6 | 6.4 | 3.1 | 3.0 | 13.4 | 15.5 | 3.9 | 3.8 | 14.6 | 12.6 |
|  | 0.1 | 0.1 | 0.7 | 0.3 | 1.6 | 0.2 | 0.8 | 1.3 | 0.2 | 0.2 | 0.9 | 1.0 | 0.2 | 0.7 |
| 73-74 | 7.7 | 13.0 | 6.8 | 7.7 | 6.7 | 6.3 | 2.8 | 2.6 | 13.3 | 15.4 | 3.4 | 3.1 | 14.6 | 12.1 |
|  | 0.0 | 0.1 | 0.6 | 0.3 | 0.6 | 0.1 | 0.6 | 0.9 | 0.1 | 0.1 | 0.4 | 0.3 | 0.2 | 0.3 |
| 75-76 | 7.7 | 13.0 | 6.7 | 7.7 | 6.4 | 6.3 | 2.8 | 2.6 | 13.3 | 15.4 | 3.1 | 3.1 | 14.7 | 12.1 |
|  | 0.1 | 0.1 | 0.5 | 0.3 | 0.4 | 0.1 | 0.6 | 0.9 | 0.1 | 0.1 | 0.2 | 0.3 | 0.3 | 0.2 |
| 77-78 | 7.7 | 12.9 | 6.7 | 7.6 | 6.4 | 6.3 | 2.8 | 2.6 | 13.2 | 15.3 | 3.1 | 2.9 | 14.5 | 11.9 |
|  | 0.1 | 0.0 | 0.5 | 0.2 | 0.4 | 0.0 | 0.6 | 0.9 | 0.0 | 0.0 | 0.2 | 0.1 | 0.1 | 0.0 |
| 79-80 | 7.7 | 13.0 | 6.2 | 7.4 | 6.0 | 6.2 | 2.4 | 1.8 | 13.4 | 15.4 | 3.1 | 2.8 | 14.7 | 12.0 |
|  | 0.0 | 0.1 | 0.0 | 0.0 | 0.0 | 0.0 | 0.2 | 0.2 | 0.2 | 0.1 | 0.1 | 0.0 | 0.3 | 0.1 |
| 81-82 | 7.9 | 13.4 | 6.3 | 7.4 | 6.1 | 6.2 | 2.2 | 1.7 | 13.8 | 15.4 | 3.1 | 2.8 | 14.7 | 12.2 |
|  | 0.2 | 0.5 | 0.1 | 0.0 | 0.1 | 0.0 | 0.0 | 0.0 | 0.6 | 0.1 | 0.1 | 0.0 | 0.3 | 0.3 |
| 83-84 | 8.0 | 13.9 | 6.9 | 7.8 | 6.3 | 6.7 | 2.7 | 2.3 | 13.8 | 15.6 | 3.1 | 2.9 | 14.7 | 12.2 |
|  | 0.3 | 1.0 | 0.7 | 0.5 | 0.3 | 0.4 | 0.4 | 0.7 | 0.6 | 0.3 | 0.2 | 0.2 | 0.3 | 0.3 |
| 85-86 | 7.9 | 14.2 | 6.9 | 7.9 | 6.2 | 6.7 | 2.7 | 2.4 | 13.9 | 15.8 | 2.9 | 2.9 | 14.4 | 12.3 |
|  | 0.2 | 1.3 | 0.7 | 0.5 | 0.2 | 0.5 | 0.5 | 0.7 | 0.6 | 0.5 | 0.1 | 0.1 | 0.0 | 0.4 |
| 87-88 | 7.8 | 14.5 | 7.0 | 8.1 | 7.3 | 7.2 | 3.1 | 2.9 | 13.8 | 16.0 | 3.7 | 3.1 | 14.8 | 12.5 |
|  | 0.2 | 1.6 | 0.8 | 0.7 | 1.3 | 1.0 | 0.9 | 1.2 | 0.6 | 0.7 | 0.8 | 0.3 | 0.4 | 0.6 |
| 89-90 | 8.2 | 14.2 | 7.1 | 8.5 | 7.4 | 7.4 | 3.2 | 2.9 | 13.8 | 16.1 | 4.2 | 3.7 | 15.1 | 12.6 |
|  | 0.6 | 1.3 | 0.9 | 1.1 | 1.4 | 1.2 | 1.0 | 1.3 | 0.5 | 0.8 | 1.3 | 0.9 | 0.7 | 0.7 |
| 91-92 | 8.1 | 14.0 | 7.0 | 8.5 | 7.4 | 7.4 | 3.2 | 3.0 | 14.0 | 16.1 | 4.2 | 3.7 | 15.4 | 12.7 |
|  | 0.5 | 1.1 | 0.8 | 1.1 | 1.4 | 1.1 | 1.0 | 1.3 | 0.8 | 0.8 | 1.3 | 1.0 | 1.0 | 0.8 |
| 93-94 | 8.2 | 13.8 | 7.3 | 8.8 | 7.7 | 7.1 | 3.2 | 3.2 | 13.7 | 16.1 | 4.6 | 4.2 | 15.1 | 12.8 |
|  | 0.5 | 0.9 | 1.1 | 1.4 | 1.6 | 0.9 | 1.0 | 1.5 | 0.5 | 0.8 | 1.7 | 1.4 | 0.7 | 0.9 |
| 95-96 | 8.6 | 14.3 | 8.1 | 9.0 | 8.8 | 7.1 | 4.0 | 3.2 | 13.8 | 16.1 | 7.4 | 4.7 | 15.4 | 13.4 |
|  | 0.9 | 1.4 | 1.9 | 1.6 | 2.7 | 0.9 | 1.8 | 1.5 | 0.5 | 0.8 | 4.4 | 1.9 | 1.0 | 1.5 |

The following muscle performance factors do not meet the criteria established by each factor to determine that any $TM^M$ or all of them develop at least one limitation of said factors:

A1. Structural Factor of Oxidative Capacity
A2. Functional Factor of Oxidative Capacity by General Fatigue
B1.1. Pulmonary Structural Factor
B1.2. Pulmonary Functional Factor
B2.1. Analytical Blood Flow Delivery Performance Factor)

The invention claimed is:

1. A monitoring and evaluation method of the physical performance of a subject that includes the stages of:
   providing devices for measuring, being two or more Near-Infrared Spectroscopy sensors (NIRS), a heart rate device, an activity monitoring device and a locomotive intensity meter;
   placing or adhering the NIRS sensors on muscle tissues (TM) to be evaluated, place the heart rate device on a subject's chest,
   place the activity monitoring device and the locomotive intensity meter on the subject;
   activating the devices for measuring data, during locomotive activity to be evaluated and sending data measured to a data processing system;
   recording, through the data processing system, the data measured, during the development of at least one Cyclical Locomotive-Physical Activity (AFC), wherein:
      the Cyclical Locomotive-Physical Activity Monitored ($AFC^M$) is continuous or interval,
      the activity monitoring device records the entire time scale from the beginning to the end of the $AFC^M$, including multiple work intervals and/or rest intervals,
      the recording frequency of the data for each device is less than 6 seconds,
      the $AFC^M$ is stable, incremental, decreasing or variable locomotor intensity or a combination of them,
      the $AFC^M$ includes a period of previous warm-up,
      when the $AFC^M$ does not include at least one Rest interval (ID), the data recording will end 1 minute after the AFC ceases and that minute will be counted as an Rest interval (ID),
      a Locomotor Work Intensity ($INT^{TL}$) or an average Locomotor Work Intensity Range ($R\text{-}INT^{TL}$), obtained from the Cyclical Locomotive-Physical Activity Monitored ($AFC^M$), is greater than or equal to a Minimum Activation Threshold ($U_{Amin}$), previously defined;
   obtaining at least the following monitored data from the devices for measuring with a respective temporary registration:
      Muscular Oxygen Saturation ($SmO_2\%$) and Absolute Capillary Hemoglobin (ThB) of each of the monitored muscle tissues ($TM^M$) that participate in $AFC^M$, through the NIRS devices,
      Heart rate (HR), through the heart rate device,
      Power, Running Speed, through the locomotive intensity meter,
      time record or timescale of the $AFC^M$, with all the time records of the start or end of $AFC^M$, and the start and end of the different intervals developed during the $AFC^M$, through the locomotive activity meter, and
      cadence or acceleration, through external locomotor performance devices,
   synchronizing, linking and joining the monitored data obtained in a single time scale of joint data from the time scale collected by the activity monitoring device during the $AFC^M$ and the time record of each of the devices for measuring, through the data processing system;
   calculating, through the data processing system, at least following values for each Monitored Muscle Tissue ($TM^M$) that participates in the $AFC^M$ from the recorded data of $SmO_2\%$ and ThB of:
      Oxygen-Charged Capillary Hemoglobin ($O_2HHb$), through the formula:

$$SmO_2 * ThB = O_2HHb$$

Oxygen Discharged Capillary Hemoglobin (HHb), through the formula:

$$ThB - O_2HHb = HHb$$

Muscle Blood Flow of Muscle Hemoglobin ($\Phi ThB$), through the formula:

$$[ThB * HR]/60 = \Phi ThB$$

Muscular Blood Flow of Oxygen Charged Hemoglobin ($\Phi O_2HHb$), through the formula:

$$[O_2HHb * HR]/60 = \Phi O_2HHb$$

Muscular Blood Flow of Oxygen Discharged Hemoglobin—g/dL/s ($\Phi HHb$), through the formula $$[HHb * HR]/60 = \Phi HHb$$

filtering and excluding, through the data processing system, the data obtained erroneously and/or due to registration error by devices during $AFC^M$;
   filtering and excluding, through the processing system, the values that are not within the following ranges, as well as data obtained by using them:
      $SMO_2\%$: Between 1% $SmO_2$ and 99% $SmO_2$;
      ThB: Between 9.5 g/dL and 14.9 g/dL;
      HR: Between 40 bpm and 230 bpm; and
   filtering and excluding, through the processing system; values whose difference between two temporary sequential records, is greater than the following parameters, and the data obtained from said values:
      Difference of $SmO_2\% > \pm 10\%$ $SmO_2\%$;
      Difference of $ThB > \pm 0.3$ g/dL;
      Difference of $HR > \pm 7$ bpm.

2. The monitoring and evaluation method according to claim 1, which further comprises the steps of:
   filtering and excluding all values obtained, calculated and/or recorded during all ID or without AFC,
   filtering and excluding all values obtained, calculated and/or recorded during the first minute of each work interval (IT),
   filtering and excluding all values obtained, calculated and/or registered when the value of the $INT^{TL}$ or $R\text{-}INT^{TL}$ in the same temporary registration is equivalent to "0", filtering and excluding all the values obtained, calculated and/or registered when a value of Muscle Contraction Frequency (FCM) or Muscle Contraction Frequency Range (R-FCM) in the same time register is equivalent to "0",
   selecting and performing one of the following procedures:
      a first procedure comprising the steps of:
         calculating the statistical median value ($\check{Y}$) of the values $SmO_2\%$, ThB, $\Phi ThB$, $O_2HHb$, $\Phi O_2HHb$, HHb, $\Phi HHb$ of each $TM^M$, during $AFC^M$, in each registered Locomotor Work Intensity ($INT^{TL}$) or in each Intensity Range of Locomotor Work ($R\text{-}INT^{TL}$), that participates in the $AFC^M$;

calculating and establishing a Trend Line ($Lin^{Trend}$) of the median values ($\check{Y}\text{-}INT^{TL}$) or ($\check{Y}\text{-}R\text{-}INT^{TL}$) obtained from $\check{Y}SmO_2\%$, $\check{Y}ThB$, $\check{Y}\Phi ThB$, $\check{Y}O_2HHb$, $\check{Y}\Phi O_2HHb$, $\check{Y}HHb$ and $\check{Y}\Phi HHb$, in each $TM^M$;

a second procedure comprising the steps of:

calculating the statistical average value ($\overline{Y}$) of the values of $SmO_2\%$, ThB, $\Phi ThB$, $O_2HHb$, $\Phi O_2HHb$, HHb, $\Phi HHb$, of each $TM^M$, during $AFC^M$, in each $INT^{TL}$ or $R\text{-}INT^{TL}$, registered during the $AFC^M$;

calculating and establishing a $Lin^{Trend}$ of the average values ($\overline{Y}\text{-}INT^{TL}$) or ($\overline{Y}\text{-}R\text{-}INT^{TL}$) obtained from $\overline{Y}SmO_2\%$, $\overline{Y}ThB$, $\overline{Y}\Phi ThB$, $\overline{Y}O_2HHb$, $\overline{Y}\Phi O_2HHb$, $\overline{Y}HHb$ and $\overline{Y}\Phi HHb$, in each $TM^M$;

a third procedure comprising a step of:

calculating and establishing a $Lin^{Trend}$ (Value/$INT^{TL}$) or (Value/$R\text{-}INT^{TL}$), from all filtered values (|Y|) of $SmO_2\%$, ThB, $\Phi ThB$, $O_2HHb$, $\Phi O_2HHb$, HHb, $\Phi HHb$, in each $TM^M$;

calculating a $Lin^{Trend}$ of each of $|Y|SmO_2\%$, $|Y|ThB$, $|Y|\Phi ThB$, $|Y|O_2HHb$, $|Y|\Phi O_2HHb$, $|Y|HHb$ and $|Y|\Phi HHb$, of each $TM^M$, for each $INT^{TL}$ or $R\text{-}INT^{TL}$;

calculating a slope (p) between pairs of values of the $Lin^{Trend}$ of each of $|Y|SmO_2\%$, $|Y|ThB$, $|Y|\Phi ThB$, $|Y|O_2HHb$, $|Y|\Phi O_2HHb$, $|Y|HHb$ and $|Y|\Phi HHb$, from each $TM^M$;

determining trend changes of the slope (p) in each of the $Lin^{Trend}$, of $|Y|SmO_2\%$, $|Y|ThB$, $|Y|\Phi ThB$, $|Y|O_2HHb$, $|Y|\Phi O_2HHb$, $|Y|HHb$ and $|Y|\Phi HHb$, of each $TM^M$;

determining two values of $INT^{TL}$ or $R\text{-}INT^{TL}$ between which occurs a $1^{st}$, $2^{nd}$ and $3^{rd}$ trend change of the slope (p) in the $Lin^{Trend}$ of at least 4 of the 7 possible (p) changes of $|Y|SmO_2\%$, $|Y|ThB$, $|Y|\Phi ThB$, $|Y|O_2HHb$, $|Y|\Phi O_2HHb$, $|Y|HHb$ and $|Y|\Phi HHb$, in each $TM^M$;

establishing Physiological Thresholds of each $TM^M$ as values of $INT^{TL}$ or $R\text{-}INT^{TL}$ (|X|) coincident with the trend changes:

|  | 1st Change (p) $U_{Amin\ Individual}$ | 2nd Change (p) $U_{Ae\ Individual}$ | 3rd Change (p) $U_{Ana\ Individual}$ |
|---|---|---|---|
| $TM^M$ | Rank|X| (Watts) \|X\| (Watts) | Rank|X| (Watts) \|X\| (Watts) | Rank|X| (Watts) \|X\| (Watts) | wherein $U_{Amin}$ represents the Minimum Activation Threshold, and is set as the value of $INT^{TL}$ or $R\text{-}INT^{TL}$ of the $1^{st}$ trend change of the slope (p), $U_{Ae}$ represents an Aerobic Threshold, and is set as the value of $INT^{TL}$ or $R\text{-}INT^{TL}$ of the $2^{nd}$ trend change of the slope (p), and $U_{Ana}$ represents an Anaerobic Threshold, previously determined, and is set as the value of $INT^{TL}$ or $R\text{-}INT^{TL}$ of the $3^{rd}$ trend change of the slope (p), and;

establishing General Physiological Thresholds as median values of $INT^{TL}$ or $R\text{-}INT^{TL}$ of the individual thresholds of each $TM^M$:

|  | 1st General Change (p) $U_{Amin}$ | 2nd General Change (p) $U_{Ae}$ | 3rd General Change (p) $U_{Ana}$ |
|---|---|---|---|
| $TM^M$ | Rank|X| (Watts) \|X\| (Watts) | Rank|X| (Watts) \|X\| (Watts) | Rank|X| (Watts) \|X\|(Watts) |

3. The monitoring and evaluation method according to claim 2, further comprising the steps of:

calculating, analyzing and determining a Coefficient of Symmetry Between Values (CSV), between at least two sets of values $|Y|SmO_2\%$, $|Y|ThB$, $|Y|\Phi ThB$, $|Y|O_2HHb$, $|Y|\Phi O_2HHb$, $|Y|HHb$ or $|Y|\Phi HHb$, established between two determined $INT^{TL}$ or $R\text{-}INT^{TL}$, between at least two determined $TM_S^M$:

$$CSV = \frac{\text{Standard Deviation } (\sigma) \text{ of the values of } |Y|}{\text{Average of the values of } |Y|}$$

establishing Symmetry Level ($NS^{CSV}$) from the CSV value calculated from the values $|Y|SmO_2\%$, $|Y|ThB$, $|Y|\Phi ThB$, $|Y|O_2HHb$, $|Y|\Phi O_2HHb$, $|Y|HHb$ or $|Y|\Phi HHb$, between two $INT^{TL}$ or two $R\text{-}INT^{TL}$ determined, between at least two $TM_S^M$ determined:

| Symmetry Level ($NS^{CSV}$) | CSV | | |
|---|---|---|---|
| | $SmO_2\%$ | $O_2HHb$ or HHb | $\Phi O_2HHb$ or $\Phi HHb$ |
| Perfect | ≤0.01 | ≤0.001 | ≤0.01 |
| Optimum | >0.01    ≤0.05 | >0.001    ≤0.005 | >0.01    ≤0.05 |
| Minimal | >0.05    ≤0.20 | >0.005    ≤0.02 | >0.05    ≤0.2 |
| Asymmetry | >0.20 | >0.02 | >0.2 | calculating, analyzing and determining the slope-trend $\overleftrightarrow{(p)}$ |Y| of at least $|Y|SmO_2\%$, $|Y|O_2HHb$, $|Y|\Phi O_2HHb$, $|Y|HHb$ and/or $|Y|\Phi HHb$, between two $INT^{TL}$ or two $R\text{-}INT^{TL}$ of at least two $TM_S^M$:

$$\overleftrightarrow{(p)} = \frac{|Y|2-|Y|1}{|X|2-|X|1};$$

where $\overleftrightarrow{(p)}$ is the slope-trend; being $|Y|1$ the determined value of $SmO_2\%$, $O_2HHb$, $\Phi O_2HHb$, HHb or $\Phi HHb$, of the first $LNT^{TL}$ or $R\text{-}INT^{TL}$, and being $|Y|2$ the determined value of $SmO_2\%$, $O_2HHb$, $\Phi O_2HHb$, HHb or $\Phi HHb$, of the second $INT^{TL}$ or $R\text{-}INT^{TL}$; $|X|1$ is-being the first $LNT^{TL}$ or $R\text{-}INT^{TL}$ and $|X|\text{-}2$ being the second $INT^{TL}$ or $R\text{-}INT^{TL}$;

calculating, analyzing and establishing the Coef-$\overleftrightarrow{(p)}$ of $\overleftrightarrow{(p)}$ $|Y|SmO_2\%$, $\overleftrightarrow{(p)}$ $|Y|O_2HHb$, $\overleftrightarrow{(p)}$ $|Y|\Phi O_2HHb$, $\overleftrightarrow{(p)}$ $|Y|HHb$ and/or $\overleftrightarrow{(p)}$ $|Y|\Phi HHb$ between two $INT^{TL}$ or two $R\text{-}INT^{TL}$, of one $TM^M$ determined with respect to the trend of $\overleftrightarrow{(p)}$ $|Y|SmO_2\%$, $\overleftrightarrow{(p)}$ $|Y|O_2HHb$, $\overleftrightarrow{(p)}$ $|Y|\Phi O_2HHb$, $\overleftrightarrow{(p)}$ $|Y|HHb$ and/or $\overleftrightarrow{(p)}$ $|Y|\Phi HHb$ of another $TM^M$ or a set of values trends of $\overleftrightarrow{(p)}$ $|Y|SmO_2\%$, $\overleftrightarrow{(p)}$ $|Y|O_2HHb$, $\overleftrightarrow{(p)}$ $|Y|O_2HHb$, $\overleftrightarrow{(p)}$ $|Y|HHb$ and/or $\overleftrightarrow{(p)}$ $|Y|\Phi HHb$ of two or more $TM_S^M$:

$$\text{Coef}\overleftrightarrow{(p)} = [\overleftrightarrow{(\tilde{p})} |Y|] - [\overleftrightarrow{(p_1)} |Y|]$$

wherein $\overleftrightarrow{(\tilde{p})}$ $|Y|$ is the median slope-trends of the compared $TM_S^M$ and $\overleftrightarrow{(p_1)}$ $|Y|$ is the slope-trend of the analyzed $TM^M$; and establishing the Symmetry Level ($NS^{Coef\text{-}(p)}$) from the calculated value of Coef-$\overleftrightarrow{(p)}$ $\overrightarrow{(p)}$ |Y|SmO$_2$%, $\overrightarrow{(p)}$ |Y|O$_2$HHb, $\overrightarrow{(p)}$ |Y|O$_2$HHb, $\overrightarrow{(p)}$ |Y|HHb o $\overrightarrow{(p)}$ |Y|HHb of the analyzed TM$^M$:

| Symmetry Level | Coef-$\overleftrightarrow{(p)}$ | | |
|---|---|---|---|
| ($NS^{Coef\text{-}(p)}$) | SmO$_2$% | O$_2$HHb – HHb | ΦO$_2$HHb – ΦHHb |
| Perfect | ≤0.01 | ≤0.001 | ≤0.01 |
| Optimum | >0.01 ≤0.05 | >0.001 ≤0.005 | >0.01 ≤0.05 |
| Minimal | >0.05 ≤0.15 | >0.005 ≤0.015 | >0.05 ≤0.15 |
| Asymmetry | >0.15 | >0.015 | >0.15. |

4. The monitoring and evaluation method according to claim 2, further comprising the steps of:
evaluating the value of |Y|SmO$_2$% in each INT$^{TL}$ or R-INT$^{TL}$, INT$^{TL}$ greater than or equal to $U_{Amin}$ and less than or equal to $U_{Ana}$;
calculating, comparing, evaluating and establishing the Coefficient of Symmetry between Values (CSV) and the Level of Symmetry ($NS^{CSV}$) between |Y|SmO$_2$%, |Y|O$_2$HHb and |Y|ΦO$_2$HHb of each TM$^M$ and his Contralateral Muscle Tissue Monitored (TMC$^M$), in each INT$^{TL}$ or R-INT$^{TL}$ INT$^{TL}$ greater than or equal to $U_{Amin}$ and less than or equal to $U_{Ana}$;
calculating, comparing and evaluating the General Trend of the Values (TGV [$\overleftrightarrow{(p)}$]) |Y|SmO$_2$%, |Y|ΦO$_2$HHb and |Y|O$_2$HHb, of all TM$_S^M$, in the R-INT$^{TL}$ ($U_{Amin}$–$U_{Ae}$) and ($U_{Ae}$–$U_{Ana}$);
calculating, comparing and establishing the lowest value of Coef-$\overleftrightarrow{(p)}$ and the equivalent $NS^{Coef\text{-}(p)}$ of $\overrightarrow{(p)}$ |Y|SmO$_2$%, $\overrightarrow{(p)}$ |Y|ΦO$_2$HHb and $\overrightarrow{(p)}$ |Y|O$_2$HHb, between the combination of at least 70-75% of the TM$_S^M$, in the R-INT$^{TL}$ ($U_{Amin}$–$U_{Ae}$) and ($U_{Ae}$–$U_{Ana}$);
determining that the following criteria are met to establish a limitation in Factor (A1):
the value of |Y|SmO$_2$% in each INT$^{TL}$ or R-INT$^{TL}$ INT$^{TL}$ greater or equal than $U_{Amin}$ and less than or equal to $U_{Ana}$, is ≥70% SmO$_2$%, in at least 70-75% of TM$_S^M$;
the values of |Y|SmO$_2$%, |Y|O$_2$HHb and |Y|ΦO$_2$HHb of each TM$^M$ and TMC$^M$, have at least one optimal symmetry, in each INT$^{TL}$ or R-INT$^{TL}$ greater than or equal to $U_{Amin}$ and less than or equal to $U_{Ana}$, in at least the 70-75% of TM$_S^M$;
the TGV of de $\overleftrightarrow{(p)}$ |Y|SmO$_2$%, $\overleftrightarrow{(p)}$ |Y|ΦO$_2$HHb and $\overleftrightarrow{(p)}$ |Y|O$_2$HHb is symmetric between the combination of at least 70-75% of TM$_S^M$, in the R-INT$^{TL}$ ($U_{Amin}$–$U_{Ae}$) and ($U_{Ae}$–$U_{Ana}$); and
the TGV of de $\overleftrightarrow{(p)}$ |Y|SmO$_2$%, $\overleftrightarrow{(p)}$ |Y|ΦO$_2$HHb and $\overleftrightarrow{(p)}$ |Y|O$_2$HHb is symmetric between each TM$^M$ and his TMC$^M$, in at least 80-85% of TM$_S^M$, in the R-INT$^{TL}$ ($U_{Amin}$–$U_{Ae}$) and ($U_{Ae}$–$U_{Ana}$).

5. The monitoring and evaluation method according to claim 2, further comprising the steps of:
evaluating the values of |Y|SmO$_2$%, |Y|O$_2$HHb and |Y|ΦO$_2$HHb of each TM$^M$, in each INT$^{TL}$ or R-INT$^{TL}$ greater than or equal to $U_{Amin}$;
calculating and evaluating the difference of SmO$_2$% between the value of |Y|SmO$_2$% of each TM$^M$ and his TMC$^M$, in each INT$^{TL}$ or R-INT$^{TL}$ greater than or equal to $U_{Amin}$;
comparing, evaluating and determining the CSV and $NS^{CSV}$ between the values of |Y|SmO$_2$%, |Y|ΦO$_2$HHb and |Y|O$_2$HHb of each TM$^M$ and his TMC$^M$, in each INT$^{TL}$ or R-INT$^{TL}$ greater than or equal to $U_{Amin}$;
calculating, comparing and evaluating the TGV [$\overleftrightarrow{(p)}$] of |Y|SmO$_2$%, |Y|ΦO$_2$HHb and |Y|O$_2$HHb of all TM$_S^M$, in the R-INT$^{TL}$ ($U_{Amin}$–$U_{Ae}$) and ($U_{Ae}$–$U_{Ana}$);
calculating, comparing and establishing the lowest value of Coef-$\overleftrightarrow{(p)}$ and the equivalent $NS^{Coef\text{-}(p)}$ of $\overrightarrow{(p)}$ |Y|SmO$_2$%, $\overrightarrow{(p)}$ |Y|ΦO$_2$HHb and $\overrightarrow{(p)}$ |Y|O$_2$HHb, between the combination of at least 50-55% of the TM$_S^M$, in the R-INT$^{TL}$ ($U_{Amin}$–$U_{Ae}$) and ($U_{Ae}$–$U_{Ana}$); and
determining that the following criteria are met to establish a limitation in Factor (A2):
the difference between the value of |Y|SmO$_2$% of each TM$^M$ and his TMC$^M$ is >5% SmO$_2$%, in the 95% of INT$^{TL}$ or R-INT$^{TL}$ greater than or equal to $U_{Amin}$, in at least the 70-75% of TM$_S^M$;
the value of |Y|SmO$_2$% is ≥55% SmO$_2$%, in the 80% of TM$_S^M$, in each INT$^{TL}$ or R-INT$^{TL}$ greater than or equal to $U_{Amin}$ and less than or equal to $U_{Ana}$;
the values of |Y|SmO$_2$%, |Y|O$_2$HHb and |Y|ΦO$_2$HHb are asymmetric in at least the 50% of INT$^{TL}$ or R-INT$^{TL}$ greater than or equal to $U_{Amin}$, between one TM$^M$ and his TMC$^M$, in at least the 70-75% of TM$_S^M$; and
the TGV of de $\overleftrightarrow{(p)}$ |Y|SmO$_2$%, $\overleftrightarrow{(p)}$ |Y|ΦO$_2$HHb and $\overleftrightarrow{(p)}$ |Y|O$_2$HHb is asymmetric between the combination of at least the 50-55% of TM$_S^M$, in the R-INT$^{TL}$ ($U_{Amin}$–$U_{Ae}$) and ($U_{Ae}$–$U_{Ana}$).

6. The monitoring and evaluation method according to claim 2, further comprising the steps of:
evaluating the value of |Y|SmO$_2$% of at least one TM$^M$, in each INT$^{TL}$ or R-INT$^{TL}$ greater than or equal to $U_{Amin}$;
calculate, comparing and evaluating the value of |Y|SmO$_2$%, |Y|O$_2$HHb and |Y|ΦO$_2$HHb of at least one TM$^M$ with the values of his TMC$^M$, in each INT$^{TL}$ or R-INT$^{TL}$ greater than or equal to $U_{Amin}$;
calculating, evaluating and determining the value of CSV and $NS^{CSV}$ of |Y|SmO$_2$%, |Y|ΦO$_2$HHb and |Y|O$_2$HHb, of at least one TM$^M$ and his TMC$^M$, in each INT$^{TL}$ or R-INT$^{TL}$ greater than or equal to $U_{Amin}$;
calculating, comparing and evaluating the TGV [$\overleftrightarrow{(p)}$] of |Y|SmO$_2$%, |Y|ΦO$_2$HHb and |Y|O$_2$HHb of all TM$_S^M$, in the R-INT$^{TL}$ ($U_{Amin}$–$U_{Ae}$) and ($U_{Ae}$–$U_{Ana}$);
calculating, evaluating and determining the lowest value of Coef-$\overleftrightarrow{(p)}$ and the equivalent $NS^{Coef\text{-}(p)}$ between the values of $\overrightarrow{(p)}$ |Y|SmO$_2$%, $\overrightarrow{(p)}$ |Y|ΦO$_2$HHb and $\overrightarrow{(p)}$ |Y|O$_2$HHb, of at least the combination of the 50-55% TM$_S^M$; and
determining that the following criteria are met to establish a limitation on Factor (A3):
the value of |Y|SmO$_2$% is >50% SmO$_2$% in the TM$^M$ analyzed, in the 95% of INT$^{TL}$ or R-INT$^{TL}$ greater than or equal to $U_{Amin}$;

the values of $|Y|SmO_2^\%$, $|Y|O_2HHb$ $|Y|y$ $\Phi O_2HHb$ of the $TM^M$ analyzed are greater than the values of his $TMC^M$, in the 95% of $INT^{TL}$ or $R\text{-}INT^{TL}$ greater than or equal to $U_{Amin}$;

the TGV of $\overleftrightarrow{(p)}|Y|SmO_2^\%$, $\overleftrightarrow{(p)}|Y|\Phi O_2HHb$ and $\overleftrightarrow{(p)}|Y|O_2HHb$ is asymmetric between the $TM^M$ analyzed and his $TMC^M$, in the $R\text{-}INT^{TL}$ ($U_{Amin}\text{-}U_{Ae}$) and ($U_{Ae}\text{-}U_{Ana}$); and the TGV of $\overleftrightarrow{(p)}|Y|SmO_2^\%$, $\overleftrightarrow{(p)}|Y|\Phi O_2HHb$ and $\overleftrightarrow{(p)}|Y|O_2HHb$ is symmetric between the combination of at least the 50-55% of $TM_S^M$, in the $R\text{-}INT^{TL}$ ($U_{Amin}\text{-}U_{Ae}$) and ($U_{Ae}\text{-}U_{Ana}$).

7. The monitoring and evaluation method according to claim 2, further comprising the steps of:
evaluating the value of $|Y|SmO_2^\%$, $|Y|\Phi O_2HHb$ and $|Y|O_2HHb$, of each $TM^M$, in each $INT^{TL}$ or $R\text{-}INT^{TL}$ greater than or equal to $U_{Amin}$;
calculating, evaluating and determining the value of CSV and the equivalent $NS^{CSV}$ of de $|Y|SmO_2^\%$, $|Y|\Phi O_2HHb$ and $|Y|O_2HHb$, of at least one $TM^M$ and his $TMC^M$, in each $INT^{TL}$ or $R\text{-}INT^{TL}$ greater than or equal to $U_{Amin}$;
calculating, comparing and evaluating the TGV [$\overleftrightarrow{(p)}$] of $|Y|SmO_2^\%$, $|Y|\Phi O_2HHb$ and $|Y|O_2HHb$ of all $TM_S^M$, in the $R\text{-}INT^{TL}$ ($U_{Amin}\text{-}U_{Ae}$) and ($U_{Ae}\text{-}U_{Ana}$);
calculating, evaluating and determining Coef-$\overleftrightarrow{(p)}$ and the equivalent $NS^{Coef\text{-}(p)}$ between the values $\overleftrightarrow{(p)}|Y|SmO_2^\%$, $\overleftrightarrow{(p)}|Y|\Phi O_2HHb$ and $\overleftrightarrow{(p)}|Y|O_2HHb$, of each $TM^M$ and his $TMC^M$, in the $R\text{-}INT^{TL}$ ($U_{Amin}\text{-}U_{Ae}$) and ($U_{Ae}\text{-}U_{Ana}$); and
determining that the following criteria are met to establish a limitation on Factor (A4):
the value of $|Y|SmO_2^\%$ of the $TM^M$ analyzed and of his $TMC^M$ is greater than or equal to 65% $SmO_2^\%$, in each $INT^{TL}$ or $R\text{-}INT^{TL}$ greater than or equal to $U_{Amin}$;
the trend of $\overleftrightarrow{(p)}|Y|SmO_2\%$, $\overleftrightarrow{(p)}|Y|\Phi O_2HHb$ and $\overleftrightarrow{(p)}|Y|O_2HHb$, in the 70% of $TM_S^M$ and their $TM_SC^M$ are minimally symmetric, in the $R\text{-}INT^{TL}$ ($U_{Amin}\text{-}U_{Ae}$) and ($U_{Ae}\text{-}U_{Ana}$);
the values of $|Y|SmO_2^\%$, $|Y|\Phi O_2HHb$ and $|Y|O_2HHb$ of the $TM^M$ analyzed and his $TMC^M$ are greater than the values of at least the 70-75% of the remaining $TM_S^M$, in each $INT^{TL}$ or $R\text{-}INT^{TL}$ greater than or equal to $U_{Amin}$; and
the values of $|Y|SmO_2^\%$ of at least the 50-55% of $TM_S^M$ is ≤45% $SmO_2^\%$, in any $INT^{TL}$ or $R\text{-}INT^{TL}$ greater than or equal to $U_{Ae}$.

8. The monitoring and evaluation method according to claim 2, where in addition to the $TM_S^M$ to be evaluated, one or more $TM_S^M$ that participate in a breathing process are evaluated, and where the method also comprise the steps of:
calculating, analyzing and evaluating the value of $|Y|SmO_2^\%$ of at least one $TM^M$ involved in the breathing process, including inspiration and expiration, during $AFC^M$, in each $INT^{TL}$ or $R\text{-}INT^{TL}$ greater than or equal to $U_{Amin}$;
calculating, analyzing and evaluating the trend $\overleftrightarrow{(p)}$ of the $SmO_2^\%$ and $\Phi O_2HHb$ values of all $TM_S^M$, on the initial 5 and 10 seconds of at least one ID after an IT of $INT^{TL}$ or $R\text{-}INT^{TL}$ average greater than or equal to $U_{Ae}$; and determining that the following criteria are met to establish a limitation on Factor (B1.1):
the trend of the values $\overleftrightarrow{(p)}$ $SmO_2^\%$ and $\overleftrightarrow{(p)}$ $\Phi O_2HHb$ in the initial 5 seconds, in all ID after an IT of $INT^{TL}$ or $R\text{-}INT^{TL}$ average greater than or equal to $U_{Ae}$, is less than [$\overleftrightarrow{(p)}$<0000.5], in at least 70% of $TM_S^M$;
the trend of the values $\overleftrightarrow{(p)}$ $SmO_2^\%$ and $\overleftrightarrow{(p)}$ $\Phi O_2HHb$ in the initial 10 seconds, in all ID after an IT of $INT^{TL}$ or $R\text{-}INT^{TL}$ average greater than or equal to $U_{ANA}$, is less than [$\overleftrightarrow{(p)}$<0000.5], in at least 70% of $TM_S^M$; and
the value of $|Y|SmO_2^\%$ is >50% $SmO_2^\%$ in the $TM_S^M$ that participate in the breathing process, in at least one $INT^{TL}$ or $R\text{-}INT^{TL}$ greater than or equal to $U_{Amin}$.

9. The monitoring and evaluation method according claim 2, where in addition to the $TM_S^M$ to be evaluated, one or more $TM_S^M$ that participate in the breathing process are evaluated, and where they also comprise the steps of:
calculating, analyzing and evaluating the value of $|Y|SmO_2^\%$ of at least one TM involved in the breathing process, inspiration (inhalation) and expiration (exhalation), during $AFC^M$, in each $INT^{TL}$ or $R\text{-}INT^{TL}$ greater than or equal to $U_{Amin}$;
calculating, analyzing and evaluating the trend $\overleftrightarrow{(p)}$ of the $SmO_2^\%$ and $\Phi O_2HHb$ values of all $TM_S^M$, in the initial 5 seconds, of at least one ID after an IT of $INT^{TL}$ or $R\text{-}INT^{TL}$ average greater than or equal to $U_{Ae}$; and
determining that the following criteria are met to establish a limitation on Factor (B1.1):
the trend of the values $\overleftrightarrow{(p)} SmO_2^\%$ and $\overleftrightarrow{(p)} \Phi O_2HHb$ in the initial 5 seconds, in all ID after an IT of $INT^{TL}$ or $R\text{-}INT^{TL}$ average greater than or equal to $U_{Ae}$, is less than [$\overleftrightarrow{(p)}$<0000.5], in at least 70% of $TM_S^M$;
the value of $|Y|SmO_2^\%$ is ≤50% $SmO_2^\%$ in the $TM_S^M$ that participate in the breathing process, inspiration (inhalation) and expiration (exhalation), in at least one $INT^{TL}$ or $R\text{-}INT^{TL}$ greater than or equal to $U_{Amin}$.

10. The monitoring and evaluation method according to claim 2, further comprising the steps of:
calculating the value of $|Y|SmO_2^\%$, $|Y|O_2HHb$, $|Y|\Phi O_2HHb$, of each $TM^M$, in at least one $INT^{TL}$ or $R\text{-}INT^{TL}$ greater than or equal to $U_{Amin}$;
calculating the values of $SmO_2^\%$, $O_2HHb$ and $\Phi O_2HHb$ of the Upper Limit of the Optimal Zone (|lim sup-|Zona$^{Op}$) and the Lower Limit of the Optimal Zone |lim inf|Zona$^{Op}$, in the determined $INT^{TL}$ or $R\text{-}INT^{TL}$, from the following calculation:

|lim sup|Zona$^{Op}$=(Median of $\{|Y|_1; |Y|_2; |Y|_3; \ldots\}$)+($\sigma$ $\{|Y|_1; |Y|_2; |Y|_3; \ldots,\}$)2

|lim inf|Zona$^{Op}$=(Median of $\{|Y|_1; |Y|_2; |Y|_3; \ldots\}$)−($\sigma$ $\{|Y|_1; |Y|_2; |Y|_3; \ldots,\}$)/2 wherein |Y| is the value ($SmO_2\%$, $O_2HHb$ or $\Phi O_2HHb$) of each $TM^M$ at the determined intensity; ($\sigma$) is the standard deviation of ($SmO_2\%$, $O_2HHb$ or $\Phi O_2HHb$) of each $TM^M$ at the determined intensity;
comparing and evaluating the values of $|Y|SmO_2^\%$, $|Y|O_2HHb$ and $|Y|\Phi O_2HHb$, of at least one $TM^M$ with the values of $SmO_2\%$, $O_2HHb$ and $\Phi O_2HHb$ of |lim inf|Zona$^{Op}$ and of |lim sup|Zona$^{Op}$, in analyzed $INT^{TL}$ or $R\text{-}INT^{TL}$ greater than or equal to $U_{Amin}$; and determining the type of performance of the Factor (B.2.1.1) that develops at least one $TM^M$ analyzed, in the analyzed $INT^{TL}$ or R-$INT^{TL}$, based on the following criteria:
- excessive Muscle Oxygen Amount when:
  - the value of $|Y|SmO_2^\%$ of the $TM^M$ is ≤80% $SmO_2^\%$ in the analyzed $INT^{TL}$ or R-$INT^{TL}$;
  - the value of $|Y|SmO_2^\%$ of the analyzed $TM^M$ is greater than $SmO_2^\%|lim\ sup|Zona^{Op}$, in the analyzed $INT^{TL}$ or R-$INT^{TL}$;
  - the difference between the value of $|Y|SmO_2^\%$ of the analyzed $TM^M$ and $SmO_2\%\ |lim\ sup|Zona^{Op}$ is ≥15% $SmO_2^\%$, in the analyzed $INT^{TL}$ or R-$INT^{TL}$;
- greater Amount of Muscular Oxygen when:
  - the value of $|Y|SmO_2^\%$ of the analyzed $TM^M$ is greater than $SmO_2^\%|lim\ sup|Zona^{Op}$, in the analyzed $INT^{TL}$ or R-$INT^{TL}$;
  - the difference between the value of $|Y|SmO_2^\%$ of the analyzed $TM^M$ and $SmO_2^\%|lim\ sup|Zona^{Op}$, is <15% $SmO_2^\%$, in the analyzed $INT^{TL}$ or R-$INT^{TL}$;
- optimal Amount of Muscular Oxygen when:
  - the value of $|Y|SmO_2^\%$ of the analyzed $TM^M$ is equal or less than $SmO_2^\%|lim\ sup|Zona^{Op}$, in the analyzed $INT^{TL}$ or R-$INT^{TL}$;
  - the value of $|Y|SmO_2^\%$ of the analyzed $TM^M$ is equal or greater than $SmO_2\%\ |lim\ inf|Zona^{Op}$, in the analyzed $INT^{TL}$ or R-$INT^{TL}$;
- lower Amount of Muscular Oxygen when:
  - the value of $|Y|SmO_2^\%$ of the analyzed $TM^M$ is greater than $SmO_2^\%|lim\ inf|Zona^{Op}$, in the analyzed $INT^{TL}$ or R-$INT^{TL}$;
  - the value of $|Y|SmO_2^\%$ of the analyzed $TM^M$ is >20% $SmO_2^\%$, in the analyzed $INT^{TL}$ or R-$INT^{TL}$; or
- inefficient or Low Amount of Muscular Oxygen when:
  - the value of $|Y|SmO_2^\%$ of the analyzed $TM^M$ is greater than $SmO_2^\%|lim\ inf|Zona^{Op}$, in the analyzed $INT^{TL}$ or R-$INT^{TL}$;
  - the value of $|Y|SmO_2^\%$ of the analyzed $TM^M$ is <20% $SmO_2^\%$, in the analyzed $INT^{TL}$ or R-$INT^{TL}$;

determining the type of performance of the Factor (B.2.1.2) that develops at least one analyzed $TM^M$, in the analyzed $INT^{TL}$ or R-$INT^{TL}$, based on the following criteria:
- higher Hemoglobin Delivery Volume when:
  - the value of $|Y|O_2HHb$ of the analyzed $TM^M$ is greater than $O_2HHb\ |lim\ sup\ |Zona^{Op}$, in the $INT^{TL}$ or R-$INT^{TL}$ analyzed;
- optimal Hemoglobin Delivery Volume when:
  - the value of $|Y|O_2HHb$ of the analyzed $TM^M$ analyzed is equal or less than $O_2HHb\ |lim\ sup|Zona^{Op}$, in the analyzed $INT^{TL}$ or R-$INT^{TL}$;
  - the value of $|Y|O_2HHb$ of the analyzed $TM^M$ is equal or greater than $O_2HHb\ |lim\ inf|Zona^{Op}$, in the analyzed $INT^{TL}$ or R-$INT^{TL}$; or
- lower Hemoglobin Delivery Volume when:
  - the value of $|Y|O_2HHb$ of the analyzed $TM^M$ a is less than $O_2HHb\ |lim\ inf|Zona^{Op}$, in the analyzed $INT^{TL}$ or R-$INT^{TL}$;

determining the type of performance of the Factor (B.2.1.3) that develops at least one analyzed $TM^M$, in the analyzed $INT^{TL}$ or R-$INT^{TL}$, based on the following criteria:
- higher Blood Flow Delivery Rate when:
  - the value of $|Y|\Phi O_2HHb$ of the analyzed $TM^M$ is greater than the value of $\Phi O2HHb|lim\ sup\ |Zona^{Op}$, in the analyzed $INT^{TL}$ or R-$INT^{TL}$;
- optimal Blood Flow Delivery Rate when:
  - the value of $|Y|\Phi O_2HHb$ of the analyzed $TM^M$ is equal or less than of $\Phi O_2HHb|lim\ sup|Zona^{Op}$, in the analyzed $INT^{TL}$ or R-$INT^{TL}$;
  - the value of $|Y|\Phi O_2HHb$ of the analyzed $TM^M$ is equal or greater than $\Phi O_2HHb\ |lim\ inf|Zona^{Op}$, in the analyzed $INT^{TL}$ or R-$INT^{TL}$; or
- lower Blood Flow Delivery Rate when:
  - the value of $|Y|\Phi O_2HHb$ of the analyzed $TM^M$ is less than $\Phi O_2HHb\ |lim\ inf|Zona^{Op}$, in the analyzed $INT^{TL}$ or R-$INT^{TL}$.

11. The monitoring and evaluation method according to claim 2, further comprising the steps of:
- calculating, comparing and evaluating the maximum value of $SmO_2^\%$, $O_2HHb$ and $\Phi O_2HHb$ of all $TM_S^M$, in at least one ID;
- calculating, evaluating and determining the value of CSV and the equivalent $NS^{CSV}$ of the maximum value of $SmO_2^°$, $\Phi O_2HHb$ and $O_2HHb$, of all $TM_S^M$, in at least one ID;
- calculating, evaluating and determining the lowest value of Coefficient of Symmetry Between Values (CSV) and the equivalent $NS^{CSV}$ of the maximum value of $SmO_2^\%$, $\Phi O_2HHb$ and $O_2HHb$, from the combination of at least the 70-75% of the $TM_S^M$, in at least one ID; and
- determining the type of performance of the Factor (B.2.2), just at the moment of cessation of locomotor work, based on the following criteria:
  - perfect performance when:
    - the maximum values of $SmO_2^\%$, $O_2HHb$ and $\Phi O_2HHb$ are symmetrically perfect, between all $TM_S^M$, in the analyzed ID;
  - optimal performance when:
    - the maximum values of $SmO_2\%$, $O_2HHb$ and $\Phi O_2HHb$, are symmetrically optimal, between the combination of at least the 70-75% of the $TM_S^M$, in the analyzed ID; or
  - asymmetric Performance when:
    - the maximum values of $SmO_2^\%$, $O_2HHb$ and $\Phi O_2HHb$, are not symmetrically optimal, between the combination of at least the 70-75% of the $TM_S^M$, in the analyzed ID.

12. The monitoring and evaluation method according to claim 2, further comprising the steps of:
- calculating, comparing and evaluating the maximum value of $SmO_2^\%$ between two ID, separated by at least one IT of at least one $TM^M$; and
- determining the type of performance of the Factor (B.2.3) that develops, at least one analyzed $TM^M$, between two ID, separated by a IT, based on the following criteria:
  - Significant increase when:
    - increase >5% $SmO_2^\%$, in the maximum value of $SmO_2^\%$, of the analyzed $TM^M$, in the 2nd ID in compared to the 1ST LD;
  - Slight Increase when:
    - increase between [2.01-5%] $SmO_2^\%$, in the maximum value of $SmO_2^\%$, of the analyzed $TM^M$, in the 2nd ID in compared to the 1ST LD;
  - Slight decrease when:
    - decrease between [2.01-5%] $SmO_2^\%$ in the maximum value of $SmO_2^\%$, of the analyzed $TM^M$, in the 2nd ID in compared to the 1ST LD;
  - Significant decrease when:
    - decrease >5% $SmO_2^\%$, in the maximum value of $SmO_2^\%$ of the analyzed $TM^M$, in the 2nd ID in compared to the 1ST LD; or Maintenance when:
  decrease or increase of between [0-2%] $SmO_2^\%$, in the maximum value of $SmO_2^\%$, of the analyzed $TM^M$, in the 2nd ID in compared to the 1ST LD.

13. The monitoring and evaluation method according to claim 2, further comprising the steps of:
  calculating, comparing and evaluating a General Trend of the Values (TGV) [$\overleftrightarrow{(p)}$] of $\overrightarrow{(p)}$ |Y|ThB of at least one $TM^M$, in the R-$INT^{TL}$ ($U_{Ae}$–$U_{ANA}$) and ($U_{ANA}$–Maximum Intensity [$Int_{Max}$]);
  the value of |Y|$SmO_2^\%$ of the analyzed $TM^M$ is less than or equal to 45% $SmO_2\%$, in at least one $INT^{TL}$ or R-$INT^{TL}$ greater than or equal to $U_{Amin}$; and
  determining if the following criteria are met to establish a limitation in Factor (B2.4):
    the TGV $\overrightarrow{(p)}$||Y|ThB of the analyzed $TM^M$ is $\overrightarrow{[(p)}$>0.0005], in the R-$INT^{TL}$ ($U_{Ae}$–$U_{ANA}$) or ($U_{ANA}$–Maximum Intensity [$Int_{Max}$]); and
    the value of |Y|$SmO_2^\%$ of the analyzed $TM^M$ is less than or equal to 45% $SmO_2^\%$, in at least one $INT^{TL}$ or R-$INT^{TL}$ greater than or equal to $U_{Amin}$.

14. The monitoring and evaluation method according to claim 2, further comprising the steps of:
  evaluating the value |Y|$SmO_2^\%$, |Y|$O_2HHb$ and |Y|$\Phi O_2HHb$, of at least one $TM^M$, in at least one $INT^{TL}$ or R-$INT^{TL}$ greater or equal than $U_{Amin}$;
  calculating the $SmO_2^\%$, $O_2HHb$ and $\Phi O_2HHb$ values of the Upper Limit of the Optimal Zone (|lim sup|$Zona^{Op}$) and the Lower Limit of the Optimal Zone (|lim inf|$Zona^{Op}$), in the determined $INT^{TL}$ or R-$INT^{TL}$, from the following calculation:
  |lim sup |$Zona^{Op}$=(Mediana de {|Y|$_1$; |Y|$_2$; |Y|$_3$; ...})+($\sigma$ {|Y|$_1$; |Y|$_2$; |Y|$_3$; ...,})/2
  |lim inf|$Zona^{Op}$=(Mediana de {|Y|$_1$; |Y|$_2$; |Y|$_3$; ...})–($\sigma$ {|Y|1; |Y|2; |Y|3; ...,})/2
  where |Y| is the value ($SmO_2\%$, $O_2HHb$ or $\Phi O_2HHb$) of each $TM^M$, in the determined $INT^{TL}$ or R-$INT^{TL}$ and ($\sigma$) is the standard deviation of ($SmO_2^\%$, $O_2HHb$ or $\Phi O_2HHb$) of each $TM^M$, in the determined $INT^{TL}$ or R-$INT^{TL}$;
  comparing and evaluating the values of |Y|$SmO_2^\%$, |Y|$O_2HHb$ and |Y|$\Phi O_2HHb$, of at least one $TM^M$ with the values of $SmO_2\%$, $O_2HHb$ and $\Phi O_2HHb$ of the |lim sup |$Zona^{Op}$ and the |lim inf|$Zona^{Op}$, in at least one determined $INT^{TL}$ or R-$INT^{TL}$ greater or equal than $U_{Amin}$; and
  determining the level of Neuromuscular Activation performed by at least one $TM^M$ (Factor B3.1), based on the following criteria:
    Null or Very Low Neuromuscular Activation when:
      the value of |Y|$SmO_2^\%$, |Y|$O_2HHb$ and |Y|$\Phi O_2HHb$ of the $TM^M$ analyzed is greater than $SmO_2^\%$, $O_2HHb$ and $\Phi O_2HHb$|lim sup |$Zona^{Op}$, in the determined $INT^{TL}$ or R-$INT^{TL}$;
      the value of |Y|$SmO_2^\%$ of the $TM^M$ analyzed, is >75% $SmO_2^\%$ in the determined $INT^{TL}$ or R-$INT^{TL}$;
    Less or Low Neuromuscular Activation when:
      the value of |Y|$SmO_2^\%$, |Y|$O_2HHb$ and |Y|$\Phi O_2HHb$ of the $TM^M$ analyzed is greater than $SmO_2^\%$, $O_2HHb$ and $\Phi O_2HHb$|lim sup|$Zona^{Op}$, in the determined $INT^{TL}$ or R-$INT^{TL}$;
      the value of |Y|$SmO_2^\%$ of the $TM^M$ analyzed, is <75% $SmO_2^\%$ in the determined $INT^{TL}$ or R-$INT^{TL}$;
    Optimal Neuromuscular Activation when:
      the value of |Y|$SmO_2^\%$, |Y|$O_2HHb$ and |Y|$\Phi O_2HHb$, of the $TM^M$ analyzed, is less than $SmO_2^\%$, $O_2HHb$ and $\Phi O_2HHb$ |lim sup |$Zona^{Op}$, in the determined $INT^{TL}$ or R-$INT^{TL}$;
      the value of |Y|$SmO_2^\%$, |Y|$O_2HHb$ and |Y|$\Phi O_2HHb$, of the $TM^M$ analyzed, is greater than $SmO_2^\%$, $O_2HHb$ and $\Phi O_2HHb$|lim inf|$Zona^{Op}$, in the determined $INT^{TL}$ or R-$INT^{TL}$;
    Excessive or Priority Neuromuscular Activation when:
      the value of |Y|$SmO_2^\%$, |Y|$O_2HHb$ and |Y|$\Phi O_2HHb$, of the $TM^M$ analyzed, is less than $SmO_2\%$, $O_2HHb$ and $\Phi O_2HHb$ |lim inf|$Zona^{Op}$, in the determined $INT^{TL}$ or R-$INT^{TL}$;
      the value of |Y|$SmO_2^\%$ of the $TM^M$ analyzed is ≤25% $SmO_2^\%$, in some $INT^{TL}$ or R-$INT^{TL}$; or
    High Neuromuscular Activation when:
      the value of |Y|$SmO_2^\%$, |Y|$O_2HHb$ and |Y|$\Phi O_2HHb$, of the $TM^M$ analyzed, is less than $SmO_2^\%$, $O_2HHb$ and $\Phi O_2HHb$ |lim inf|$Zona^{Op}$, in the determined $INT^{TL}$ or R-$INT^{TL}$;
      the value of |Y|$SmO_2^\%$ of the $TM^M$ analyzed is >25% $SmO_2^\%$, in all the $INT^{TL}$ or R-$INT^{TL}$ greater than or equal to $U_{Amin}$.

15. The monitoring and evaluation method according to claim 2, further comprising the steps of:
  calculating the median value of ThB ($\check{Y}ThB$), of at least one $TM^M$, in at least one IT of average $INT^{TL}$ or R-$INT^{TL}$ greater than or equal to $U_{Amin}$;
  calculating the standard deviation ($\sigma$) of at least one $TM^M$, in at least one IT of average $INT^{TL}$ or R-$INT^{TL}$ greater than or equal to $U_{Amin}$;
  calculating the minimum value of ThB in at least one ID perform after an IT analyzed, of average $INT^{TL}$ or R-$INT^{TL}$ greater than or equal to $U_{Amin}$;
  calculating and evaluate the difference between [($\check{Y}ThB$)–$\sigma$] of at least one IT and the minimum value of ThB of his posterior/successive ID; and
  determining if the following criteria are met to establish a limitation in Factor (B3.2) in at least one $TM^M$:
    the value [Median $\check{Y}ThB$-6ThB] of the analyzed $TM^M$, of the analyzed IT of $INT^{TL}$ or R-$INT^{TL}$ greater than or equal to $U_{Amin}$, is greater than the minimum value of ThB of the successive ID to the analyzed IT.

16. The monitoring and evaluation method according to claim 2, further comprising the steps of:
  calculating, comparing and evaluating the median value (Y) of $SmO_2^\%$, $O_2HHb$, $\Phi O_2HHb$, HHb and $\Phi HHb$, of each $TM^M$, in at least one determined $INT^{TL}$ or R-$INT^{TL}$, in each one of the developed FCM and in the determined environmental conditions, during the $AFC^M$; and
  determining all the Optimal FCM or Optimal R-FCM, of at least one determined $INT^{TL}$ or R-INTIL, under certain environmental conditions, during $AFC^M$, based on the fulfillment of the following criteria established for the factor (B3.3):
    have the highest value of $\check{Y}SmO_2^\%$ or a difference≤ (±2.5%) $SmO_2^\%$ with respect to the highest value $\check{Y}SmO_2^\%$, of all FCM or R-FCM, in at least the 78-81% of the $TM^M$, in the determined $INT^{TL}$ or R-$INT^{TL}$, during the determined $AFC^M$;
    have the highest value of $\check{Y}O_2HHb$ % or a difference≤ (±0.30 g/dL) $O_2HHb$ with respect to the highest value $\check{Y}O_2HHb$, of all FCM or R-FCM, in at least the 78-81% of the $TM^M$, in the determined $INT^{TL}$ or R-$INT^{TL}$, during the determined $AFC^M$;

have the highest value of $\breve{Y}\Phi O_2HHb$ % or a difference≤($\pm 1.00$ g/dL) $\Phi O_2HHb$ with respect to the highest value $\breve{Y}\Phi O_2HHb$, of all FCM or R-FCM, in at least the 78-81% of the $TM^M$, in the determined $INT^{TL}$ or R-$INT^{TL}$, during the determined $AFC^M$;

have the lowest value of $\breve{Y}HHb^\%$ or a difference≤ ($\pm 1.00$ g/dL) HHb with respect to the lowest value $\breve{Y}HHb$, of all FCM or R-FCM, in at least the 78-81% of the $TM^M$, in the determined $INT^{TL}$ or R-$INT^{TL}$, during the determined $AFC^M$; and have the lowest value of $\breve{Y}\Phi HHb^\%$ or a difference≤ ($\pm 1.00$ g/dL) $\Phi HHb$ with respect to the lowest value $\breve{Y}\Phi HHb$, of all FCM or R-FCM, in at least the 78-81% of the $TM^M$, in the determined $INT^{TL}$ or R-$INT^{TL}$, during the determined $AFC^M$.

17. A monitoring and evaluating system of the physical performance of one subject that comprises:

two or more near infrared sensors (NIRS);

a heart rate device;

an activity monitoring device;

a locomotive intensity meter; and a data processing system connected to the two or more near infrared sensors (NIRS), the heart rate device, the activity monitoring device and the locomotive intensity meter and configured to carry out the steps of:

placing or adhering the NIRS sensors on muscle tissues (TM) to be evaluated, place the heart rate device on a subject's chest, place the activity monitoring device and the locomotive intensity meter on the subject;

activating the devices for measuring data, during locomotive activity to be evaluated and sending data measured to a data processing system;

recording, through the data processing system, the data measured, during the development of at least one Cyclical Locomotive-Physical Activity (AFC), wherein:

the Cyclical Locomotive-Physical Activity Monitored ($AFC^M$) is continuous or interval, the activity monitoring device records the entire time scale from the beginning to the end of the $AFC^M$, including multiple work intervals and/or rest intervals, the recording frequency of the data for each device is less than 6 seconds, the $AFC^M$ is stable, incremental, decreasing or variable locomotor intensity or a combination of them, the $AFC^M$ includes a period of previous warm-up, when the $AFC^M$ does not include at least one Rest interval (ID), the data recording will end 1 minute after the AFC ceases and that minute will be counted as an Rest interval (ID), a Locomotor Work Intensity ($INT^{TL}$) or an average Locomotor Work Intensity Range (R-$INT^{TL}$)), obtained from the Cyclical Locomotive-Physical Activity Monitored ($AFC^M$), is greater than or equal to a Minimum Activation Threshold ($U_{Amin}$), previously defined;

obtaining at least the following monitored data from the devices for measuring with a respective temporary registration:

Muscular Oxygen Saturation ($SmO_2^\%$) and Absolute Capillary Hemoglobin (ThB) of each of the monitored muscle tissues ($TM^M$) that participate in $AFC^M$, through the NIRS devices, Heart rate (HR), through the heart rate device, Power, Running Speed, through the locomotive intensity meter, time record or timescale of the $AFC^M$, with all the time records of the start or end of $AFC^M$, and the start and end of the different intervals developed during the $AFC^M$, through the locomotive activity meter, and cadence or acceleration, through external locomotor performance devices, synchronizing, linking and joining the monitored data obtained in a single time scale of joint data from the time scale collected by the activity monitoring device during the $AFC^M$ and the time record of each of the devices for measuring, through the data processing system;

calculating, through the data processing system, at least following values for each Monitored Muscle Tissue ($TM^M$) that participates in the $AFC^M$ from the recorded data of $SmO_2^\%$ and ThB of:

Oxygen-Charged Capillary Hemoglobin–g/dL ($O_2HHb$), through the formula:

$SmO_2*ThB=O_2HHb$

Oxygen Discharged Capillary Hemoglobin–g/dL (HHb), through the formula:

$ThB-O_2HHb=HHb$

Muscle Blood Flow of Muscle Hemoglobin–g/dL/s ($\Phi ThB$), through the formula:

$[ThB*HR]/60=\Phi ThB$

Muscular Blood Flow of Oxygen Charged Hemoglobin–g/dL/s ($\Phi O_2HHb$), through the formula:

$[O_2HHb*HR]/60=\Phi O_2HHb$

Muscular Blood Flow of Oxygen Discharged Hemoglobin–($\Phi HHb$), through the formula $[Hb*HR]/60=\Phi HHb$ filtering and excluding, through the data processing system, the data obtained erroneously and/or due to registration error by devices during $AFC^M$;

filtering and excluding, through the processing system, the values that are not within the following ranges, as well as data obtained by using them:

$SMO_2$%: Between 1% $SmO_2$ and 99% $SmO_2$;

ThB: Between 9.5 g/dL and 14.9 g/dL;

HR: Between 40 bpm and 230 bpm; and filtering and excluding, through the processing system: values whose difference between two temporary sequential records, is greater than the following parameters, and the data obtained from said values:

Difference of $SmO_2$%>$\pm 10$% $SmO_2$%;

Difference of ThB>$\pm 0.3$ g/dL;

Difference of HR>$\pm 7$ bpm.

* * * * *